(12) United States Patent
Ute et al.

(10) Patent No.: US 7,231,648 B2
(45) Date of Patent: Jun. 12, 2007

(54) DISK HOLDING APPARATUS, AND DISK APPARATUS

(75) Inventors: Chikara Ute, Shizuoka (JP); Kiyoshi Kawakubo, Tochigi (JP); Takeshi Sano, Tochigi (JP); Yukio Matsumoto, Saitama (JP); Akira Ishihara, Tochigi (JP); Noboru Fujita, Kanagawa (JP); Yutaka Ogasawara, Tochigi (JP); Hiroaki Masuda, Tochigi (JP); Daisuke Matsuo, Tochigi (JP)

(73) Assignee: Sony Corporation, Tokyo (JP)

( * ) Notice: Subject to any disclaimer, the term of this patent is extended or adjusted under 35 U.S.C. 154(b) by 483 days.

(21) Appl. No.: 10/433,481

(22) PCT Filed: Dec. 6, 2001

(86) PCT No.: PCT/JP01/10672

§ 371 (c)(1),
(2), (4) Date: Jan. 21, 2004

(87) PCT Pub. No.: WO02/49028

PCT Pub. Date: Jun. 20, 2002

(65) Prior Publication Data

US 2004/0139455 A1    Jul. 15, 2004

(30) Foreign Application Priority Data

Dec. 12, 2000 (JP) .............................. 2000-377216
Dec. 12, 2000 (JP) .............................. 2000-377217
Dec. 12, 2000 (JP) .............................. 2000-377219
Mar. 26, 2001 (JP) .............................. 2001-087257
Mar. 26, 2001 (JP) .............................. 2001-087258
Mar. 30, 2001 (JP) .............................. 2001-102399
Mar. 30, 2001 (JP) .............................. 2001-102400
Mar. 30, 2001 (JP) .............................. 2001-102401
Mar. 30, 2001 (JP) .............................. 2001-102402
Mar. 30, 2001 (JP) .............................. 2001-102403
Mar. 30, 2001 (JP) .............................. 2001-102404

(51) Int. Cl.
G11B 33/04    (2006.01)
G11B 17/03    (2006.01)
A47B 81/06    (2006.01)

(52) U.S. Cl. ....................................................... 720/703
(58) Field of Classification Search ................. 720/703
See application file for complete search history.

(56) References Cited

U.S. PATENT DOCUMENTS 4,655,342 A * 4/1987 Brauner et al. .............. 206/753
5,067,116 A * 11/1991 Kadrmas ................. 369/30.86

(Continued)

FOREIGN PATENT DOCUMENTS

DE          19527259 A1 * 3/1996

(Continued)

*Primary Examiner*—Angel Castro
*Assistant Examiner*—Christopher R. Magee
(74) *Attorney, Agent, or Firm*—Oblon, Spivak, McClelland, Maier & Neustadt, P.C.

(57) ABSTRACT

To provide a disk supporting apparatus, a disk holding apparatus and a disk apparatus whose planar dimension is minimized, and which can be manufactured simply and inexpensively.

A plurality of supporting portions 44 inclines with respect to a top portion 46 as a vertex. A tray 26 is formed into a substantially triangular pyramid (three-dimensional) configuration, and a planar dimension of the tray 26 can be smaller than that of a conventional turntable. Accordingly, a plurality of disks can be mounted on the tray 26. The supporting portion 44 of the tray 26 can be placed in parallel to a door leaf without a slide mechanism that has conventionally been used for sliding a tray. Accordingly, a desired disk can be attached/detached merely by rotating and driving the tray 26, and a mechanism disposed at a stereo apparatus is made compact and manufactured inexpensively.

6 Claims, 76 Drawing Sheets

U.S. PATENT DOCUMENTS 5,386,403 A * 1/1995 Morioka et al. ......... 369/30.98

FOREIGN PATENT DOCUMENTS

| JP | 111039/1992 | 9/1992 |
| JP | 9-326152 | 12/1997 |
| JP | 10064157 * | 3/1998 |
| JP | 10255364 A * | 9/1998 |
| JP | 11-339359 | 12/1999 |
| JP | 2000-100044 | 4/2000 |
| JP | 2000-322799 | 11/2000 |

* cited by examiner

DISK HOLDING APPARATUS, AND DISK APPARATUS

TECHNICAL FIELD

The present invention relates to a disk supporting apparatus, a disk holding apparatus and a disk apparatus that are appropriately applied to a disk player or the like that is equipped at an acoustic apparatus such as a component stereo apparatus.

More particularly, the present invention relates to a disk apparatus that is appropriately applied to a disk changer in which a tray having a plurality of compact disks mounted thereon is rotatably disposed Further, the present invention relates to a disk apparatus in which a tray having a plurality of compact disks mounted thereon is movably disposed.

Moreover, the present invention relates to a disk apparatus that comprises turntables each having a compact disk mounted thereon.

Furthermore, the present invention relates to a disk holding apparatus that is appropriately applied to a disk apparatus for reproducing information that is recorded on, for example, a compact disk.

BACKGROUND ART

As shown in FIG. 74, a disk changer 490 comprises a plate-shaped turntable 492 on which a plurality of mounting portions (three in FIG. 74) for mounting disks 10 thereon is formed, and a tray 494 on which the turntable 492 is rotatably disposed. Namely, the disk changer 490 is provided with a rotation mechanism for rotating the turntable 492, and a slide mechanism for sliding the tray 494.

The tray 494 slides along the base 496 by the slide mechanism, and is ejected from or returned to a door leaf of the apparatus body. In other words, an unillustrated "eject" button is pressed to pull the tray 494 out from or pull the tray 494 back to the door leaf of the apparatus body.

In the state in which the tray 494 is pulled out from the door leaf of the apparatus body, one of the mounting portions of the turntable 492 that comes on this side of the tray 494 has no disks or is vacant. Further, concave portions having diameters of two types are formed on each mounting portion so as to correspond to both 12 cm-disk and 8 cm-disk (not shown). Moreover, the disk 10 is chucked by an unillustrated damper at a damper holding portion 493 and an unillustrated turntable of a disk reproducing apparatus beneath the turntable 492 so as to face this clamper, and then reproduced.

A user mounts a disk on the mounting portion that is made vacant by pressing the unillustrated button. The tray 494 is pulled back into the apparatus body by repressing the "eject" button. The disk is reproduced or the like by pressing an unillustrated "play" button.

The rotation mechanism for rotating the turntable 492 and the slide mechanism for sliding the tray 494 are provided at the disk changer 490 shown in FIG. 74, whereby the structure of the disk changer 490 becomes more complicated and the manufacturing cost thereof becomes higher.

In the disk changer 490, since a plurality of disks must be arranged on the same plane of the turntable 492, the tray 494 must be spacious.

As shown in FIG. 75, a disk player 80 comprises a plate-shaped mounting table 82, a turntable 84, a ring-shaped damper 90, and unillustrated first moving means. Mounting portions 83A and 83B are formed on the mounting table 82 concentric with each other, and a 12 cm-disk (not shown) is mounted on the mounting portion 83A or an 8 cm-disk (not shown) is mounted on the mounting portion 83B. The turntable 84 is disposed so as to move vertically along the mounting table 82. The ring-shaped damper 90 is disposed so as to face the turntable 84. The mounting table 82 is movably disposed at the first moving means. Further, if a plurality of the mounting portions 83A and 83B are provided on the mounting table 82, the disk apparatus 80 functions as a disk changer.

The turntable 84 comprises a metal ring portion 85A at a portion at which the disk 10 is mounted, and a trunk portion 85B whose outer diameter is slightly smaller than an inner diameter of a hole of the disk 10. Further, the upper end of the trunk portion 85B is tapered. Moreover, a motor shaft 87 of a motor 86 is fixed to the bottom portion of the turntable 84, and when the motor 86 is driven, the turntable 84 is rotated.

The mounting portions 83A and 83B of the mounting table 82 are respectively caved so as to correspond to the 12 cm-disk 10 and the 8 cm-disk 10. Further, each of the mounting portions 83A and 83B has a through hole 82A through which the turntable 84 is passed. The through hole 82A has a diameter that is slightly larger than that of the ring portion 85A of the turntable 84.

Therefore, the turntable 84 moves vertically along the mounting table 82 that stops at a predetermined position, while passing through the through hole 82A. Namely, the turntable 84 moves the disk 10 up/down with respect to the mounting portion 83A.

The damper 90 is rotatably mounted to a supporting portion 94, and has a ring-shaped magnet 92. Further, an unillustrated hole is formed at the damper 90 so as to correspond to the configuration of the trunk portion 85B of the turntable 84. When the trunk portion 85B passes through the unillustrated hole, the magnet 92 magnetically attracting the ring portion 85A of the metal turntable 84 chucks the damper 90 (including the magnet 92) and the turntable 84 with each other.

On the other hand, in the disk apparatus 80 that is shown in FIG. 75, the disk 10 is chucked by moving the turntable 84 having the disk 10 mounted on the mounting portion 83A upward. When the disk 10 is not appropriately mounted on the mounting portion 83A, i.e., when the disk 10 is displaced from the mounting portion 83A, the disk 10 cannot be chucked. Thus, if the disk apparatus 80 is simply structured so as to mount the disk 10 on the mounting portion 83A, the disk 10 always needs be parallel with the mounting portion 83A.

In the disk apparatus 80, the mounting portion 83A or 83B on which a 12 cm-disk or an 8 cm-disk 10 is mounted must be formed on the mounting table 82 to be concentric with each other. Further, in order to appropriately mount on the mounting portion 83A of the mounting table 82 a so-called deformed disk which is formed into a heart shaped configuration or the like, it is necessary to correspond the configuration of the mounting portion 83A to that of the deformed disk. However, it is difficult to make the configuration of the mounting portion 83A correspond to various configurations of the deformed disks.

Accordingly, it is difficult to appropriately mount and chuck all of the disks such as the deformed disks onto the mounting portion 83A or 83B. A problem is caused in that smooth and reliable chucking cannot be conducted on all of the disks.

Further, when the turntable is attached to the mounting table 82, in order to connect the motor to the turntable, connection portions of the motor and the turntable are reliably positioned at a predetermined position therebetween. On the other hand, if a distance between a disk surface of the disk attached to the turntable and a pickup varies, a focal distance between the disk surface and the pickup may displace, and thereby causes a problem in that a focus servo control does not work successfully.

The distance between the disk surface and the pickup should be strictly adjusted such that the tolerance of the distance with respect to a reference value is ±0.1 mm. Further, during the rotation of the turntable, when the rotation center is displaced in the radial direction thereof, a case in which a tracking serve control does not work appropriately. As described above, if the focus servo control or the tracking servo control does not work appropriately, a case occurs in which a reproducing operation cannot be carried out.

A conventional disk changer comprises a tray on which a plurality of turntables on each of which a disk is mounted is disposed, a motor for the tray that rotates the tray by being connected to the tray, a pickup for reproducing data from the disk mounted on the turntable, a spindle of a spindle motor that is connected to the turntable, a chassis on which the spindle motor and the pickup are disposed, and a motor for the chassis for moving the chassis so that the spindle is connected to the turntable of the tray.

When a disk mounted on the turntable is reproduced, after the disk-change has been carried out, the spindle and the turntable must be connected to each other. Namely, the tray is rotated through the motor for the tray, so that the turntable having a disk mounted thereon corresponds to the spindle of the chassis. Thereafter, the chassis is moved (upward) through the motor for the chassis in order to connect the spindle to the turntable of the tray.

Further, in the conventional disk changer, a rotational movement of the tray and a (vertical) movement of the chassis have been performed by separate motors comprising a motor for the tray and a motor for the chassis. Therefore, in the conventional disk changer, since two motors have been required, separate gears have been also required for forming a driving path for the motors. Accordingly, the conventional disk changer requires more parts, needs be structured in a more complicated manner, and is thereby manufactured at more expense.

As described above, among the conventional disk changers, there has been provided a type of a disk changer comprising a tray in which a plurality of turntables on each of which a disk is mounted is disposed, a pickup for reproducing data from the disks mounted on the turntables, and a spindle of a spindle motor that is connected to each of the turntables, and a chassis on which the spindle motor and the pickup are disposed.

The aforementioned type of the disk changer is structured such that the turntables that are rotatably disposed on the tray and the spindle of the spindle motor that is disposed at the chassis can be separated from each other. For this reason, in the state in which each of the turntables and the spindle are not connected to each other (such as in a disk-change mode), for example, the bottom surface of each of the turntable abuts the upper surface of the tray.

On the other hand, in the state in which the turntable and the spindle are connected to each other (such as in a play mode), for example, in order not to damage a rotation of the turntable, the spindle is used to separate (float) the turntable from the tray and prevent the turntable and the tray from abutting to each other.

When a disk mounted on the turntable is reproduced, after a disk-change has been carried out, the spindle and the turntable must be connected to each other. Namely, the tray is rotated so as to correspond the turntable having a disk mounted thereon to the spindle of the chassis, and thereafter, the chassis is moved (upward) so that the spindle is connected to the turntable of the tray.

In the conventional disk changer described above, since the turntable disposed on the tray and the spindle of the spindle motor disposed on the chassis are structured to be separated from each other, a gap (play) must be formed between the turntable and the tray in order to separate (float) the turntable from the tray.

In the state in which the turntable and the tray are not connected to each other, for example, during the disk-change during which the tray is rotating or while the disk apparatus is being carried, a play between the turntable and the tray causes a so-called rattling noise.

In the conventional disk changer, in a connection mode in which the spindle and the turntable are connected to each other, the chassis is supported to the apparatus body merely by an operation lever. Namely, in the connection mode, for example, when a disk is attached or detached with respect to the turntable, it is feared that an unexpected load is applied to the tray, thus entering an unstable state. In this case, attaching/detaching operation of a disk with respect to the turntable becomes difficult.

In the above-described conventional disk changer, in a case in which a tray is formed into a rectangular shape having solid-angle portions, for example, because the tray rotates, a gap between each of turntables disposed on the tray and an opening portion of a panel must be made larger. Namely, in this case, since a user needs to stretch his or her hand to the turntable at a position that is separated from the opening portion of the panel, an attaching/detaching operation of a disk with respect to the turntable becomes difficult.

On the other hand, among conventional disk apparatuses, there has been provided a type of a disk apparatus in which an engaging member (balls, coil springs, and the like) for positioning a disk on a mounting surface of a turntable is provided at the turntable. Then, in order to position (attach) a disk on the mounting surface of the turntable, the disk must pass through the engaging member.

When a disk is incompletely attached to the turntable, information recorded on the disk cannot be reproduced. Further, in a disk changer of a type in which a tray being rotated, when a disk is incompletely attached to a turntable disposed on the tray, it is feared that, during a rotation of the tray, the disk flies away from the turntable due to a centrifugal force.

As shown in FIG. 59, a disk changer 300 of a type can be thought of, comprising a plurality of supporting portions 305 on which turntables 302 each having the disk 10 mounted thereon are disposed, and a tray 304 that is formed in a plan into a triangular configuration having solid-angle portions 304A. The tray 304 is rotatably disposed at the disk changer 300.

In the disk changer 300 shown in FIG. 59, as shown in FIG. 60, when the tray 304 is rotated to change the disk, one of the solid-angle portions 304A protrudes from single dot lines of FIG. 60. Therefore, the width of a base 301 of the disk changer 300 must be longer twice as much as a length LC. Namely, the width of the base 301 requires twice a maximum radius LA of the tray 304, i.e., twice a distance between a rotational center PA of the tray 304 and a vertex of each solid-angle portion 304A.

Further, conventionally, as a disk holding apparatus for holding a disk at a turntable, a ball-chuck mechanism is provided at a trunk portion of the turntable. As shown in FIGS. 76 and 77, the ball-chuck mechanism comprises balls 474, and coil springs 476 for protruding portions of the balls 474 from a trunk portion 471 of a turntable 470.

When the disk 10 shown in FIG. 77 is attached to the turntable 470, the balls 474 are pressed by an inner diameter of the disk 10 so that the disk 10 is moved over the balls 474 and mounted on a mounting portion 472 of the turntable 470. When the disk 10 is mounted on the mounting portion 472, the balls 474 are popped out by the urging force of the coil springs 476. Namely, since the balls 474 abut the disk 10 and press the disk 10 toward the mounting portion 472, the disk 10 can reliably be held at the turntable 470.

In the ball-chuck mechanism shown in FIGS. 76 ad 77, when the disk 10 is detached from the turntable 470, the disk 10 has been forcibly detached from the trunk portion 471 of the mounting portion 472 to resist the urging force of the coil springs 476 applying to the balls 474.

When the disk 10 engaged by the balls 474 is forcibly detached from the turntable 470, the disk 10 is prone to be damaged so that a careful handling is needed during the detachment of the disk 10.

In order to solve the aforementioned facts, it is considered to reduce the urging force of the coil springs. However, in this case, when a shock is applied to the apparatus body, it is feared that the disk 10 is easily ejected from the trunk portion 471.

DISCLOSURE OF INVENTION

An object of the present invention is to provide a disk supporting apparatus whose space is minimized, and can be manufactured simply and inexpensively.

Another object of the present invention is to provide a disk holding apparatus and a disk apparatus in which positioning between a turntable and a disk is carried out smoothly and reliably.

Another object of the present invention is to provide the disk apparatus in which both rotation of a tray having a plurality of turntables disposed thereon and movement of a holder having information processing means disposed thereon are carried out via a common driving path.

Another object of the present invention is to provide the disk apparatus in which a rattle or a rattling noise due to a play between the turntable and the tray can be prevented.

Another object of the present invention is to provide the disk apparatus in which a disk can be detached or attached with respect to a turntable with more excellent workability.

Another object of the present invention is to provide the disk apparatus in which it is detected whether or not a disk is appropriately attached to the turntable.

Another object of the present invention is to provide the disk apparatus in which an apparatus body having a tray which is formed into a triangular configuration as seen from a plan view is made compact.

Another object of the present invention is to provide a disk holding apparatus in which a disk is reliably held on a turntable even if a weak urging force is applied to urge an engaging means.

Another object of the present invention is to provide a disk holding apparatus in which a turntable and first driving means can be connected to each other and positioned smoothly and reliably.

The disk supporting apparatus according to claim 1 of the present invention characterized in that the apparatus comprises, first holding means for rotatably holding a disk, and supporting means for supporting a plurality of the first holding means to be concentric therewith, wherein the supporting means rotates to be concentric with the first holding means.

In accordance with the disk supporting apparatus of claim 1 of the present invention, since disks are supported and held rotatably by the plurality of first holding means that are supported concentrically with the supporting means, a disk can be inclined or placed upright at each of the first holding means. In this case, a planar dimension (space) of the disk supporting apparatus can be saved.

The disk supporting apparatus according to claim 3 of the present invention is characterized in that the first holding means is connected to or released from disk driving means that is provided at reproducing means for reproducing the disk, and in a reproducible state of the disk held by the first holding means, the supporting means support the first holding means, and surfaces of respective disks form faces of a polygonal pyramid configuration including a predetermined point on the axis, as a vertex.

In accordance with the disk supporting apparatus of claim 3 of the present invention, since, in a reproducible state of the disk held by the first holding means, the supporting means support the first holding means, and surfaces of respective disks form faces of a polygonal pyramid configuration including a predetermined point on the axis, as a vertex, a planar dimension (space) of the disk supporting apparatus can be lessened. Namely, in accordance with the disk supporting apparatus of claim 3 of the present invention, since a planar dimension of the disk supporting apparatus of the present invention becomes narrower than that of a conventional turntable, a plurality of disks can be disposed at the disk supporting apparatus.

The disk supporting apparatus according to claim 5 of the present invention is characterized in that a distance between the engaging portion and an opening end portion of the supporting portion is shorter than a radius of a disk. In accordance with the disk supporting apparatus of claim 5 of the present invention, since the distance between the engaging portion and the opening end portion of the supporting portion is shorter than the radius of the disk, the supporting portion can be made smaller than a mounting portion of a conventional turntable.

The disk holding apparatus according to claim 6 of the present invention is characterized in that the apparatus comprises a turntable for rotatably holding a disk, first driving means for rotating and driving the turntable, and connecting means for connecting the first driving means and the turntable to each other, wherein the first driving means and the turntable are self-held by the connecting means.

The disk apparatus according to claim 7 of the present invention is characterized in that the apparatus comprises a turntable for rotatably holding a disk, disk driving means which can be connected to or released from a turntable for rotating and driving the turntable, connecting means for connecting the turntable and the first driving means to each other, and first moving means for moving the turntable between one position at which the turntable and the first driving means are connected to each other and another position.

In accordance with the disk supporting apparatus or the disk apparatus of claim 6 or 7 of the present invention, a disk is held at the turntable. The connecting means connects the first driving means and the turntable to each other. In this connecting state, the connecting means self-holds the first driving means and the turntable. Here, "self-holding" is an idea that the first driving means and the turntable are held by being tightly kept in contact with each other due to a magnetic force and the like. In other words, in accordance with claim 6 or 7 of the present invention, since the turntable and the first driving means are self-held by the connecting means, they can be connected to each other smoothly and reliably.

In the above-described connecting state, the first driving means is driven to rotate the turntable, and accordingly, the disk held by the turntable is rotated. Further, connection of the first driving means and the turntable is released by the connecting means.

In accordance with the disk supporting apparatus or the disk apparatus of claim 6 or 7, if a disk apparatus is structured so as to move the turntable between one position at which the turntable and the first driving means are connected to each other and the other, a disk is rotatably held at the turntable in advance, and the disk is not displaced from the turntable, whereby a conventional mis-chucking of a disk can be prevented. Further, In accordance with the present invention of claims 6 and 7, since a disk is rotatably held at the turntable in advance, even when a deformed disk is used, the disk can be positioned smoothly and reliably at the turntable.

The disk holding apparatus according to claim 8 of the present invention is characterized in that the apparatus comprises a turntable which has a first connecting portion and rotatably holds a disk, first driving means which has a second connecting portion that connects to the first connecting portion for rotatably driving the turntable, connecting means for connecting the first driving means and the turntable to each other by connecting the first connecting portion and the second connecting portion, and first positioning means for positioning one of the first connecting portion and the second connecting portion in the state in which the first connecting portion and the second connecting portion are connected to each other.

In accordance with the disk holding apparatus of claim 8 of the present invention, the disk is held at the turntable. The first driving means and the turntable are connected to each other by the connecting means. Further, One of the first connecting portion and the second connecting portion is positioned by the first positioning means in the state in which the first connecting portion and the second connecting portion are connected to each other. Then, in the aforementioned connected state, the first driving means is driven to rotate the turntable. Accordingly, the disk held at the turntable is rotated. Moreover, connection of the first driving means and the turntable is released by the connecting means.

In accordance with the disk holding apparatus of claim 8 of the present invention, the first positioning means urges one of the first connecting portion and the second connecting portion in a single direction (a direction of a "reference surface" in a first embodiment of the present invention that will be described below). Accordingly, a radial alignment of the first driving means and the turntable is carried out. Consequently, a rotational run-out of the turntable that may occur during the rotation of the first driving means can be prevented.

Further, in accordance with the disk holding apparatus of claim 8 of the present invention, a distance between a pickup disposed at the disk apparatus and the disk attached to the turntable and a rotational center of the turntable is always maintained constant. Accordingly, the focus servo and the tracking servo can appropriately be controlled.

In accordance with the disk apparatus of claim 9 of the present invention, even if the disk apparatus is structured so as to move the turntable between one position at which the turntable and the first driving means are connected to each other and the other, since a disk is rotatably held at the turntable in advance, the disk is not displaced from the turntable. Accordingly, conventional mis-chucking of a disk can be prevented. Further, in accordance with the disk apparatus of claim 9 of the present invention, since a disk is rotatably held at the turntable in advance, even when a deformed disk is used, the disk can be positioned smoothly and reliably at the turntable.

The disk apparatus according to claim 10 of the present invention is characterized in that the apparatus comprises a tray which is rotatably disposed and which has turntables on which disks are mounted, the turntables being disposed so as to correspond to a plurality of supporting portions; a holder which has connecting means which is movably disposed so as to connect to each of the turntables and which has information processing means for conducting information processing with respect to the disks, and second driving means for rotating the tray and moving the holder via a common driving path.

In accordance with the disk apparatus of claim 10 of the present invention, since the tray is rotated and the holder is moved, respectively, by the same second driving means and a common driving path, the number of parts used for the apparatus of the present invention can be reduced as compared to those in a conventional disk changer, whereby the disk apparatus is structured more simply and manufactured inexpensively.

The disk apparatus of claim 11 of the present invention is characterized in that the apparatus comprises a tray which is disposed rotatably and which has turntables on which disks are mounted so as to correspond to a plurality of supporting portions, information processing means which has connecting means which is movably disposed so as to connect to each of the turntables and which conducts information processing with respect to a disk, and lock means which locks the turntable at a predetermined position in an unconnected mode in which the connecting means is not connected to the turntable.

In accordance with the disk apparatus of claim 11 of the present invention, the lock means locks the turntable at a predetermined position in the unconnected mode in which the connecting means is not connected to the turntable. On the other hand, in the connected mode in which the connecting means is connected to the turntable, the lock means is separated from the turntable, the turntable is floated away from the tray, and becomes rotatable.

In accordance with the disk apparatus of claim 11 of the present invention, the lock means locks the turntable at a predetermined position in an unconnected mode in which the connecting means is not connected to the turntable. Accordingly, even when the turntable and a spindle are not connected to each other, for example, during a disk change time at which the tray is rotating, or at the time when the disk apparatus is carried, occurrence of a rattle or a rattling noise due to a play between the turntable and the tray can be prevented.

The disk apparatus according to claim 12 of the present invention is characterized in that the apparatus comprises a movable tray which has turntables on which disks are mounted, information processing means that has connecting means which is movably disposed so as to connect to each of the turntables and that performs information processing with respect to the disks, and third positioning means for positioning the information processing means for which connection between the connecting means and the turntable has been completed.

In accordance with the disk apparatus of claim 12 of the present invention, the third positioning means positions the information processing means in the state in which connection between the connecting means and the turntable has been completed. Therefore, when a disk is detached or attached with respected to a turntable, if an unexpected load is applied to the tray, the tray is reliably supported. Accordingly, since the tray for which the connection between the connecting means and the turntable has been completed is reliably supported by the third positioning means, the disk can be detached or attached with respect to the turntable with more excellent workability.

The disk apparatus of claim 13 of the present invention is characterized in that the apparatus comprises a tray which has solid-angle portions and on which turntables having disks mounted thereon are disposed, an apparatus body for rotatably supporting the tray, a panel having an opening portion through which disks are attached to/removed from a turntable, and second moving means for moving the apparatus body in order to place the tray in the vicinity of the panel when a disk is attached to/removed from the turntable through the opening portion.

The second moving means moves the apparatus body in order to place the tray in the vicinity of the panel when a disk is attached to/removed from the turntable through the opening portion i.e., after the tray has been rotated (e.g. after a disk has been changed). Namely, in accordance with the disk apparatus of claim 13 of the present invention, after the disk has been changed, the second moving means moves the apparatus body in order to place the tray in the vicinity of the panel. Accordingly, a gap between the turntable and the opening portion of the panel becomes smaller than that of a conventional disk apparatus. As a result, a disk is attached to/removed from the turntable through the opening portion with more excellent workability.

The disk apparatus of claim 14 of the present invention is characterized in that the apparatus comprises a turntable having a mounting surface for mounting a disk thereon, second holding means that is disposed at the turntable and holds a disk on the mounting surface, and detecting means for detecting whether or not a disk is inclined with respect to the mounting surface when the disk is positioned at the second holding means.

When a disk is not appropriately attached to the turntable, i.e., when a disk is placed on the second holding means, the detecting means detects that the disk is inclined with respect to the mounting surface of the turntable. On the other hand, when a disk is appropriately attached to the turntable, the detecting means detects that the disk is mounted on the mounting surface in parallel thereto.

Consequently, since the detecting means detects that a disk is not appropriately attached to the turntable, in the disk changer, for example, a disk is prevented from flowing away from the turntable due to a centrifugal force.

The disk apparatus of claim 15 of the present invention is characterized in that the apparatus comprises a tray which has a plane surface having triangular solid-angle portions and which is provided with a plurality of supporting portions at which turntables having disks mounted thereon are disposed, an apparatus body for rotatably supporting the tray, and sliding means that, during the rotation of the tray, slides the tray in a direction opposing a direction in which one solid-angle portion protrudes, from an initial position at which one supporting portion is positioned at a front of the apparatus body.

During the rotation of the tray, the sliding means slides the tray in the direction opposing the direction in which one solid-angle portion protrudes from an initial position at which one supporting portion is positioned at a front of the apparatus body. Namely, in accordance with the disk apparatus of claim 15 of the present invention, during the rotation of the tray, since the sliding means slides the tray such that the solid-angle portion of the tray does not protrude from the apparatus body, the apparatus body can be made more compact than a conventional one.

The disk holding apparatus of claim 16 of the present invention is characterized in that the apparatus comprises a turntable having both a mounting portion on which a disk is mounted and an attachment portion onto which a central hole of the disk is fitted, engaging means which is disposed at the turntable and moves in a radial direction to thereby engage the disk with the attachment portion, urging means which is disposed at the turntable and urges the engaging means away from the attachment portion, control means that is movably disposed at the turntable to control the engaging means to move into the attachment portion, and release means which is movably disposed at the turntable to release the control means from the engaging means.

When a disk is mounted on the turntable, the engaging means abuts the disk in order to hold the disk at the turntable. The release means is moved in order to detach a disk from the turntable. When the release means is moved, the engaging means becomes movable into the attachment portion, and a disk becomes detachable from the mounting portion. Thereafter, the disk is detached from the turntable.

On the other hand, in the state in which the engaging means and the control means are opposed to each other (e.g. in the stop mode), even if unexpected force (load) is applied into a disk, the engaging means is appropriately positioned by the control means so that a disk can be appropriately held at the turntable.

In accordance with the disk holding apparatus of claim 16 of the present invention, for example, even if a shock is applied to the apparatus body, since the engaging means and the control means abut with each other, a disk is not easily ejected from the turntable, and the disk can reliably be held at the turntable.

The disk holding apparatus of claim 18 of the present invention is characterized in that the apparatus comprises a turntable which has a third connecting portion and rotatably holds a disk, first driving means which can be connected to the turntable and drives to rotate the turntable and has a fourth connecting portion which connects to the third connecting portion, and second positioning means for positioning the third connecting portion and the fourth connecting portion in a connected state thereof.

The second positioning means positions the third connecting portion and the fourth connecting portion in the connected state thereof. In this state, the first driving means is driven to rotate the turntable, and accordingly, a disk held at the turntable rotates.

In accordance with the disk holding apparatus of the claim 18 of the present invention, the disk holding apparatus is structured to be connectable to the turntable. However, since the second positioning means is provided between the third connecting portion of the turntable and the fourth connecting portion of the first driving means, the third connecting portion and the fourth connecting portion are tightly connected and secured to each other by the second positioning means, whereby the turntable becomes more resistant to vibration.

Further, in accordance with the disk holding device of claim 18 of the present invention, since the second positioning means is provided between the third connecting portion of the turntable and the fourth connecting portion of the first driving means, the first driving means and the turntable are radially aligned to each other, whereby a rotational run-out of the turntable during the rotation of the first driving means can be prevented.

Moreover, in accordance with the disk holding device of claim 18 of the present invention, since a distance between a pickup provided at the disk apparatus and a disk attached to the turntable, and a rotational center of the turntable are maintained constant, a focus servo and a tracking servo are normally controlled.

BEST MODE FOR CARRYING OUT THE INVENTION

First Embodiment

With reference to FIGS. 1 to 6, a description of a disk supporting apparatus, a disk holding apparatus and a disk apparatus according to a first embodiment of the present invention will be made hereinafter. The disk apparatus according to the first embodiment of the present invention is an example of a disk changer built in a component stereo apparatus.

Figure 1:
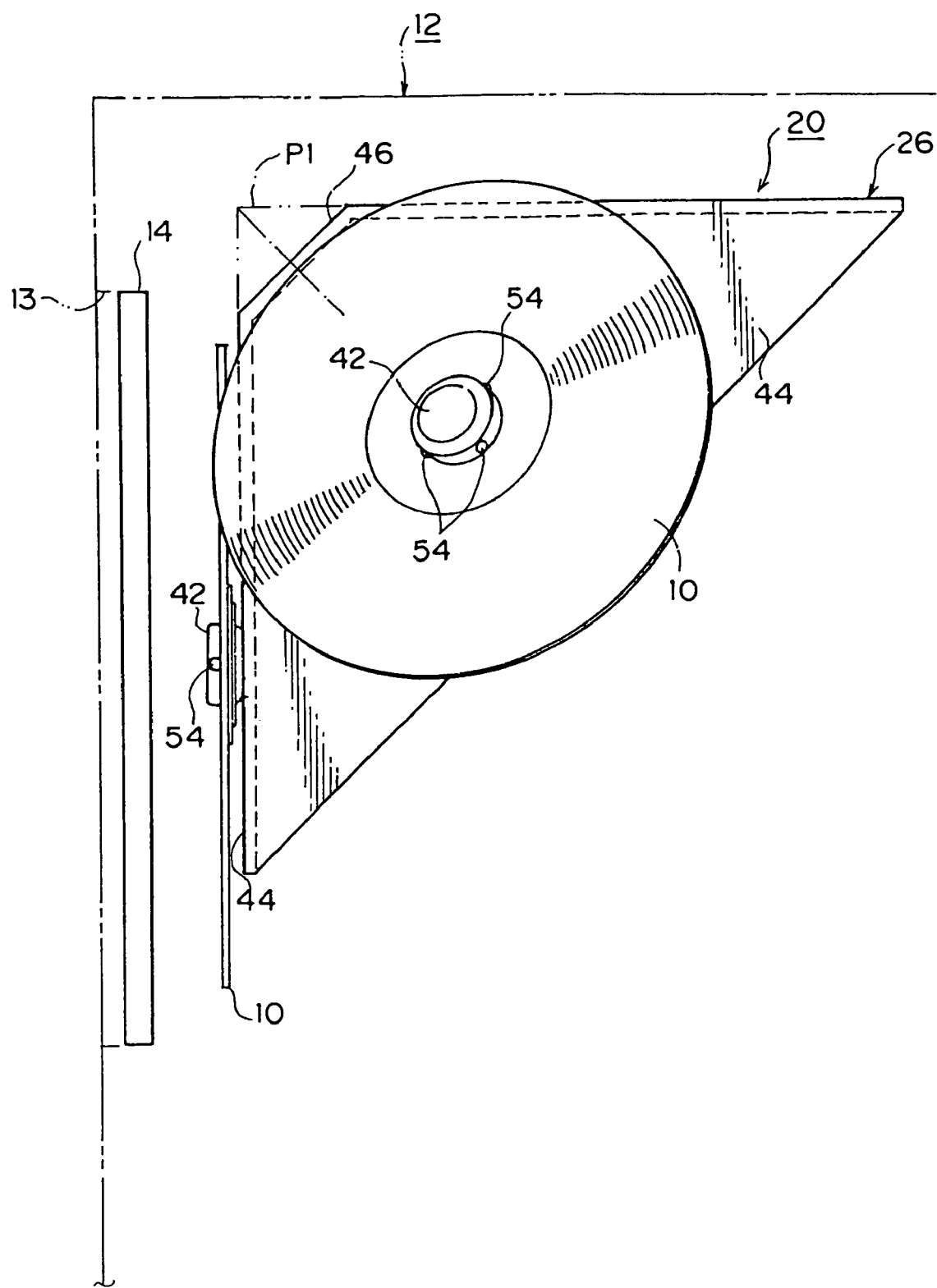
FIG. 1 is a schematic view of a positional relationship between a disk changer and a door leaf that are disposed in a component stereo apparatus according to a first embodiment of the present invention.
Figure 2:
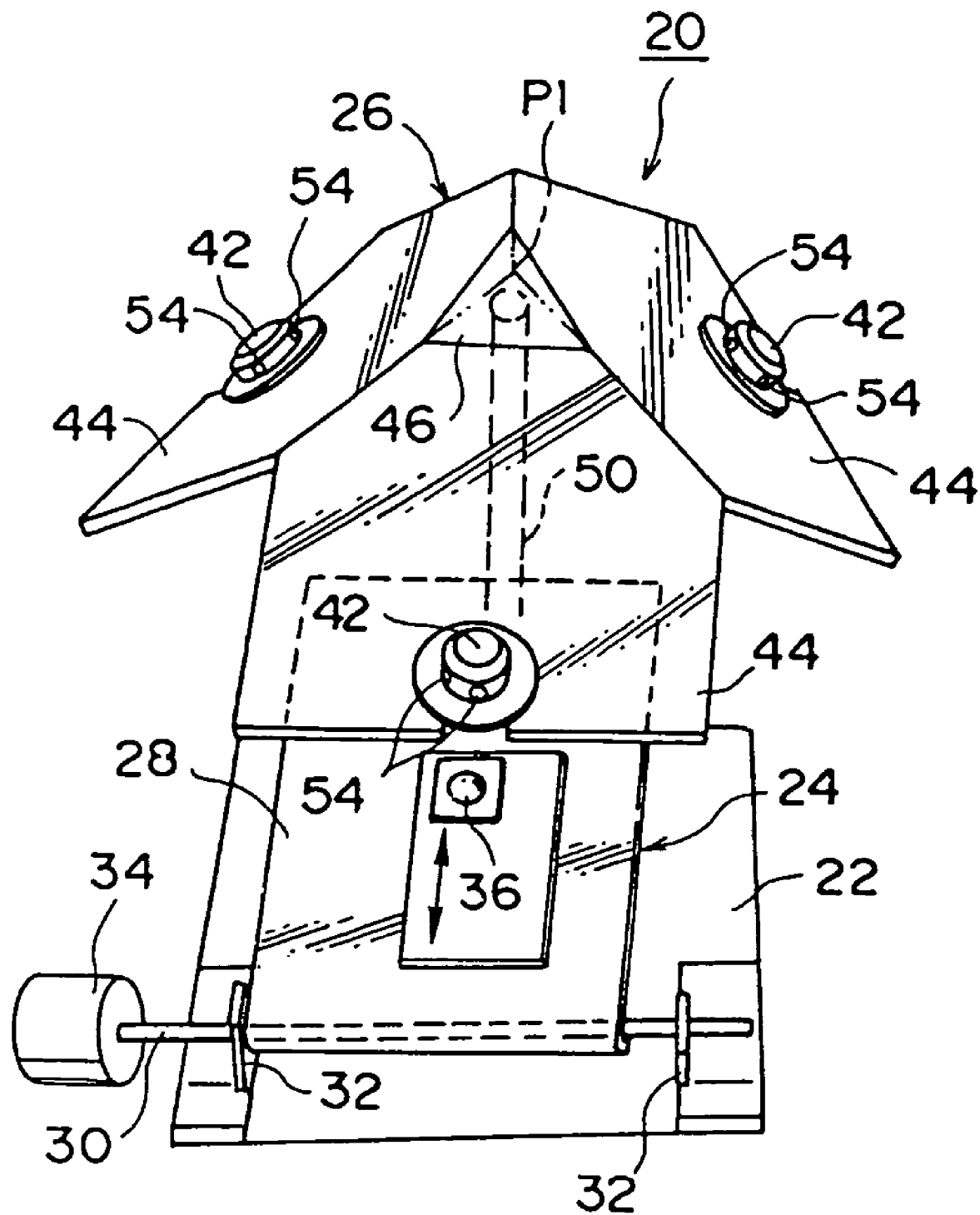
FIG. 2 is an overall perspective view of a main portion of the disk changer shown in FIG. 1.
Figure 3:
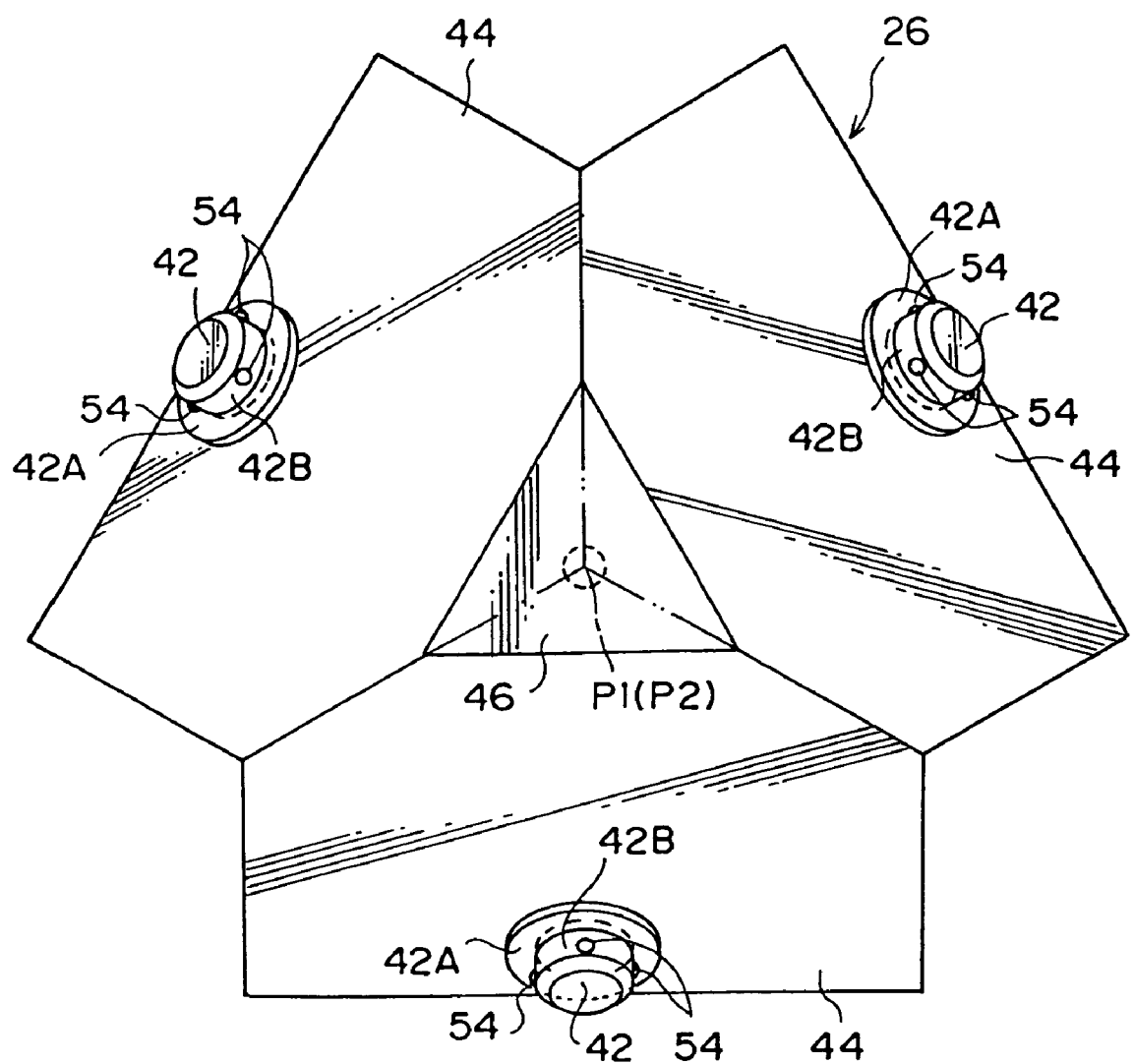
FIG. 3 is a plan view of a turntable shown in FIG. 2.
Figure 4:
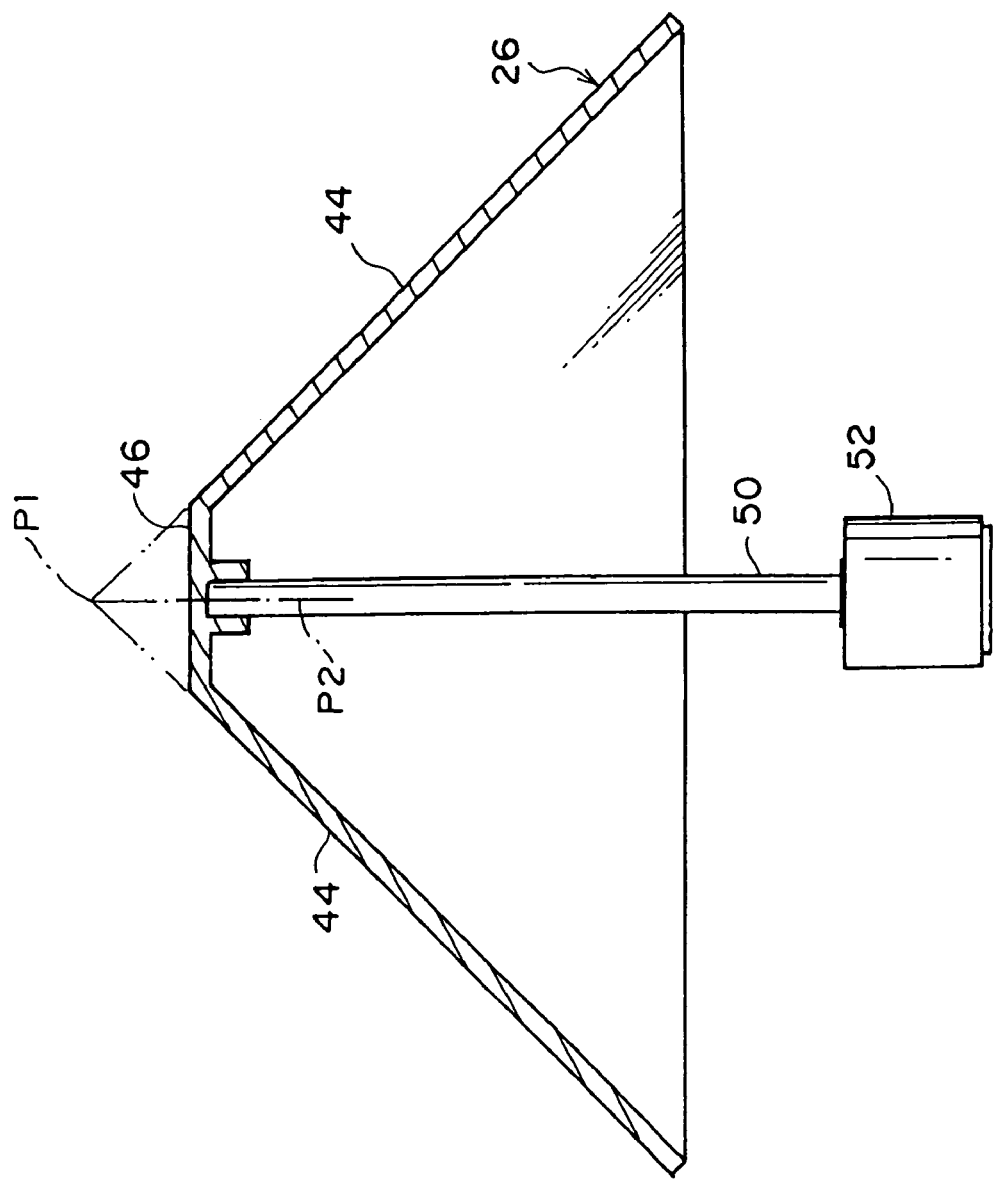
FIG. 4 is a cross sectional view of a turntable shown in FIG. 3.
Figure 5:
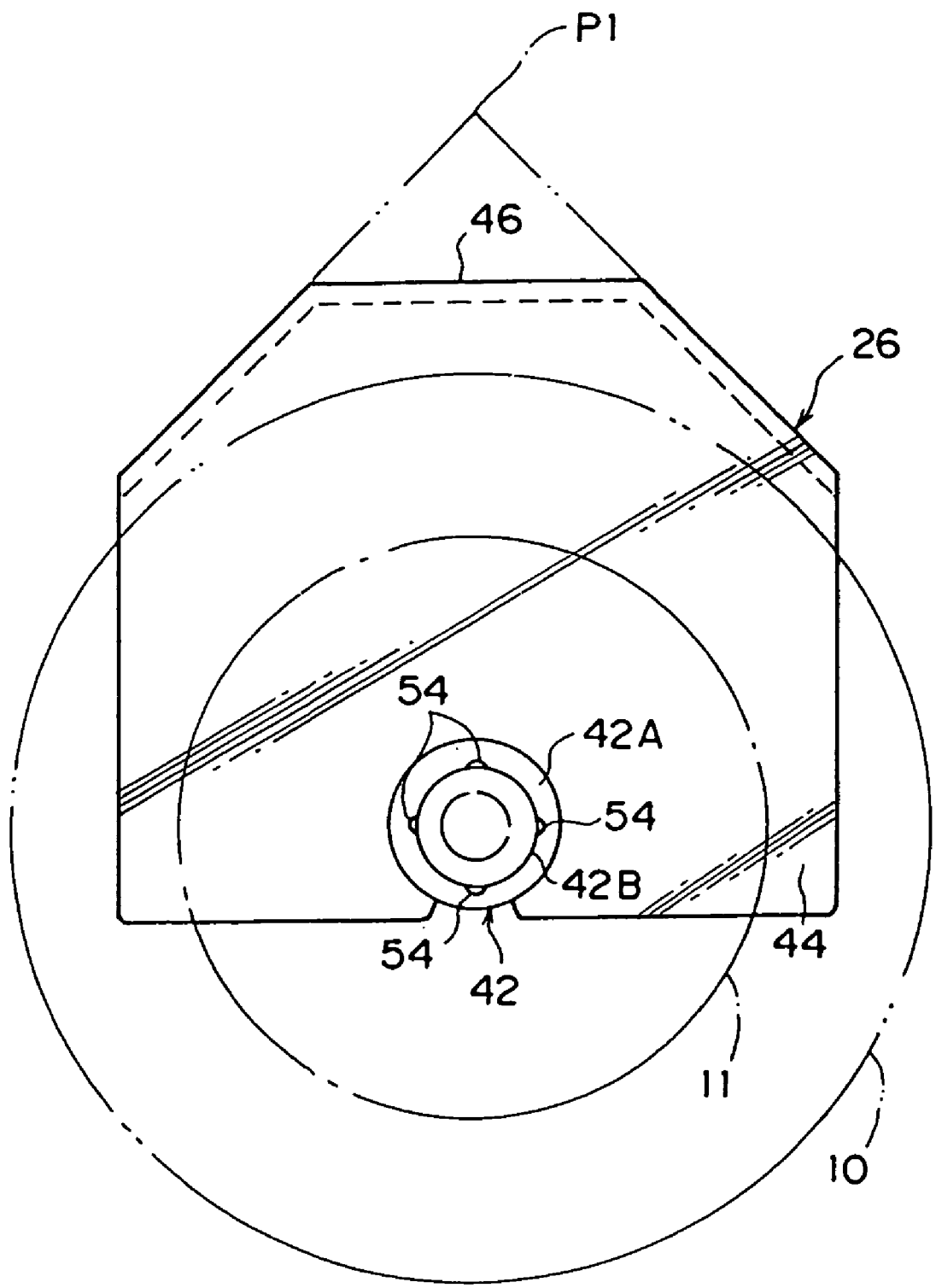
FIG. 5 is a front view of a supporting portion of the turntable shown in FIG. 3.

FIG. 1 is a schematic view of a positional relationship between a disk changer and a door leaf that are disposed in the component stereo apparatus, FIG. 2 is an overall perspective view of a main portion of the disk changer shown in FIG. 1, FIG. 3 is a plan view of a turntable shown in FIG. 2, FIG. 4 is a cross sectional view of a turntable shown in FIG. 3, and FIG. 5 is a front view of a supporting portion of the turntable shown in FIG. 3.

Overall Structure of the Component Stereo Apparatus

As shown in FIG. 1, a disk changer 20 is built in a cabinet 12 of the component stereo apparatus (hereinafter, a "stereo apparatus"), and a substantially rectangular opening portion 13 is formed at a front panel for constituting the cabinet 12, so as to oppose the disk changer 20. Further, a door leaf 14 is slidably disposed at the stereo apparatus so as to correspond to the opening portion 13.

An unillustrated opening/closing button for opening/closing the door leaf 14 is disposed at the stereo apparatus, and due to an operation of an opening/closing button, the door leaf 14 is slid to open/close the opening portion 13. Further, an unillustrated tuner, tape recorder or the like is incorporated in the stereo apparatus.

Structure of the Disk Changer

As shown in FIG. 2, the disk changer 20 comprises a disk drive unit 24 disposed at a frame 22, a tray 26 for supporting a plurality of disks. The disk drive unit 24 has a supporting shaft 30 that is attached to a base 28. The supporting shaft 30 is passed through a pair of bearings 32 that are disposed upright from the frame 22, and then connected to the frame 22 via the bearings 32. Further, a motor 34 as first driving means is connected to one end of the supporting shaft 32. Due to the rotation of the motor 34, the base 34 rotates around the supporting shaft 30 as a center.

Figure 6A:
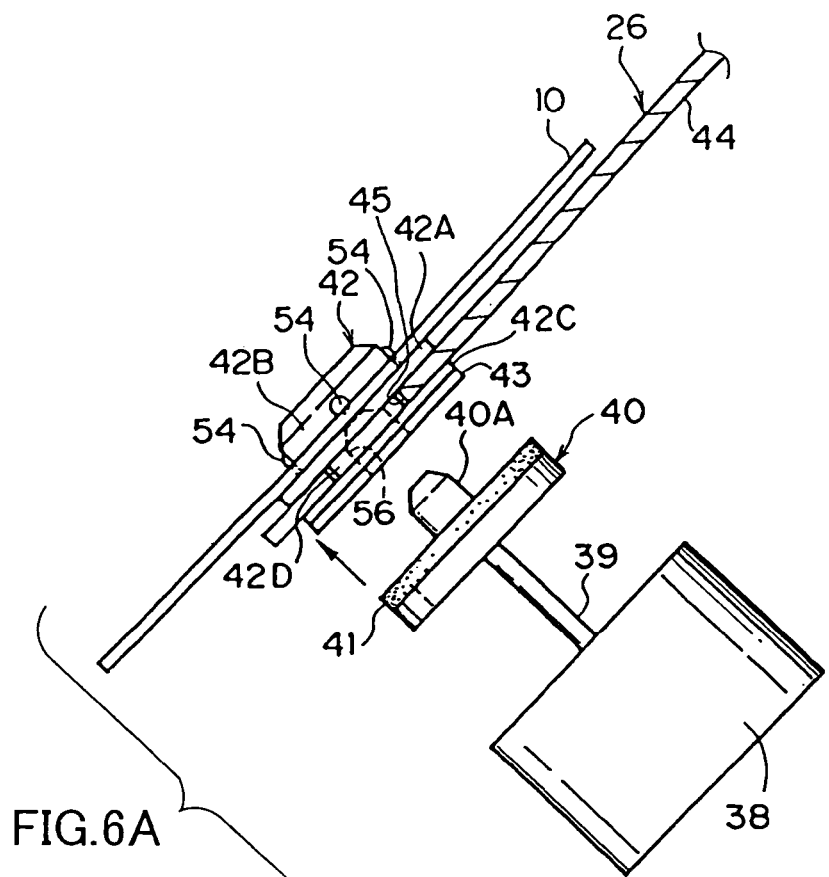
FIG. 6A is a cross sectional view of a main portion of the turntable shown in FIG. 2.
Figure 6B:
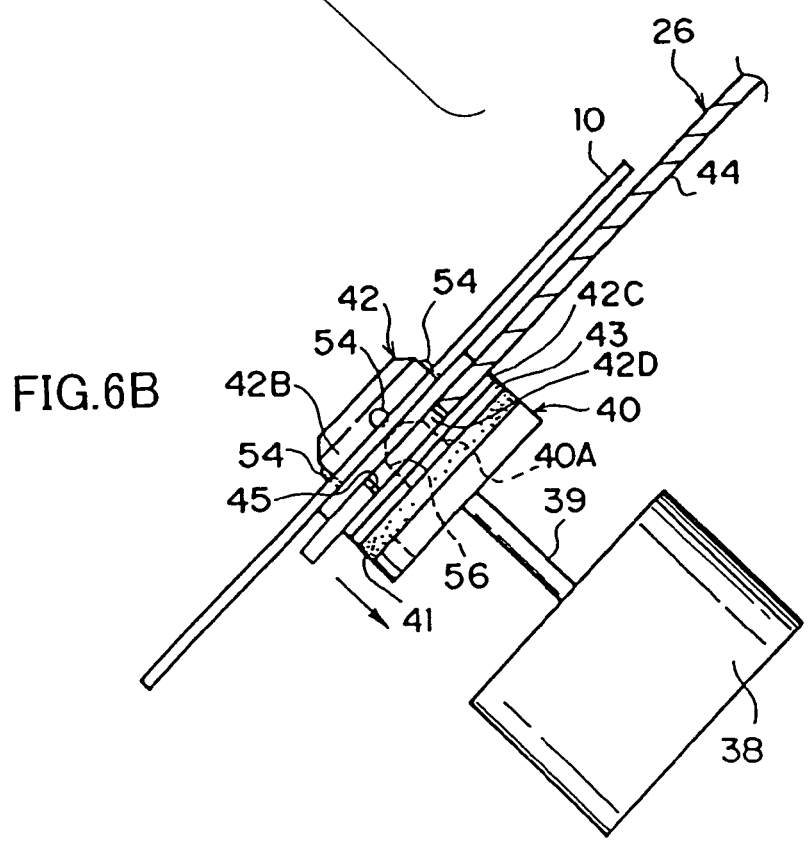
FIG. 6B is a cross sectional view of a state in which a ring member is connected to the turntable shown in FIG. 6A.

A pickup 36 is disposed so as to move slidably at the disk drive unit 24. A motor 38 (see FIG. 6) as the first drive means for rotating and driving turntables 42 on the tray 26 is also disposed at the disk drive unit 24. Namely, as shown in FIG. 6, a ring member 40 for constituting connecting means is fixed to a motor shaft 39 of the motor 38, and is connected to or separated from the turntable 42 of the tray 26 that is positioned at a predetermined position (see FIGS. 6A and 6B).

A head portion 40A whose diameter is larger than that of the motor shaft 39 is formed at a tip end portion of the ring member 40. The tip end portion of the head portion 40A is tapered. A magnet member 41 for constituting the connecting means is concentrically fixed to the ring member 40 at the head portion 41 side thereof.

As shown in FIG. 2, a plurality of plate-shaped supporting portions 44 (three in this embodiment) for supporting the turntables 42, each of which holds a disk 10 such as a 12 cm-disk 10 (see FIG. 13) or an 8 cm-disk 11 (see FIG. 14), are formed integrally with the tray 26. The plurality of the supporting portions 44 are respectively inclined with respect to a shaft center P2 of a spindle 50 (see FIG. 4) of the tray 26 so as to have a vertex P1 as a center of rotation. Accordingly, the tray 26 is formed into a substantially triangular pyramid configuration whose side portions are formed by the supporting portions 44.

A top portion 46 as a rotational center of the tray 26 is flat shaped, and accordingly, formed into a truncated polygonal pyramid configuration. As shown in FIG. 4, a tip end portion of the spindle 50 is fitted into a central portion of the top portion 46 of the tray 26. Further, the tray 26 is disposed such that one of the supporting portions 44 faces the opening portion 13, and the disk 10 can be attached to/removed from the turntable through the opening portion 13.

A motor 52 for rotating and driving the tray 26 is mounted at a proximal end of the spindle 50. Due to a rotation of the motor 52, the tray 26 rotates around the vertex P1 (i.e., the shaft center P2 of the spindle 50) as a center. Further, unillustrated selection keys corresponding to the respectively supporting portions 44 are disposed at the stereo apparatus. Namely, inherent identifiers (identification numbers) are previously denoted to the respective supporting portions 44. Due to an operation of a selection key corresponding to each of the identification numbers, the tray 26 rotates around the spindle 50 as a center, and the selected supporting portion 44 faces the door leaf 14 (i.e., the opening portion 13) shown in FIG. 1.

As shown in FIGS. 2 and 6, the turntable 42 which is made of a synthetic resin is disposed at each supporting portion 44 so as to correspond to the ring member 40 in the disk drive unit 24. As shown in FIGS. 3 and 5, the turntable 42 comprises a mounting portion 42A on which the 12 cm-disk 10 or the 8 cm-disk 11 is mounted, and a trunk portion 42B whose outer diameter is slightly smaller than an inner diameter of a hole of the disk 10 (or the disk 11).

A ball-chuck mechanism as holding means for rotatably holding the disk 10 is disposed at the trunk portion 42B of the turntable 42. As shown in FIG. 6, the ball-chuck mechanism is formed by balls 54, a portion of which is protruded from the turntable 42 by, for example, an unillustrated coil spring that is disposed inside the turntable 42. Accordingly, when the balls 54 are pressed by the inner circumferential portion of the disk 10, the disk 10 passes over the balls 54 and is then mounted on a mounting portion 42A.

When the disk 10 is mounted on the mounting portion 42A, as shown in FIG. 6, the balls 54 is urged by the unillustrated coil spring, and pressed out from the disk 10. Namely, since the balls 54 abut the disk 10 to press the disk 10 toward the mounting portion 42A, the disk 10 is reliably held at the turntable 42.

As shown in FIGS. 6A and 6B, the turntable 42 comprises a proximal portion 42C whose diameter is the same as that of the mounting portion 42A and a connecting portion 42D that connects the proximal portion 42C and the mounting portion 42A to each other. The proximal portion 42C and the connecting portion 42D are integrally formed with the turntable 42. The turntable 42 is rotatably supported by the supporting portion such that the supporting portion 44 is interposed between the mounting portion 42A and the proximal portion 42C, and the connecting portion 42D is passed through a through hole 45 formed at the supporting portion 44. A metal ring member 43 for constituting the connecting means is fixed to the proximal portion 42C of the turntable 42. Further, a hole 56 shown by a dotted line in FIG. 6 is formed at both the turntable 42 and the ring member 43, and the hole 56 is formed so as to correspond to the shape of the head portion 41A of the ring member 40.

As shown in FIG. 6B, in the state in which the head portion 40A is inserted into the hole 56, the magnet member 41 magnetically attracting the metal ring member 43 reliably connects the turntable 42 and the ring member 40 (including the magnet member 41) with each other The base 28 shown in FIG. 2 is rotated with respect to the frame 22, and the ring member 40 is made to come close to or separate from the corresponding supporting portion 44. Accordingly, as shown in FIG. 6A, the ring member 40 is separated from the corresponding turntable 42, and as shown in FIG. 6B, the ring member 40 is connected to the turntable 42.

In the state in which the ring member 40 is separated from the turntable 42 (see FIG. 6A), the tray 26 can be rotated by the motor 52 (see FIG. 4) and a desired supporting portion 44 stops in front of the door leaf 14 (see FIG. 1). Further, in the state in which the tray 26 is stopped (see FIG. 2), the disk changer 20 enters a state in which the magnet member 41 is connected to the ring member 43, thus making the turntable 42 rotatable (see FIG. 6B).

In the rotatable state of the turntable 42, the turntable 42 is rotated by the motor 38, and the pickup 36 shown in FIG. 2 carries out a data reproducing processing on the disk 10 or 11.

Figure 75:
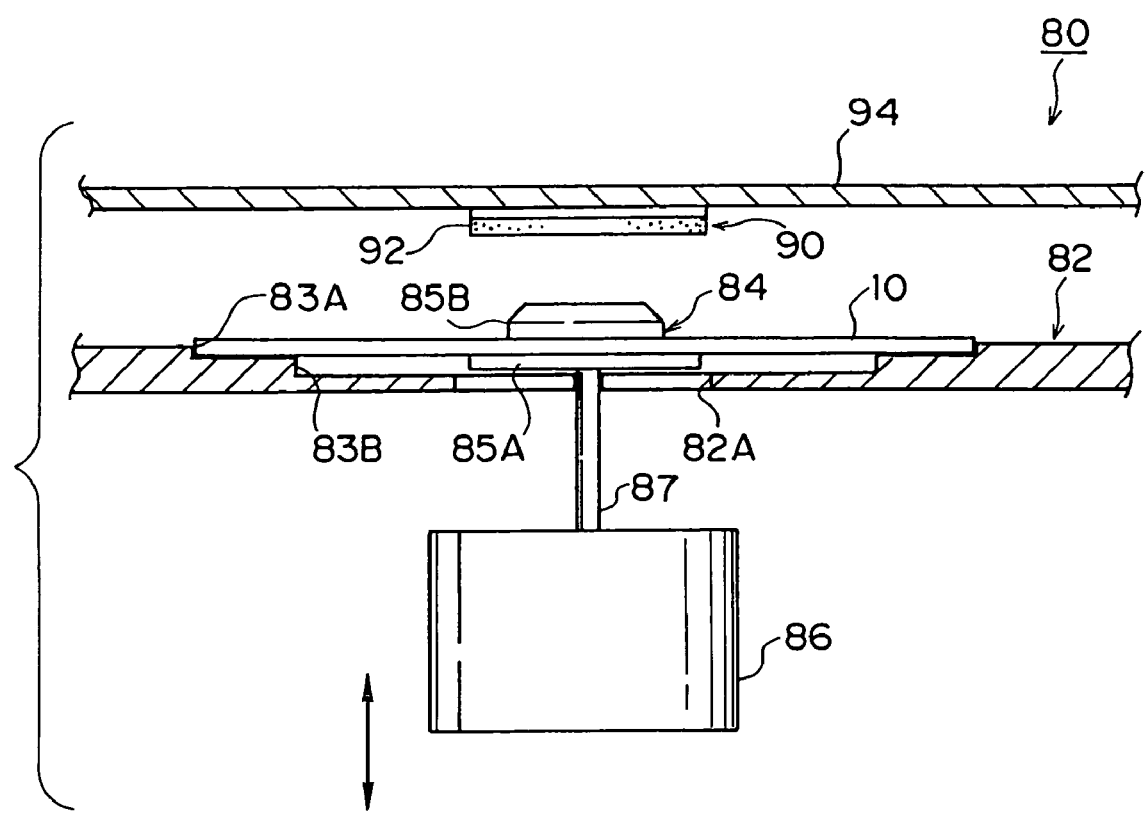
FIG. 75 is a cross sectional view of a main portion of a conventional disk player.
Figure 76:
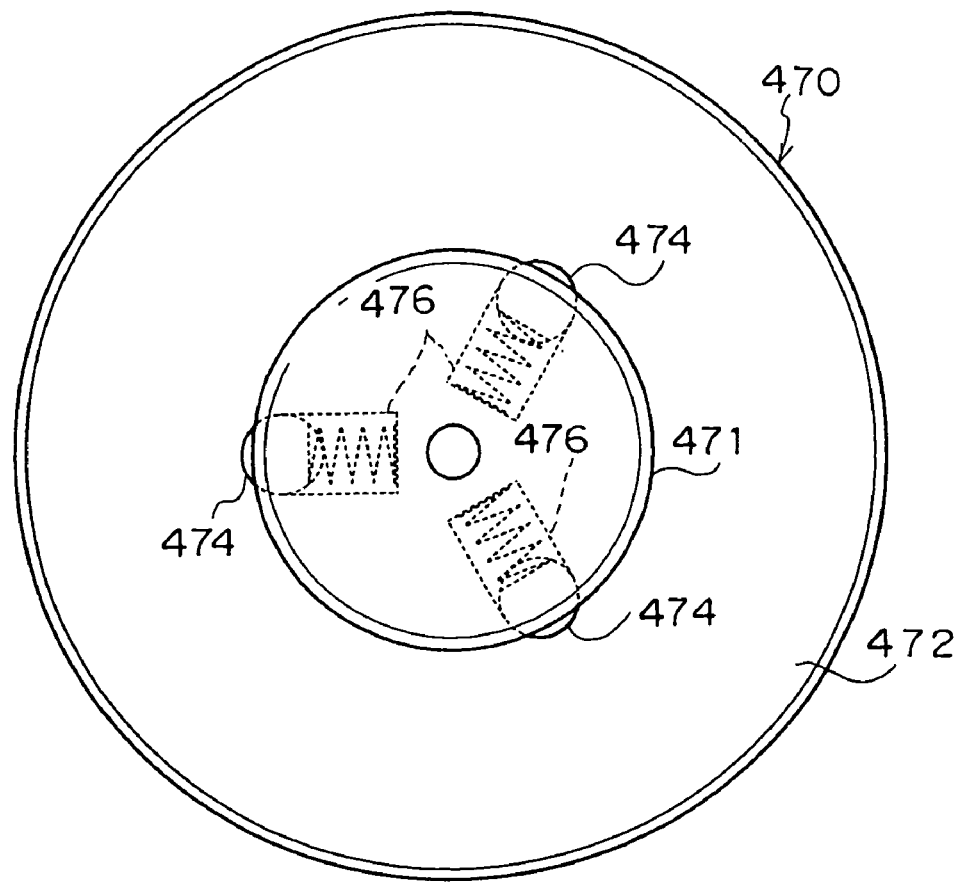
FIG. 76 is a plan view of a main portion of a conventional turntable.
Figure 77:
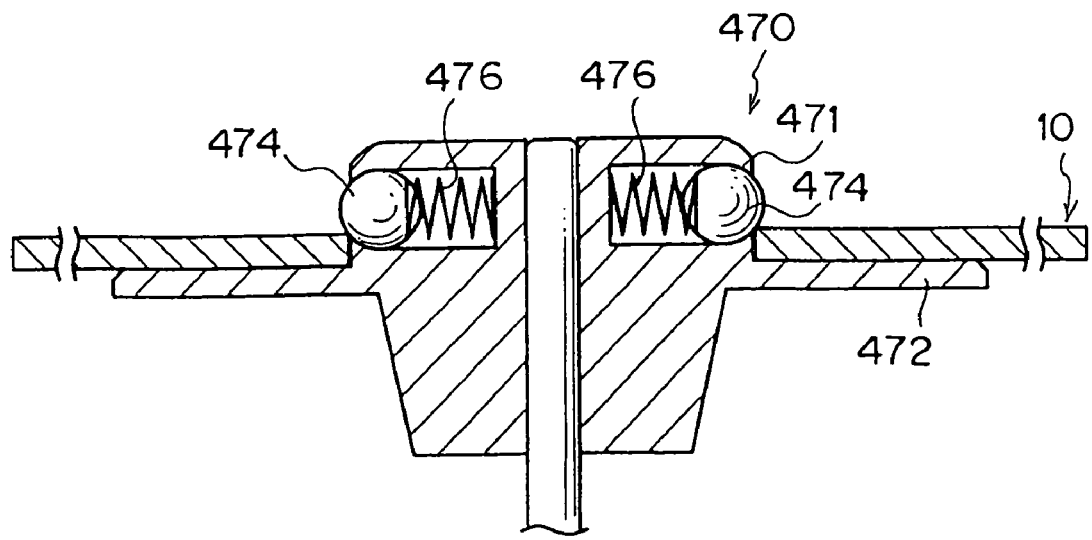
FIG. 77 is a cross sectional view of the conventional turntable shown in FIG. 76.

As shown in FIG. 5, when the 12 cm-disk 10 is mounted on the turntable 42, the supporting portion 44 is structured so as to face almost a half portion of the disk 10. Namely, in the present embodiment, since the plate-shaped supporting portion 44 supports the turntable 42 alone, the tray 26 whose size is smaller than that of a mounting portion of a conventional mounting table 82 shown in FIG. 75 will suffice.

The first embodiment of the present invention corresponds to claim 4. A distance between the through hole 45 as an engaging portion and an opening end portion of the supporting portion 44 is structured to be shorter than a radius of the disk 10.

Figure 13:
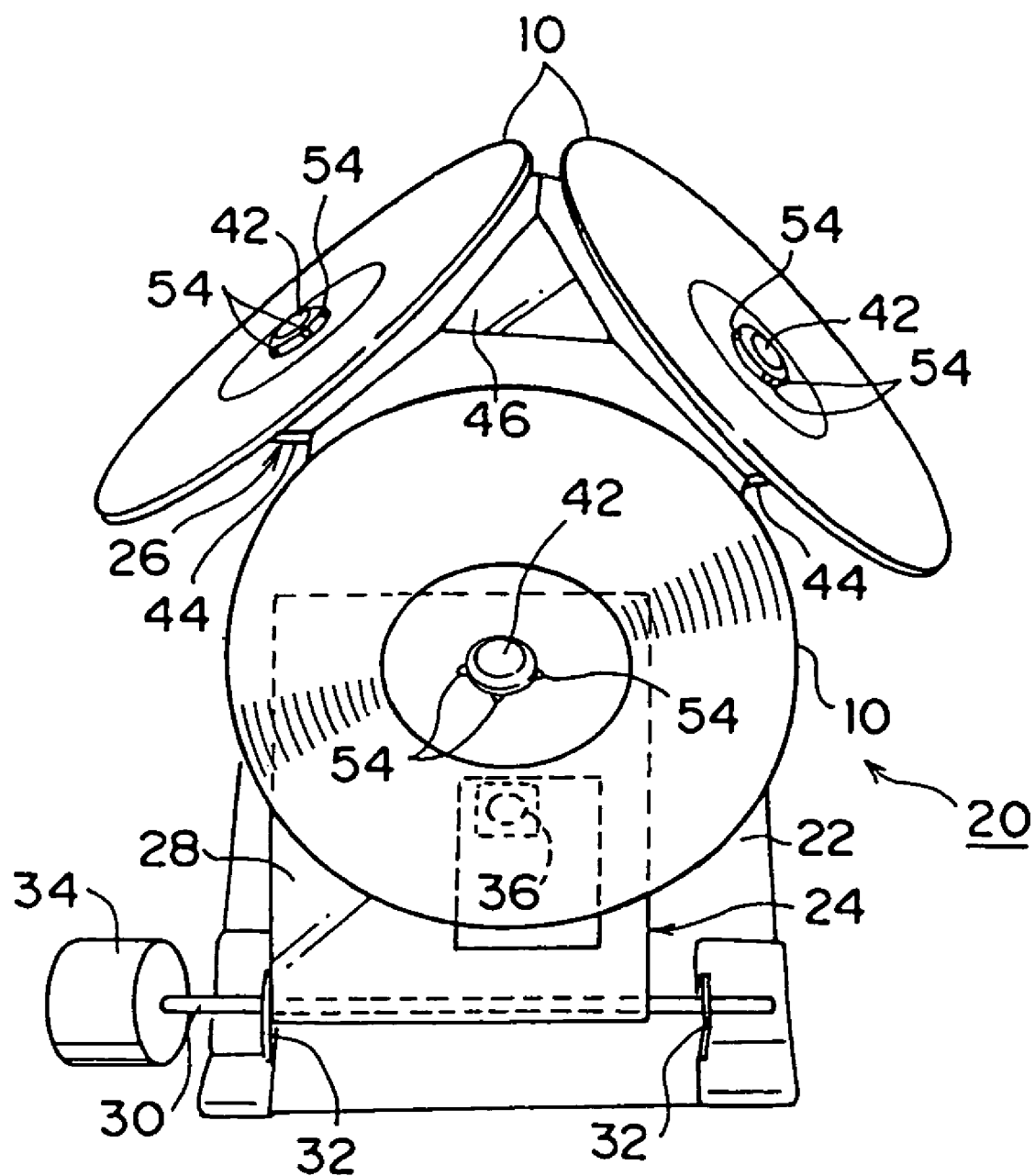
FIG. 13 is a perspective view of a state in which a 12 cm-disk is disposed at a supporting portion of the disk changer shown in FIG. 2.

As shown in FIG. 13, in the state in which the 12 cm-disks 10 are respectively supported by the supporting portions 44 of the tray 26, the disks 10 do not overlap each other. In other words, in the present embodiment, even when three 12 cm-disks 10 are respectively mounted on three supporting portions 44, three disks 10 do not overlap each other. Accordingly, a user can attach the disks 10 to the turntables speedily and easily through the opening portion 13.

Subsequently, a description of an operation of the present embodiment will be made. As shown in FIG. 1, in order to attach the disk 10 to the tray 26 of the disk changer 20, an unillustrated selection key is operated to face a desired supporting portion 44 with the opening portion 13. Then, an unillustrated opening/closing button is operated to slide the door leaf 14 to open the opening portion 13.

Since the desired supporting portion 44 faces the opened opening portion 13, the disk 10 is attached to the turntable 42 of this supporting portion 44. Namely, the disk 10 is rotatably held at the supporting portion 44 by the turntable 42 having the ball-chuck mechanism (such as the balls 54).

In the present embodiment, the tray 26 is formed into a substantially triangular pyramid (three-dimensional) configuration, and a planar dimension thereof can be made smaller than that of a conventional turntable 492 (see FIG. 74), whereby the space of the tray 26 can be lessened. Namely, in accordance with the present embodiment, since the planar dimension of the tray 26 can be made smaller than that of a conventional turntable 492 shown in FIG. 74, a plurality of the disks 10 or 11 can be mounted on the tray 26 whose space is thus lessened.

The turntable 42 for holding the disk 10 or 11 is not fixed to the supporting portion 44. Accordingly, in a waiting state shown in FIG. 6A in which the disk drive unit 24 is separated from the turntable 42 of the supporting portion 44, the disk 10 or 11 does not form a pyramid surface like the supporting portion 44.

On the other hand, in the state in which reproduction is enabled such that the magnet member 41 that is disposed at the disk drive unit 24 is connected to the ring member 43 of the turntable 42 (see FIG. 6B), the corresponding disk 10 or 11 becomes parallel to the supporting portion 44 to thereby form a pyramid surface.

In order to face the supporting portion 44 of the tray 26 with the opening portion 13 in parallel thereto, the rotational axis P2 of the tray 26 may be inclined at a suitable angle. Therefore, it becomes necessary to use a conventional slide mechanism for sliding the tray 494 (see FIG. 74) in order to attach/remove a disk with respect to a turntable. Namely, in accordance with the present embodiment, since a desired disk 10 or 11 can be attached/detached by rotating and driving means of the tray 26 alone, a mechanism equipped at the stereo apparatus can be simplified and manufactured inexpensively.

In accordance with the present embodiment, since the ball-chuck mechanism including the balls 54 or the like is provided at the turntable 42, as shown in FIG. 1, even when the disk 10 or 11 is disposed vertically, horizontally, or diagonally, the disk 10 or 11 can reliably be held at the tray 26 through the turntable 42. Accordingly, in whatever direction a disk is oriented with respect to the disk apparatus, the disk can be held inside or outside the disk apparatus.

In the state in which the tray 26 is stopped (see FIG. 1), due to the rotation of the motor 34 shown in FIG. 2, the base 28 rotates around the supporting shaft 30 as a center ad moves toward the supporting portion 44 that faces the opening portion 13. Therefore, since the motor 38 (see FIG. 64) disposed at the base 28 moves toward the supporting portion 44, both the ring member 40 and the magnet member 41 that are connected to the motor 38 are connected to the ring member 43 of the turntable 42 (see FIG. 6B).

As shown in FIG. 6B, in the state in which the head portion 40A is inserted in the hole 56, the magnet member 41 magnetically attracting the metal ring member 43 connects the turntable 42 and the ring member 40 with each other. In this connected state, the turntable 42 and the ring member 40 are "self-held" by the magnet member 41 and the ring member 43.

At this point, "self-holding" means that the ring member 40 and the turntable 42 for constituting the first drive means are held in the state of being magnetically kept in close contact with one another. Namely, in accordance with the present embodiment, the surfaces of the magnet member 41 and the ring member 43 are magnetically self-held so that connection between the turntable 42 and the ring member 40 can be carried out smoothly and reliably, and axial alignment between the motor 38 and the turntable 42 can be carried out smoothly and reliably.

In the state in which the turntable 42 is made rotatable, due to a driving of the motor 38, the turntable 42 is rotated. Accordingly, data recorded in the disk 10 is reproduced by the pickup 36.

As shown in FIG. 2, during a disk-change, the base 28 is rotated in a separating direction from the supporting portion 44 facing the opening portion 13. Namely, since the motor 38 shown in FIG. 6B moves in a separating direction from the supporting portion 44, the magnet member 41 of the ring member 40 separates from the ring member 43 of the turntable 42, whereby connection of the magnet member 41 and the ring member 43 is released (see FIG. 6A).

Accordingly, due to a rotation of the spindle 50 shown in FIG. 2, as shown in FIG. 1, the tray 26 is made rotatable to stop at a position at which the selected supporting portion 44 faces the opening portion 13. In the stopped state of the tray 26, the disk 10 is attached to the turntable 42. Thereafter, as described above, due to the rotation of the motor 34 shown in FIG. 2, the magnet member 41 and the ring member 43 are connected to each other, thus making the turntable 42 rotatable.

In the present embodiment, since the disk 10 (or 11) is rotatably held at the turntable 42 in advance, the disk 10 does not displace from the turntable 42. Namely, in the disk 10 according to the present embodiment, use of a conventional chucking becomes unnecessary, whereby mis-chucking does not occur.

Figure 14:
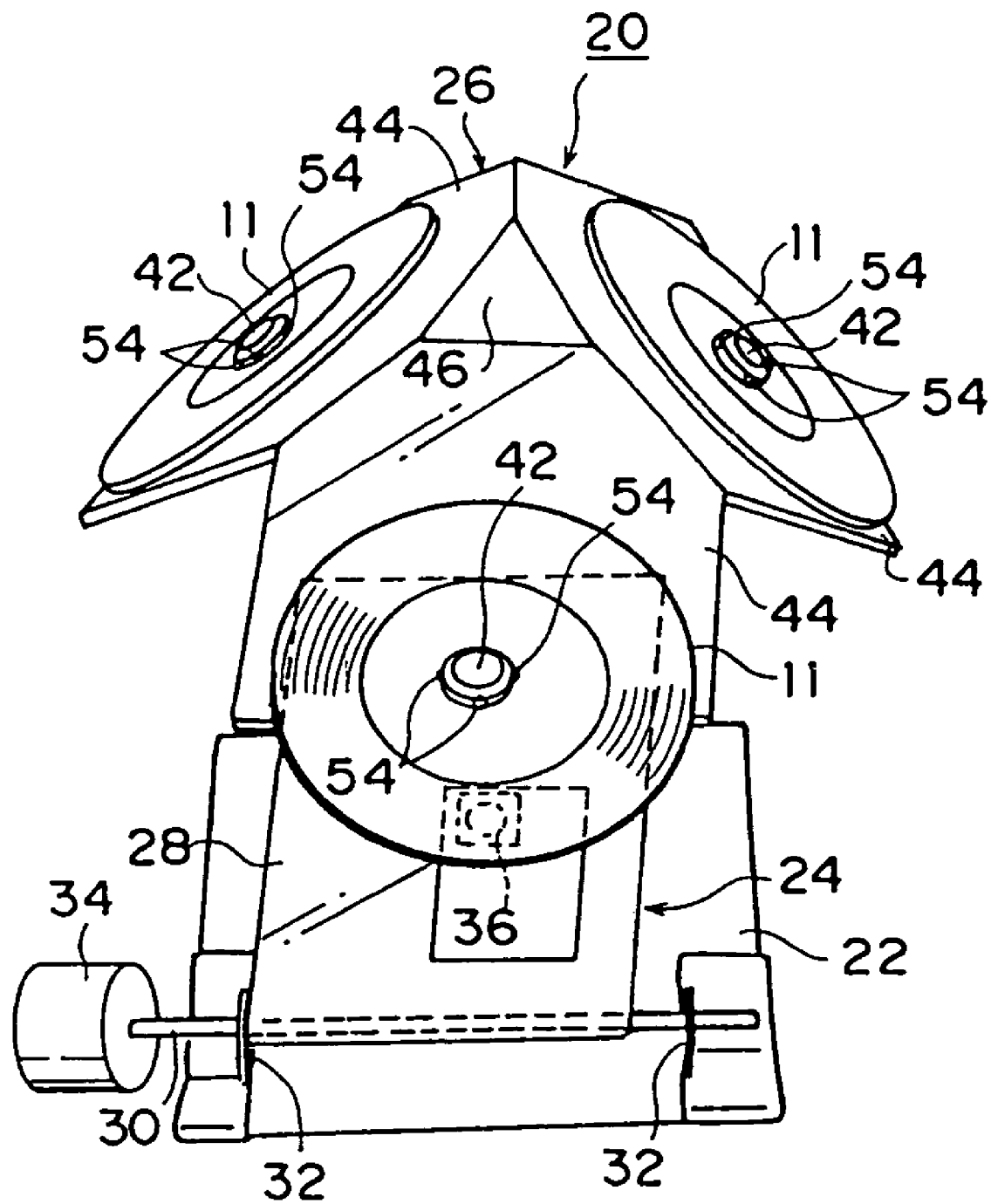
FIG. 14 is a perspective view of a state in which an 8 cm-disk is disposed at a supporting portion of the disk changer shown in FIG. 2.

In the present embodiment, if the 8 cm-disk 11 as shown in FIG. 14, a so-called deformed disk such as a heart-shaped disk, or a labeled CD-R is mounted on each of the supporting portions 44, use of a conventional special mechanism (a mechanism having a damper or a concave portion that corresponds to a profile of the 8 cm-disk at the mounting portion) becomes unnecessary.

In accordance with the present embodiment, since a mechanism capable of holding disks such as the ball chuck mechanism is disposed at the turntable 42, use of an eject prevention mechanism for preventing ejection of disks from the mounting portion when the stereo apparatus i.e., the disk changer 20 is subjected to a shock and inclined.

In the present embodiment, if the door leaf 14 is clear or semi-clear, the tray 26 becomes visually recognizable, and a rotational state of the tray 26 during the disk change also becomes recognizable. Namely, in accordance with the present embodiment, rotational operation of the tray 26 is unique, looks excellent and has something to satisfy users.

A connection mechanism shown in FIG. 7 is another variant example of the connection mechanism shown in FIG. 6. Further, in the example illustrated in FIG. 7, portions identical to those shown in the example of FIG. 6 are denoted by the same reference numerals. Further, a coil spring 55 for making portions of the balls 54 protrude from the turntable 42 is shown in FIG. 7.

As shown in FIG. 7, the motor shaft 39 is formed into a cylindrical shape, and has a tapered tip end portion 39A. Further, the ring member 40 is positioned at a substantially intermediate portion of the motor shaft 39. The ring-shaped magnet member 41 for constituting the connecting means is concentrically fixed at the ring member 40 at a portion facing the turntable 42.

A groove 42C is formed along an outer circumferential surface of the mounting portion 42A. The through hole 45 is formed at the supporting portion 44 at a portion corresponding to the groove 42C of the mounting portion 42A. The groove 42C of the mounting portion 42A is rotatably fitted into the through hole 45.

The groove of the turntable 42C is fitted into the through hole 45 of the supporting portion 44, and the turntable 42 is rotatably supported by the supporting portion 44. The metal ring member 43 as the connecting means is fixed to the mounting portion 42A of the turntable 42 on the surface facing the ring member 40.

Figure 7A:
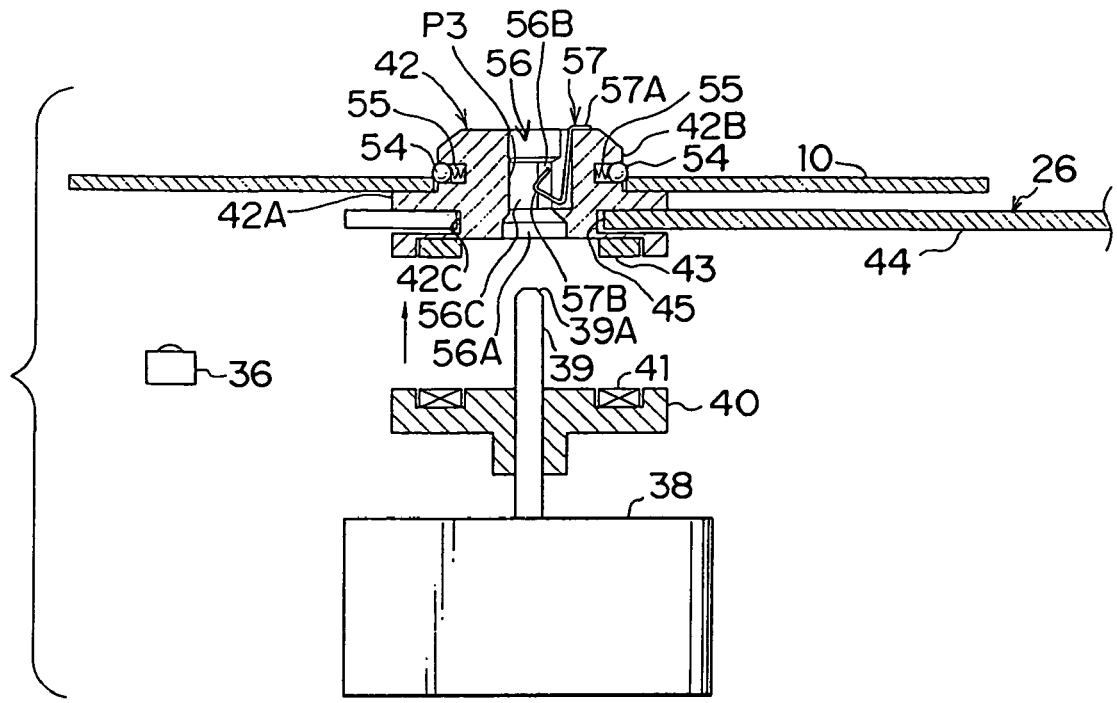
FIG. 7A is a cross sectional view of a main portion of a variant example of a connection mechanism shown in FIG. 6.
Figure 7B:
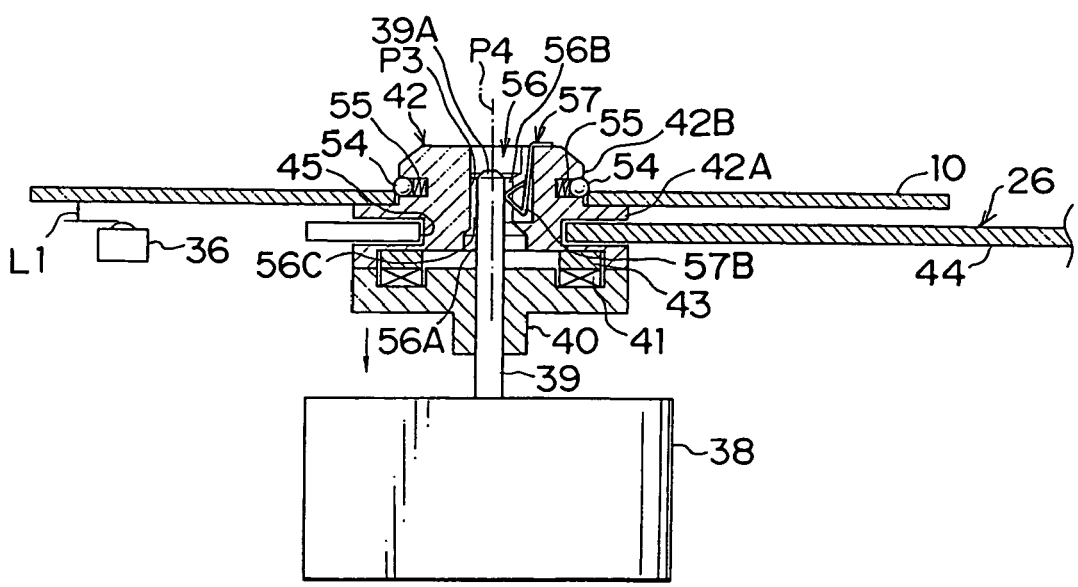
FIG. 7B is a cross sectional view of a state in which a ring member is connected to a turntable shown in FIG. 7A.
Figure 8A:
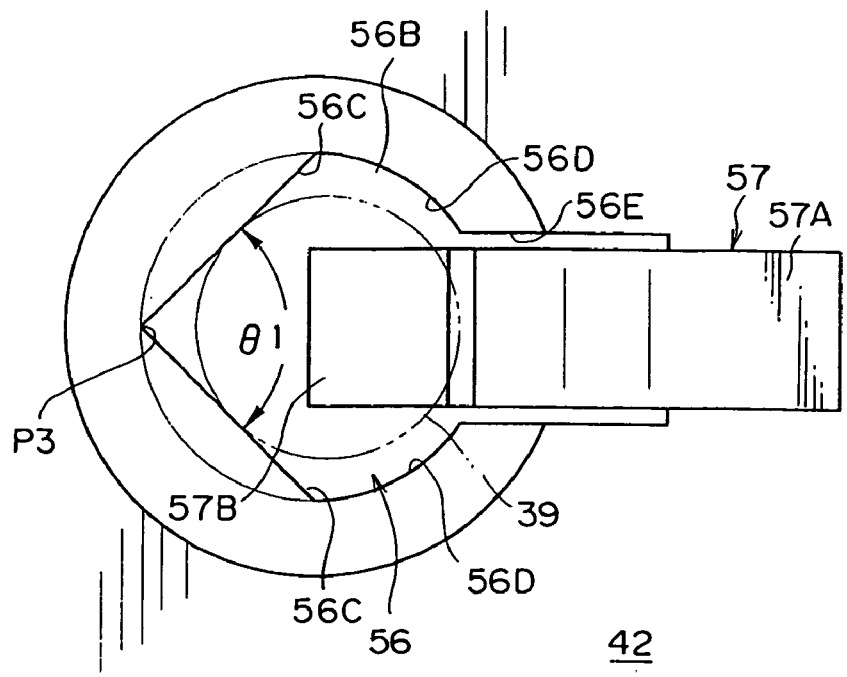
FIG. 8A is a view of a state before a motor shaft is inserted into a hole shown in FIG. 7.

The hole 56 as shown in FIGS. 7 and 8 is formed on the turntable 42, and the motor shaft 39 is inserted in this hole 56. As shown in FIG. 7, the hole 56 comprises a complete round guide portion 56A formed at the end portion of hole 56 at the ring member 43 side, and a reference portion 56B for constituting first positioning means that is formed in continuous with the guide portion 56A.

The guide portion 56A has a diameter that is almost twice as large as that of the motor shaft 39. The reference portion 56B has an intermediate diameter between the motor shaft 39 and the guide portion 56A. Further, the guide portion 56 is tapered at the reference portion 56B side to guide the motor shaft 39 when the motor shaft 39 is inserted into the reference portion 56B of the hole 56.

Figure 8B:
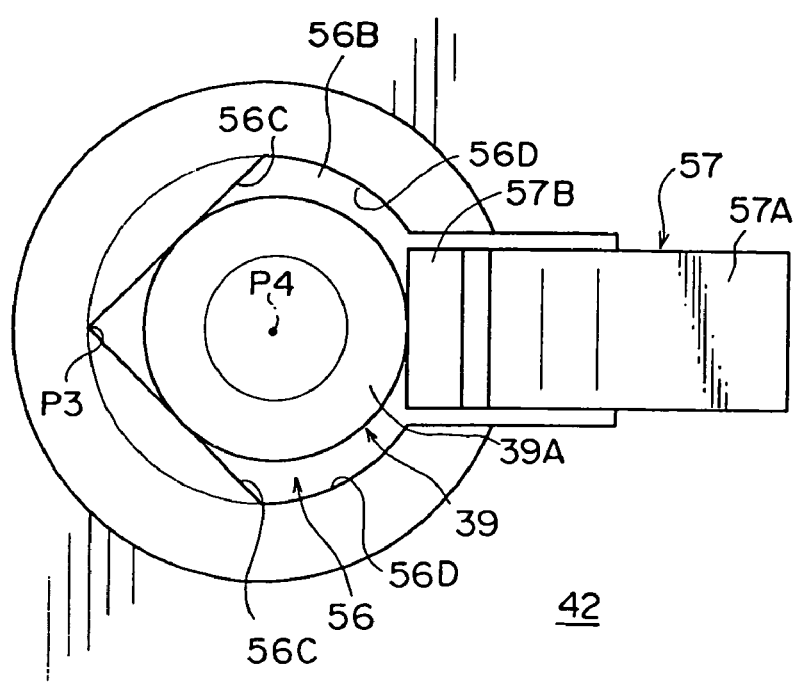
FIG. 8B is a view of a state after the motor shaft is inserted into the hole.

As shown in FIG. 8, a pair of linear reference surfaces 56C is formed into a V-shaped configuration at portions of the circumferential wall of the reference portion 56B. Namely, the reference portion 56B branches from an intersecting point P3 at which the linear reference surfaces 56C intersect with each other and forms a V-shaped configuration. The reference portion 56B is in continuous with an arc surface 56C having the same center as the guide portion 56B. The angle θ1 of the reference surfaces 56C is formed to let motor shaft 39 and the reference portion 56B have the same shaft center P4 (see FIG. 8B) in the state in which the motor shaft 39 contacts with the reference surfaces 56C.

A mounting portion 56E is formed in continuous with the arc surface 56D at a portion of the turntable 42 so as to face the reference surface 56C. A plate spring 57 for constituting the first positioning means is disposed at the mounting portion 56E. The plate spring 57 has a base portion 57A that is fixed to an outer surface of the trunk portion 42B of the turntable 42 via an unillustrated fixing means (for example, vis).

A folded portion 57B which is folded into a substantially V shape is formed at a free end side of the plate spring 57. Further, the plate spring 57 is mounted such that the folded portion 57B is positioned within the reference portion 56B. And as shown in FIGS. 7B and 8B, the plate spring 57 urges the motor shaft 39 toward the reference surface 56C in the state in which the motor shaft 39 is inserted into the reference portion 56B, and the folded portion 57B is kept in contact with the motor shaft 39.

In the state in which the motor shaft 39 is inserted into the hole 56, the magnet member 41 magnetically attracting the metal ring member 43 connects the turntable 42 and the motor 38 with each other. Namely, the base 28 shown in FIG. 2 is rotated toward the frame 22, and the ring member 40 is separated from and approached to the supporting portion 44, whereby the ring member 40 is separated from the corresponding turntable 42 as shown in FIG. 7A, or is connected to the turntable 42 as shown in FIG. 7B.

In this connecting state, by urging the motor shaft 39 to the reference surface 56C by using the plate spring 57, the motor shaft 39 and the turntable 42 are center-aligned by the outer circumferential surface of the motor shaft 39 and the reference surface 56C at the shaft center P4. Further, an axial alignment between the motor 38 and the turntable 42 is carried out on the basis of a distance between the surfaces of the magnet member 41 and the ring member 43 when they are connected to each other.

In the example in FIG. 7, the motor 38 disposed at the base 28 rotates around the supporting shaft 30 as a center and moves toward the supporting portion 44 that has stopped at a predetermined position. Accordingly, as shown in FIG. 7B, the tip end portion 39A of the motor shaft 39 moves toward the reference portion 56B while being guided by the guide portion 56A of the turntable 42. Then, when the motor shaft 39 abuts the folded portion 57B of the plate spring 57, the plate spring 57 urges the motor shaft 39 toward the reference surface 56C.

For this reason, as shown in FIG. 8B, since the motor shaft 39 is connected to each of the reference surfaces 56C, in this state, the motor shaft 39 and the reference portion 56B have the same shaft center P4. Therefore, in accordance with the present embodiment, by urging the motor shaft 39 to the reference surface 56C by using the plate spring 57, the motor shaft 39 and the turntable 42 are center-aligned by the outer circumferential surface of the motor shaft 39 and the reference surface 56C at the shaft center P4. Accordingly, a radial alignment of the motor shaft 39 and the turntable 42 can be carried out smoothly and reliably, and a rotational run-out of the turntable during a rotation of the motor shaft 39 can be prevented.

When a predetermined length of the motor shaft 39 is inserted into the hole 56, the magnet member 41 is kept into contact with the ring member 43, whereby the metal ring member 43 is magnetically attracted to and connected to the magnet member 41. In this connected state, the turntable 42 and the ring member 40 are self-held by the magnetic member 41 and the ring member 43.

Accordingly, in accordance with the present embodiment, a distance L1 (see FIG. 7B) between the pickup 36 disposed at the disk drive unit 24 and the disk 10 attached to the turntable 42, and the rotational center of the turntable are always maintained constant. Accordingly, control of the focus servo and the tracking servo works efficiently.

In the state in which the turntable 42 is rotatable (i.e., the state shown in FIG. 7B), when the motor 38 is driven, the turntable 42 is then rotated. Therefore, data recorded in the disk 10 is reproduced by the pickup 36.

Figure 9A:
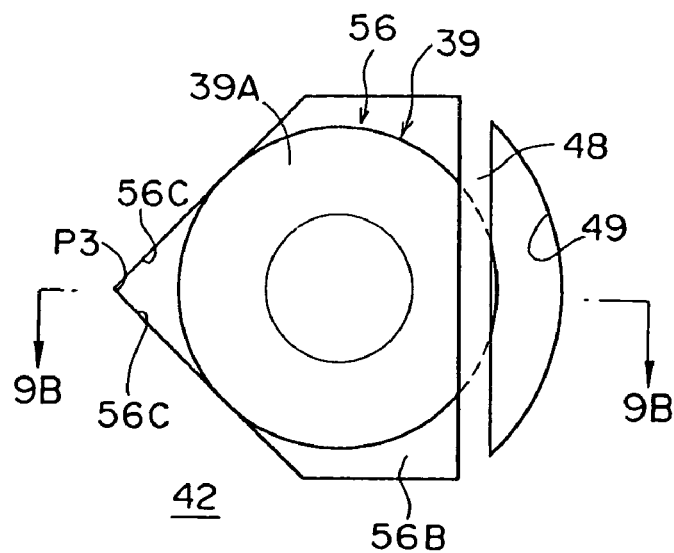
FIG. 9A is a plan view of a main portion of a variant example of a connection mechanism shown in FIG. 8.
Figure 9B:
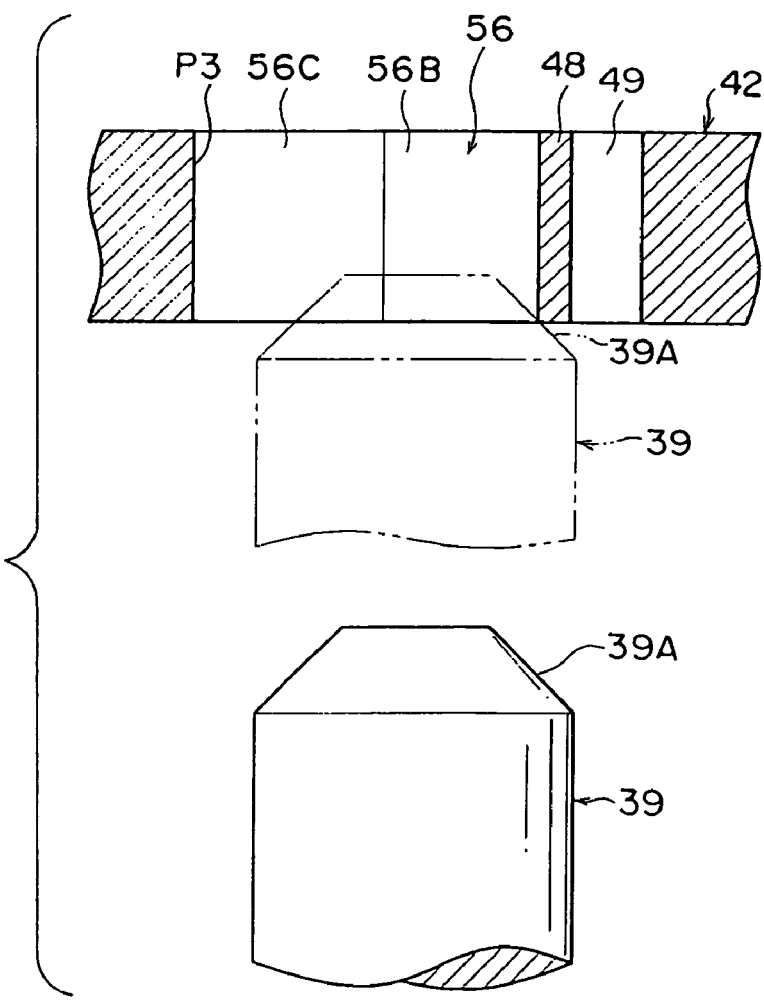
FIG. 9B is a cross sectional view cut along a line 9B—9B of FIG. 9A.
Figure 10A:
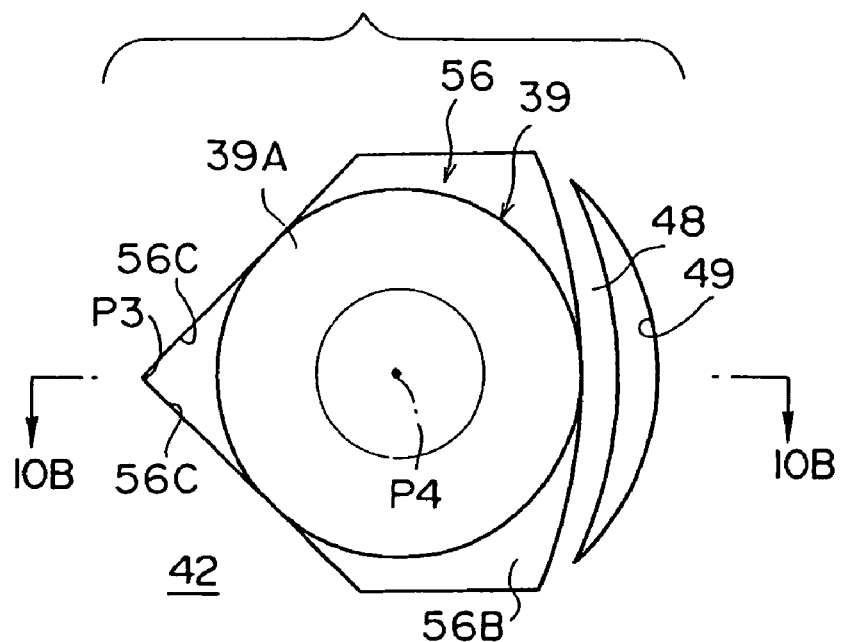
FIG. 10A is a plan view of the connection mechanism in the state in which a motor shaft is inserted into a hole of a turntable shown in FIG. 9A.

With reference to FIGS. 9 and 10, a description will be made of an embodiment in which the first positioning means shown in FIG. 7 (means comprising the hole 56, the plate spring 57, and the like) has been modified. In the present embodiment, in place of the plate spring 57 shown in FIG. 7, an elastic portion 48 is provided at a portion of the turntable 42 made of a synthetic resin. In the present embodiment, portions identical to those in the embodiment of FIG. 7 are denoted by the same reference numerals.

As shown in FIG. 9A, the elastic portion 48 that is formed by a synthetic resin is formed integrally with the turntable 42 at a portion that opposes the reference surfaces 56C of the turntable 42, and an arc portion 49 is formed at the elastic portion 48 at the opposite side of the reference portion 56B. Further, a planar configuration of the reference portion 56B is made smaller than an arc of the motor shaft 39. Therefore, when the motor shaft 39 is inserted into the reference portion 56B, the motor shaft 39 is opposed to the elastic portion 48.

Figure 10B:
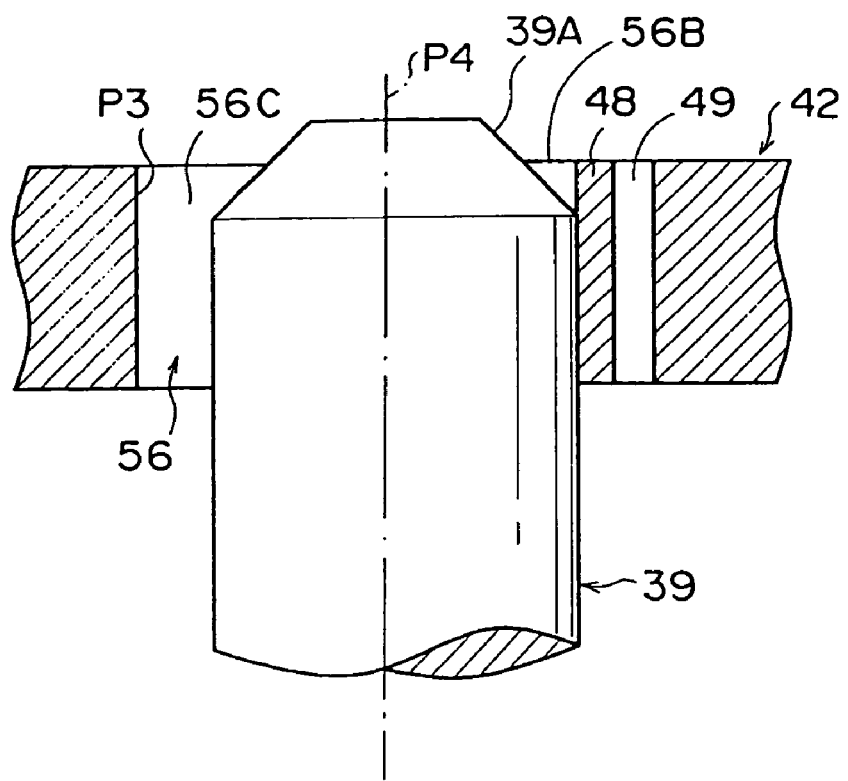
FIG. 10B is a cross sectional view cut along a line 10B—10B of FIG. 10A.

The motor 38 shown in FIG. 7 is moved toward the turntable 42, whereby, as shown by an imaginary line of FIG. 9B, the tapered tip end portion 39A of the motor shaft 39 is kept in contact with the reference surfaces 56C and the elastic portion 48. Further, as shown in FIG. 10B, the motor shaft 39 is moved to press the elastic portion 48 toward the arc portion 49 by the motor shaft 39.

In the present embodiment, the elastic portion 48 is pressed toward the arc potion 49 by the motor shaft 39, and the reference portion 56B is deformed by the motor shaft 39. Then, in the state in which the motor shaft 39 is inserted into the reference portion 56B, the motor shaft 39 is urged toward the reference surfaces 56C by the elastic portion 48.

Accordingly, in accordance with the present embodiment, the motor shaft 39 and the turntable 42 are center-aligned by the outer circumferential surface of the motor shaft 39 and the reference surface 56C at the shaft center P4. Accordingly, a radial alignment of the motor shaft 39 and the turntable 42 can be carried out smoothly and reliably. Further, since other arrangement, operation, and effect of the present embodiment are the same as those of the embodiment shown in FIG. 7, a detailed description thereof will be omitted.

With reference to FIG. 11, an embodiment in which a planar configuration of a reference surface for constituting the first positioning means shown in FIG. 9 is varied will be explained. In the present embodiment, portions identical to those of the embodiment in FIG. 9 are denoted by the same reference numerals.

Figure 11A:
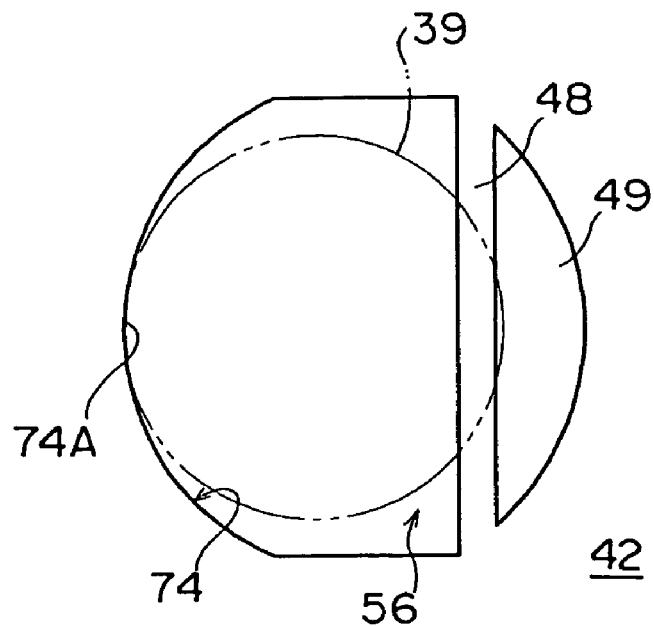
FIG. 11A is a plan view of a main portion of another variant example of the connection mechanism shown in FIG. 8.
Figure 11B:
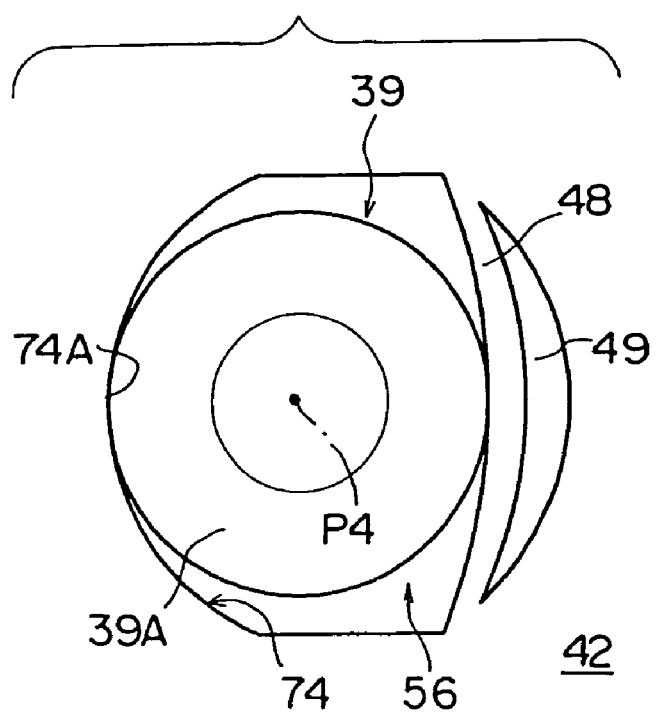
FIG. 11B shows a plan view of the connection mechanism in the state in which a motor shaft is inserted into a hole shown in FIG. 11A.

As shown in FIG. 11A, a reference surface 74 in the present embodiment is arc shaped, and is symmetrical with the arc surface of the arc portion 49. Then, as shown in FIG. 11B, when the motor shaft 39 is inserted into the reference portion 56B and urged toward a reference surface 74 by the elastic portion 48, the motor shaft 39 is kept into contact with a vertex 74A of the reference surface 74 and a portion of the elastic portion 48 corresponding to the vertex 74A.

In the state in which the motor shaft 39 is inserted into the reference 56B, the motor shaft 39 is urged toward the vertex 74A of the reference surface 74 by the elastic portion 48. Accordingly, in accordance with the present embodiment, since the motor shaft 39 and the turntable 42 are center-aligned at the shaft center P4 (see FIG. 11) by the outer circumferential surface of the motor shaft 39 and the reference surface 74, the motor shaft 39 and the turntable 42 can be aligned in a radial direction smoothly and reliably. Further, since other arrangement, operation and effect are the same as those of the embodiment shown in FIG. 7, a more detailed description thereof will be omitted.

With reference to FIG. 12, an embodiment in which the plate spring and the reference surface for constituting a portion of the first positioning means shown in FIG. 7 is varied will be explained. In the present embodiment, portions identical to those shown in FIG. 6 are denoted by the same reference numerals.

Figure 12A:
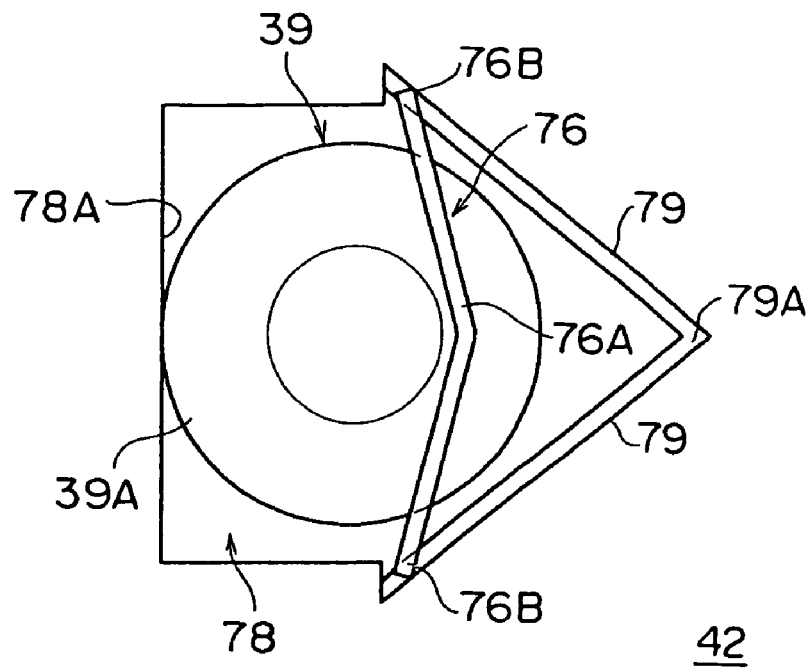
FIG. 12A is a plan view of a main portion of another variant example of the connection mechanism shown in FIG. 8.

As shown in FIG. 12A, a plate spring 76 in the present embodiment is folded at a central portion 76A so as to form a V-shaped configuration and end portions 76B of the plate spring 76 are approached to each other. A hole 78 of the present embodiment is formed into a substantially arrow-shaped planar configuration.

Abutting portions 79 are formed into a V-shaped configuration at portions of the hole 78 corresponding to the end portions 76B of the plate spring 76. In the state in which the motor shaft 39 is inserted into the hole 78, the plate spring 76 and the abutting portion 79 and the motor shaft 39 and the hole 78 are concentric with each other at the shaft center P4.

Figure 12B:
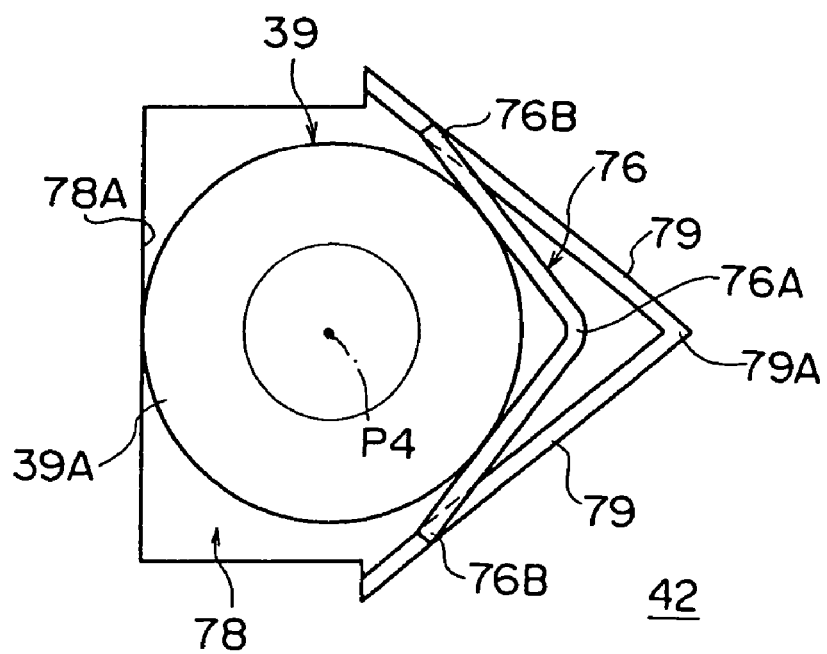
FIG. 12B is a plan view of a state of the connection mechanism in which a motor shaft is inserted into a hole shown in FIG. 12A.

The abutting portions 79 are formed respectively at both axial end portions of the hole 78, and an axial movement of the plate spring 76 in the axial direction of the hole 78 is controlled by a pair of the abutting portions 79. Accordingly, as shown in FIG. 12B, when the motor shaft 39 is inserted into the hole 78, and the plate spring 76 is elastically deformed toward an intersecting point 79A of the abutting portions 79, the plate spring 76 is folded in conformity with the abutting portions 79.

Therefore, in the state in which the motor shaft 39 is inserted into the hole 78, the plate spring 76 is urged toward a sidewall 78A of the hole 78 corresponding to the plate spring 76. Then, the motor 39 is kept in contact with two points of the plate spring 76 and with one point of the sidewall 78A of the hole 78 so that the motor 39 and the hole 78 become concentric with each other at the shaft center P4. Namely, the present embodiment relates to an example in which positioning of the motor shaft 39 with respect to the hole 78 is carried out by the plate spring 76.

In accordance with the present embodiment, the motor shaft 39 and the turntable 42 are center-aligned at the shaft center P4 by the plate spring 76 and the sidewall 78A of the hole 78 corresponding to the plate spring 76. Accordingly, the motor shaft 39 and the turntable 42 can be radially aligned smoothly and reliably. Further, since other arrangement, operation, and effect of the present embodiment are the same as those of the embodiment shown in FIG. 7, a detailed description thereof will be omitted.

Figure 15:
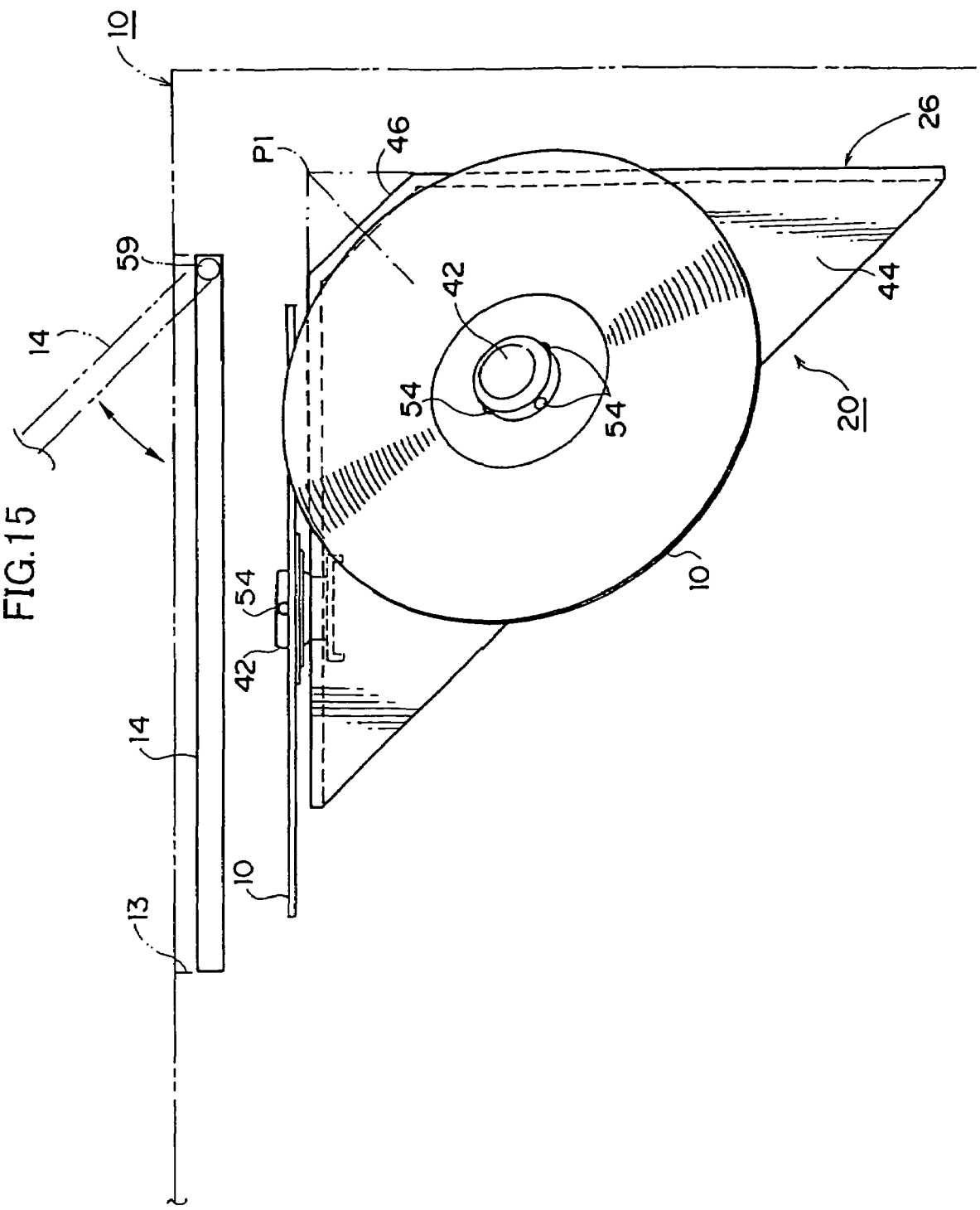
FIG. 15 is a schematic view of a main portion of a component stereo apparatus according to a variant example of the first embodiment of the present invention.

With reference to FIG. 15, another variant example of the first embodiment of the present invention will be explained. Further, in the present embodiment, portions identical to those of the first embodiment of the present invention are denoted by the same reference numerals. A stereo apparatus according to the present embodiment comprises the opening portion 13 and the door leaf 14 at an upper surface of the cabinet 12, and the disk changer 20 corresponding to the door leaf 14.

The door leaf 14 of the present embodiment is structured so as to rotate around the supporting shaft 59 as a center. Since other arrangement, operation and effect are similar to those shown in FIG. 1, a detailed description thereof will be omitted.

Figure 16:
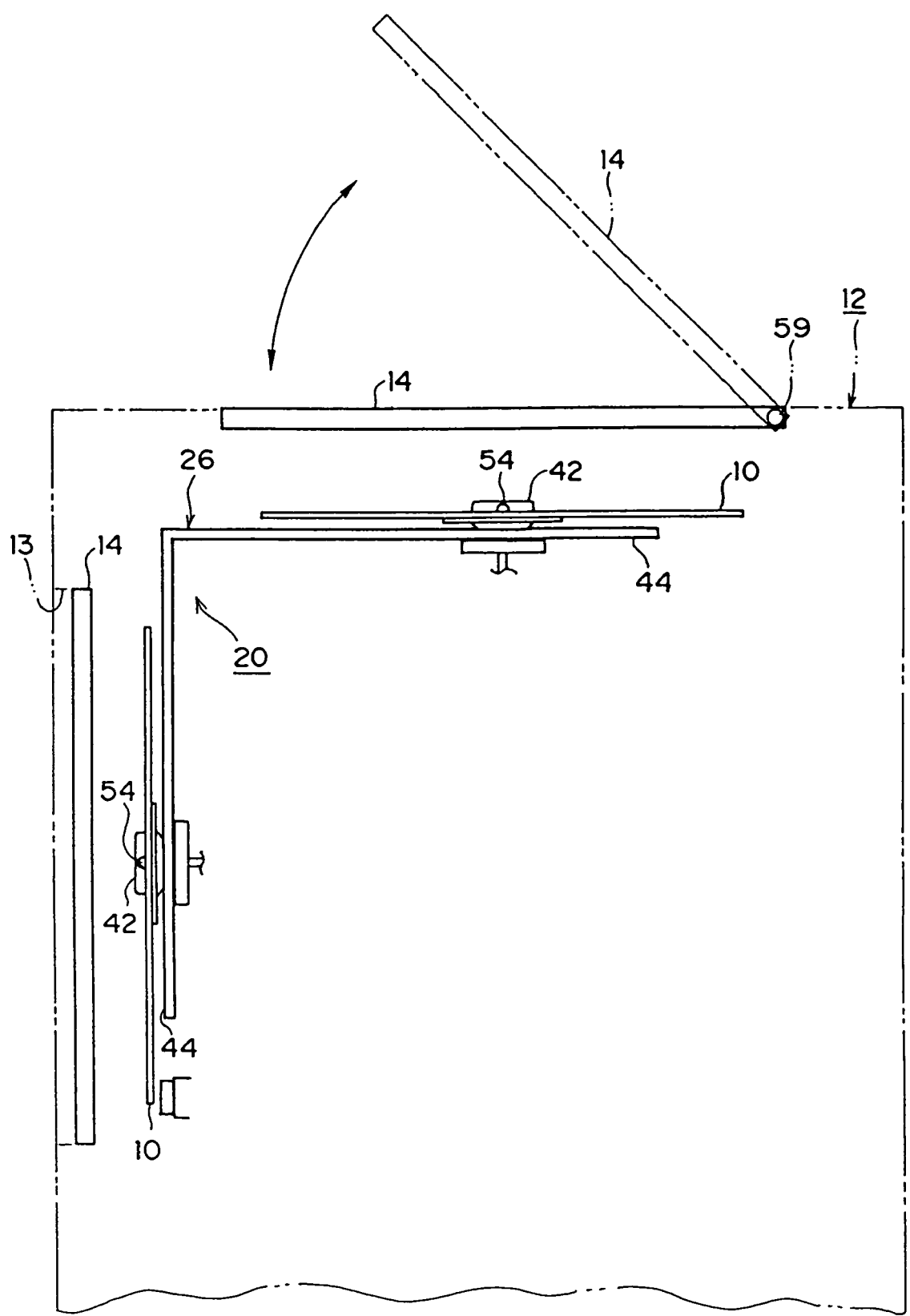
FIG. 16 is a schematic view of a main portion of a component stereo apparatus according to another variant example of the first embodiment of the present invention.

With reference to FIG. 16, another variant example of the first embodiment of the present invention will be explained. The present embodiment is structured by combining the arrangements of FIG. 1 and FIG. 15. Namely, the opening portion 13 and the door leaf 14 are respectively disposed both at a front surface and an upper surface of the cabinet 12. Further, in the present embodiment, portions identical to those shown in FIGS. 1 and 15 are denoted by the same reference numerals.

The disk changer 20 comprises the supporting portions 44 that are respectively disposed so as to correspond to the door leaves 14. Namely, the present embodiment is structured such that two of the supporting portions 44 are right-angled to each other. Since other arrangements are the same as those in FIGS. 1 and 5, a detailed description thereof will be omitted.

In the present embodiment, since the door leaf 14, through which the disk 10 can be attached to/removed from a turntable, are provided at two positions. Accordingly, while the disk 10 that is placed on one supporting portion 44 is reproduced, the disk 10 can be attached/detached with respect to the other supporting portion 44. Since other operation and effect are similar to those in the embodiment shown in FIG. 1, a detailed description will be omitted.

With respect to FIG. 17, still another embodiment of the present invention will be explained, and portions identical to those shown in FIG. 1 are denoted by the same reference numerals.

Figure 17A:
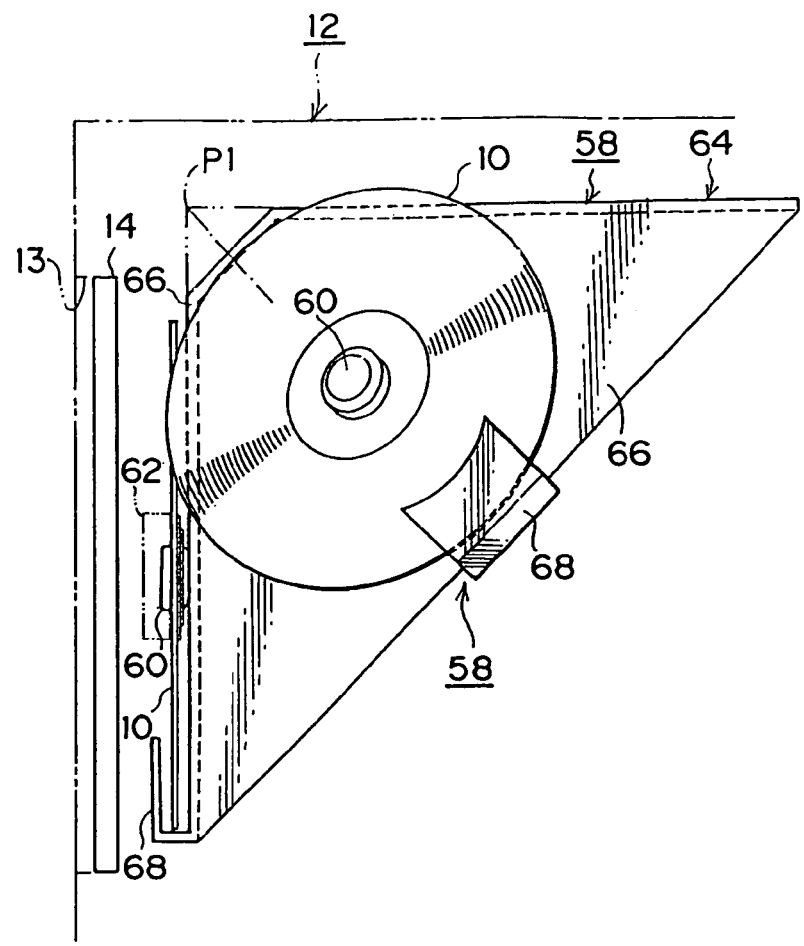
FIG. 17A is a schematic view of a main portion of a disk changer according to another variant example of the first embodiment of the present invention.
Figure 17B:
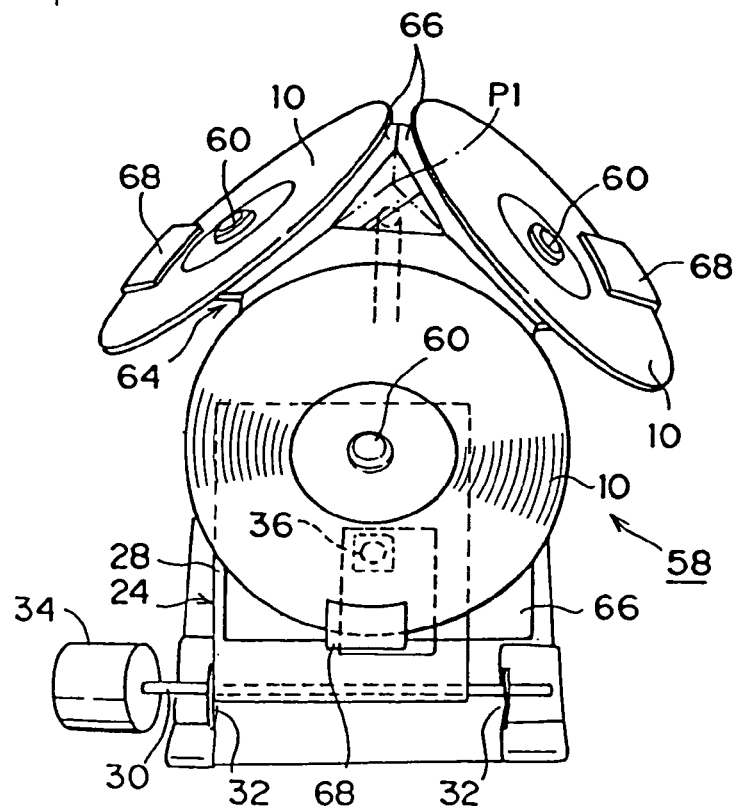
FIG. 17B shows a perspective view of the main portion of the disk changer shown in FIG. 17A.

In the present embodiment, an example is shown in which a chucking mechanism of the disk 10 (or 11) is operated by a turntable 60 and a damper 62 clamping the disk 10 (see an imaginary line of FIG. 17A). Namely, the turntable 60 of the present embodiment is not provided with a ball-chuck mechanism. Then, as shown in FIG. 17A, the disk 10 is clamped by the turntable 60 and the damper 62.

In the present embodiment, each of supporting portions 66 of a tray 64 has a space that is larger than that of the example shown in FIG. 1. Hook pieces 68 are provided respectively at tip end portions of the supporting portion 66 so as to correspond to the 12 cm-disk (see FIG. 17B). The hook piece 68 is used in order to prevent the disk 10 that is supported by the turntable 60 from falling off from the supporting portion 66 during the rotation of the tray 64. Since the present embodiment is structured as described above, the turntable 60 and the hook piece 68 are able to hold the disk at the tray 64 even when the disk is inclined.

The damper 62 is movably disposed at a portion that opposes the opening portion 13. Further, in a disk changer 58, in the state in which the turntable 60 and the ring member 40 are connected to each other (i.e., a state in which the disk is rotatable), as shown in FIG. 17A, the disk floats from the hook piece 68. Moreover, the hook piece 68 is structured to support the 8 cm-disk 11 at the turntable 60. Since other arrangement is the same as that of the embodiment shown in FIG. 1, a detailed description thereof will be omitted.

In the present embodiment shown in FIG. 17, during the rotation of the tray 64, since the hook piece 68 prevents the disk 10 supported by the turntable 60 from falling off from the turntable 60, the disk 10 is clamped by the turntable 60 and the damper 62, and the disk 10 is then reproduced.

This embodiment is suitable for holding a disk encased in a cartridge such as a mini-disk. The cartridge is supported by a holding portion provided at each of the supporting portions 66, and the disk encased in the cartridge is held at the turntable, whereby operational effects similar to the above-description can be obtained. Since other operation and effect are the same as those in the embodiment shown in FIG. 1, a detailed description will be omitted.

Figure 18A:
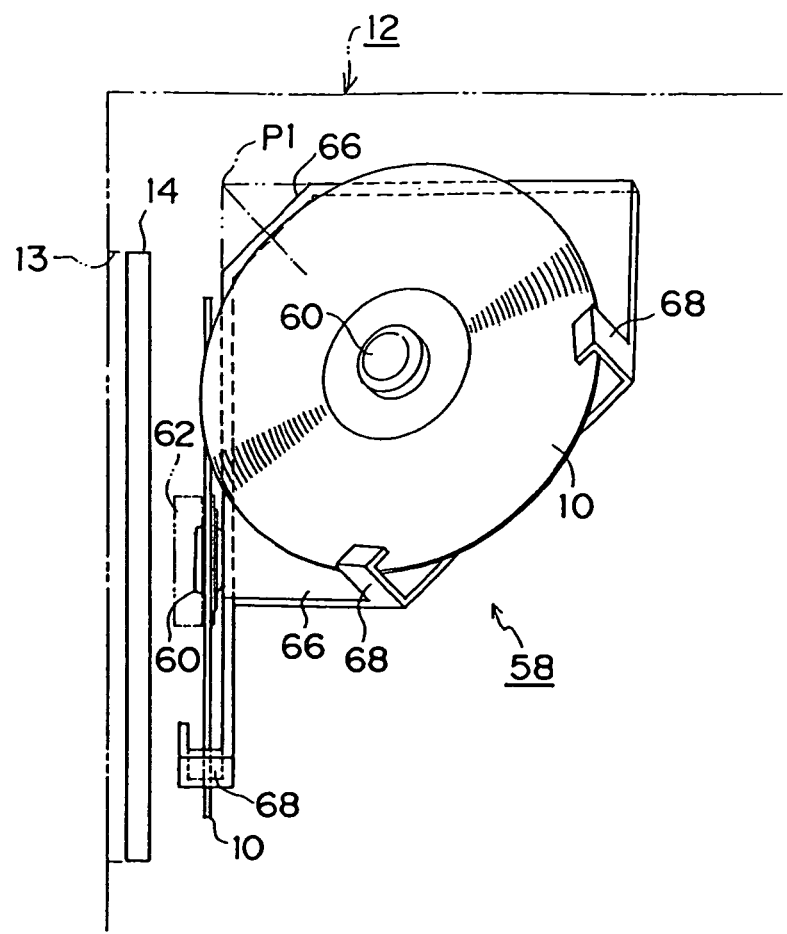
FIG. 18A is a schematic view of a component stereo apparatus showing a main portion of the disk changer according to another variant example of the first embodiment of the present invention.

With reference to FIG. 18, a description of another variant example of the first embodiment of the present invention will be made. The embodiment is an example in which the structure of the supporting portion 44 shown in FIG. 17 is varied. In the present embodiment, portions identical to those of the embodiment shown in FIG. 17 are denoted by the same reference numerals.

In the present embodiment, a configuration of each of the supporting portions 44 and a relational position between the hook piece 68 and each supporting portion 44 of the embodiment shown in FIG. 17 are varied. Namely, a pair of the hook pieces 68 is provided at one supporting portion 44. Accordingly, the supporting portion 44 is structured such that a distance between the through hole 45 (see FIG. 6) and the opening end portion is shorter than a radius of the 12-cm disk 10.

Figure 18B:
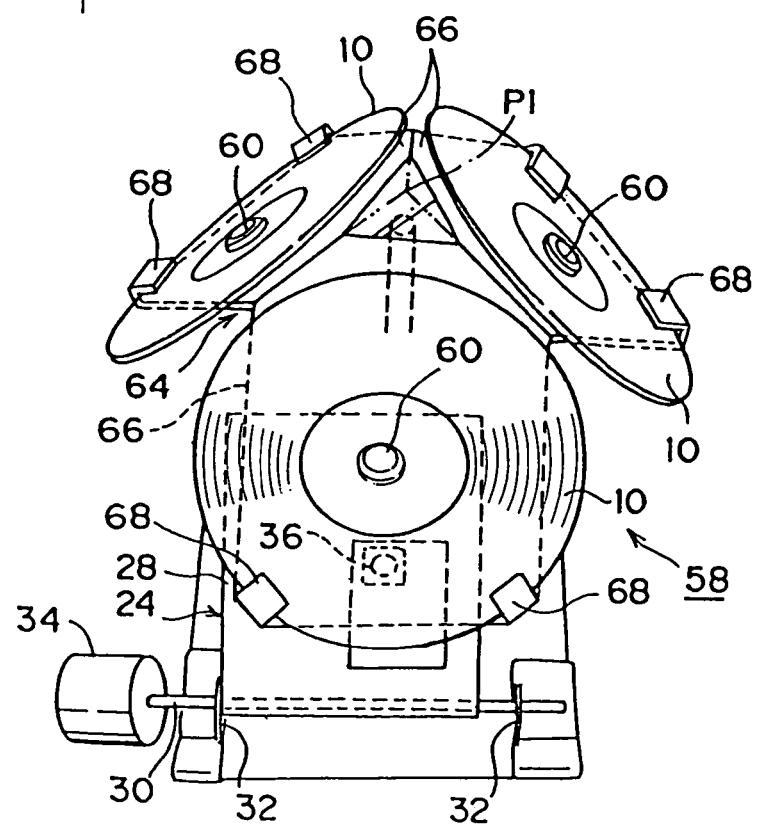
FIG. 18B is a perspective view of the main portion of the disk changer shown in FIG. 18A.

As shown in FIG. 18B, the pair of the hooks 68 are formed respectively at corners of the opening end portion of the supporting portion 44. Namely, the present embodiment corresponds to claim 5. Since other arrangement is similar to that of the embodiment shown in FIG. 17, and a detailed description will be omitted.

Figure 74:
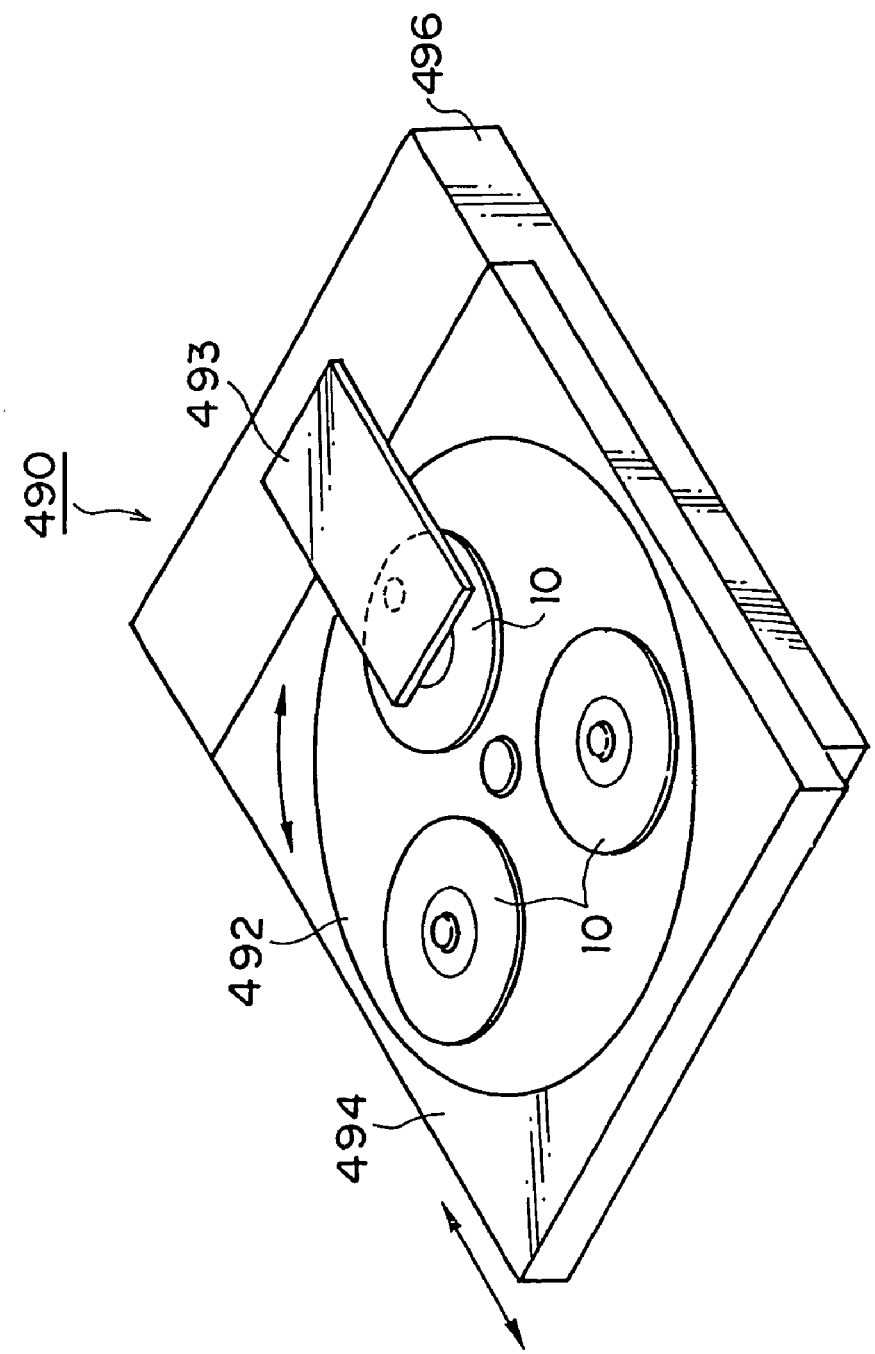
FIG. 74 is a perspective view showing a main portion of a conventional disk changer.

In accordance with an embodiment shown in FIG. 18, since a distance between the through hole 45 (see FIG. 6) and the opening end portion, of the supporting portion 44 is shorter than a radius of the disk 10, it is possible to make the supporting portion 44 smaller than that of a mounting portion of a conventional turntable 492 shown in FIG. 74. Since other operation and effect are the same as those of the embodiment shown in FIG. 17, a detailed description thereof will be omitted.

Second Embodiment

With reference to FIGS. 19 to 49, a disk apparatus according to a second embodiment of the present invention will be explained hereinafter. The disk apparatus according to the second embodiment of the present invention is an example of a disk changer built in a component stereo apparatus.

Figure 19:
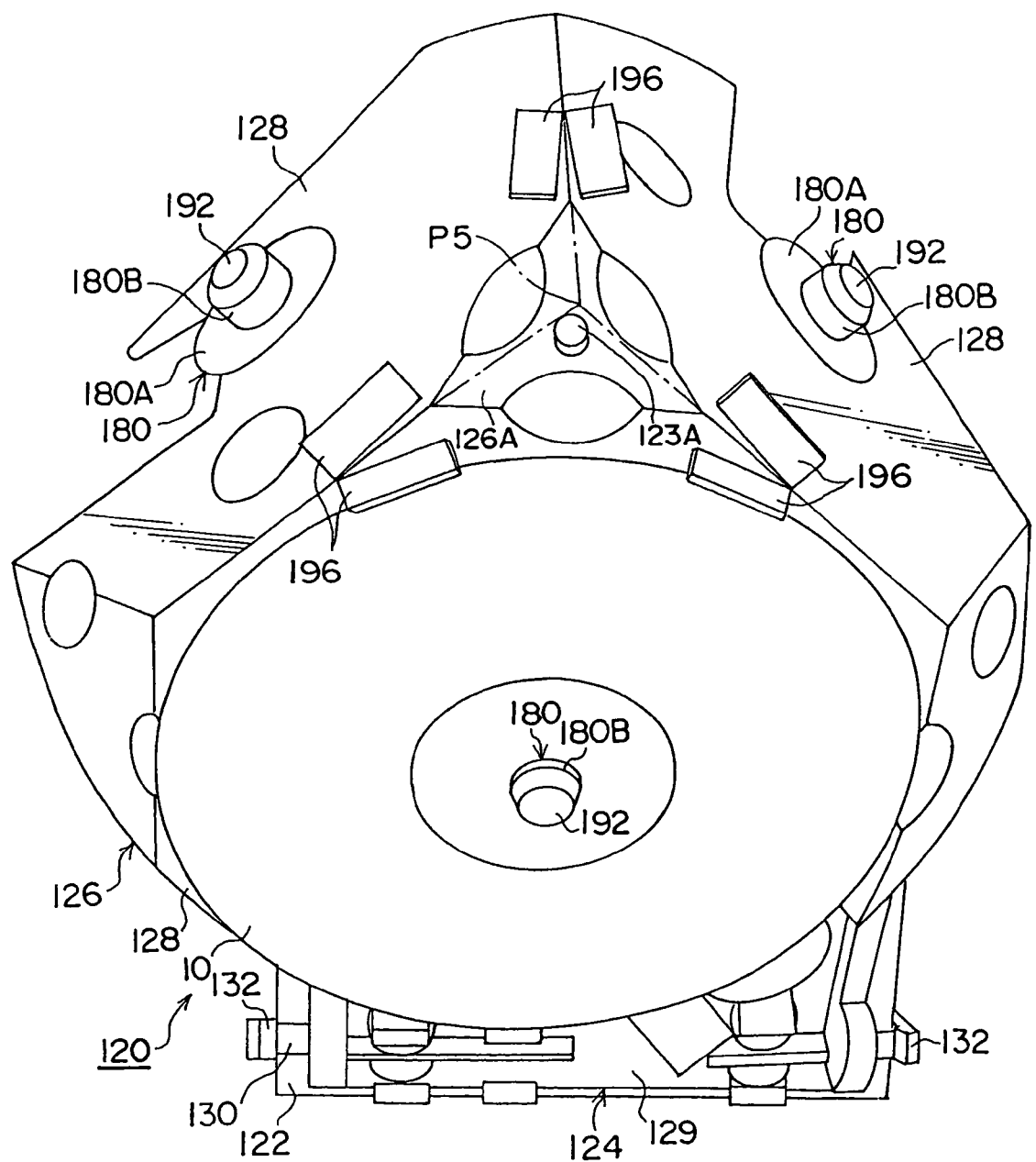
FIG. 19 is a plan view of a disk changer disposed at the component stereo apparatus according to a second embodiment of the present invention.
Figure 20:
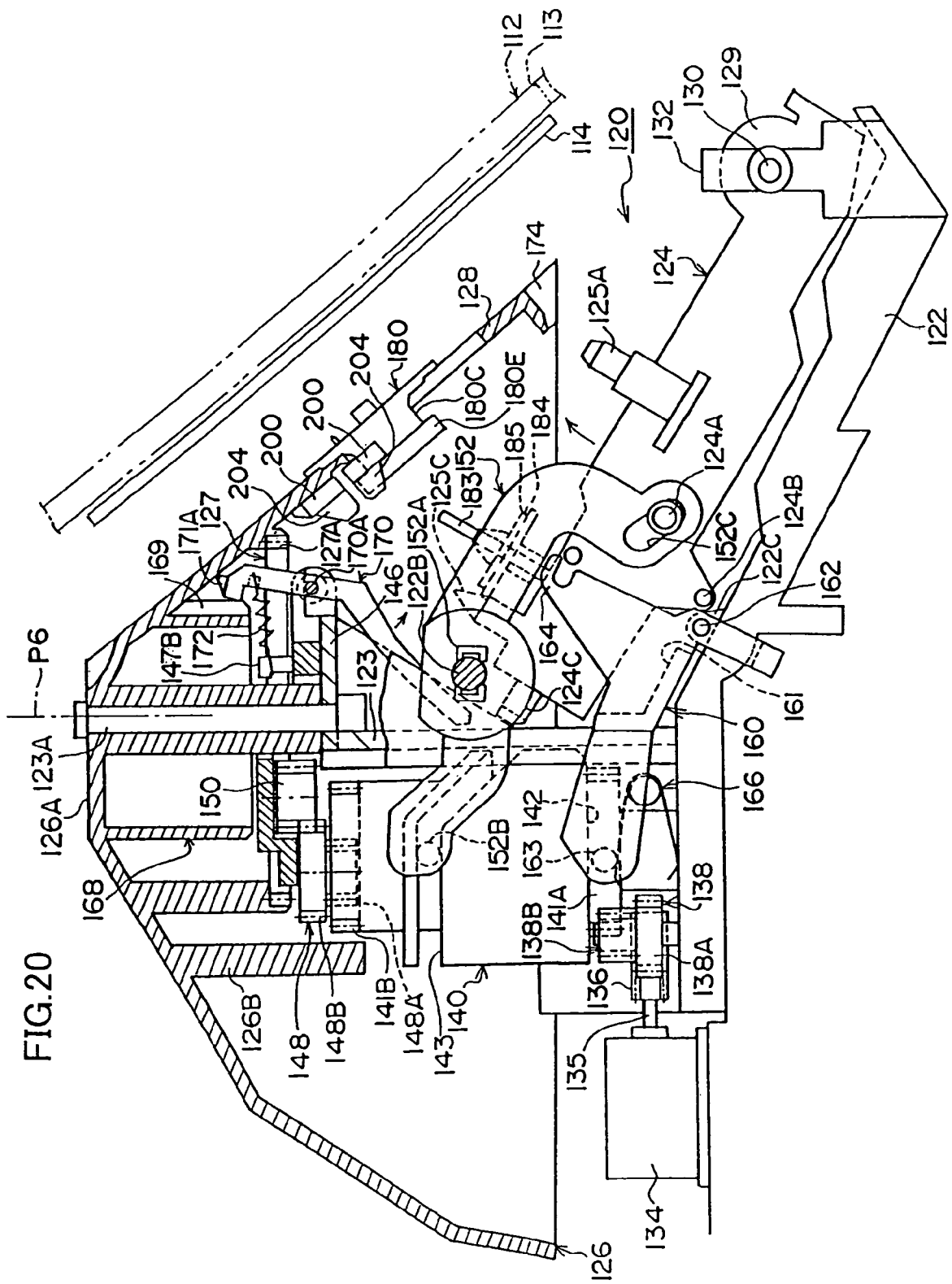
FIG. 20 is a side view of a disk changer in the state in which a tray shown in FIG. 19 is broken.
Figure 21:
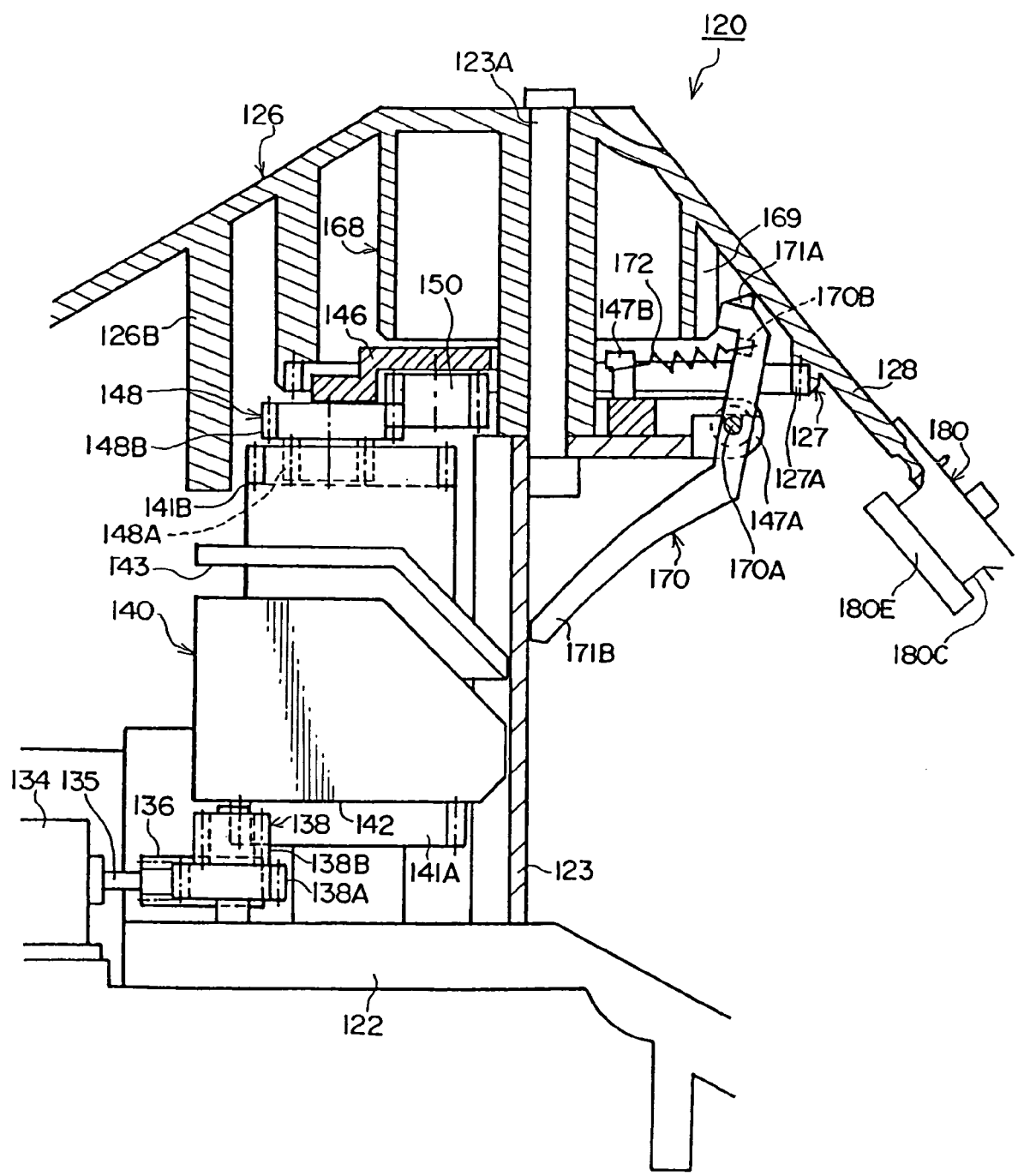
FIG. 21 is an explanatory view for explaining a driving path of a tray of the disk changer shown in FIG. 20.
Figure 22:
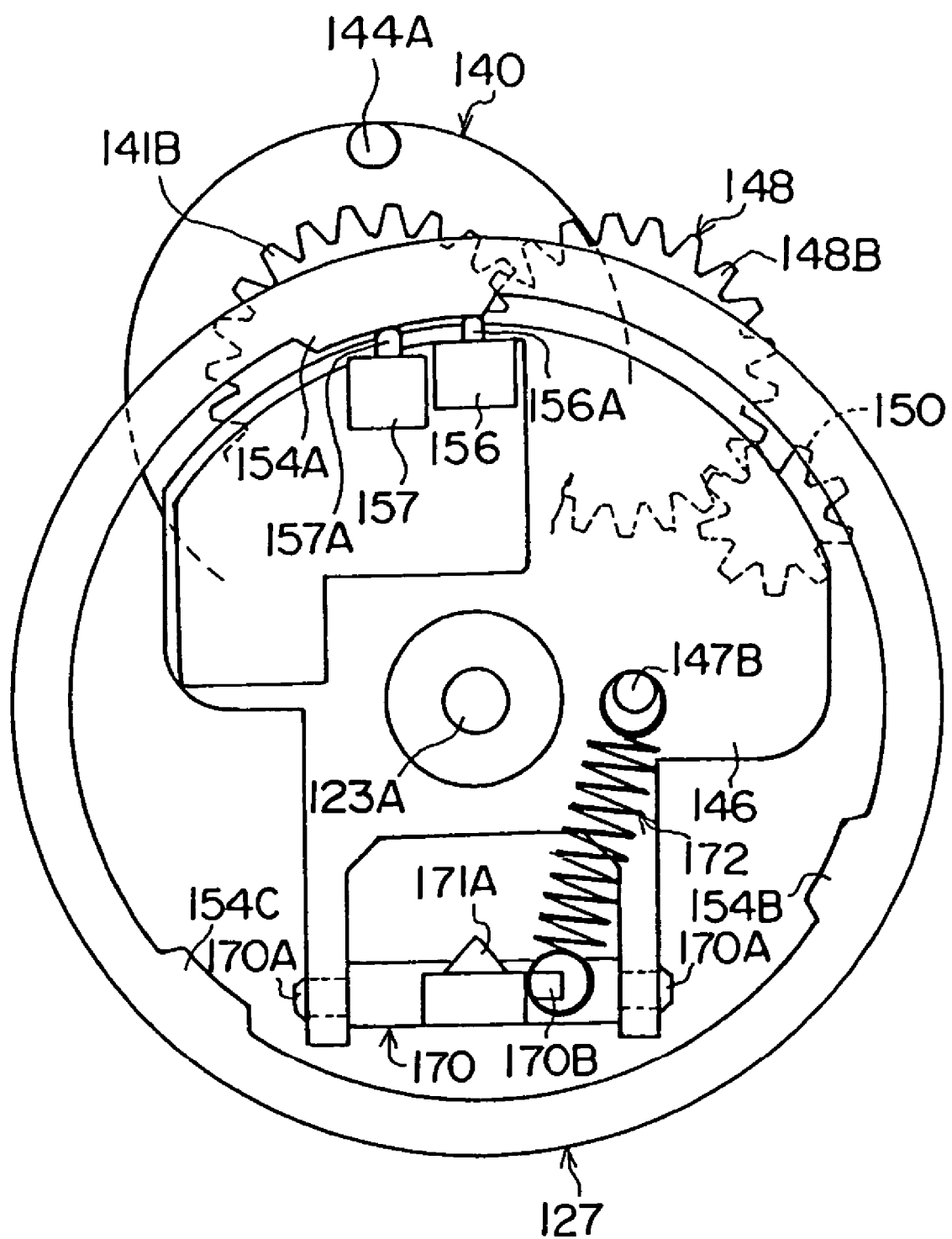
FIG. 22 shows a plan view of a driving path of the disk changer shown in FIG. 21.
Figure 23:
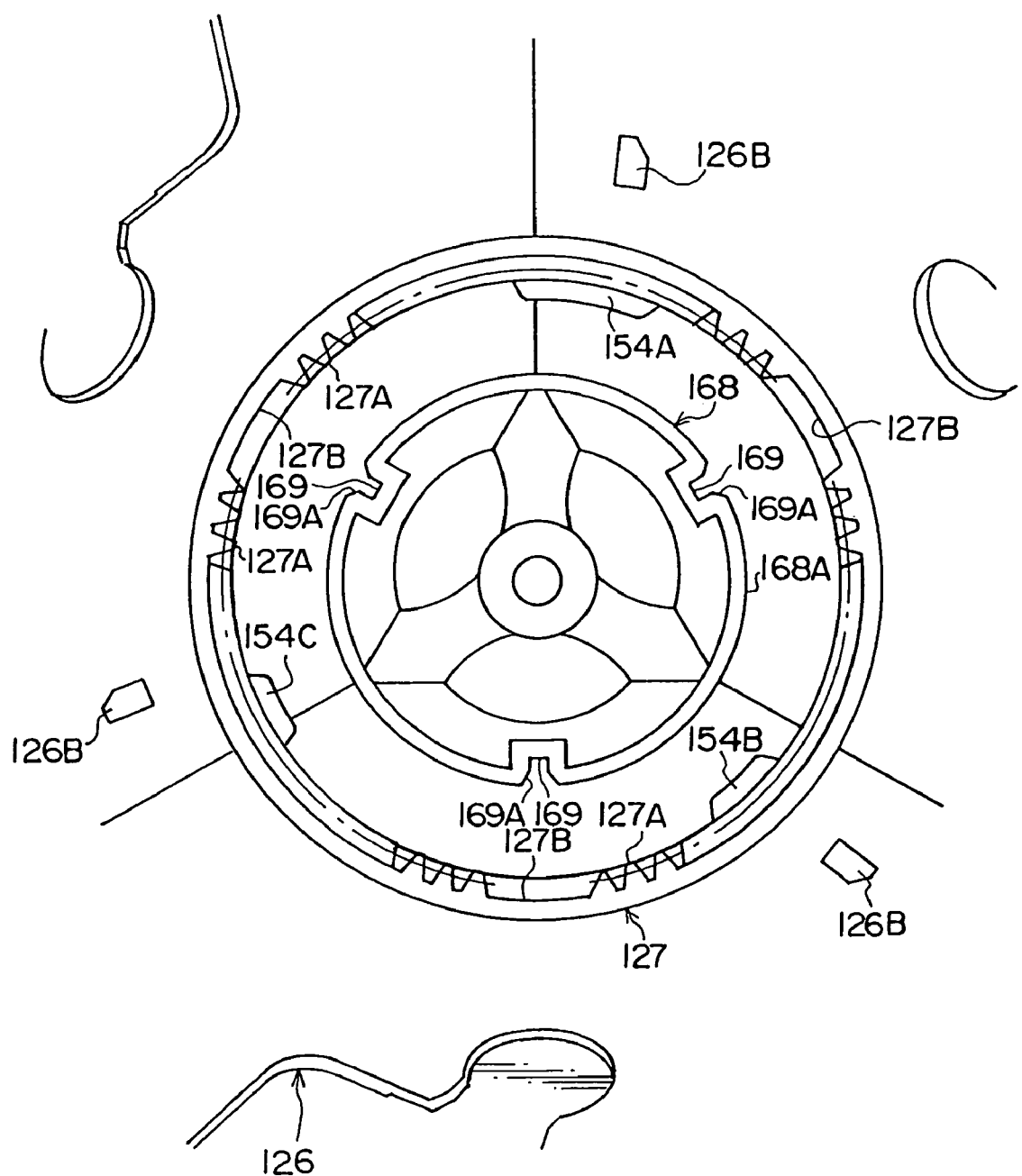
FIG. 23 shows a bottom plan view of the tray of the disk changer shown in FIG. 21.

FIG. 19 is a plan view of a disk changer disposed in the component stereo apparatus, FIG. 20 is a side view of the disk changer in the state in which the tray shown in FIG. 19 is broken, FIG. 21 is an explanatory view for explaining a driving path of the tray shown in FIG. 20, and FIG. 22 is a plan view of the driving path shown in FIG. 21, and FIG. 23 is a bottom view of the tray shown in FIG. 21.

Overall Structure of the Component Stereo Apparatus

A disk changer 120 as shown in FIG. 19 is built in a cabinet 112 (see an imaginary line of FIG. 20) of a component stereo apparatus (hereinafter, simply, a "stereo apparatus"). As shown in FIG. 20, a substantially rectangular opening portion 113 is formed at a front panel for constituting a cabinet 112 so as to oppose the disk changer 120. Further, a door leaf 114 is slidably disposed at the stereo apparatus so as to oppose the opening portion 113.

An unillustrated opening/closing button for opening/closing the door leaf 114 is disposed at the stereo apparatus. Due to an operation of the opening/closing button, the door leaf 114 is slid so that the opening portion 113 is opened/closed. Further, an unillustrated tuner, tape recorder or the like is incorporated in the stereo apparatus.

Overall Structure of the Disk Changer

As shown in FIGS. 19 and 20, the disk changer 120 comprises a disk drive unit 124 serving as a holder that is disposed at a frame 122, and a tray 126 for supporting a plurality of the disks 10 (see FIG. 19). In the disk drive unit 124, a supporting shaft 130 is placed on a base 129, passed through a pair of bearings 132 that are disposed so as to protrude from the frame 122, and then connected to the frame 122 via the bearings 132.

The disk drive unit 124 (the base 129) rotates (inclined) with respect to the frame 122 around the supporting shaft 130 as a center, and the tray 126 is rotatably supported by a support 123 standing upright from the frame 122.

The tray 126 is formed into a substantially triangular pyramid configuration whose side surfaces are formed by supporting portions 128. Namely, a plurality of the supporting portions 128 (three in the present embodiment) are formed integrally with the tray 126. Further, a turntable 180 is rotatably disposed at each of the supporting portions 128 so as to hold a disk such as 12 cm-disk 10 (see FIG. 19) or 8 cm-disk (not shown).

Each supporting portion 128 is inclined such that a shaft center P6 (see FIG. 20) around which the tray 126 rotates as a center corresponds to a vertex P5 (see FIG. 19). Further, a top portion 126A that is supposed to be a rotational center of the tray 126 is flat-shaped, whereby the tray 126 is formed into a truncated polygonal pyramid configuration.

A shown in FIG. 19, a supporting shaft 123A is mounted to a top central portion of the tray 126, whereby the tray 126 rotates around the vertex P5 (the shaft center P6 of the supporting shaft 123A) as a center. Further, as shown in FIG. 20, the tray 126 is disposed such that one supporting portion 128 (i.e., the supporting portion 128 that faces the disk drive unit 124) corresponds to the opening portion 113, and the disk 10 can be detached or attached via the opening portion 113.

Unillustrated selection keys that respectively correspond to each of the supporting portion 128 are disposed at the stereo apparatus. Namely, identifiers (identification numbers) to the respective supporting portions 128 are denoted in advance. Due to an operation of a selection key corresponding to each of the identification numbers, the tray 126 rotates around the spindle 183 as a center, and the selected supporting portion 128 thereby faces the door leaf 114 (i.e., the opening portion 113).

Driving Structure of the Disk Drive Unit 124 and the Tray 126

With reference to FIGS. 20 to 23, a driving structure of the disk drive unit 124 and the tray 126 will be explained hereinafter. As shown in FIGS. 20 and 21, a motor 134 for constituting the second driving means is provided at the frame 122. A worm gear 136 is fixed to a motor shaft 135 of the motor 134. A gear 138 at which a worm gear portion 138A is formed to mesh therewith is rotatably disposed at the frame 122.

Figure 24:
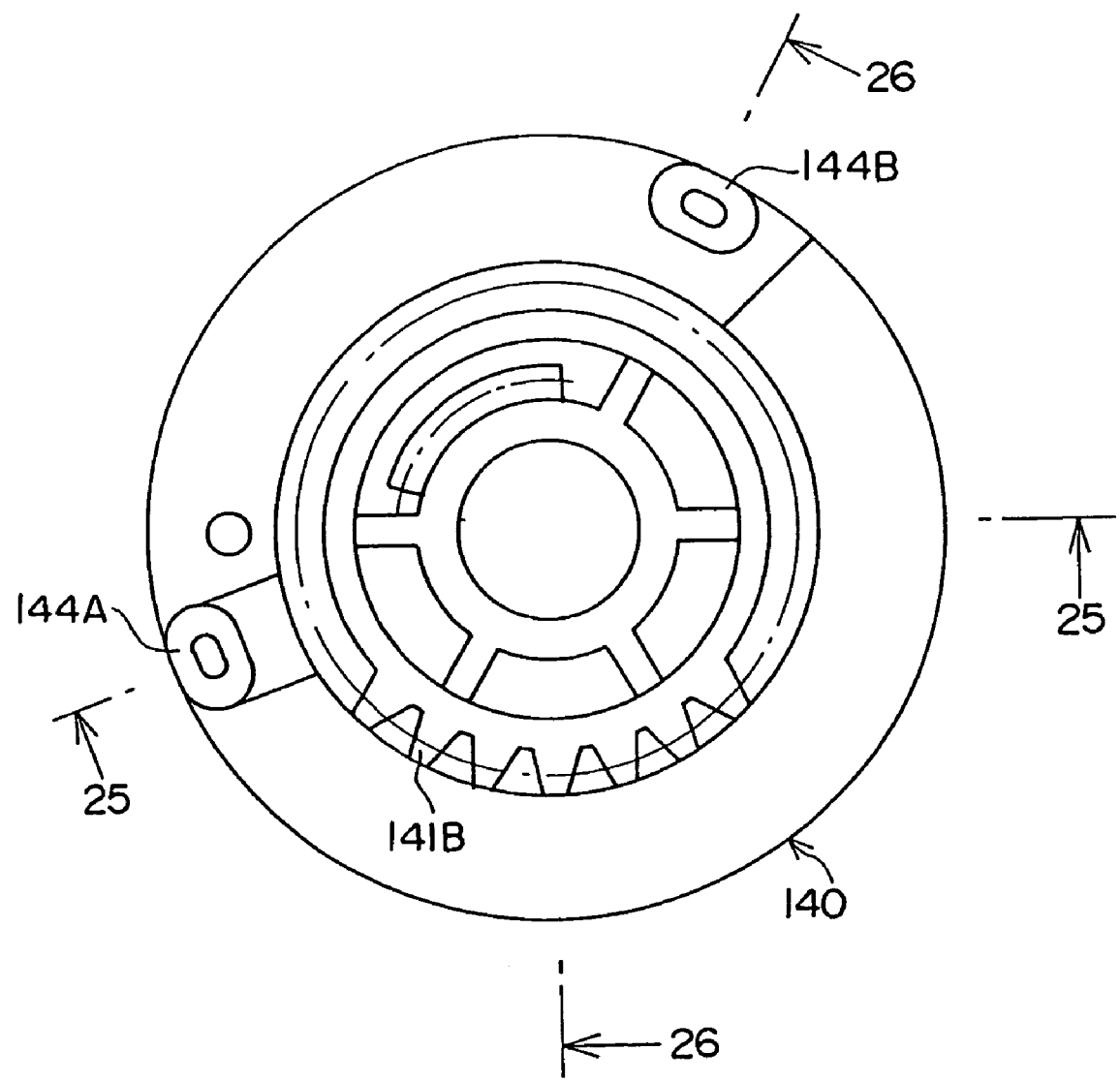
FIG. 24 shows a plan view of a cam gear of the disk changer shown in FIG. 20.
Figure 25:
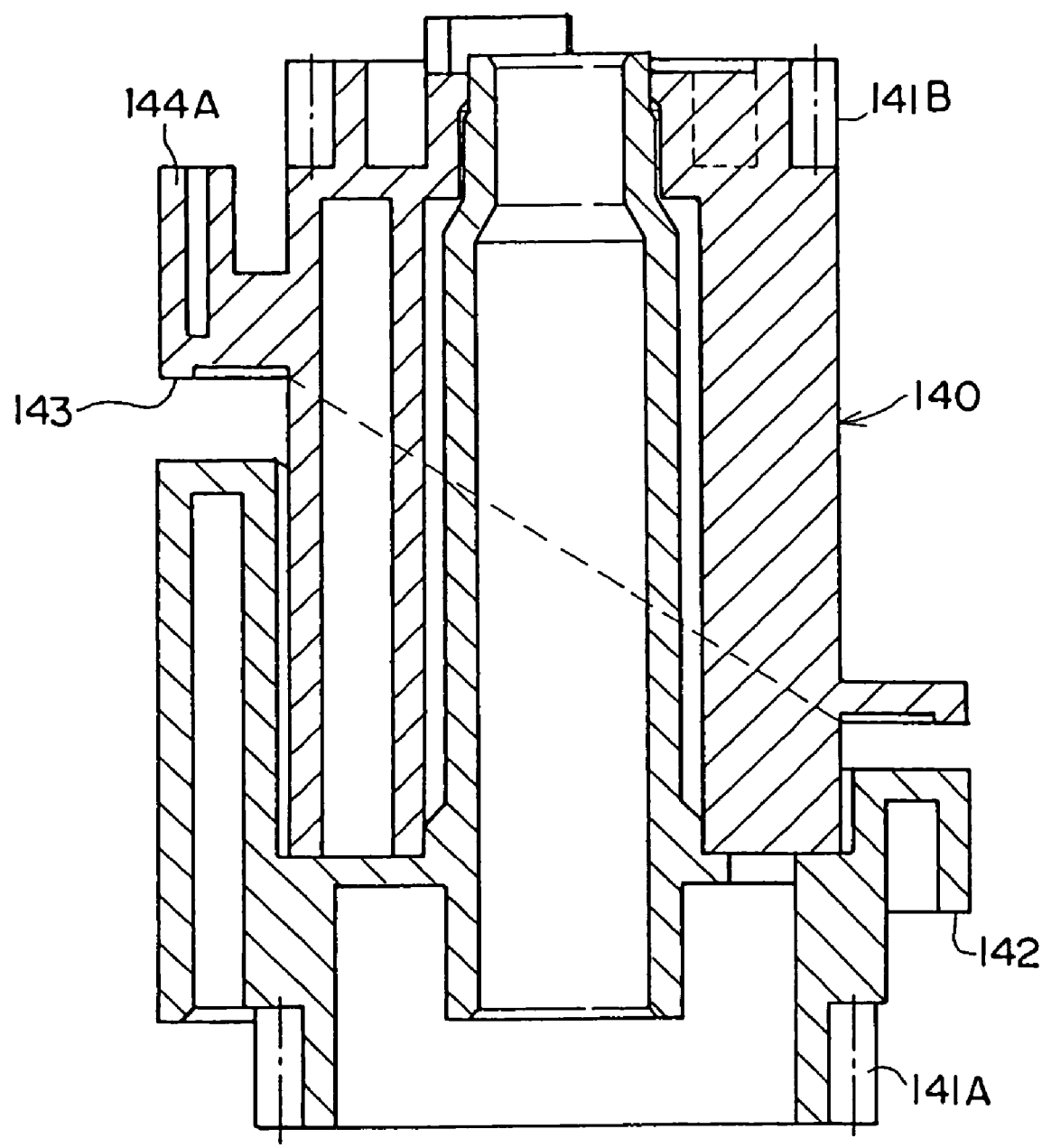
FIG. 25 shows a cross sectional view of the disk changer cut along a line 25—25 of FIG. 24.
Figure 26:
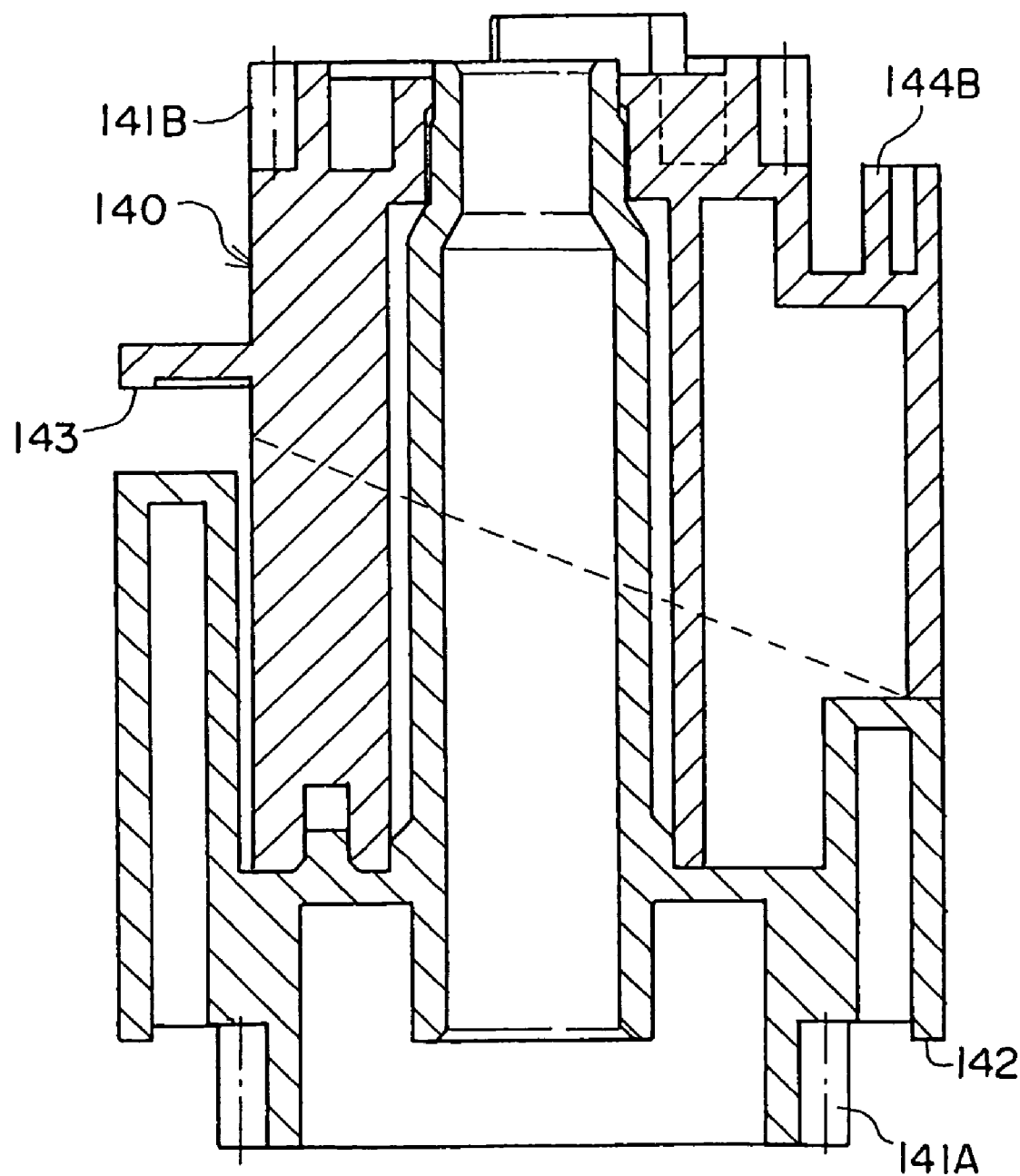
FIG. 26 shows a cross sectional view of the disk changer cut along a line 26—26 of FIG. 24.

The gear 138 has a small gear portion 138B whose diameter is smaller than that of the worm gear portion 138A. The small gear portion 138B is formed integrally with an upper portion of the worm gear portion 138A. A cam gear 140, at which a lower gear portion 141A is formed to mesh with the small gear portion 138B, is rotatably disposed at the frame 122. As shown in FIGS. 24 to 26, the cam gear 140 is formed into a substantially cylindrical shape, and the lower gear portion 14 1A, an upper gear portion 141B, a cam portion 142, a cam groove 143, and a pair of pins 144A and 144B, all of which are formed the cam gear 140.

The lower gear portion 14 1A is formed at the lower portion of the cam gear 140. The upper gear portion 141B is formed at the upper portion of the cam gear 140. The cam portion 142 is formed at the lower gear portion 141A side.

The cam groove 143 is formed between the lower gear portion 141A and the upper gear portion 141B. Pins 144A and 144B are formed at the upper gear portion 141B side. Further, specific structures of the cam portion 142 and the cam groove 143 will be described later.

A gear 148 is rotatably disposed at a supporting base 146 mounted on the support 123. A small gear portion 148A is formed at the gear 148 and meshes with the upper gear portion 141B. The gear 148 has a large gear portion 148B whose diameter is larger than that of the small gear portion 148A. The large gear portion 148B is formed integrally with an upper portion of the small gear portion 148A. As shown in FIG. 22, a drive gear 150 meshes with the large gear portion 148, and is rotatably disposed at the supporting base 146.

As shown in FIGS. 20 and 21, an inner tooth 127A is formed at the tray 126, and the drive gear 150 meshes therewith. Namely, when the motor 134 is driven, the tray 126 passes through a driving path comprising the worm gear 136, the gear 138, the cam gear 140, the gear 148, and the drive gear 150, and rotates around a supporting shaft 123A as a center. The supporting shaft 123A perpendicularly extends from the support 123.

A gear ratio of the inner gear 127A to the upper gear portion 141B of the cam gear 140 is 3 (the inner tooth portion 127A):1 (an upper gear portion 141 B). That is to way, a gear ratio of the inner tooth portion 127A between non-tooth portion 127B to the upper gear portion is 1:1. Therefore, the tray 126 rotates one time while the cam gear 140 rotates 3 times.

As shown in FIG. 23, a gear portion 127 is formed at the tray 126 so as to correspond to the drive gear 150, and comprises the inner tooth portion 127A and the non-tooth portion 127B. The inner tooth portion 127A are disposed to form an angle 100° therebetween, and the non-tooth portion 127B are disposed to form an angle 20° therebetween. The inner tooth portion 127A and the non-tooth portion 127B are disposed alternately. The inner tooth portion 127A and the non-tooth portion 127B are used in order to rotate the tray 126 to a predetermined position and stop the rotation of the tray 126 at a predetermined position.

Figure 28:
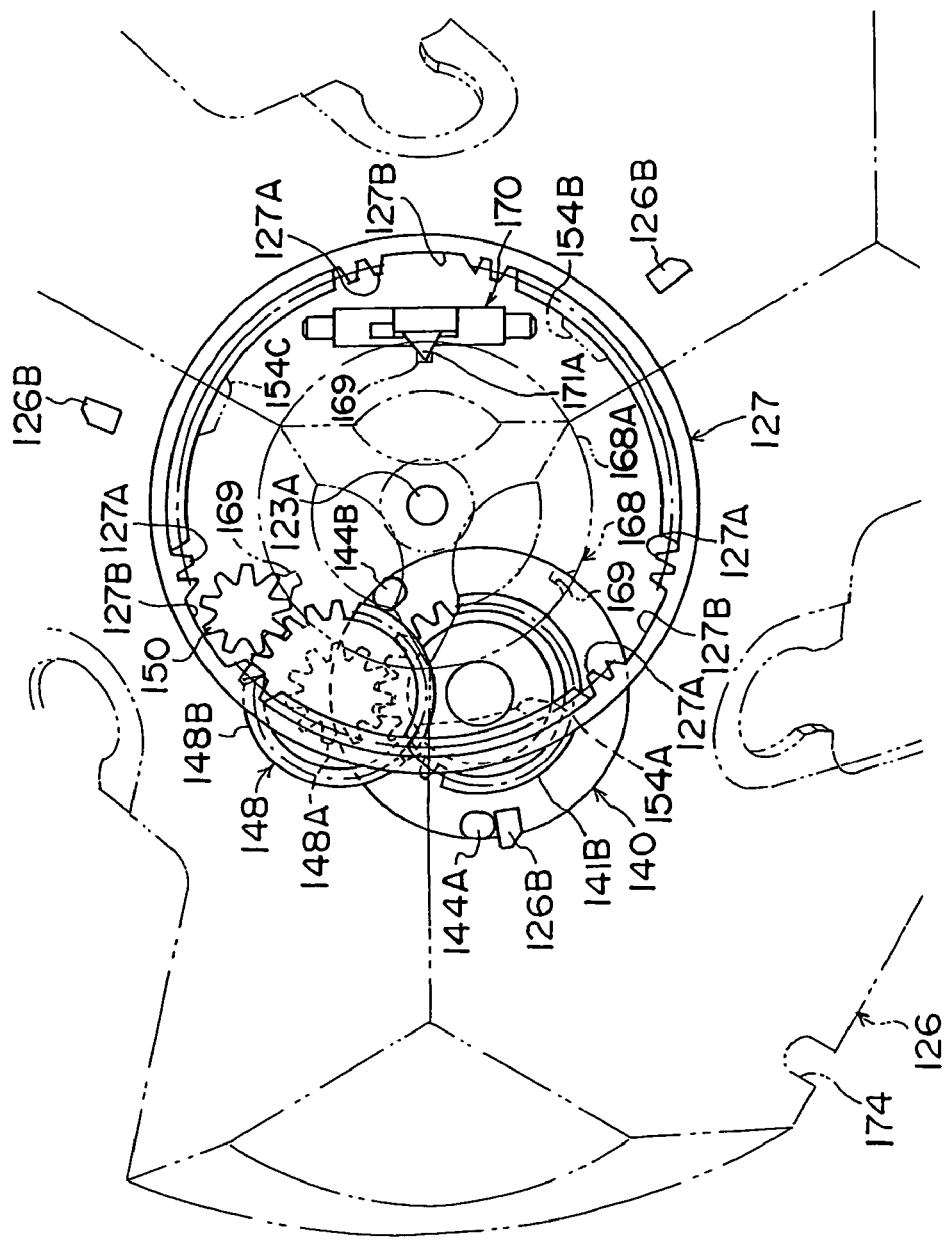
FIG. 28 is an explanatory view of the disk changer in which a driving path on which the tray shown in FIG. 20 is rotated and driven.
Figure 30:
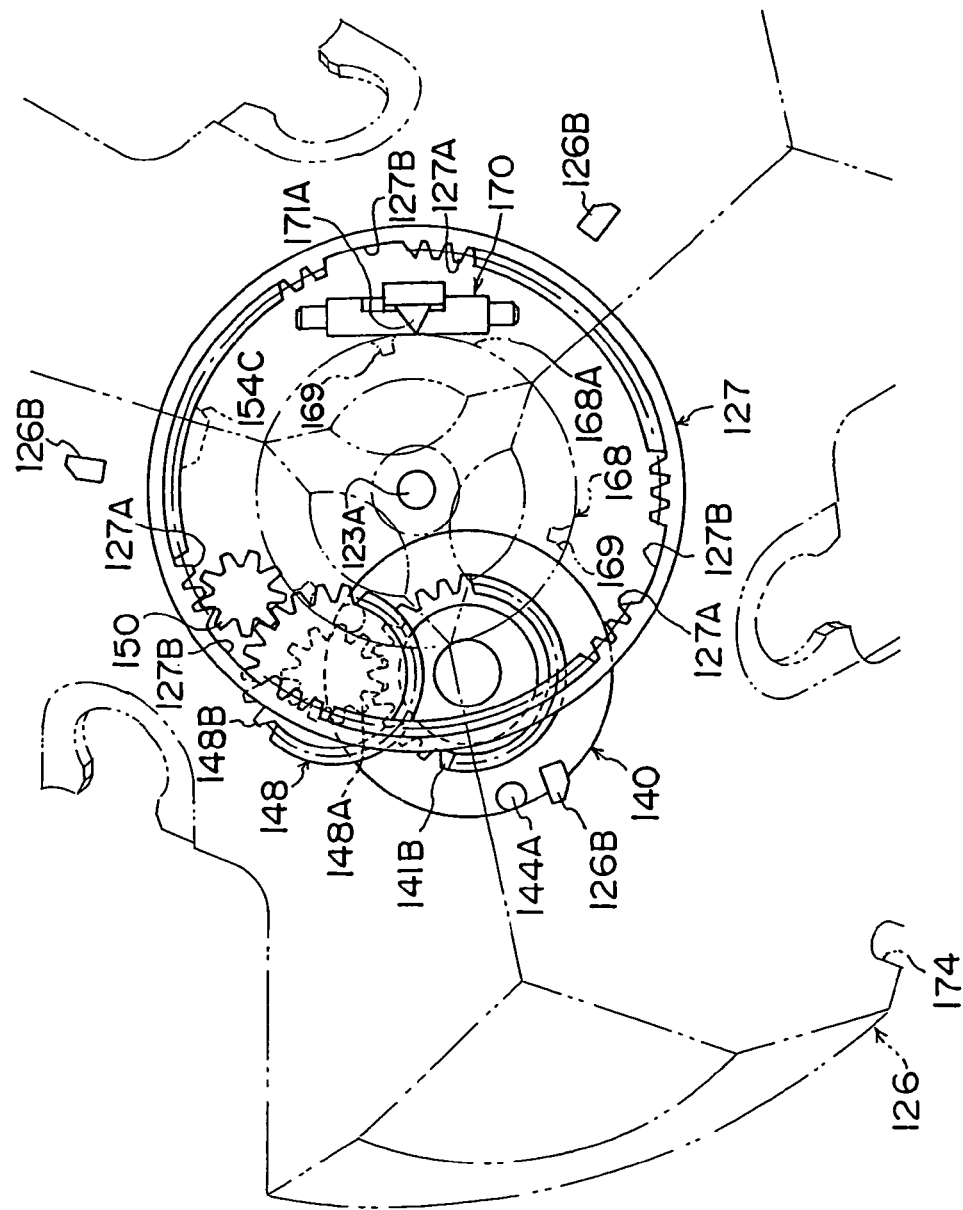
FIG. 30 is an explanatory view of the disk changer in the state in which the tray shown in FIG. 29 is slightly rotated.
Figure 31:
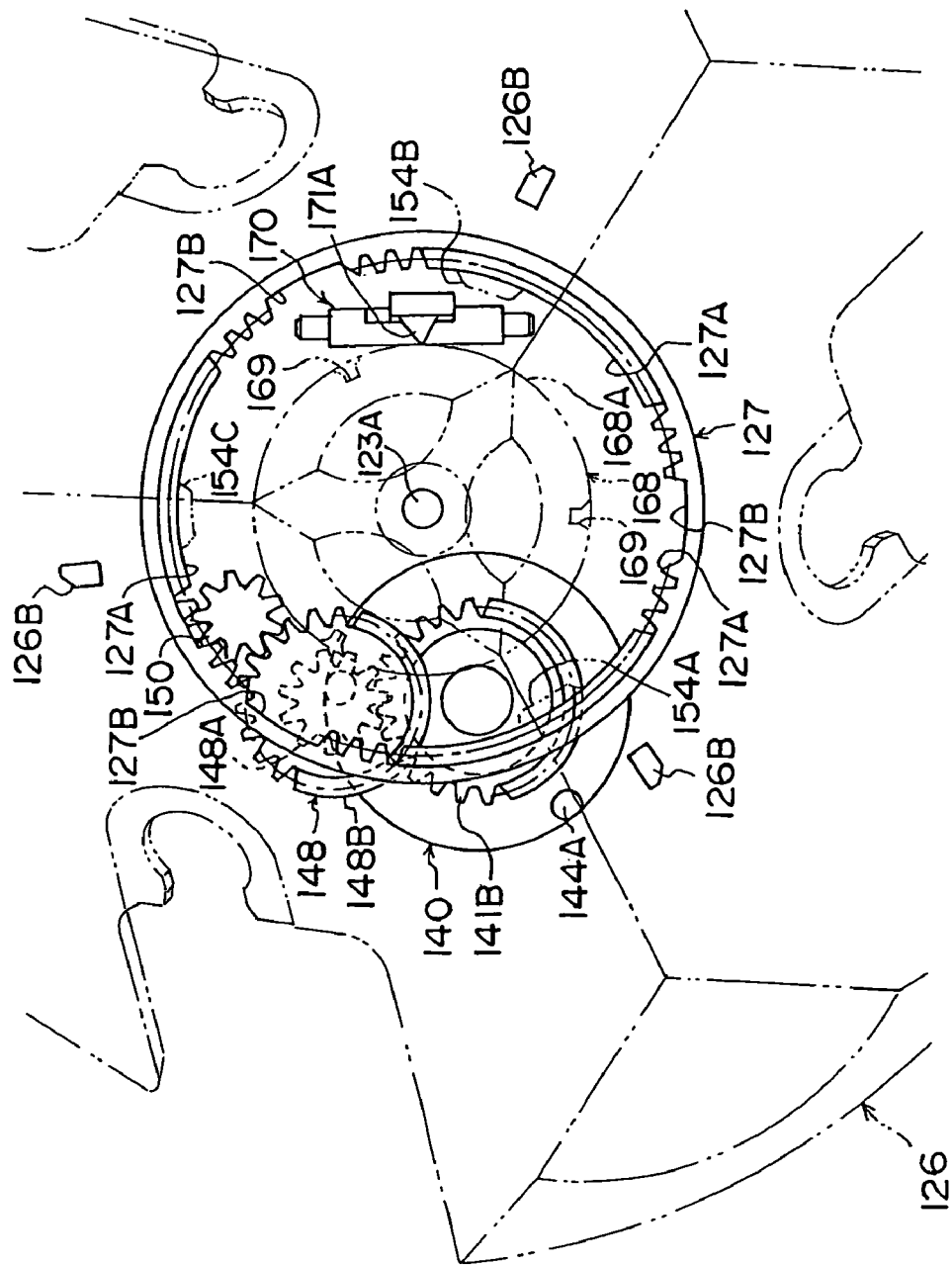
FIG. 31 is an explanatory view of the disk changer in the state in which the tray shown in FIG. 30 is slightly rotated.
Figure 32:
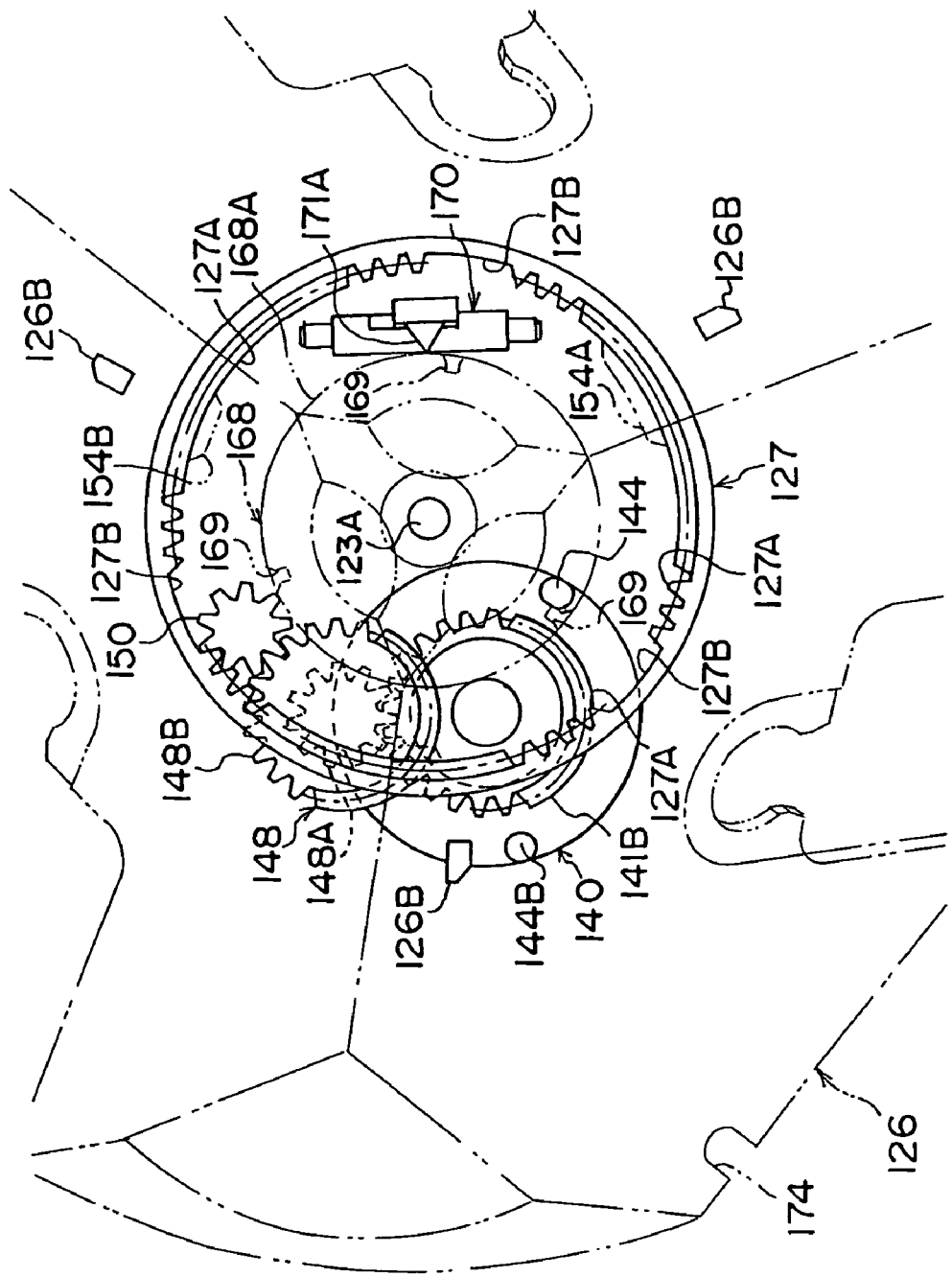
FIG. 32 is an explanatory view of the disk changer in the state in which the tray shown in FIG. 31 is slightly rotated.
Figure 34:
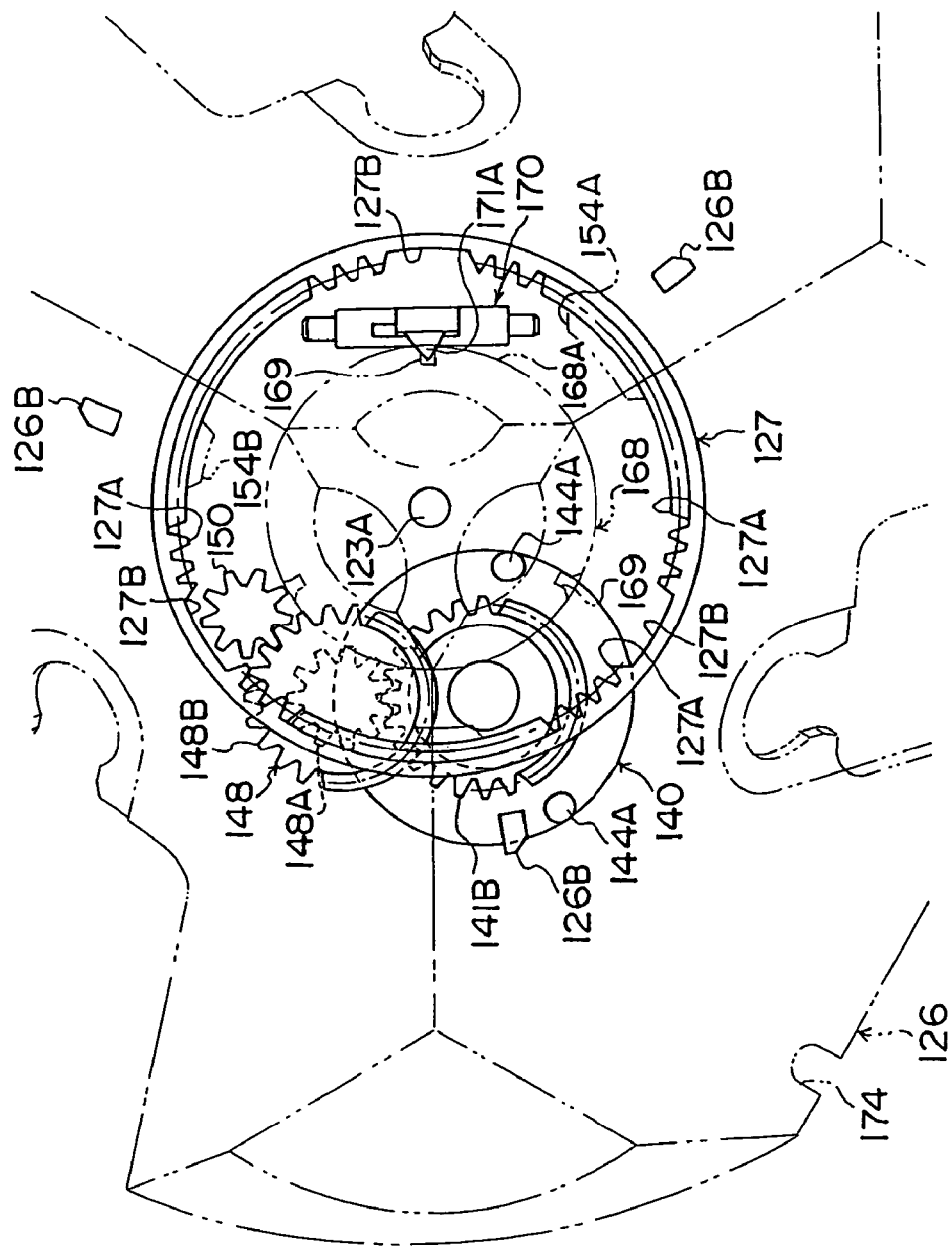
FIG. 34 is an explanatory view of the disk changer in the state in which the tray shown in FIG. 33 is slightly rotated.
Figure 35:
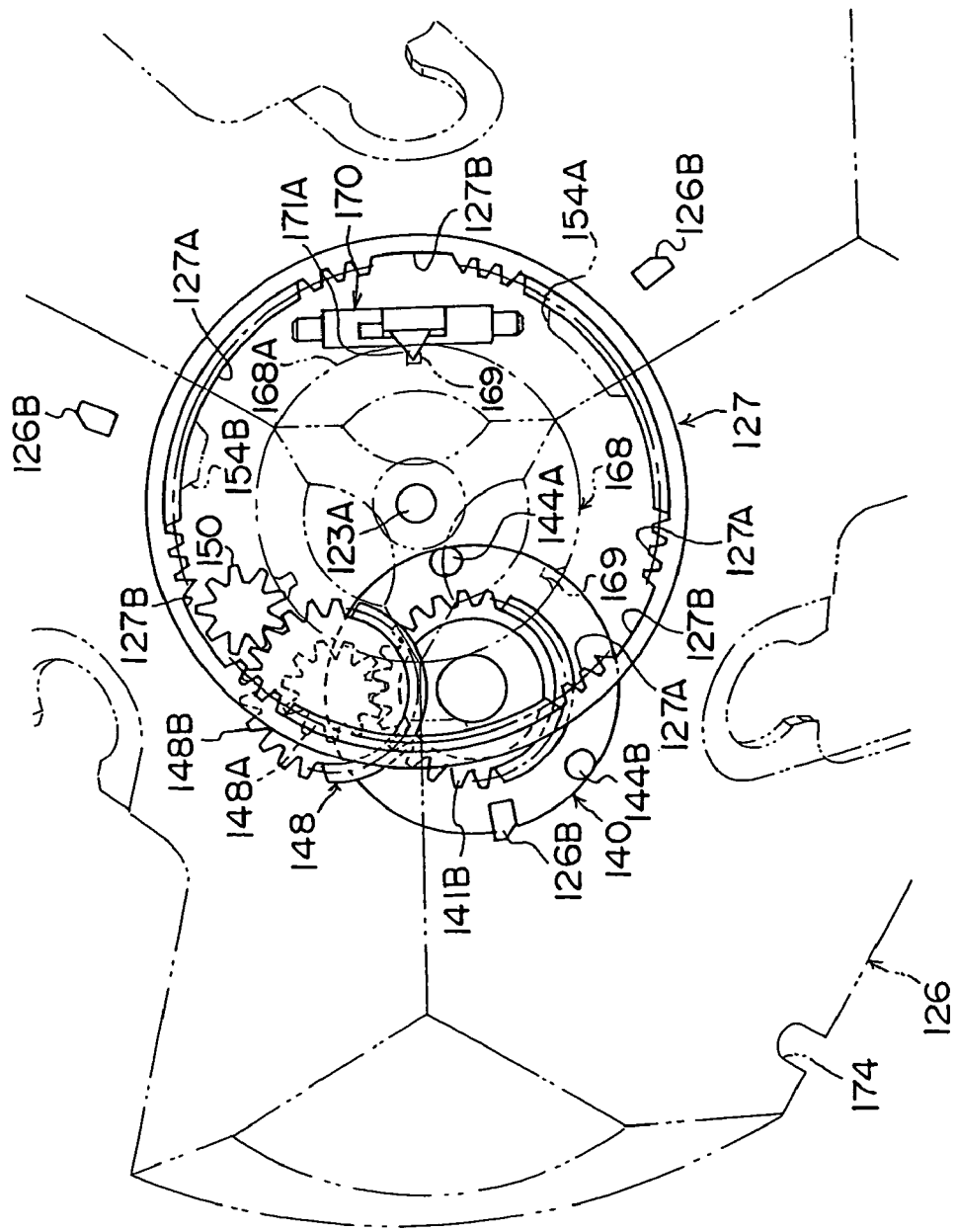
FIG. 35 is an explanatory view of the disk changer in the state in which the tray shown in FIG. 34 is slightly rotated.

As shown in FIGS. 30, 31, and 32, when the drive gear 150 is corresponded to the inner tooth portion 127A to mesh therewith, the tray 126 rotates. On the other hand, as shown in FIGS. 28, 34 and 35, when the drive gear 150 is corresponded to the non-tooth portion 127B (namely, when the drive gear 150 is separated from the inner tooth portion 127A), the tray 126 does not rotate.

As shown in FIG. 23, leg portions 126B are provided so as to protrude downwardly outside the gear portion 127 of the tray 126 and face the pins 144A and 144B of the cam gear 140. The leg portions 126B are respectively disposed to form an angle of 120° therebetween, and are used as a means to forcibly move the drive gear 150 toward the inner tooth portion 127A or the non-tooth portion 127B. In the present embodiment, during the rotation of the cam gear 140, when the leg portions 126B and the pins 144A and 144B are abutted with each other, the drive gear 150 is slightly rotated from the inner tooth portion 127A or the non-tooth portion 127B.

Detents 154A, 154B, and 154C are respectively formed inside the gear portion 127 of the tray 126 so as to form an angle of 120° therebetween in order to detect a rotational position of the tray 126. As shown in FIG. 22, a pair of switches 156 and 157 is disposed at the supporting base 146 so as to correspond to the detents 154A, 154B, and 154C.

Operators 156A and 157A are slidably disposed at the switches 156 and 157. When the operator 156A or 157A is pressed, the switch 156 or 157 outputs on-signal to an unillustrated microcomputer as control means.

On the other hand, the detent 154A is circumferentially formed such that both the operator 156A of the switch 156 and the operator 157A of the switch 157 face the detent 154A. The detent 154B is circumferentially formed such that the operator 156A of the switch 156 solely faces the detent 154B. The detent 154C is also circumferentially formed such that the operator 157A of the switch 157 solely faces the detent 154C.

The unillustrated microcomputer judges a rotational position of the tray 126 on the basis of a detected signal (i.e., an on-signal) of the switches 156 or 157. A stop position sensor such as an unillustrated switch is disposed at the supporting base 146. The stop position sensor detects that the tray 126 in a stop mode is positioned at a predetermined stop position (i.e., a position at which the turntable 180 disposed at the supporting portion 128 faces a spindle 183 of a spindle motor 182 disposed at the disk drive unit 124). Further, the turntable 180 and the spindle 183 constitute the connecting means.

An unillustrated detecting portion is formed at the cam gear 140 at a portion corresponding to the aforementioned stop position sensor. A position of the detecting portion is predetermined such that the stop position sensor is turned on when the tray 126 is positioned at the predetermined stop position.

In the present invention, a structure for detecting a rotational position and a stop position of the tray 126 can arbitrarily be changed. For example, the present invention can be changed in such a manner that a gear ratio of the cam gear 140 to the inner tooth portion 127A of the tray 126 is 1:1, and a positional detection is done only for the cam gear 140. In this case, the present invention can be structured such that the rotational position and the stop position of the tray 126 (i.e., the supporting portion 128) can be detected only by the switches 156 and 157.

Figure 39:
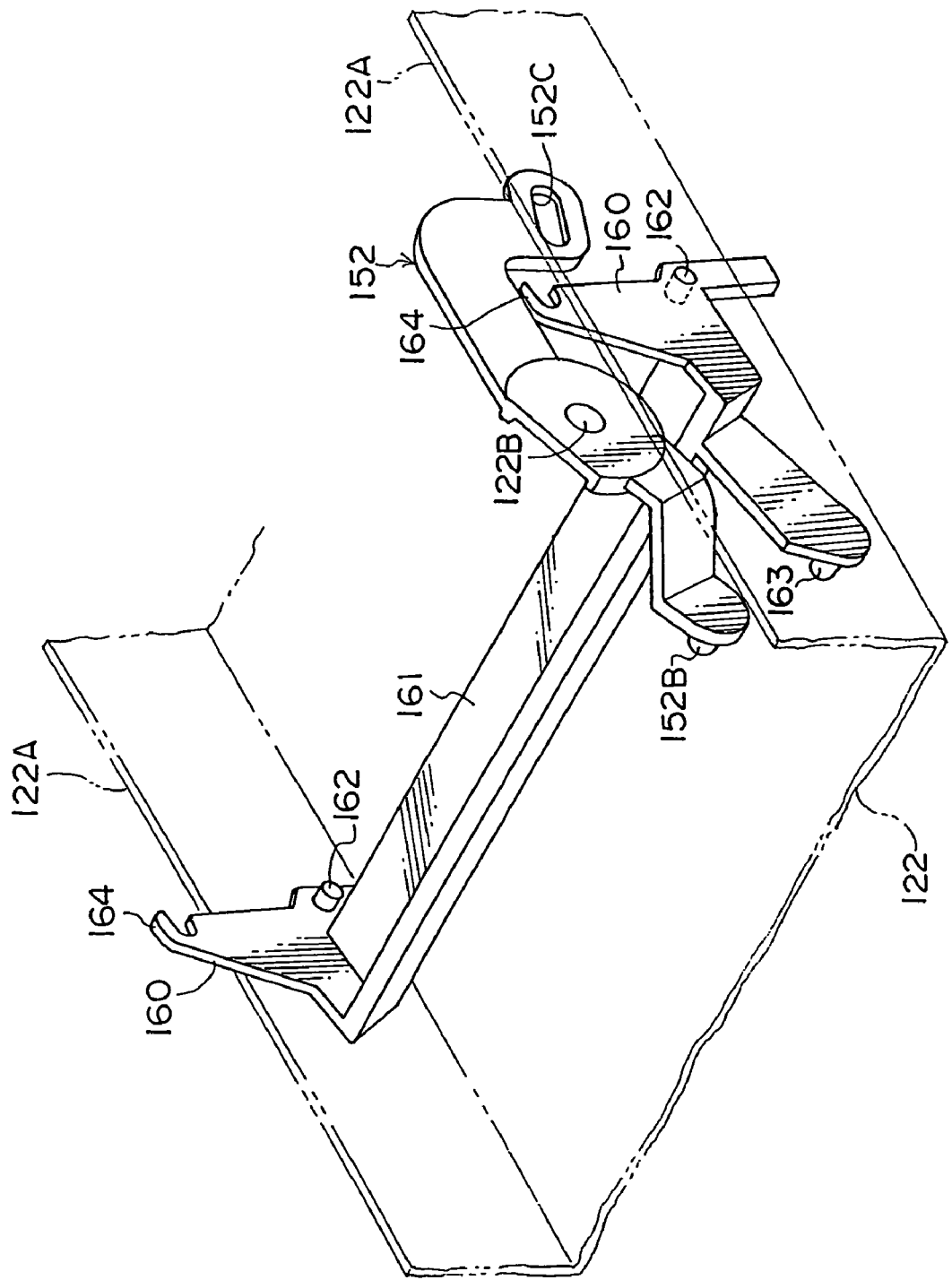
FIG. 39 is a perspective view of an operation lever and a positioning lever of the disk changer in which shown in FIG. 20.

The driving path of the disk drive unit 124 will be explained next. The disk drive unit 124 moves vertically along the cam groove 143 of the cam gear 140. Namely, an operation lever 152 as is shown in FIG. 20 and FIG. 39 is disposed rotatably at a sidewall 122A (see the imaginary line of FIG. 39) of the frame 122 between the disk drive unit 124 and the cam gear 140.

A pin-receiving portion 152A is formed at a substantially central portion of the operation lever 152. A pin 122B (see FIG. 20) is provided so as to protrude from the sidewall 122A and is inserted into the pin-receiving portion 152A. Namely, the operation lever 152 rotates around the pin 122B as a center. An engaging pin 152B is provided so as to protrude from the operation lever 152 at a proximal end side (at the cam gear 140 side), and is inserted into the cam groove 143 of the cam gear 140.

Figure 37:
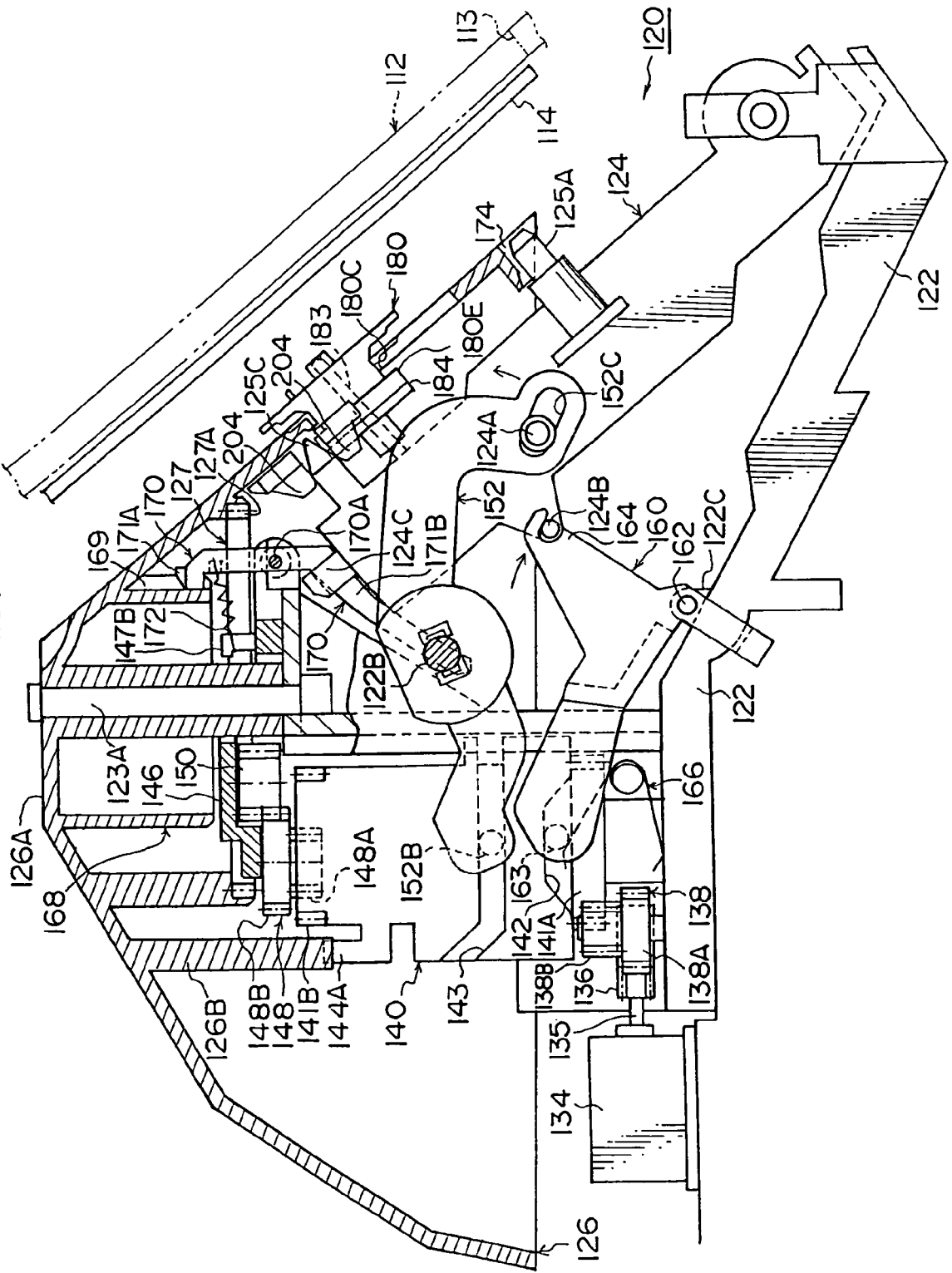
FIG. 37 is a side view of the disk changer in the state in which a disk drive unit shown in FIG. 20 is moved upwardly.

Therefore, when the cam gear 140 rotates the motor 134 and the gear 138 for constituting the second driving means and the driving path, since the engaging pin 152B moves vertically along a cam configuration of the cam groove 143, the operation lever 152 thereby rotates around the pin 122B as a center. Further, as shown in FIG. 20 and FIG. 37, the pin 122B is disposed so as to correspond to a substantially vertical intermediate position of the cam groove 143 in a vertical direction of the disk changer 120.

On the other hand, an elongated hole 152C is formed at the operation lever 152 at a tip end side (at the disk drive unit 124 side). The elongated hole 152C inclines downwardly with respect to a longitudinal axis of the operation lever 152. An engaging pin 124A is protruded from the disk drive unit 124. The engaging pin 124A is inserted into the elongated hole 152C of the operation lever 152, and is connected to the disk drive unit 124. Accordingly, when the operation lever 152 rotates, the disk drive unit 124 rotates (moves inclined) around the supporting shaft 130 as a center.

The disk drive unit 124 is positioned by a positioning lever (positioning means) 160. The positioning lever 160 operates in accordance with the cam portion 142 of the cam gear 140. Namely, the positioning lever 160 as is shown in FIGS. 20 and 39 is rotatably disposed at the side wall 122A of the frame 122 (see the imaginary line of FIG. 39).

As shown in FIG. 39, a pair of the positioning levers 160 is formed at widthwise-directional sides of the frame 122 through a joint lever 161. Namely, the positioning levers 160 are structured to support both sides of the disk drive unit 124, thus making it possible to reliably support the disk drive unit 124.

The pin 162 is disposed at the front of the positioning lever 160 so as to protrude inwardly. The pin 162 is inserted into the pin-receiving portion 122C formed at the frame 122. Namely, the positioning lever 160 rotates around the pin 162 as a center. An engaging pin 163 is provided so as to protrude from the positioning lever 160 at a proximal end side (at the cam gear 140 side). The engaging pin 163 is disposed so as to abut the cam portion 142 of the cam gear 140.

As shown in FIG. 20, a helical coil spring 166 is disposed at the frame 122, and urges the engaging pin 163 upwardly (toward the cam portion 142) all the time. Therefore, when the cam gear 140 rotates through the motor 134 and the gear 138 for constituting the second driving means and the driving path, the engaging pin 163 moves vertically in accordance with the cam configuration of the cam portion 142. Accordingly, the positioning lever 160 rotates around the pin 162 as a center.

On the other hand, a pin-receiving portion 164 caves in the positioning lever 160 at the tip end side (at the side of the disk drive unit 124). A positioning pin 124B is provided so as to protrude from a side surface of the disk drive unit 124, and inserted into the pin-receiving portion 164 (see FIG. 37). Namely, when the positioning lever 160 at a position shown in FIG. 20 rotates around the pin 162 as a center, as shown in FIG. 37, the pin-receiving portion 164 is corresponded to the pin 124B of the disk drive unit 124 moving upwardly, and is inserted by the pin 124B.

In the present embodiment, the disk drive unit 124 is reliably positioned by the pin 124B being inserted into the pin-receiving portion 164 of the positioning lever 160. Namely, in the present embodiment, in a connection-complete state in which connection of the spindle 183 of the spindle motor 182 and the turntable 180 has been completed (the state as shown in FIG. 37), the disk drive unit 124 is positioned by the positioning lever 160 in the connection-complete state.

In accordance with the present embodiment, in the connection-complete state, since the positioning lever 160 positions the disk drive unit 124 in the connection complete state, when the disk 10 shown in FIG. 19 is attached or detached with respect to the turntable 180, if an unexpected load is applied to the tray 126, the tray 126 can reliably be supported. Namely, in accordance with the present embodiment, the tray 126 in the connection-complete state is reliably supported by the positioning lever 160, whereby workability of attaching/detaching the disk 10 with respect to the turntable 180 can be improved.

Next, with reference to FIG. 27, a description of the cam configuration of the cam groove 143 will be made. It is assumed that a start point of the cam gear 140 is 0°, and a finish point of the cam gear 140 for which rotation around the outer circumferential surface of the cam gear 140 has been finished is 360°. Namely, when a disk change operation begins, the cam gear 140 is rotated in a counterclockwise direction from the start point to the finish point.

In the cam configuration of the cam groove 143, when the cam groove 143 is positioned over the cam gear 140, the disk drive unit 124 moves downwardly via the operation lever 152. Meanwhile, when the cam groove 143 is positioned beneath the cam gear 140, the disk drive unit 124 moves upwardly via the operation lever 152.

Figure 27:
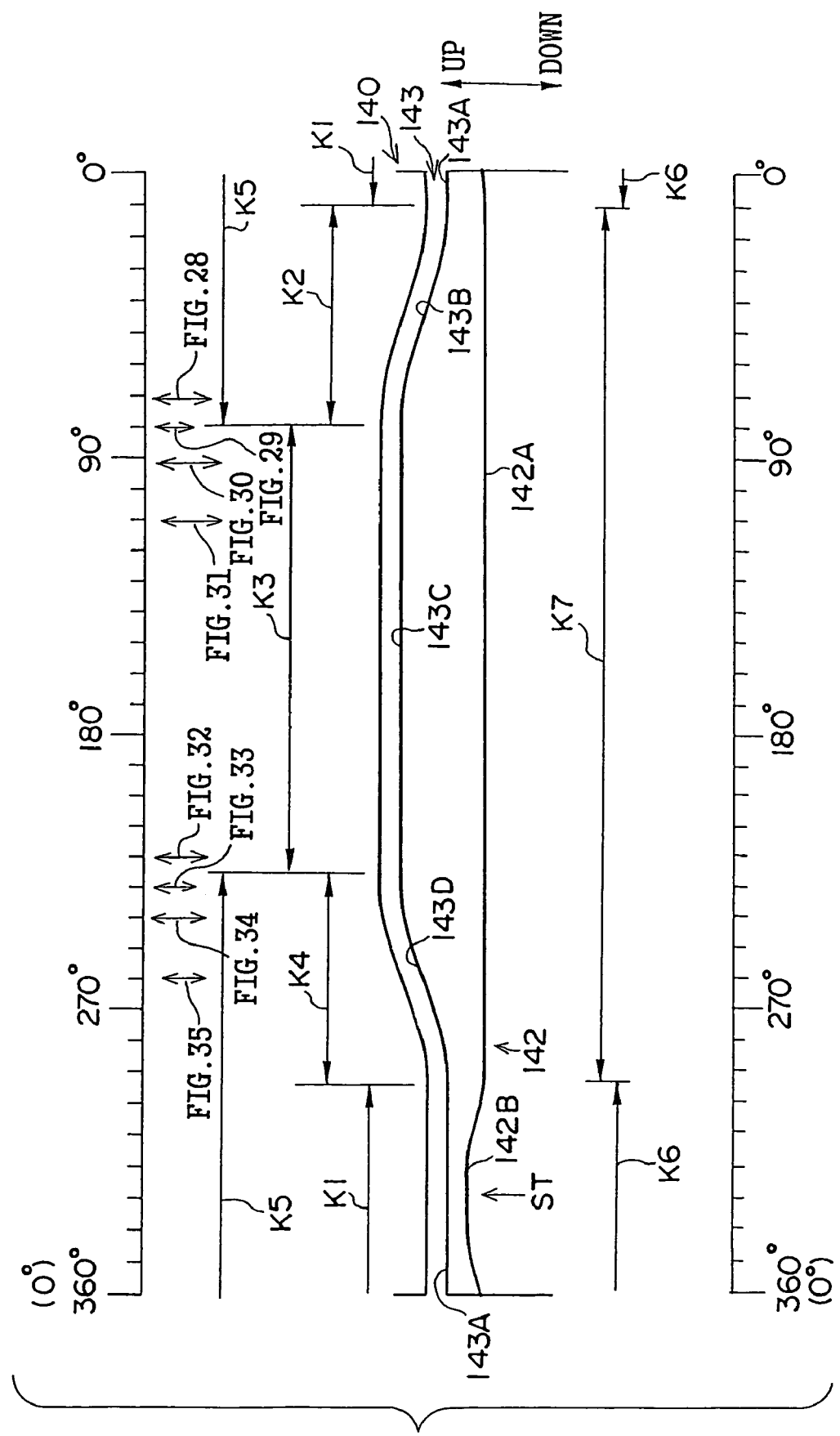
FIG. 27 is an expanded view of the disk changer in which a cam portion and a cam groove of the cam gear of the disk changer shown in FIG. 20.

As shown in FIG. 27, the cam groove 143 comprises a first cam portion 143A, a second cam portion 143B, a third cam portion 143C, and a fourth cam portion 143D. The first cam portion 143A has a cam region (within an angle range of 75°) K1 between 0° and 10° and between 295° and 360°, the second cam portion 143B is a cam region (within an angle range of 70°) K2 between 10° and 80°, the third cam portion 143C is a cam region (within an angle range of 145°) K3 between 80° and 225°, and the fourth cam portion 143D is a cam region (within an angle range of 70°) K4 between 225° and 295°.

In the cam region K3, the disk drive unit 124 is moved downwardly via the operation lever 152 (waiting mode), and enters a rotational mode for rotating the tray 126 (disk change mode). On the other hand, the cam region K5 comprising all of the cam regions K1, K2, and K4 stops a rotation of the tray 126 and enters a vertically moving mode for vertically moving the disk drive unit 124 (chucking mode).

In the first cam portion 143A, since the engaging pin 152B is moved downwardly (see FIG. 37), as shown in FIG. 37, the operation lever 152 rotates in a counterclockwise direction (in a direction of arrow of FIG. 37). On the other hand, in the third cam portion 143C, since the engaging pin 152B (see FIG. 20) is moved upwardly, as shown in FIG. 20, the operation lever 152 rotates in a clockwise direction (in a direction of arrow of FIG. 20).

The second cam portion 143B inclines upwardly from the first cam portion 143A to the third cam portion 143C. The fourth cam portion 143D inclines downwardly from the third cam portion 143C to the first cam portion 143A. Namely, the second cam portion 143B and the fourth cam portion 143D moves the engaging pin 152B to the first cam portion 143A and the third cam portion 143C, respectively.

The cam portion 142 comprises a first cam surface 142A including a cam region K6 (within an angle range of 75°) between 0° and 10° and between 295° and 360°, and a second cam surface 142B including a cam region K7 between 10° and 295° (within an angle range of 285°). Further, a linear portion of the first cam surface 142A is between 320° and 345°. Moreover, the aforementioned linear portion of the first cam surface 142A inclines upward at the front portion and inclines downward at the rear portion.

Since the engaging pin 163 moves upwardly on the cam surface 142B (see FIG. 37), as shown in FIG. 37, the positioning lever 160 moves in a clockwise direction (in the direction of arrow of FIG. 37). On the other hand, the engaging pin 163 moves downwardly on the first cam surface 142A (see FIG. 20), as shown in FIG. 20, the positioning lever 160 rotates in a counterclockwise direction (in a direction of arrow of FIG. 20).

In the stop or play mode of the disk changer 120, the operation lever 152 and the positioning lever 160 are positioned as shown in FIG. 37. Namely, the cam portion 142 and the cam groove 143 of the cam gear 140 shown in FIG. 27 are positioned so as to correspond to the engaging pins 152B and 163 at an angle of 330° (hereinafter referred to as "ST" in FIG. 27).

When the cam gear 140 corresponds to an "ST" position, the disk change 120 is in a stop mode in which the disk changer 120 is disposed at the initial position, and the spindle 183 of the disk drive unit 124 is connected to the turntable 180 of the supporting portion 128.

Accordingly, in the stop or play mode shown in FIG. 37, the engaging pin 152B of the operation lever 152 is positioned at the cam region K1 so that the disk drive unit 124 is lifted, and the spindle 183 of the spindle motor 182 is connected to the turntable 180. Further, in the stop or play mode, the engaging pin 163 of the positioning lever 160 is positioned in the cam region K6, and the pin-receiving portion 164 of the positioning lever 160 supports the positioning pin 124B of the disk drive unit 124.

The disk drive unit 124 is reliably supported by the positioning lever 160, and is held in the stop or play mode. Further, in the stop mode, each of the components for forming the disk changer 120 enters their initial state (a state in which the cam gear 140 corresponds to the "ST" position). Namely, if an unillustrated stop key is operated by a user in the play mode, when a stop position sensor (not shown) is turned on by an unillustrated detection portion of the cam gear 140, each of the components of the disk changer 120 stops in its initial state by the unillustrated microcomputer.

A description of the state of the disk changer 120 corresponding to the cam portion 142 (the cam surfaces 142A and 142B) and the cam groove 143 (cam portions 143A to 143D) of the cam gear 140 will be made hereinafter. Further, reference numerals (shown in FIGS. 28 to 35) are denoted so as to correspond to scales (angle 0° to 360°) in FIG. 27 and illustrate the states of the driving path (comprising the cam gear 140, the gear 148, the drive gear 150, and the gear portion 127 of the tray 126) corresponding to each of the cam portions 142 and the cam groove 143.

Operational State of the Operation Levers 152 and 160 Corresponding to the Cam Gear 140

When the engaging pin 163 moves from the ST position of the cam gear 140 to a position of the cam region K7, the positioning lever 160 rotates in a counterclockwise direction as shown in FIG. 20, and the pin-receiving portion 164 is separated from the positioning pin 124B. Namely, the positioning lever 160 releases a support (lock) of the disk drive unit 124 in accordance with the cam region K7.

When the engaging pin 152B moves along the cam region K2 of the cam gear 140, the engaging pin 152B moves upward, and the operation lever 152 thereby moves in a clockwise direction. Therefore, the disk drive unit 124 rotates in a counterclockwise direction around the supporting shaft 130 as a center, and accordingly, gradually moves downwardly.

The engaging pin 152B is positioned in the cam region K3 of the cam gear 140, as shown in FIG. 20, the spindle 183 is separated from the turntable 180 of the supporting portion 128. Namely, the disk drive unit 124 is transferred to a disk change mode, and the tray 126 becomes rotatable.

When the cam gear 140 further rotates, and moves along the cam region K4, the engaging pin 152B moves downwardly, and the operation lever 152 rotates in a counterclockwise direction. Therefore, the disk drive unit 124 rotates in a clockwise direction around the supporting shaft 130, and accordingly, gradually moves upwardly.

When the engaging pin 152B is positioned at the cam region K1 of the cam gear 140, as shown in FIG. 37, the spindle 183 is connected to the turntable 180 of the supporting portion 128. Namely, the disk drive unit 124 is transferred to a disk change mode, and the tray 126 becomes rotatable.

Operational State of the Driving Path Corresponding to the Cam Gear 140

Figure 29:
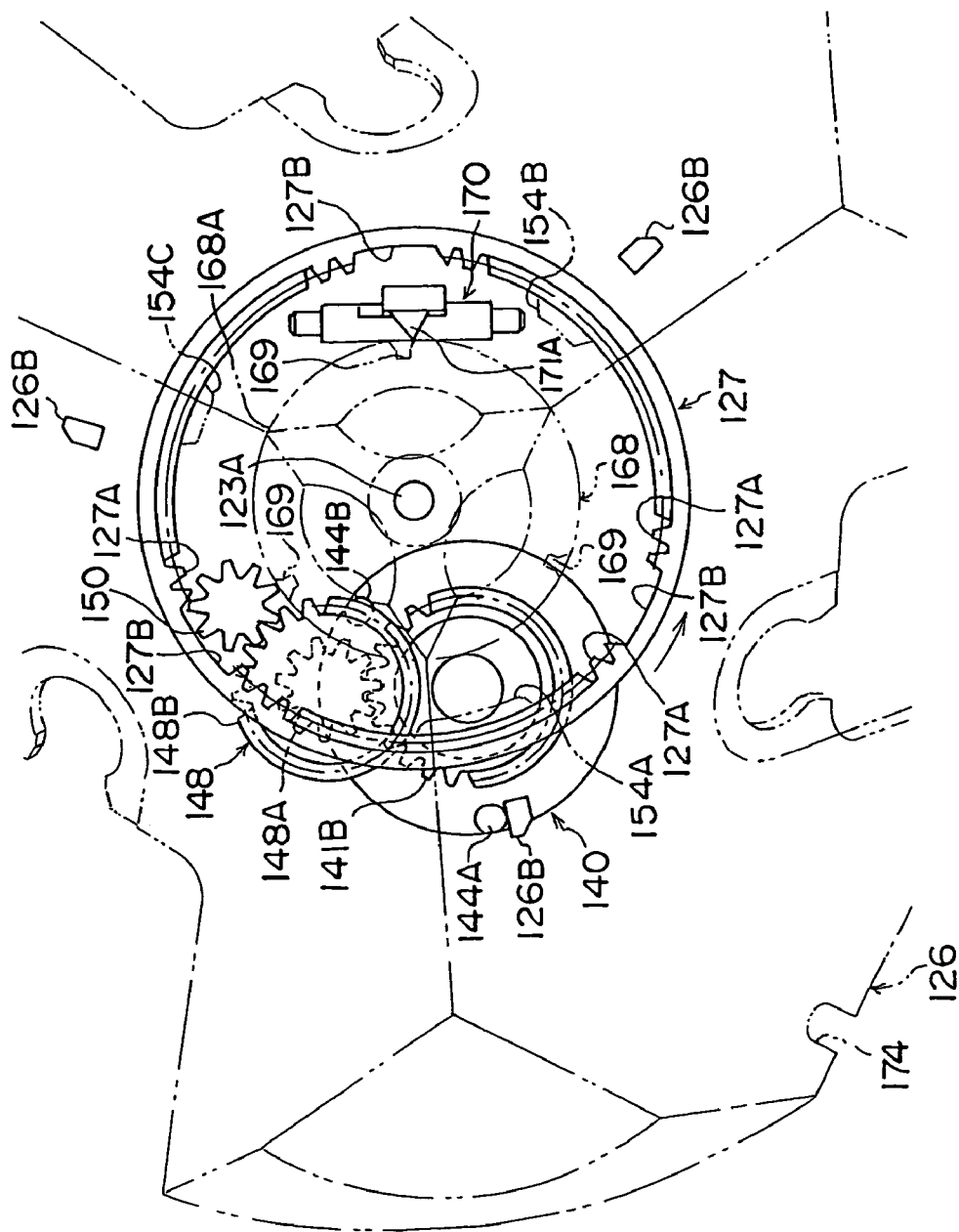
FIG. 29 is an explanatory view of the disk changer in the state in which the tray shown in FIG. 28 is slightly rotated.

Next, with reference to FIGS. 28 to 35, a description will be made of states of the drive path (comprising the cam gear 140, the gear 148, the drive gear 150, and the gear portion 127 of the tray 126) corresponding to the cam portions 142 and the cam groove 143. More specifically, FIG. 28 shows a state of the scale of the cam groove 143 at an angle of 70° in FIG. 27. FIG. 29 shows a state of the scale of the cam groove 143 at an angle of 80° in FIG. 27. FIG. 30 shows a state of the scale of the cam groove 143 at an angle of 90° in FIG. 27. And FIG. 31 shows a state of the scale of the cam groove 143 at an angle of 110° in FIG. 27.

Figure 33:
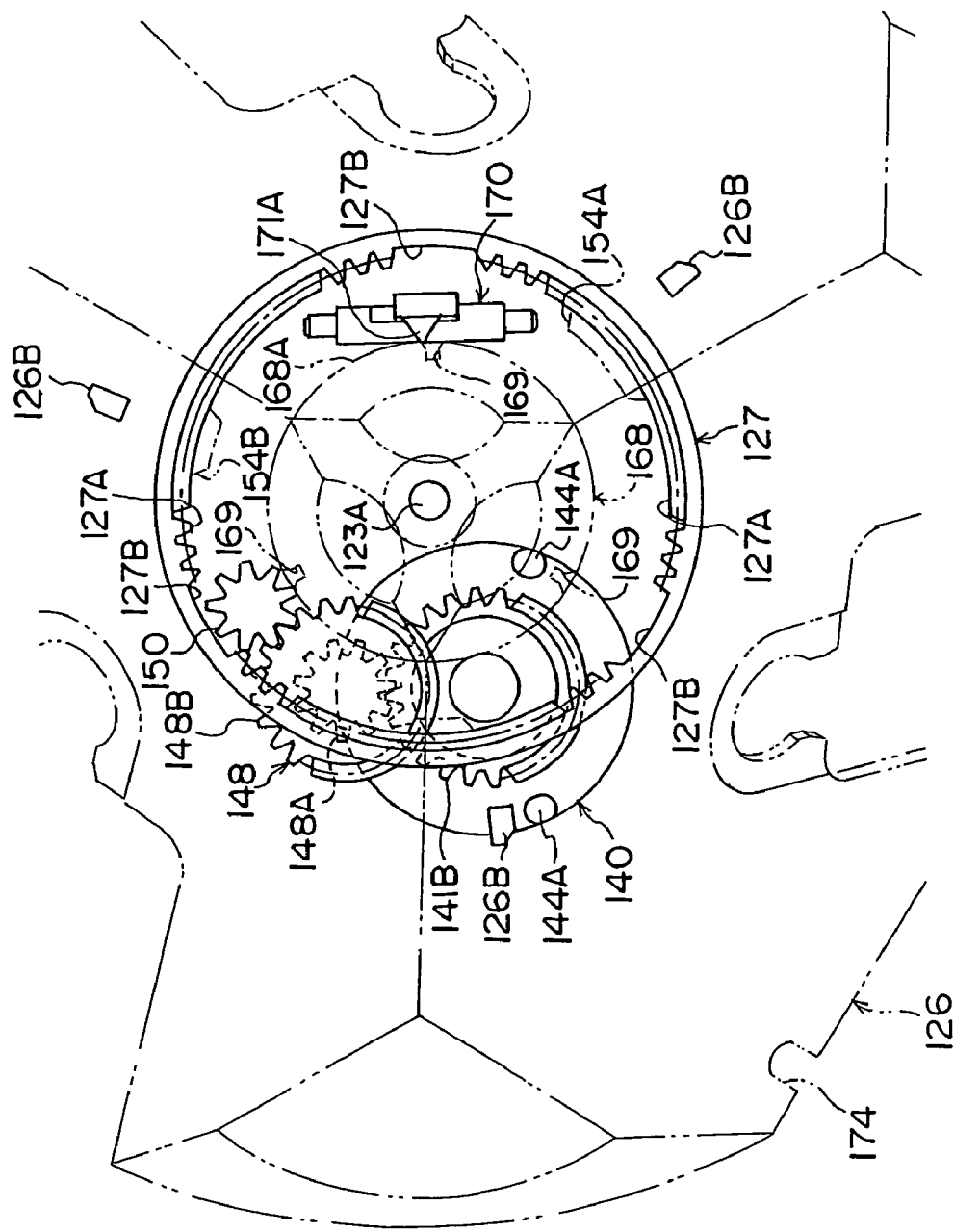
FIG. 33 is an explanatory view of the disk changer in the state in which the tray shown in FIG. 32 is slightly rotated.

Further, FIG. 32 shows a state of the scale of the cam groove 143 at an angle of 220° in FIG. 27. FIG. 33 shows the scale of the cam groove 143 at an angle of 230° in FIG. 27. FIG. 34 shows the scale of the cam groove 143 at an angle of 240° in FIG. 27. And FIG. 35 shows the scale of the cam groove 143 at an angle of 260° in FIG. 27.

In the state shown in FIG. 28, the drive gear 150 corresponds to the non-tooth portion 127B of the tray 126 in the state in which the rotation of the tray 126 stops, and the pin 144A of the cam gear 140 faces one of the leg portions 126B of the tray 126 and abuts therewith. Further, due to the rotation of the cam gear 140, as shown in FIG. 29, the pin 144A presses the leg portion 126B and urges the tray 126 in a counter clockwise direction. Therefore, in FIG. 29, the drive gear 150 meshes with the inner tooth portion 127A of the gray 126.

As shown in FIG. 30, the drive gear 150 meshes with the inner tooth portion 127A of the tray 126 to drive and rotate the tray 126 in a counterclockwise direction. Therefore, in FIG. 30, the leg portion 126B is separated from the pin 144A. Accordingly, as shown in FIG. 31, due to the drive gear 150 and the inner tooth portion 127A of the tray 126 meshing with each other, the tray 126 further rotates in a counterclockwise direction.

In the state of the scale of the cam groove 143 at an angle of 220° in FIG. 27 (i.e., the state just before the end of a movement along the cam region K3), as shown in FIG. 32, the leg portion 126B of the tray 126 moves from a counterclockwise direction, and faces the pin 144B of the cam gear 140. Further, in FIG. 32, the drive gear 150 moves from the inner tooth portion 127A of the tray 126 to the non-tooth portion 127B.

Due to a further rotation of the cam gear 140, as shown in FIG. 33, the leg portion 126B of the tray 126 comes close to the pin 144B of the cam gear 140, and the drive gear 150 corresponds to the non-tooth portion 127B of the tray 126. In FIG. 33, there is a difference between rotational speeds of the tray 26 and the cam gear 140. The rotational speed of the tray 140 is higher than that of the cam gear 140. Therefore, when the leg portion 126B abuts the pin 144B, a resistance is applied to the tray 126 (the rotation of the tray 126 is suppressed) to stop and position the tray 126.

In FIG. 34, as described above, since the rotation of the tray 126 is forcibly stopped, the drive gear 150 faces the non-tooth portion 127B of the tray 126, and does not mesh with the inner tooth portion 127A. As shown in FIG. 34, since the cam gear 140 rotates in a counterclockwise direction, the pin 144B is separated from the leg portion 126B. Further, as shown in FIG. 35, due to the rotation of the cam gear 140, the pin 144B is further separated from the leg portion 126B.

In the present embodiment, as described above, the motor 134 as a single second driving means rotates the tray 126, and moves (inclined) the disk drive unit 124 as a holder via a common driving path (comprising the motor shaft 135, the worm gear 136, the gear 138, and the cam gear 140). Namely, in accordance with the present embodiment, rotation of the tray 126 and inclined movement of the disk drive unit 124 are respectively carried out by the motor 134, the motor shaft 135, the worm gear 136, the gear 138, and the cam gear 140 in a common driving path, a number of parts can be reduced as compared to a conventional disk changer, and the disk changer can be structured simply and manufactured inexpensively.

Positioning Structure of the Tray 126 and the Disk Drive Unit 124

First, a structure of a stopper lever 170 will be explained. As shown in FIG. 20 and FIG. 3, the stopper lever 170 is formed into a substantially inverted V-shaped configuration, and is rotatably disposed at the supporting base 146. Namely, pins 170A are provided so as to extend from widthwise ends of the stopper lever 170 at the center thereof. On the other hand, bearing portions 147A are formed at the supporting base 146 so as to correspond to the pins 170A. The bearing portions 147 support the pins 170A, and the stopper lever 170 thereby rotates around the pins 170A as a center.

Figure 36:
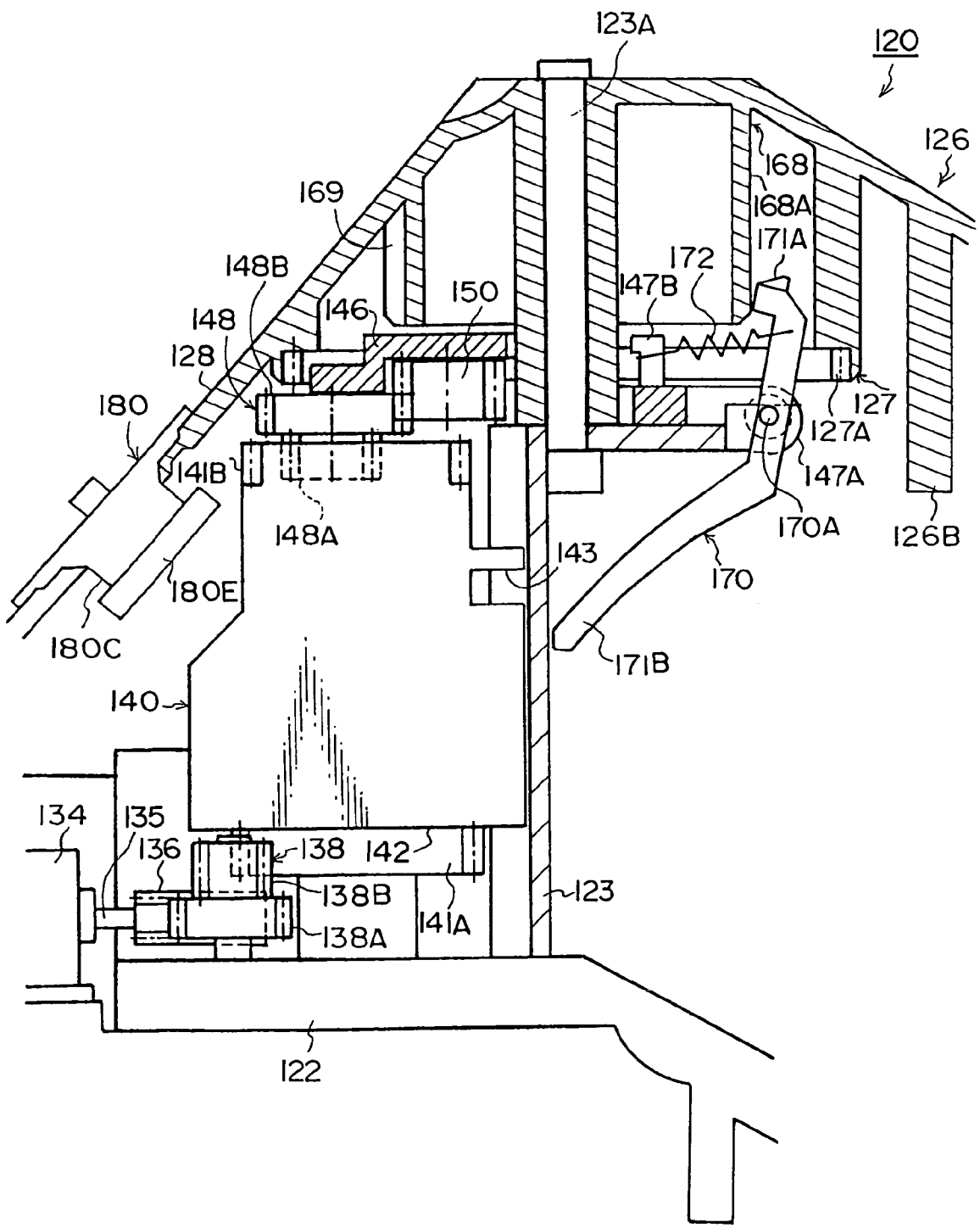
FIG. 36 is an explanatory view of the disk changer in the state in which the cam gear shown in FIG. 3 is rotated.

As shown in FIG. 22, a substantially V-shaped engaging portion 171A is formed at the proximal end (upper end) of the stopper lever 170. As shown in FIG. 36, the engaging portion 171A is disposed so as to abut an outer circumferential surface 168A of a ring body 168 of the tray 126. As shown in FIG. 23, the ring body 168 is positioned inside the gear portion 127, and concave portions 169 are formed at the ring body 168 so as to correspond to the non-tooth portion of the gear portion 127.

The concave portions 169 are respectively disposed within an angle range of 120°. As shown in FIG. 28 and FIG. 37, the engaging portion 171A is fitted into each of the concave portions 169. Further, as shown in FIG. 23, taper portions 169B are formed at circumferential end portions of the concave portions 169. The taper portions 169B facilitate the engaging portion 171A to move into the concave portions 169.

As shown in FIG. 22, a hook portion 170B is disposed between the pins 170A and the engaging portion 171 of the stopper lever 170. Then, one end of the coil spring 172 is hooked at the hook portion 170B of the stopper lever 170, and the other is hooked at a hook portion 147B on the supporting base 146.

Therefore, as shown in FIG. 20, due to the urging force of the coil spring 172, the stopper lever 170 is always urged in a counterclockwise direction. Namely, the coil spring 172 is used in order to always urge the engaging portion 171A of the stopper lever 170 to the outer circumferential surface 168A f the ring body 168 of the tray 126 and abut the engaging portion 171A of the stopper lever 170 therewith.

Figure 38:
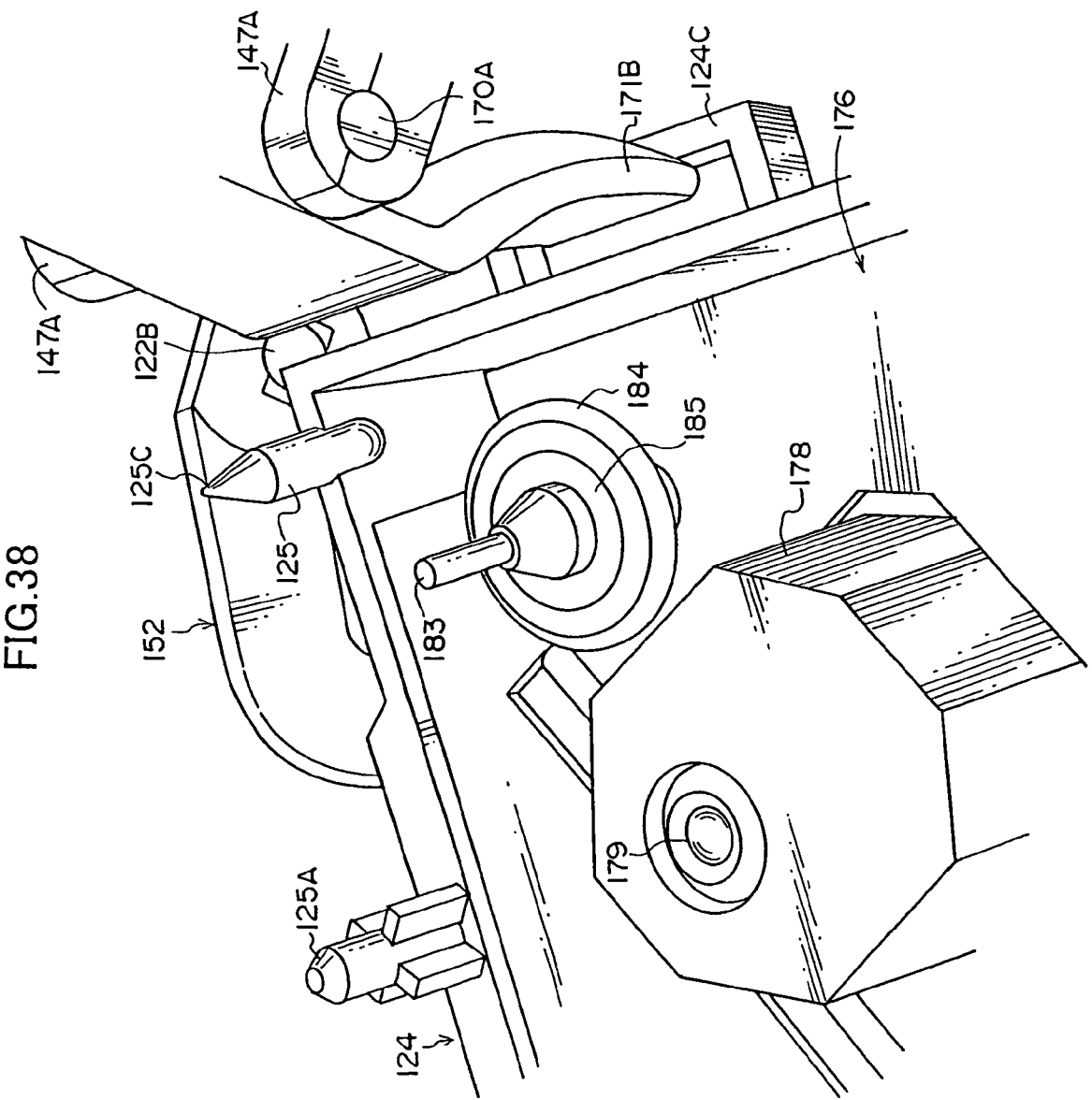
FIG. 38 is a perspective view of a disk drive unit of the disk changer shown in FIG. 20.

As shown in FIG. 38, a substantially C-shaped tongue portion B as seen from a side view is formed at the tip end side (lower end side) of the stopper lever 170. On the other hand, a substantially U-shaped anchor portion 124C as a planar configuration is formed at the rear surface of the disk drive unit 124 so as to correspond to the tongue portion 171B.

As shown in FIG. 37, both in the state in which the engaging portion 171A of the stopper lever 170 is fitted into the concave portion 169 of the tray 126, and the stopper lever 170 is rotated in a counterclockwise direction and the state in which the disk drive unit 124 moves upwardly, and the spindle 183 of the spindle motor 182 is connected to the turntable 180 (the state shown in FIG. 37), the tongue portion 171B is inserted into the anchor portion 124C so that the disk drive unit 124 is positioned by the stopper lever 170.

The tray 126 that moves in accordance with the cam gear 140, the disk drive unit 124, and the like are structured such that the tip end of the tongue portion 171B faces the anchor portion 124C just before the stopper lever 170 rotates in a counterclockwise direction and the disk drive unit 124 moves upwardly.

Next, a structure of an engaging pin 125A will be explained. As shown in FIG. 38, a substantially cylindrical engaging pin 125A is disposed at an upper surface of a side plate of the disk drive unit 124. As shown in FIG. 20, a stopper portion 174 is formed at the tray 126 so as to correspond to the engaging pin 125A. Further, as shown by an imaginary line in FIG. 28, the stopper portion 174 is formed to cave in an outer peripheral end portion of the tray 126.

When the support portion 128 of the tray 126 stops at a predetermined position corresponding to the opening portion 113 of the cabinet 112, due to a rotation of the disk drive unit 124 around the support shaft 130 as a center, the engaging pin 125A is fitted into the stopper portion 174, and the disk drive unit 124 positions the tray 126, and thereby prevents the tray 126 from rotating.

In the present embodiment, in the play mode or the stop mode in which the spindle 183 of the spindle motor 182 is connected to the turntable 180, since the stopper lever 170 and the engaging pin 125A are structured as described above, the disk drive unit 124 and the support portion 128 of the tray 126 can reliably be positioned.

Detection Structure of a Disk Attachment

Figure 48:
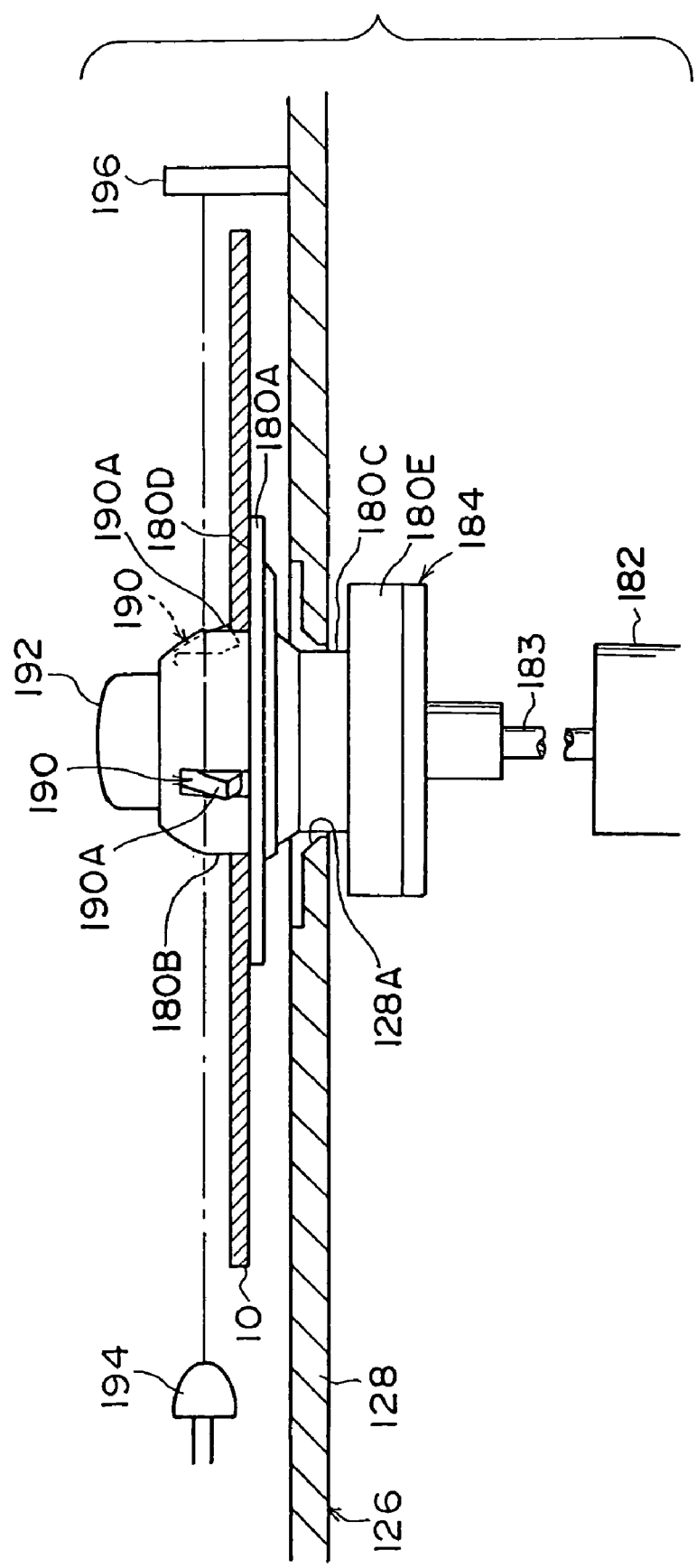
FIG. 48 is an explanatory view of a state in which a disk is normally mounted on a detecting structure shown in FIG. 47.

As shown in FIG. 19 and FIG. 48, the turntable 180 is rotatably disposed at each of the supporting portions 128 of the tray 126. The turntable 180 comprises a mounting portion 180A for mounting a disk such as a 12 cm-disk 10 or an 8 cm-disk (not shown) thereon, and a trunk portion 180B whose outer diameter is slightly smaller than an inner diameter of a hole of the disk 10.

The turntable 180 is provided with a chucking mechanism as a holding means for rotatably holding the disk 10 at the trunk portion 180B. As shown in FIG. 48, the chucking mechanism comprises a plurality of engaging pawls 190 (for example, three) as components of the chucking mechanism, and unillustrated springs for always urging the engaging pawls outside the trunk portion 180B. The engaging pawls 190 are rotatably disposed at the trunk portion 180B within an angle range of 120°. The engaging pawls 190 are respectively provided for the turntable 14 each of which is disposed at each supporting portion 128.

When each of the engaging pawls 190 is pressed by the inner diametrical portion of the disk 10, the disk 10 passes through the engaging pawl 190, and is mounted on the mounting portion 180A. On the other hand, when the disk 10 is mounted on the mounting portion 180A, as shown in FIG. 48, the engaging pawl 190 is pressed out by the urging force of the unillustrated spring. Namely, since the engaging pawl 190 abuts the disk 10 and presses the disk 10 toward the mounting portion 180A, the disk 10 is reliably held at the turntable 180.

An ejection button 192 is slidably disposed at an upper portion of the trunk portion 180B of the turntable 14. When the ejection button 192 is operated, the engaging pawl 190 is moved into the trunk portion 180B, and the disk 10 can be easily ejected from the turntable 14.

Figure 49:
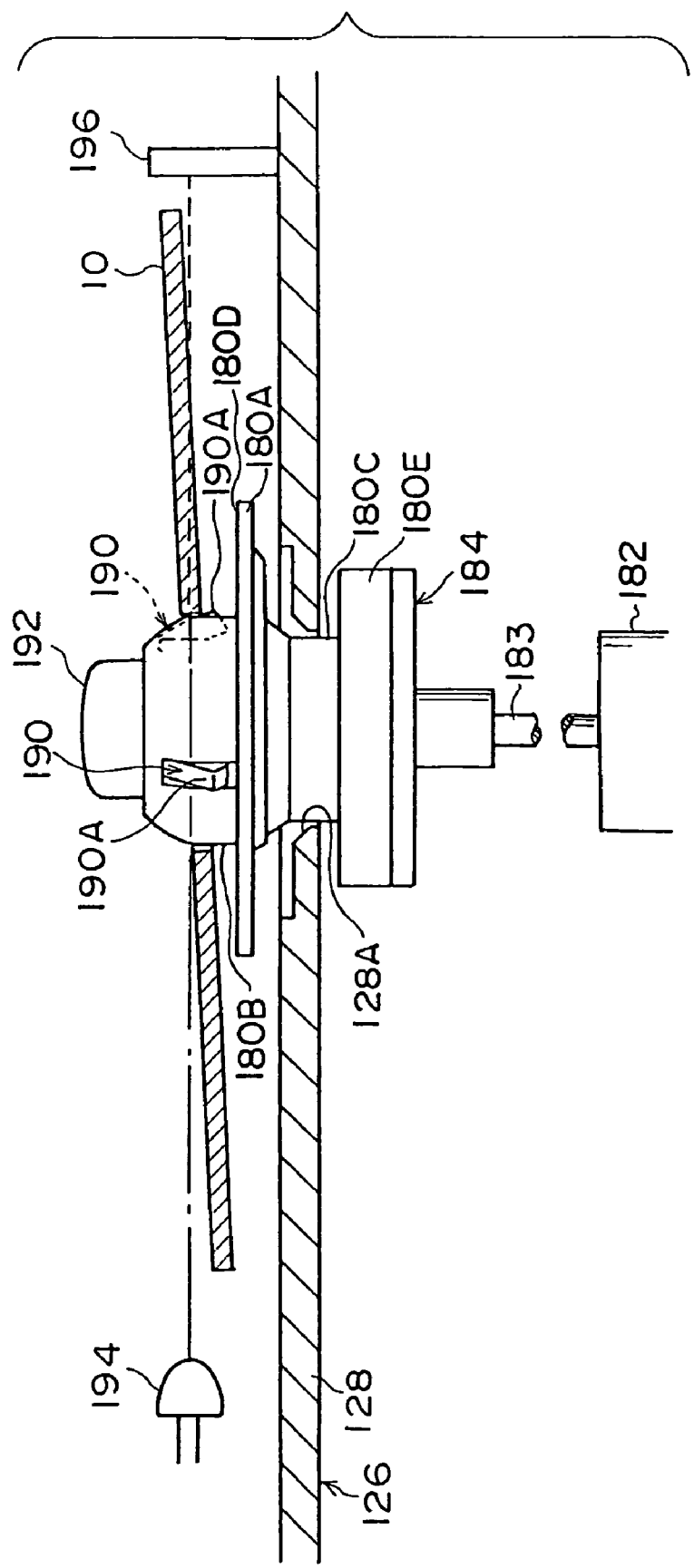
FIG. 49 is an explanatory view of a state in which the disk is not normally mounted on the detecting structure shown in FIG. 47.

Among the plurality of the engaging pawls 190 with respect to the trunk portion 180B, at least one engaging pawl 190 is different from the other engaging pawls 190 in a height from a mounting portion 180A to each of the engaging pawls 190 at a side portion 190A (a portion protruding outwardly from the trunk portion 10B). In other words, the present embodiment is structured such that at least one engaging pawl 190 has a different height at its side portion 190A from a mounting portion 180A. For this reason, as shown in FIG. 49, when the disk 10 is positioned at the side portion 190A of each engaging pawl 190, the disk 10 inclines with respect to a mounting surface 180D of the mounting portion 180A of the turntable 180.

Figure 47:
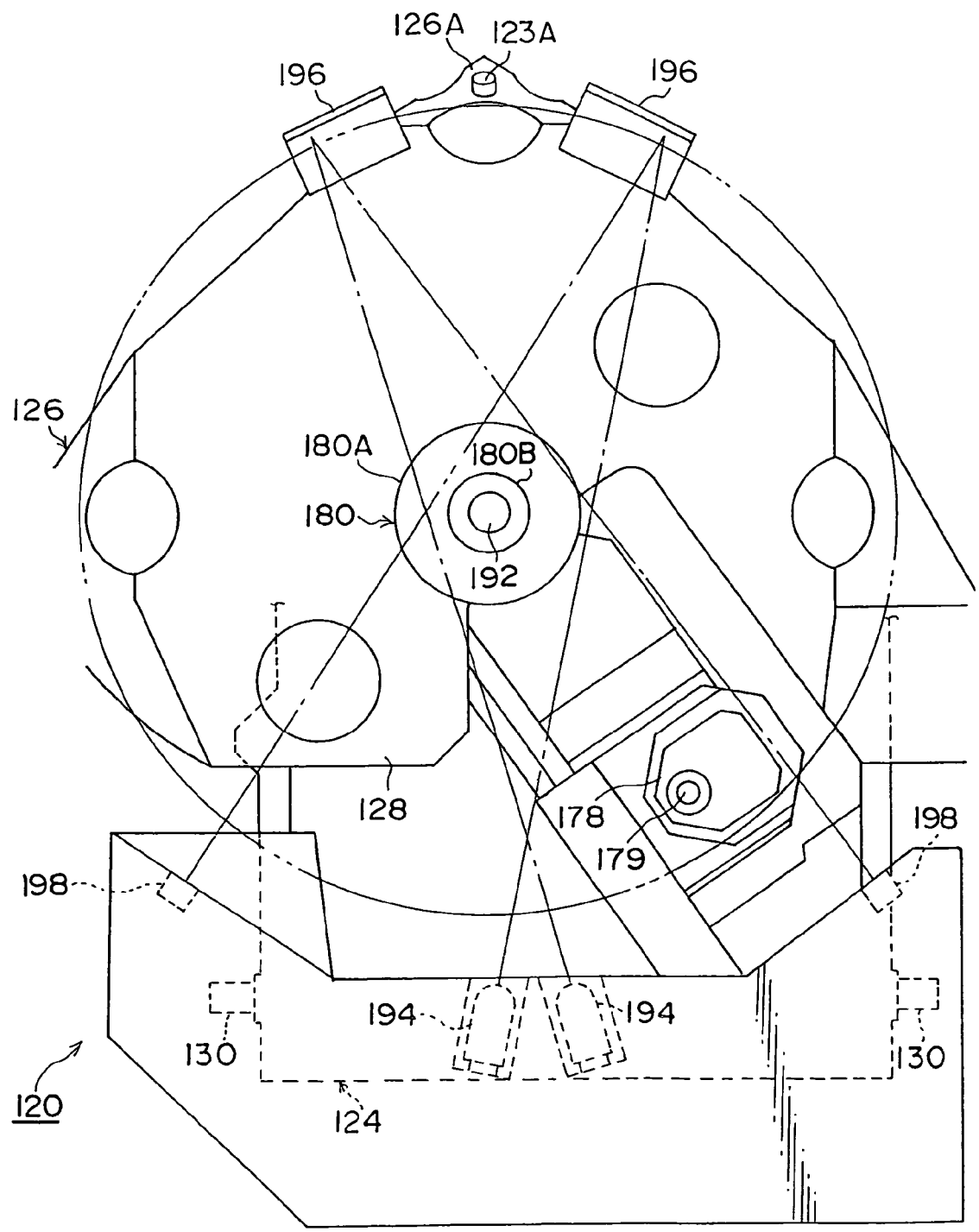
FIG. 47 is an explanatory view of a detecting structure of a disk attachment according to a second embodiment of the present invention.

As shown in FIG. 47, a pair of infrared LEDs 194 as light-emitting means, reflectors 196, and phototransistors 198 as light-receiving means, and forms detecting means are disposed at the dick changer 120 and form detecting means. The detecting means detects information and the detected information is transferred to an unillustrated microcomputer. Then, on the basis of the information detected by the detecting means, the microcomputer (not shown) determines whether or not the disk 10 is appropriately attached to the turntable 180.

The infrared LEDs 194 and the phototransistors 198 are connected to the microcomputer. Then, the disk changer 120 is structured such that the infrared LEDs 194 emit light in response to operational signals from the microcomputer. The phototransistors 198 receive light from the reflectors 196 and transmit the detected signals to the microcomputer.

The pair of infrared LEDs 194, the reflectors 196, and the phototransistors 198 are located as shown by one dotted line in FIG. 47 so as to prevent infrared rays from the infrared LEDs 194 or reflected light from the reflectors 196 from interfering with the turntable 180. Further, in order to incline the disk 10 in various directions, the infrared LED 194, the reflector 196, and the phototransistor 198 are provided in pairs, whereby a detection range of the detection means can be expanded.

As shown in FIG. 48, when the disk 10 is appropriately mounted on the turntable 180, that is to say, when the disk 10 is mounted in parallel to the mounting surface 180D, infrared rays from the infrared LEDs 194 and reflected light from the reflectors 196 are not blocked by the disk 10, and these light can be transmitted to the phototransistor 198. The microcomputer determines that the disk 10 is appropriately mounted on the turntable 180.

On the other hand, as shown in FIG. 49, if the disk 10 is not appropriately mounted on the turntable 180, i.e., if the disk 10 is positioned at the side portion 190A of each engaging pawl 190, infrared rays from the infrared LEDs 194 and reflected light from the reflectors 196 are blocked by the disk 10, and the reflected light is not transmitted to the phototransistors 198. Namely, the microcomputer determines that the disk 10 is not appropriately mounted on the turntable 180 because the disk 10 inclines with respect to the mounting surface 180D.

If the microcomputer determines that the disk 10 is not appropriately attached to the turntable 180, neither rotation of the turntable 180 in the play mode nor rotation of the tray 126 in the disk change mode are permitted. The inappropriate attachment of the disk 10 to the turntable 180 is displayed or warned by unillustrated displaying means (such as a display) or warning means (such as a speaker voice).

Structure of the Chucking Mechanism of the Turntable 180

As shown in FIG. 38, a pickup apparatus 176 is mounted on the disk drive unit 124 as information processing means. A pickup 178 having an objective lens 179 is slidably disposed at the pickup apparatus 176. The spindle motor 182 (see FIG. 48) for rotating and driving the turntable 180 disposed at the tray 126 is also disposed at the pickup apparatus 176.

A ring member 184 for constituting the connecting means is fixed to the spindle 183 of the spindle motor 182 shown in FIG. 48. The ring member 184 is connected to or separated from the turntable 180 of the tray 126 that is positioned at a predetermined position (see FIG. 20 and FIG. 37).

Figure 40:
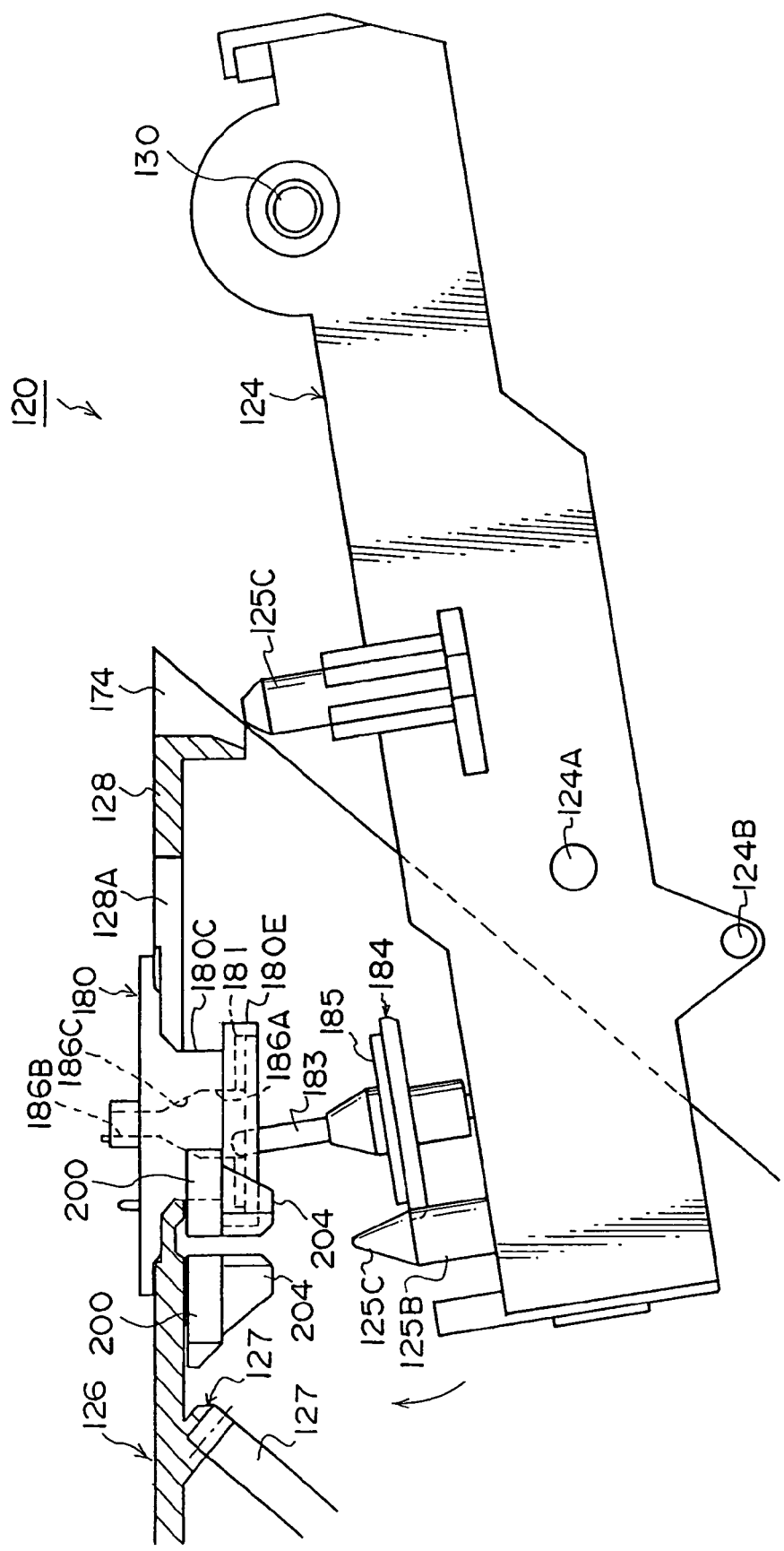
FIG. 40 is an explanatory view of the disk drive unit shown in FIG. 20 is rotated, and a tip end of a spindle is slightly inserted into a hole portion of a turntable.
Figure 42A:
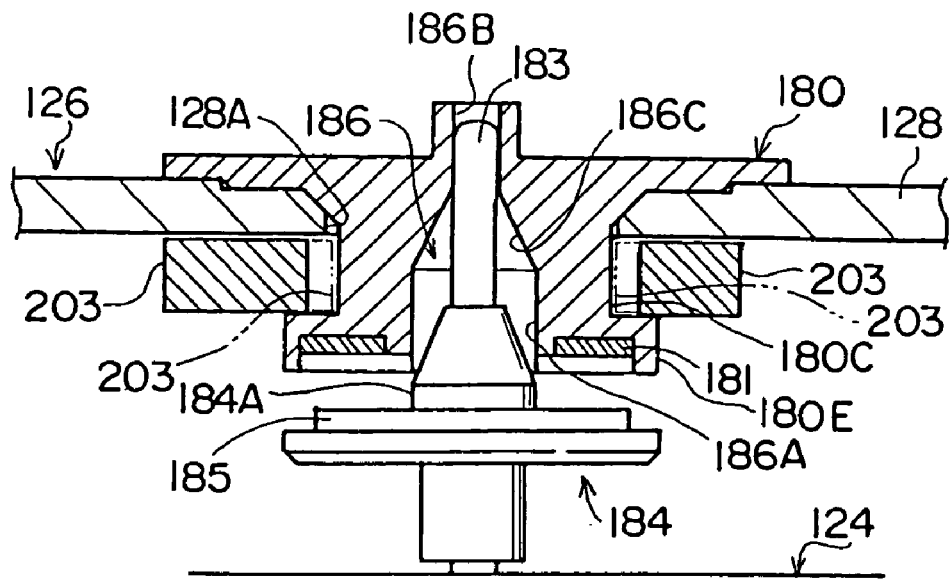
FIG. 42A is a cross sectional view of a state in which a spindle of the disk drive unit shown in FIG. 40 is further inserted into a hole portion of a turntable.

As shown in FIG. 40, a ring shaped magnet member 185 for constituting the connecting means is concentrically fixed to the ring member 184 so as to oppose the turntable 180. Further, as shown in FIG. 42A, an insertion portion 184A is formed at the ring member 184, and has a tapered tip end portion.

As shown in FIGS. 20 and 40, the turntable 180 made of a synthetic resin is disposed at each of the supporting portions 128 so as to correspond to the spindle 183 in the disk drive unit 124. Namely, the tray 126 and the disk drive unit 124 that move in accordance with the cam gear 140 are structured such that the turntable 180 of each supporting portion 128 and the spindle 183 are connected to each other when the tray 126 stops at a predetermined position.

As shown in FIG. 40, a groove 180C is formed along an outer circumferential surface of the turntable 180. A through hole 128A is formed at a portion of the supporting portion 128 corresponding to the groove 180C of the turntable 180, and the groove 180C is fitted into the through hole 128A.

The groove 180C of the turntable 180 is fitted into the through hole 128A of the supporting portion 128, whereby the turntable 180 is rotatably supported by the supporting portion 128. A connecting portion 180E is formed at the turntable 180 at a surface side of the mounting portion 180A so as to correspond to the ring member 184. The connecting portion 180E has a diameter that is larger than that of the through hole 128A. Further, a metal ring member 181 as the connecting means is fixed to the connecting portion 180E at a portion corresponding to the magnet member 185.

A hole 186 as is shown in FIG. 42A is formed at the turntable 180, and the spindle 183 is inserted into the hole 186. As shown in FIG. 42A, the hole 186 comprises a hole portion 186A whose diameter is slightly larger than that of the insertion portion 184A, a hole portion 186B whose diameter is slightly larger than that of the spindle 183, and a taper portion 186C whish communicates the hole portions 186A and 186B so as to be in continuous with each other.

The taper portion 186C guides the tip end of the spindle 183 inserted into the hole 186. Further, an unillustrated plate spring is formed at the turntable 180 at a portion corresponding to the hole portion 186B. A substantially V-shaped curve portion (not shown) is formed at the plate spring. Then, the plate spring urges the spindle 183 toward a circumferential wall of the hole portion 186B in the state in which the spindle 183 is inserted into the hole portion 186B, and the unillustrated curve portion is kept in contact with the spindle 183.

As shown in FIG. 40 and FIG. 42A, in the state in which the spindle 183 is inserted into the hole 186, the magnet member 185 magnetically attracting the metal ring member 181 connects the turntable 180 and the spindle motor 182 with each other. Namely, when the disk drive unit 124 shown in FIG. 45 rotates around the support shaft 130 as a center in a counterclockwise direction (in a direction of arrow in FIG. 45), the ring member 184 is separated from the turntable 180 (see FIG. 40). On the other hand, when the disk drive unit 124 shown in FIG. 40 rotates around the support shaft 130 as a center in a clockwise direction (in a direction of arrow in FIG. 40), the ring member 184 is connected to the turntable 180 (see FIG. 45).

In this connection state, the unillustrated spindle 183 urges the spindle 183 toward the circumferential wall of the hole portion 186B. Accordingly, the spindle 183 and the turntable 180 are aligned at the axis center P7 by the outer circumferential surface of the spindle 183 and the circumferential wall of the hole portion 186B. Further, the spindle motor 182 and the turntable 180 are axially aligned with each other due to a connection between the surfaces of the magnet member 185 and the ring member 181.

On the other hand, in the state in which the ring member 184 is separated from the turntable 180 (in the state shown in FIG. 20), due to the rotation of the tray 126 around the supporting shaft 123A as a center, a desired support portion 128 is stopped so as to correspond to the door leaf 114 (see FIG. 20). Further, in the disk changer 120, in the state in which the tray 126 is stopped as shown in FIG. 37, the magnet member 185 is connected to the ring member 181, whereby the turntable 180 becomes rotatable (see FIG. 44).

In the state in which the turntable 180 is able to rotate, as shown in FIG. 44, the ring member 184 of the spindle motor 182 allows the turntable 180 to float on the supporting portion 128 by. Namely, in the aforementioned rotatable state of the turntable 180, the turntable 180 and the supporting portion 128 are prevented from contacting with each other in order not to damage the rotation of the turntable 180.

In the state in which the turntable 180 is able to rotate, the spindle motor 182 allows the turntable 180 to rotate, and a reproducing processing of data recorded in the disk 10 (see FIG. 19) is carried out by the pickup 178 shown in FIG. 38 carries out Locking Structure of the Turntable 180 for the Supporting Portion 128

Figure 41:
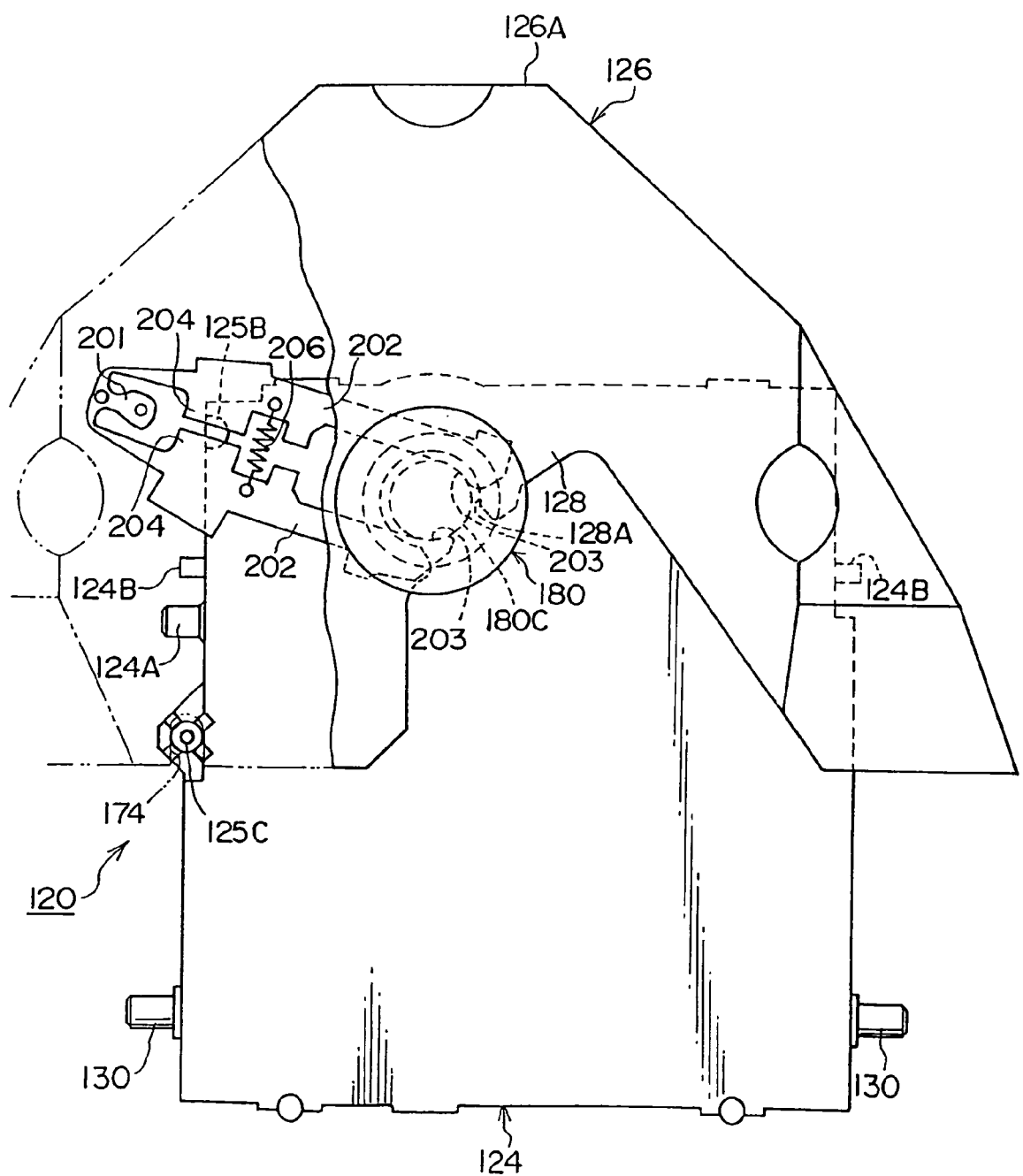
FIG. 41 is a front view of a state of the disk drive unit shown in FIG. 40.

With reference to FIGS. 40 to 46, a description of a structure of locking means of the turntable 180 for the supporting portion 128 will be made. Clamp members 200 for constituting the locking means are disposed at a rear side of the supporting portion 128 so as to correspond to the grooves 180C of the turntable 180. Each of the clamp members 200 is a substantially plat-shaped configuration. As shown in FIG. 41, the clamp member 200 comprises a pair of clamping portions 202 for rotating around a support point 201 as a center. Further, the support point 201 is fixed to the supporting portion 128.

A coil spring 206 is interposed between the pair of the clamping portions 202 and urges the pair of the clamping portions 202 always in a direction in which the clamping portions 202 are clamped (i.e., a direction in which each of the clamping portions 22 moves along the groove 180C of the turntable 180). Therefore, as shown in FIG. 41, the coil spring 206 urges abutting portions 203 of the clamping portions 202 to clamp the groove 180C of the turntable 180, and then abut a circumferential wall of the groove 180C.

Namely, in an unconnected state in which the magnet member 185 of the ring member 184 for constituting the connecting means is not yet connected to the ring member 181 of the turntable 180, the turntable 180 is mounted on the supporting portion 128 by its own weight (see FIGS. 40 and 42). Then, as shown in FIG. 42A, the turntables 180, the supporting portions 128, and the clamping portions 202 are structured such that the abutting portions 203 can be fitted into the groove 180C of the turntable 180 in the unconnected mode.

An engaging portion 204 is formed at each of the clamp portions 202 to open the clamp portions 202. The engaging portion 204 is positioned at each clamping portion 202 at the side of the support point 201, and an angle between the abutting portions 203 becomes larger. On the other hand, an engaging pin 125B is disposed at the disk drive unit 124 so as to correspond to the engaging portion 204. Further, a tapered taper portion 125C is formed at the tip end portion of the engaging pin 125B.

Figure 42B:
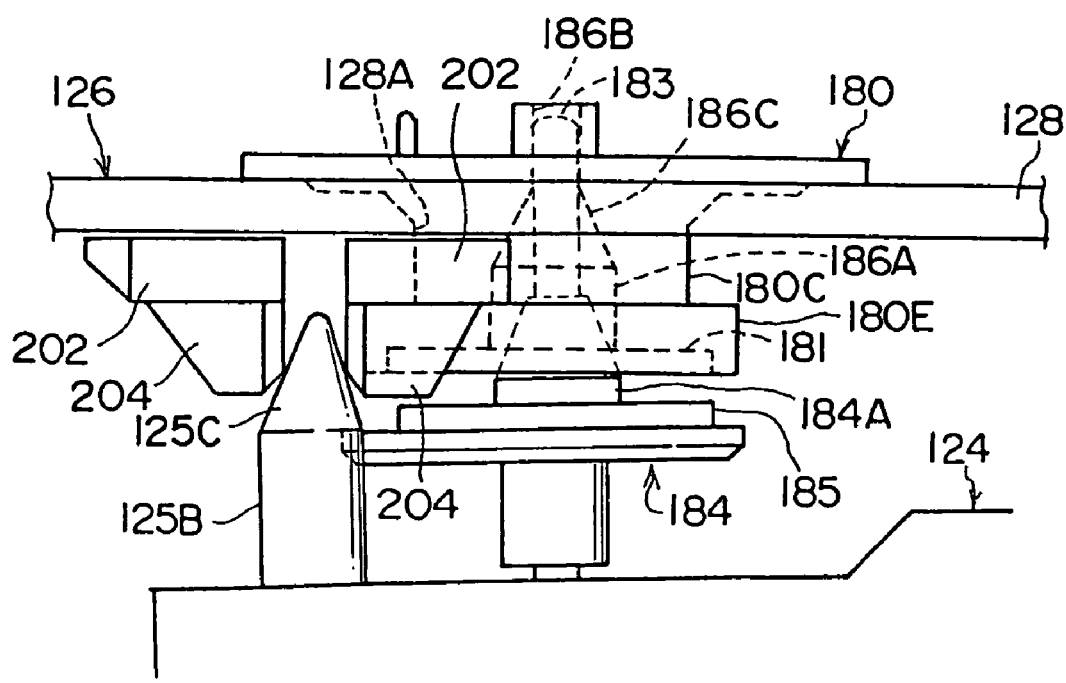
FIG. 42B is a view of a positional relationship between a clamp portion in FIG. 42A and an engaging pin.

As shown in FIG. 20, when the disk drive unit 124 rotates in a clockwise direction around the supporting shaft 130 as a center (see the arrow in FIG. 20), as shown in FIG. 40, a tip end portion of the spindle 183 is inserted into the hole portion 186A of the turntable 180. Further, when the disk drive unit 124 rotates, as shown in FIG. 42A, the tip end portion of the spindle 183 is slightly inserted into the hole portion 186B, and as shown in FIG. 42B, the taper portion 125C of the engaging pin 125B is slightly inserted into the engaging portions 204 of the clamp portions 202.

Since the taper portion 125C of the engaging pin 125B is slightly inserted into the engaging portion 204, the clamp portions 202 are slightly open to resist the urging force from the coil spring 206 (see FIG. 41). For this reason, as shown by the imaginary lines of FIG. 42A, the clamp portions 202 is slightly separated from a state in which the abutting portions 203 of the clamp portions 202 abut the circumferential wall of the groove 180C.

A timing at which the clamp portions 202 are open (the abutting portions 203 are separated from each other) is one at which the engaging pin 125B is inserted into the engaging portions 203. Accordingly, control of the timing depends on a length (height) of the engaging pin 125B. Further, in the state shown in 42, a curve portion of an unillustrated plate spring does not abut the spindle 183.

Figure 43A:
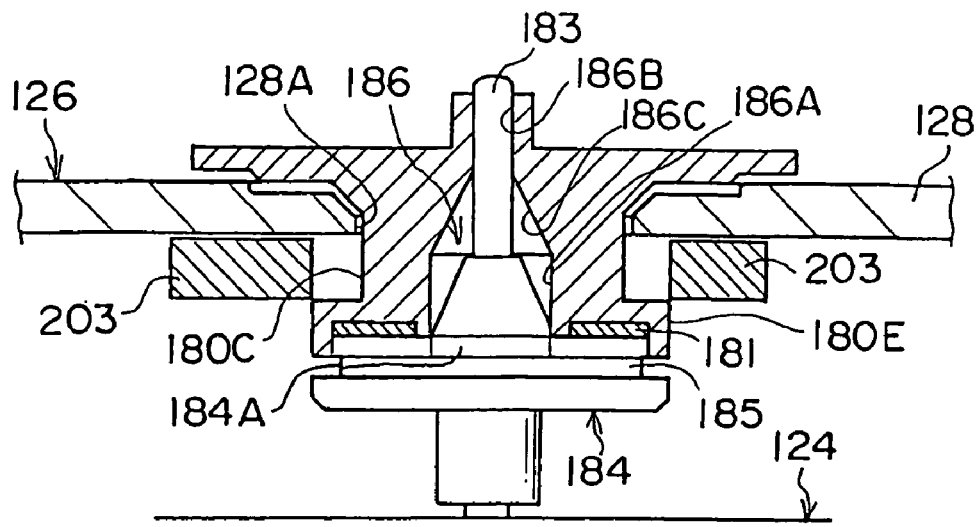
FIG. 43A is a cross sectional view of the disk drive unit in the state in which the spindle shown in FIG. 42A is further inserted into a hole portion of a turntable.
Figure 43B:
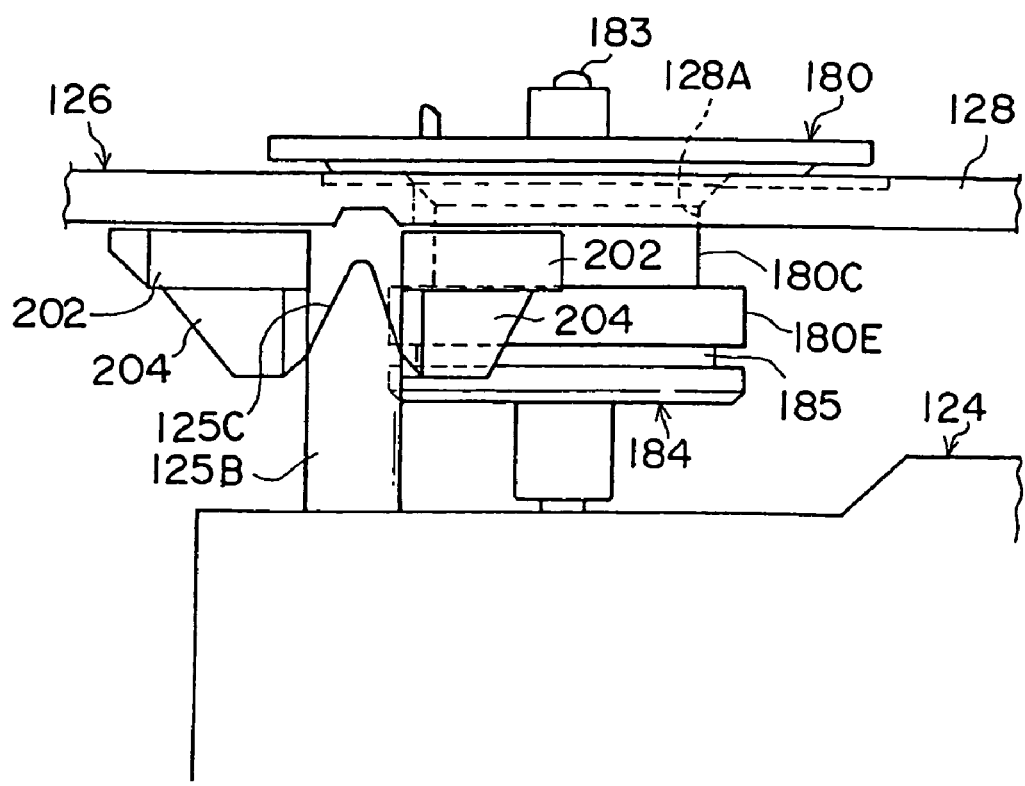
FIG. 43B shows a positional relationship between a clamp portion and an engaging pin in FIG. 43A.

When the disk drive unit 124 further rotates, as shown in FIG. 43A, the tip end portion of the spindle 183 is further inserted into the hole portion 186B, and as shown in FIG. 43B, the engaging pin 125B is inserted into the engaging portions 204 of the clamp portions 202 over the entire diameter of the engaging pin 125B. Accordingly, as shown in FIG. 43A, the abutting portions 203 separate from one another to portions in vicinities of the outer circumferential surface of the ring member 181 of the turntable 180.

As shown in FIG. 43, the unillustrated spindle abuts the spindle 183. Namely, the abutting portions 203 of the clamp members 200 position the turntable 180 with respect to the supporting portion 128 until the curve portion (not shown) of the plate spring abuts the spindle 183 and positions the spindle 183.

Figure 44A:
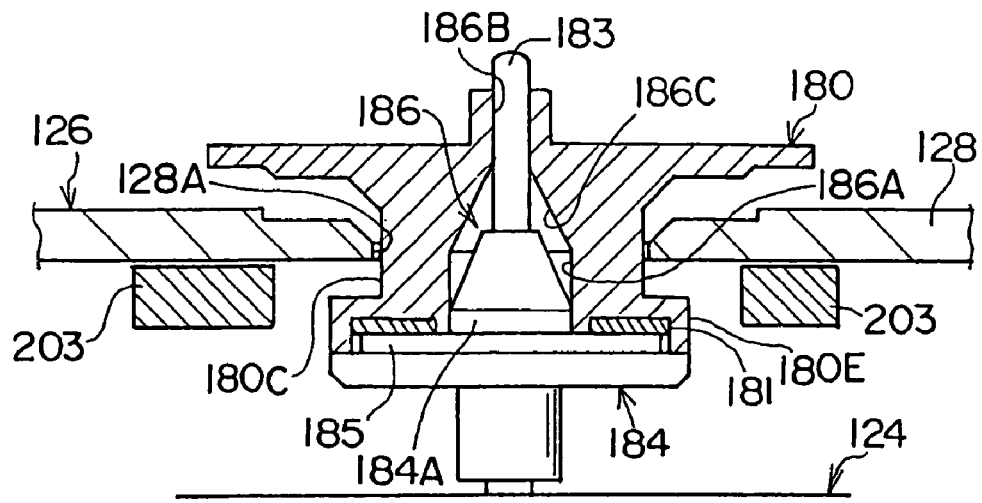
FIG. 44A is a cross sectional view of the disk drive unit in the state in which the spindle shown in FIG. 43A is further inserted into a hole portion of a turntable.
Figure 44B:
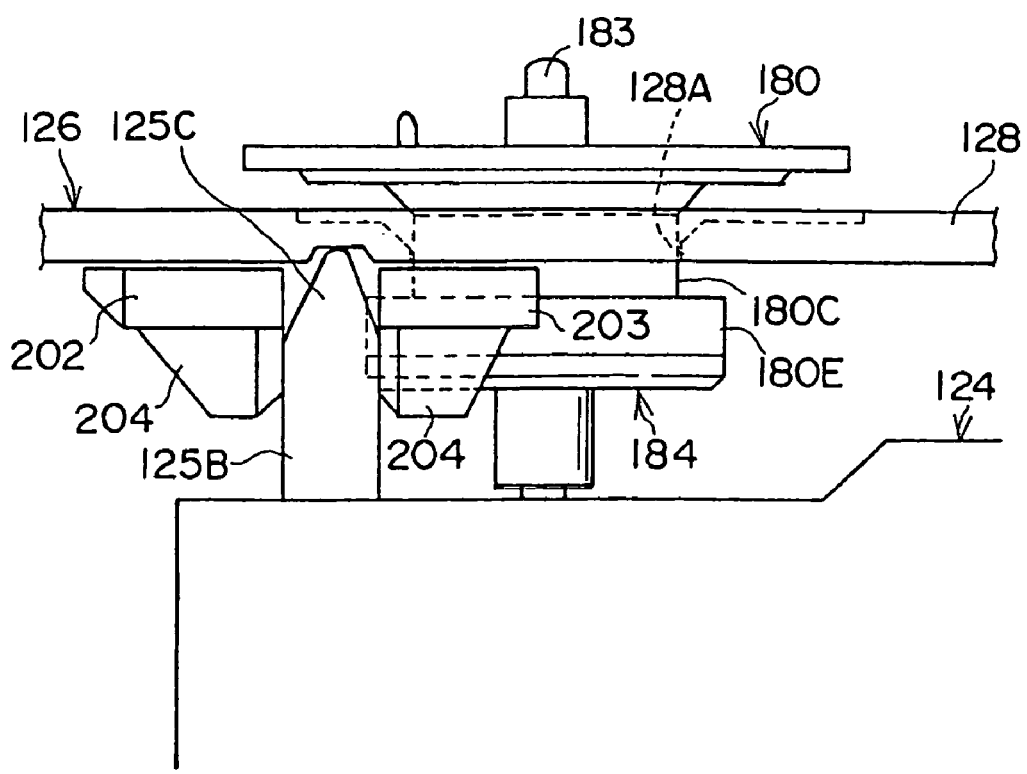
FIG. 44B shows a positional relationship between a clamp portion and an engaging pin in FIG. 44A.
Figure 46:
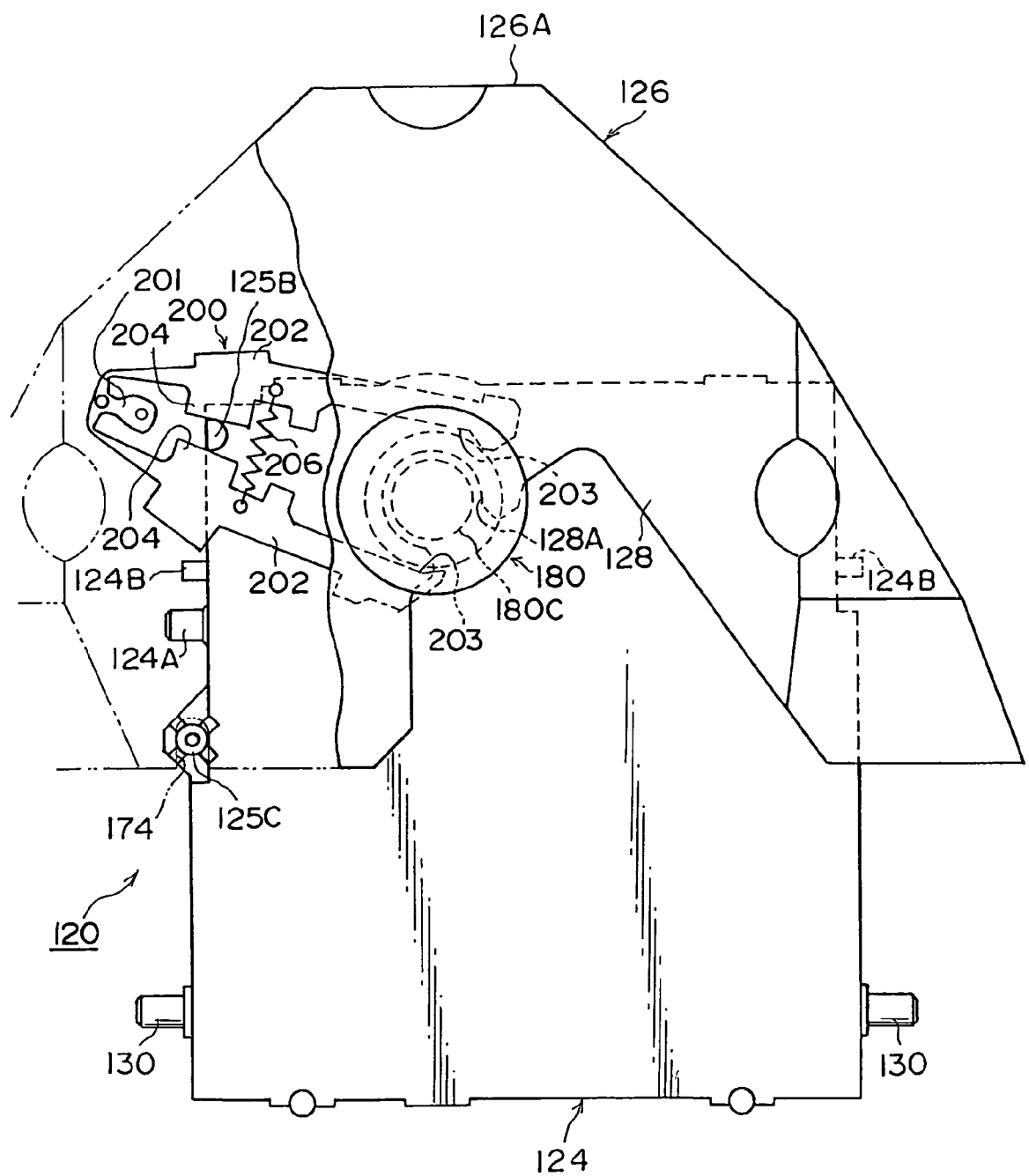
FIG. 46 is a front view of the disk drive unit shown in FIG. 45.

When the disk drive unit 124 rotates, as shown in FIG. 44A, insertion of the spindle 183 into the hole portion 186B is completed, and as shown in FIG. 44B, insertion of the engaging pin 125B into the insertion portions 204 is completed. Namely, as shown in FIGS. 44A and 46, the abutting portions 203 are separated from the ring member 181 of the turntable 180.

Figure 45:
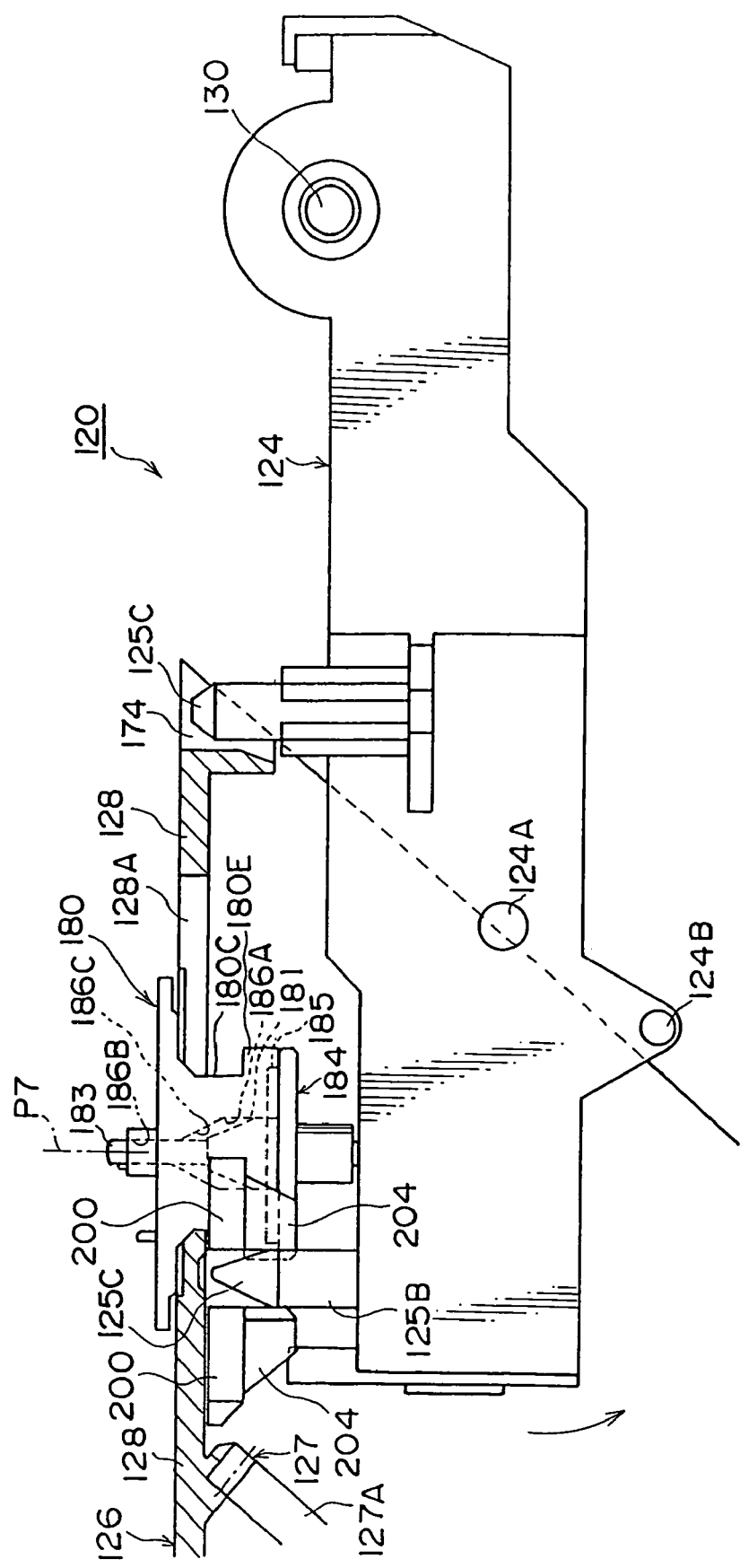
FIG. 45 is a cross sectional view in which the disk drive unit shown in FIG. 40 is rotated, and connection of the spindle and the turntable is completed.

The state shown in FIGS. 44 and 45 enters a connection mode in which the magnet member 185 of the ring member 184 for constituting the connecting means, and the ring member 181 of the turntable 180 are connected to each other. Accordingly, the turntable 180 is released from locking the supporting portion 128. Further, in the aforementioned connection mode, the turntable 180 is lifted by the ring member 184 of the spindle motor 182 and floated from the supporting portion 128, whereby the turntable 180 becomes rotatable. Meanwhile, during a mode change from the above-described connection mode to the unconnected mode in which the magnet member 185 is not connected to the ring member 181, an inverse movement is taken to the aforementioned movement in which the turntable 180 is positioned at the supporting portion 128 by the clamping portions 200.

Accordingly, in accordance with the present embodiment, in the aforementioned unconnected mode, since the clamp members 200 position the turntable 180 at a predetermined position, even if the turntable 180 and the spindle 183 are not connected to each other, for example, during a disk change time when the tray 126 is rotating, or during carrying of a disk apparatus, it is possible to prevent the occurrence of a rattle or a rattling noise due to a play between the turntable 180 and the supporting portion 128.

Operation of the Second Embodiment of the Present Invention

An operation of the present embodiment will be explained hereinafter. First, as shown in FIG. 37, in the stop mode, the disk drive unit 124 moves upwardly, and the spindle 183 of the spindle motor 182 is connected to the turntable 180. Further, the positioning pin 124B of the disk drive unit 124 is supported by the pin-receiving portion 164 of the positioning lever 160, whereby the disk drive unit 124 is reliably supported by the positioning lever 160.

In the stop mode, in order to mount the disk 10 on the turntable 180 of the supporting portion 128, due to an operation of the unillustrated button, the door leaf 114 is slid to open the opening portion 113. The supporting portion 128 is stopped so as to correspond to the opened opening portion 113, and the disk 10 is then mounted to the turntable 180 of the supporting portion 128.

In the present embodiment, in the stop mode i.e., in the state in which connection between the spindle 183 of the spindle motor 182 and the turntable 180 has been completed (in a connection-complete state), the positioning lever 160 positions the disk drive unit 124. Accordingly, during attachment/detachment of the disk 10 with respect to the turntable 180, even when an unexpected load is applied to the tray 126, the tray 126 is reliably supported. Consequently, in accordance with the present embodiment, since the tray 126 is reliably supported by the positioning lever 160 in the connection-complete state, workability in attaching/detaching the disk 10 with respect to the turntable 180 can improve.

When the disk 10 is attached to the turntable 180, as shown in FIGS. 47 to 49, the unillustrated microcomputer determines whether or not the disk 10 is appropriately mounted on the turntable 180 on the basis of infrared rays of the infrared LEDs 194 and reflected light from the reflectors 196.

As shown in FIG. 49, for example, when the disk 10 is positioned at the side portion 190A of each of the engaging pawls 190, both infrared rays of the infrared LEDs 194 and reflected light from the reflectors 196 are blocked by the disk 10, and are not appropriately transmitted to the phototransistors 198. Accordingly, the microcomputer determines that the disk 10 is not appropriately mounted on the turntable 180.

If the microcomputer determines that the disk is not appropriately mounted to the turntable 180, rotation of the turntable 180 in the play mode or that of the tray 126 in the disk change mode later described is suppressed. Accordingly, it is displayed or warned by the unillustrated displaying means or warning means that the disk 10 is not appropriately mounted to the turntable 180.

In accordance with the present embodiment, since the infrared LEDs 194, the reflectors 196, and the phototransistors 198 as the detecting means detect that the disk 10 is not appropriately attached to the turntable 180, rotation of the turntable 180 in the play mode or that of the tray 126 in the disk change mode later described can be inhibited. Accordingly, in accordance with the present embodiment, during the rotation of the tray 126 or the like, the disk 10 is prevented from ejecting from the turntable 180 by the centrifugal force. Consequently, the disk 10 does not fall off from the tray 126.

If the disk is appropriately mounted on the turntable 180, reflected light from the reflectors 196 are not blocked by the disk 10, and are transmitted to the phototransistors 198. Accordingly, the microcomputer determines that the disk 10 is property mounted on the turntable 180. In this case, the microcomputer drives the spindle motor 182 or the motor 134 on the basis of an operational signal of a play key or a selection key for a disk change.

The play mode is maintained almost in the similar manner to the stop mode except that the spindle motor 182 rotates, and the pickup 178 slides to perform a reading processing of data from the disk 10. Then, since the turntable 180 rotates and the pickup 178 slides in the play mode, the reproducing (play mode) processing of data from the disk 10 is carried out by the pickup 178. Further, when the specified reproducing processing (play mode) is completed, a waiting mode (stop mode) shown in FIG. 37 will begin.

Movement During the Disk Change

In the case of the disk change, the unillustrated selection key for the disk change is selected, and a desired supporting portion 128 is faced with the opening portion 113. Namely, the unillustrated microcomputer drives the motor 134 shown in FIG. 37, and then rotates the operation lever 152 and the positioning lever 160 via the cam portion 142 and the cam groove 143 of the cam gear 140.

Therefore, the pin-receiving portion 164 of the positioning lever 160 is separated from the positioning pin 124B of the disk drive unit 124, and the operation lever 152 rotates the disk drive unit 124 in a counterclockwise direction around the supporting shaft 130 as a center. Namely, as shown in FIG. 20, the magnet member 185 of the ring member 184 is separated from the ring member 181 of the turntable 180, and thereby releases connection of the magnet member 185 and the ring member 181 (see FIG. 40).

As shown in FIG. 40, since the engaging pin 125B is separated from the engaging portion 204 of the clamp member 200, as shown by the imaginary lines of FIG. 42A, the abutting portion 203 abuts the circumferential wall of the groove portion 180C of the turntable 180, and the clamp member 200 positions the turntable 180 with respect to the supporting portion 128.

Namely, in accordance with the present embodiment, in the unconnected mode shown in FIG. 41, since the clamp member 200 positions the turntable 180 at a predetermined position, during the disk change during which the tray 126 rotates or during the carrying of the disk apparatus, a rattle or a rattling noise due to a play between the turntable 180 and the supporting portion 128 is prevented.

The tray 126 passes through the drive path comprising the motor 134, the cam gear 140, the gear 148, the drive gear 150, and the gear portion of the tray 126, and stops at a position at which the selected supporting portion 128 faces the opening portion 113 (see the above-description in FIGS. 28 to 35). In the state in which the tray 126 is stopped, the unillustrated microcomputer drives the motor 134 shown in FIG. 20, and rotates the operation lever 152 and the positioning lever 160 through the cam portion 142 and the cam groove 143 of the cam gear 140 by.

The operation lever 152 rotates the disk drive unit 124 in a clockwise direction around the support shaft 130 as a center, and the pin-receiving portion 164 of the positioning lever 160 is inserted into the positioning pin 124B of the disk drive unit 124.

In accordance with the present embodiment, in the stop mode (or play mode) in which the spindle 183 of the spindle motor 182 is connected to the turntable 180, the disk drive unit 124 and the supporting portion of the tray 126 are reliably positioned by structuring the stopper lever 170, the engaging pins 125A and the like as described above.

In the present embodiment, the tray 126 shown in FIG. 20 is driven by the motor 134 and rotated through the driving path comprising the cam gear 140, the gear 148, the drive gear 150, and the gear portion 127 of the tray 126. On the other hand, the above-described vertical movement of the disk drive unit 124 is also carried out through a common driving path (comprising the motor shaft 135, the worm gear 136, the gear 138, and the cam gear 140).

In accordance with the present embodiment, since both the rotation of the tray 126 and the inclined movement of the disk drive unit 124 are carried out through the motor 134 and the motor shaft 135, the worm gear 136, the gear 138, and the cam gear 140, the number of parts can be reduced as compared to the conventional disk changer, whereby the disk changer can be structured more simply, and manufactured inexpensively.

Third Embodiment

Figure 50:
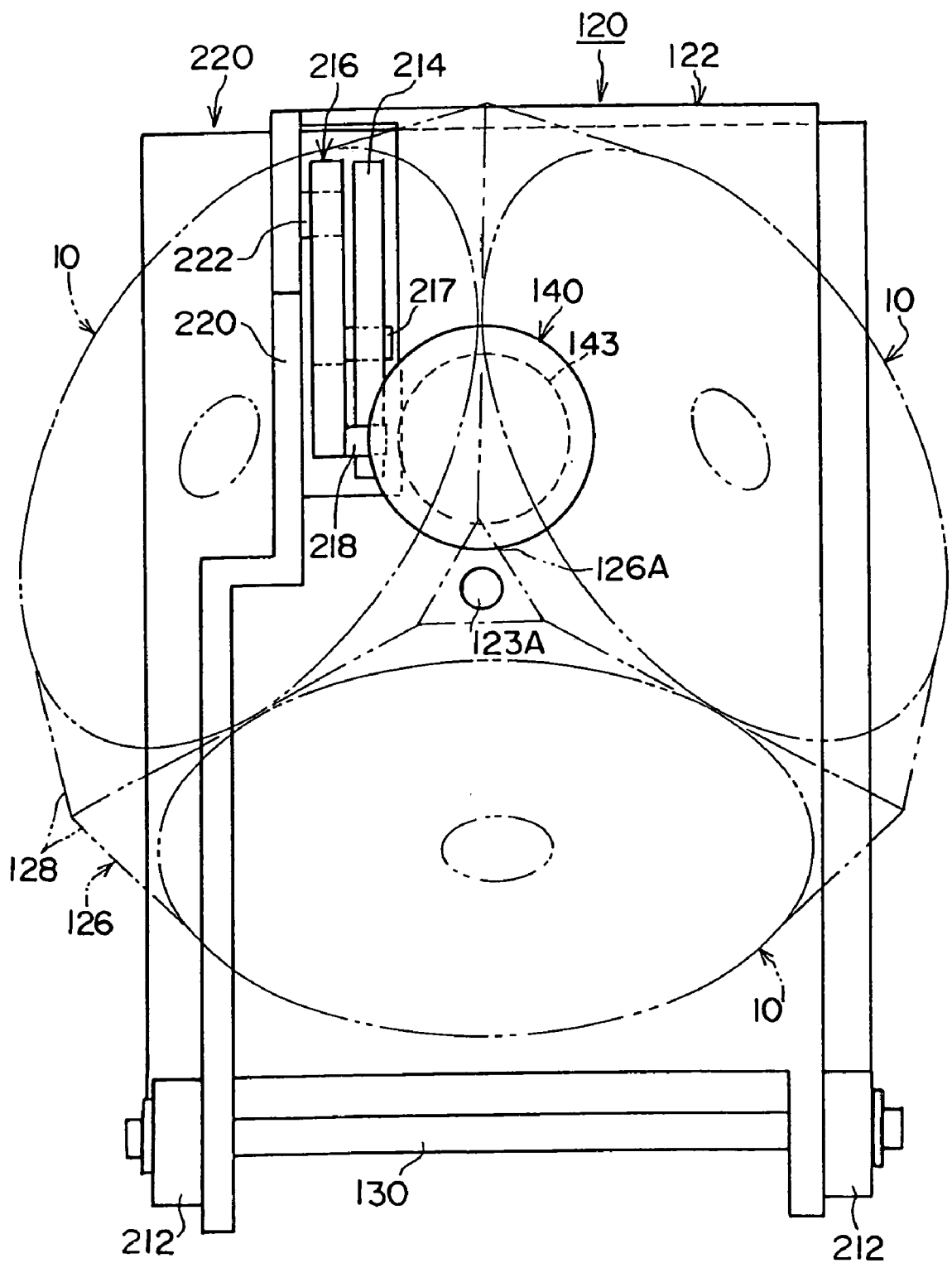
FIG. 50 is a plan view of a main portion of a disk changer according to a third embodiment of the present invention.
Figure 51:
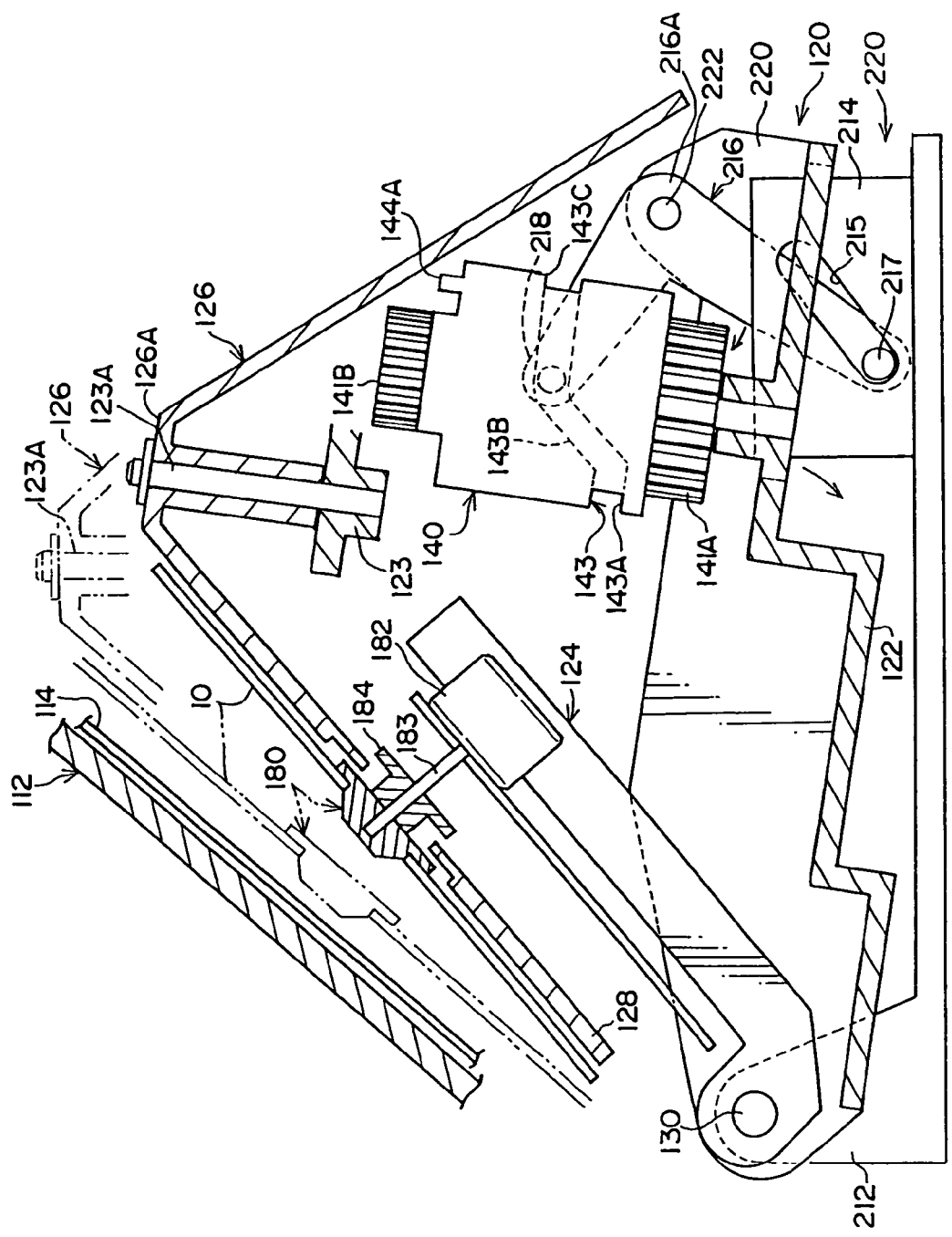
FIG. 51 is a cross sectional view of a main portion of the disk changer shown in FIG. 50.

With respect to FIGS. 50 to 52, a structure of the third embodiment of the present invention will be explained. In the present embodiment, the entire disk changer 120 shown in FIGS. 19 and 20 is inclined with respect to the cabinet 112, and moved. Further, in the present embodiment, portions identical to those in the second embodiment of the present invention will be denoted by the same reference numerals. FIGS. 50 and 51 show only the main portions of the disk changer 120 according to the third embodiment of the present invention.

As shown in FIGS. 50 and 51, the present embodiment is provided with a supporting apparatus 210 for rotatably supporting the entire disk changer 120 shown in FIGS. 19 and 20. A pair of bearing portions 212 is formed at widthwise front-end portions of the supporting apparatus 210 and rotatably supports the supporting shaft 130 of the disk changer 120. Accordingly, the front portion of the disk changer 120 rotates around the supporting shaft 130 as a center.

Meanwhile, a plate-shaped cam plate 214 is provided perpendicularly from a rear portion of the supporting apparatus 210 in a lengthwise direction thereof. As shown in FIG. 51, a cam groove 215 is formed at the cam plate 214 so as to incline in a lengthwise direction thereof. Further, the cam groove 143 of the cam gear 140 and the cam groove 215 of the cam plate 214 are connected to each other by a plate-shaped tilt lever 216 as the moving means. As shown in FIG. 52, the plate-shaped tilt lever 216 is formed into a substantially L-shaped configuration as seen from a side view.

An engaging pin 217 is formed at a proximal end of the tilt lever 216, and is inserted into the cam groove 215 of the cam plate 214. An engaging pin 218 is formed at a tip end of the tilt lever 216, and is inserted into the cam groove 143 of the cam gear 140. Further, a supporting pin 222 protruding from the sidewall 220 of the frame 122 is pivotally supported at a solid-angle portion 216A of the tilt lever 216.

Since the engaging pin 218 is controlled by the cam groove 143 and moves vertically, the tilt lever 216 rotates around the supporting pin 222 as a center. When the tray 126 is rotated or when a disk is changed, as shown in FIG. 51, when the engaging pin 218 is positioned at the cam portion 143C of the cam groove 143, the engaging pin 218 rotates in a clockwise direction (see the arrow of FIG. 51) around the support pin 222 as a center, and the engaging pin 217 moves frontward of the cam groove 215.

The tilt lever 216 rotates the disk changer 120 in a clockwise direction (see the arrow of FIG. 51) around the supporting shaft 130 as a center. Accordingly, in the present embodiment, since the supporting portion 128 facing the door leaf 114 in a close state is separated from the door 114, even when the tray 126 rotates around a support shaft 123A as a center, the tray 126 does not interfere with the cabinet 112 (including the door leaf 112). Further, an opening portion is not shown at the cabinet 112 shown in FIGS. 51 and 52. However, an opening portion, which is the same as that shown in FIG. 20, is also provided at the cabinet 112 of the present embodiment.

Figure 52:
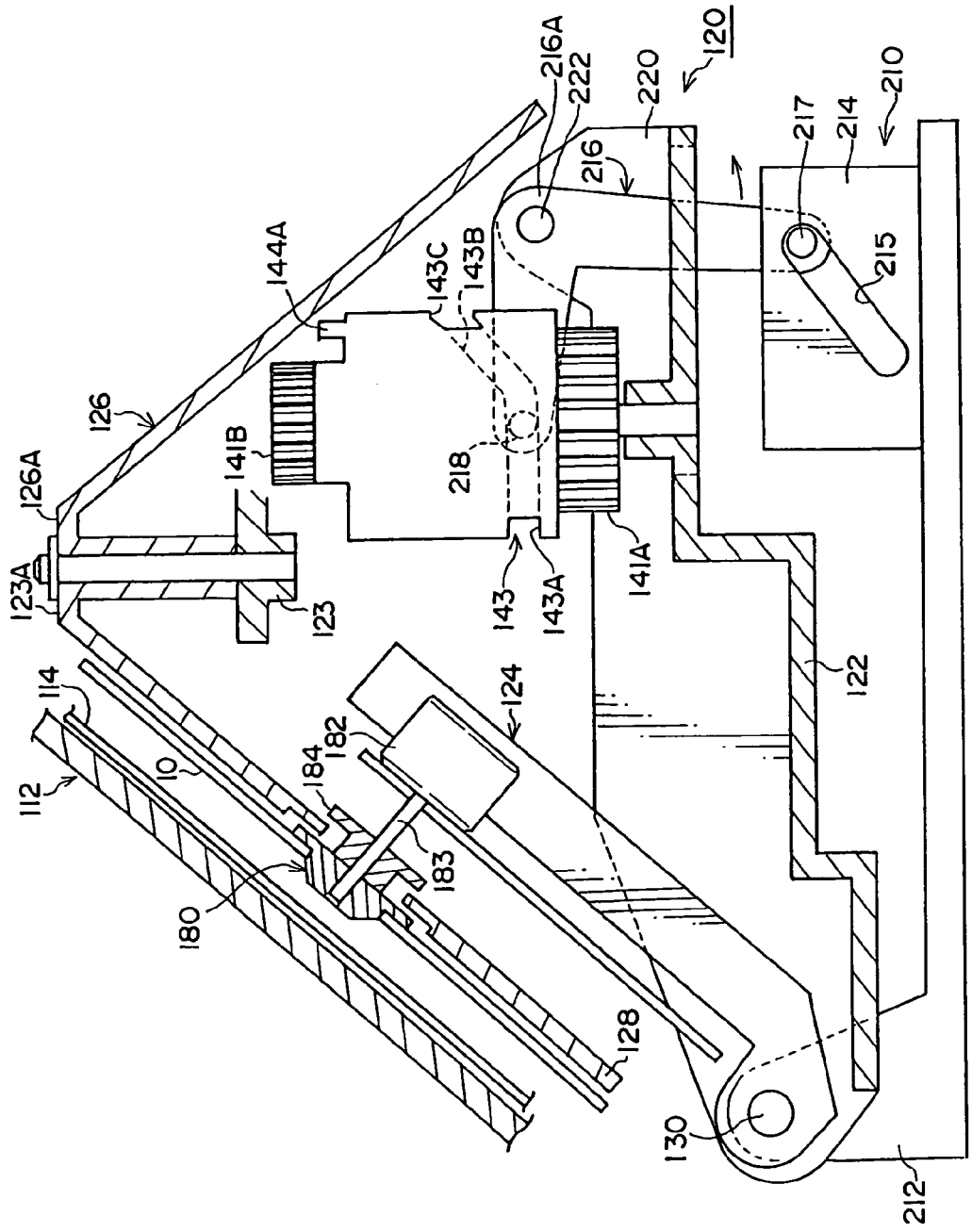
FIG. 52 is a cross sectional view of a state in which the disk changer shown in FIG. 51 is inclined.

In the present embodiment, when the engaging pin 218 is positioned at the cam portion 143A of the cam groove 143, as shown by the imaginary lines of FIGS. 52 and 51, the tilt lever 216 rotates the disk changer 120 in a counterclockwise direction (in the direction of arrow in FIG. 52) around the supporting shaft 130 as a center. Namely, in the present embodiment, during the attachment/detachment of the disk 10 with respect to the turntable 180, i.e., after the tray 126 has been rotated (for example, after the disk has been changed), the supporting portion 128, facing the closed-door leaf 114, inclines and approaches the closed-door leaf 114. Accordingly, in accordance with the present embodiment, since a gap between the turntable 180 and the cabinet 112 becomes narrower as compared to that in a conventional art, workability of attaching/detaching the disk 10 with respect to the turntable 180 can improve.

The present embodiment is structured such that the entire disk changer 120 is made to come close to or separate from the cabinet 112 by using the cam groove 143 of the cam gear 140 for moving the disk drive unit 124. Accordingly, the disk changer 120 can be synchronized with the timing during the disk change.

Since other structures and operational effects of the present embodiment are the same as in the second embodiment of the present invention, a detailed description thereof will be omitted. Further, in the present invention, a structure of separating or approaching the entire disk changer with respect to the cabinet can be carried out by another driving means (a motor, an operation lever and the like) through an unillustrated sensor.

Fourth Embodiment

With reference to FIGS. 53 to 58, a description of the fourth embodiment of the present invention will be made. In the present embodiment, the entire disk changer 120 shown in FIGS. 19 and 20 is slid in a widthwise direction of the cabinet 112. Further, in the present embodiment, portions identical to those in the second embodiment of the present invention are denoted by the same reference numerals. Moreover, FIGS. 53 to 56 show only main portions of the disk changer 120 according to the fourth embodiment of the present invention.

Figure 53:
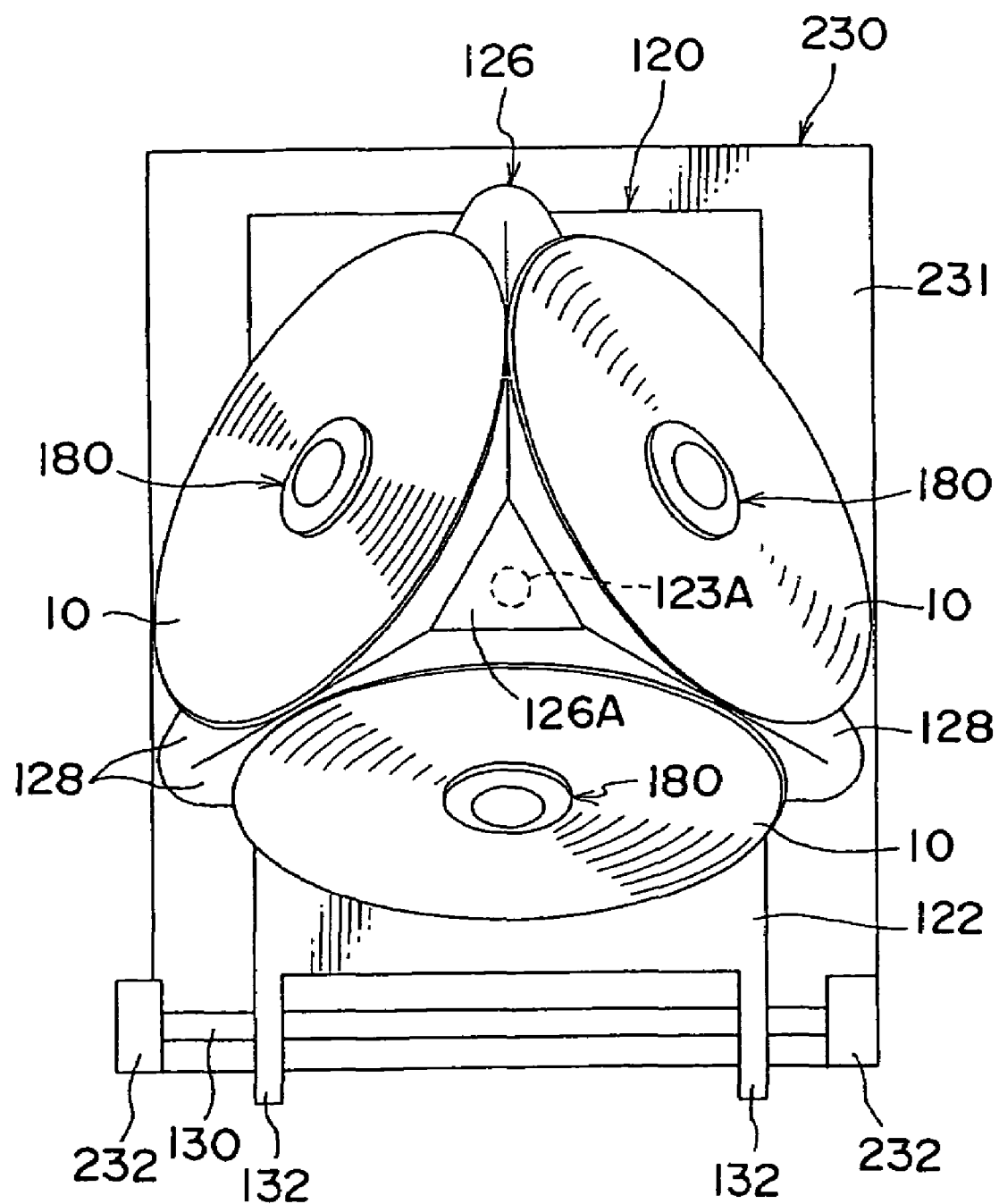
FIG. 53 is a plan view of a main portion of a disk changer according to a fourth embodiment of the present invention.
Figure 54:
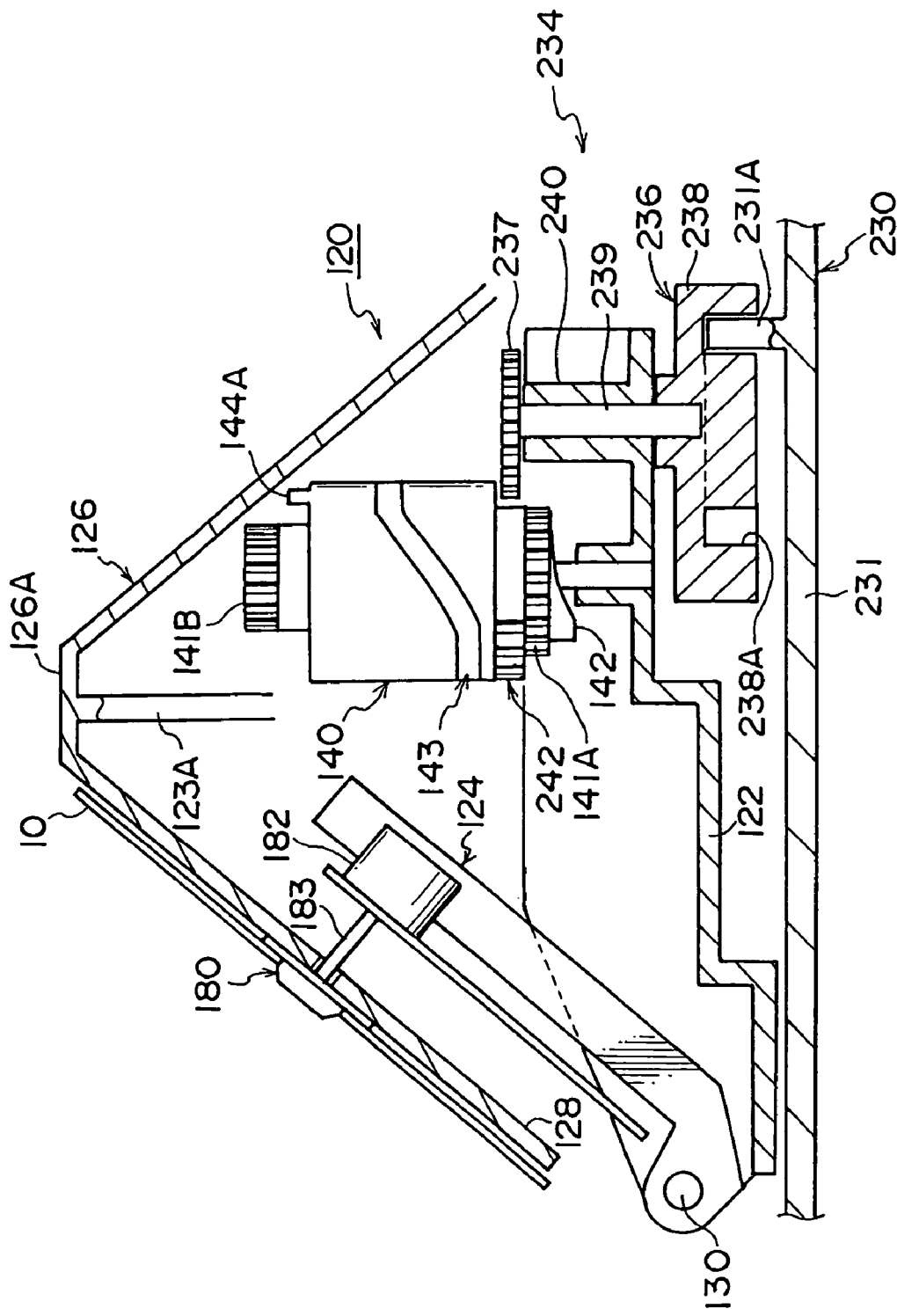
FIG. 54 is a cross sectional view of a main portion of the disk changer shown in FIG. 53.
Figure 57:
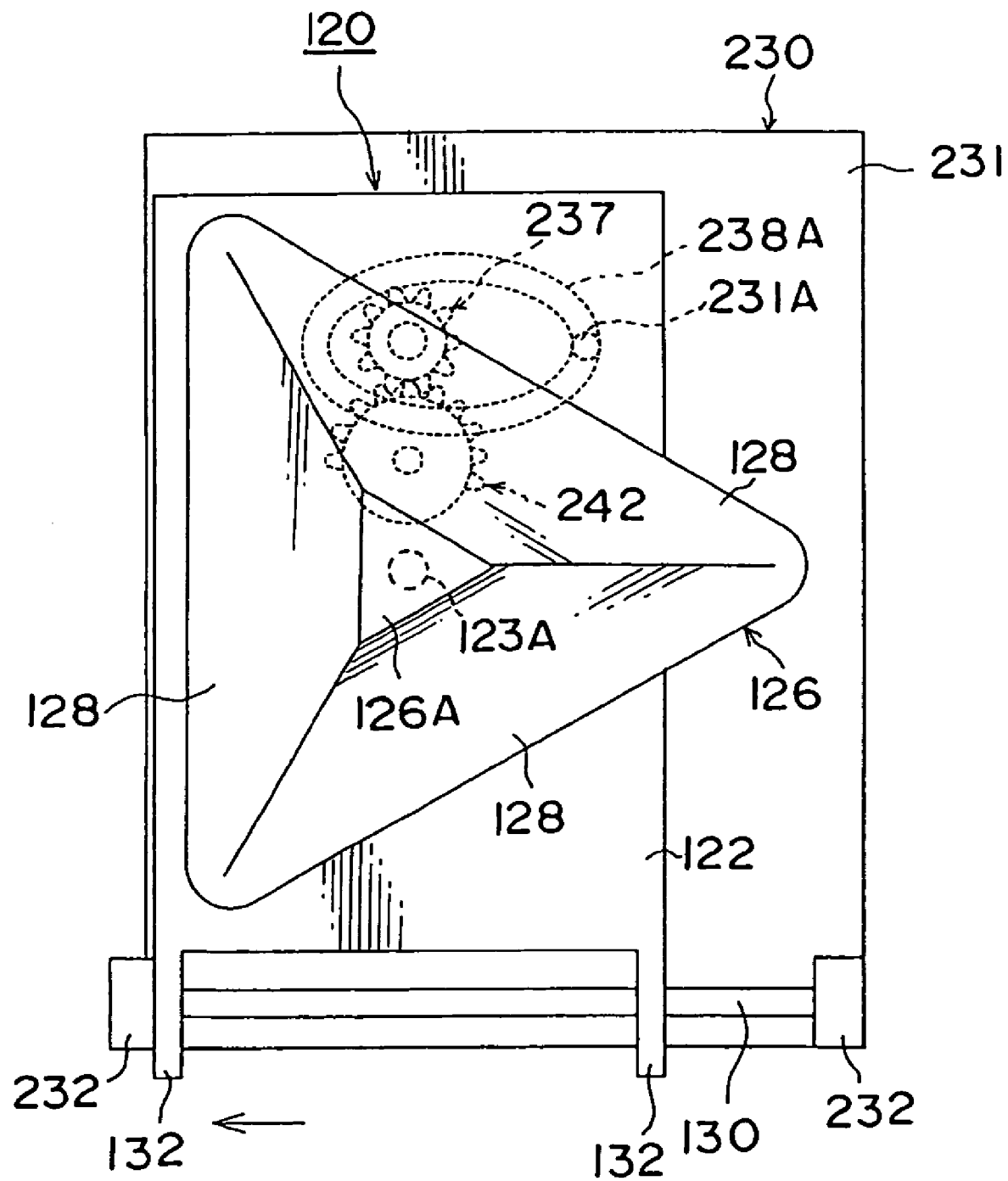
FIG. 57 is a plan view of the disk changer shown in FIG. 56 which is slid in a left-hand direction.
Figure 58:
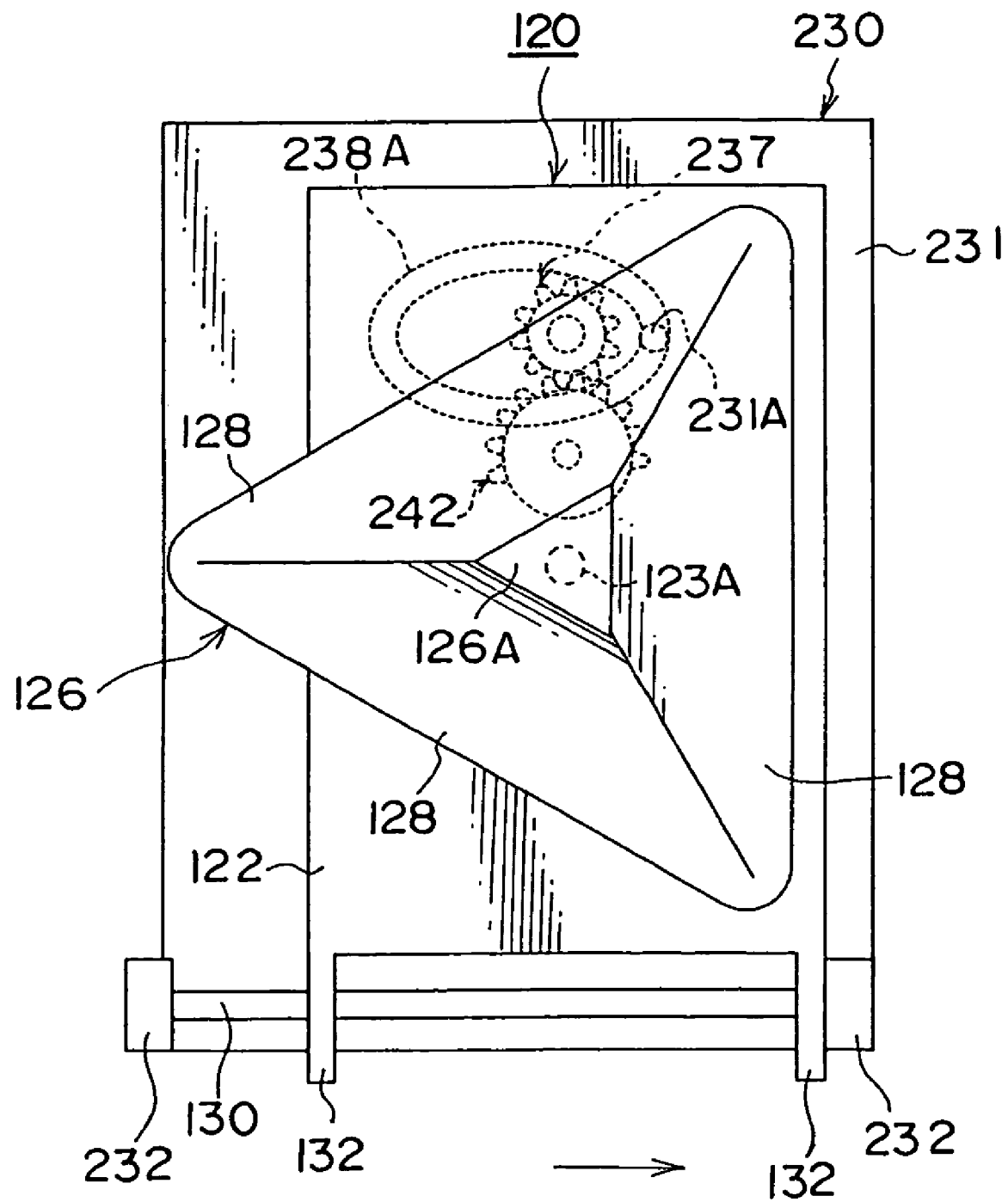
FIG. 58 is a plan view of the disk changer shown in FIG. 57 which is slid in a right-hand direction.

As shown in FIGS. 53 and 54, in the present embodiment, there is provided a supporting apparatus 230 for slidably supporting the entire disk changer 120 shown in FIGS. 19 and 20 in the widthwise direction. A pair of bearing portions 232 for pivotally supporting the supporting shaft 130 of the disk changer 120 is formed at both widthwise front-end portions of the supporting apparatus 230. Accordingly, the entire disk changer 120 slides in a widthwise direction along the shaft center of the supporting shaft 130. Further, as shown in FIGS. 57 and 58, the bearing portions 232 function as a stopper, while abutting the bearings 132 of the disk changer 120.

Meanwhile, as shown in FIG. 54, a sliding apparatus 234 as the sliding means is provided at the rear side of the supporting apparatus 230. The sliding apparatus 234 comprises a pin 231A that is provided perpendicularly from a base plate 231 of the supporting apparatus 230, a cam apparatus 236 that is connected to the pin 231A, a cylindrical supporting portion 128 that rotatably supports the cam apparatus 236 with respect to the frame 122, and an intermittent gear 242 that meshes with a gear 237 of the cam apparatus 236. Further, a supporting portion 240 is formed at the frame 122, and the intermittent gear 242 is formed at the cam gear 140.

Figure 56:
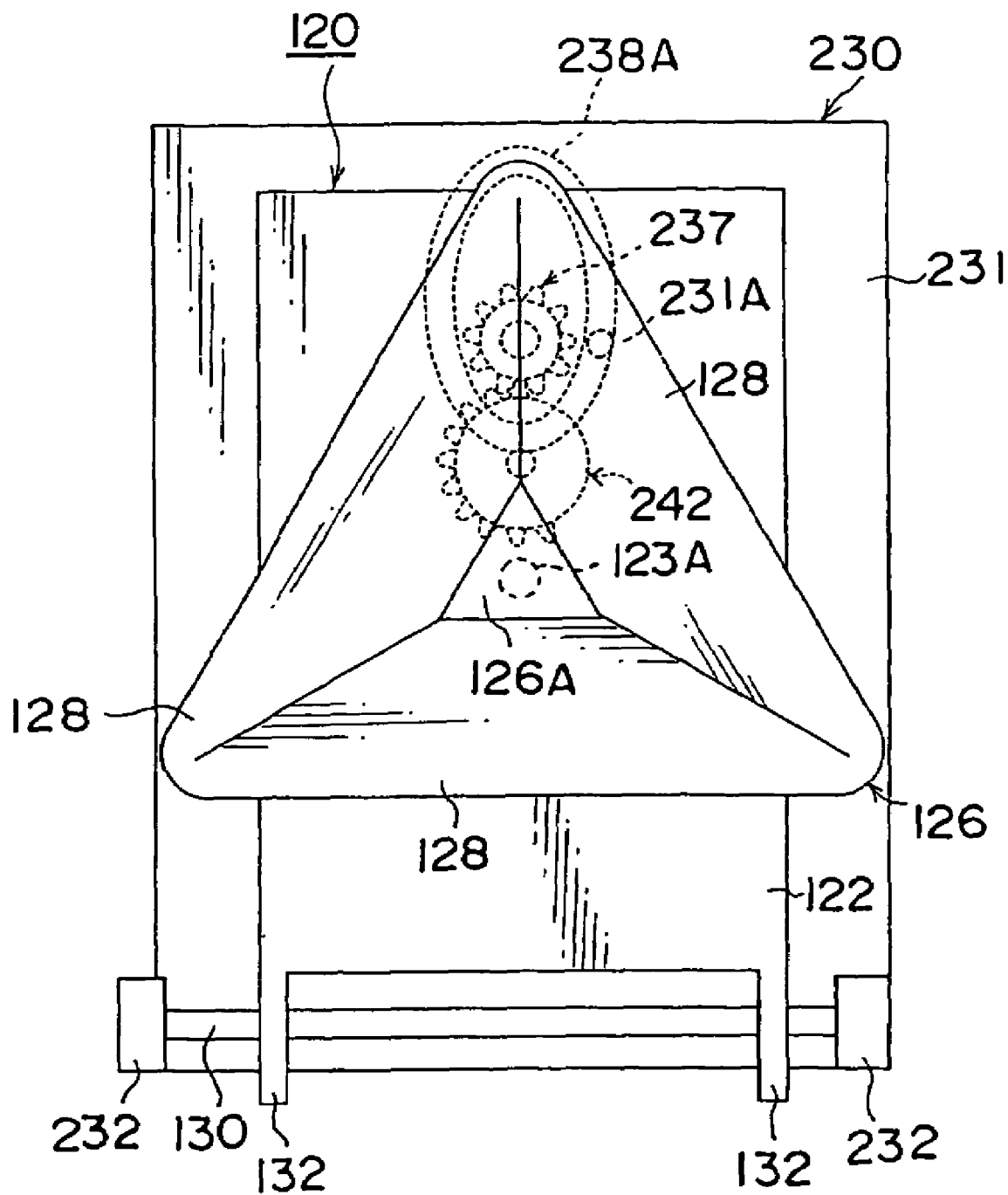
FIG. 56 is a schematic plan view of the disk changer shown in FIG. 53.

The cam apparatus 236 comprises the gear 237, a cam plate 238, and a connecting shaft 239 that connects the gear 237 and the cam plate 238 to each other. An ellipse-shaped cam groove 238A shown in FIG. 56 is formed at the cam plate 238. The pin 231A of the base plate 231 is inserted into the cam groove 238A of the cam plate 238. Therefore, due to the rotation of the cam apparatus 236, the disk changer 120 mounted on the frame 122 is guided by the supporting shaft 130 and then slid in a widthwise direction.

Figure 55A:
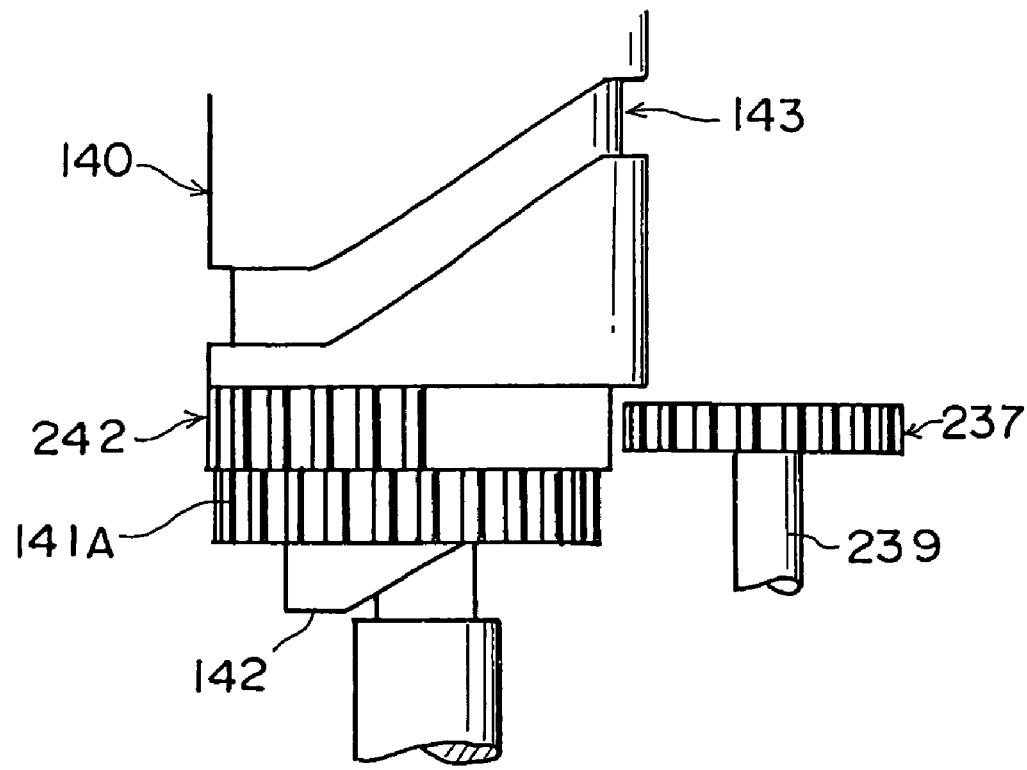
FIG. 55A is an enlarged view of a drive gear portion shown in FIG. 54.
Figure 55B:
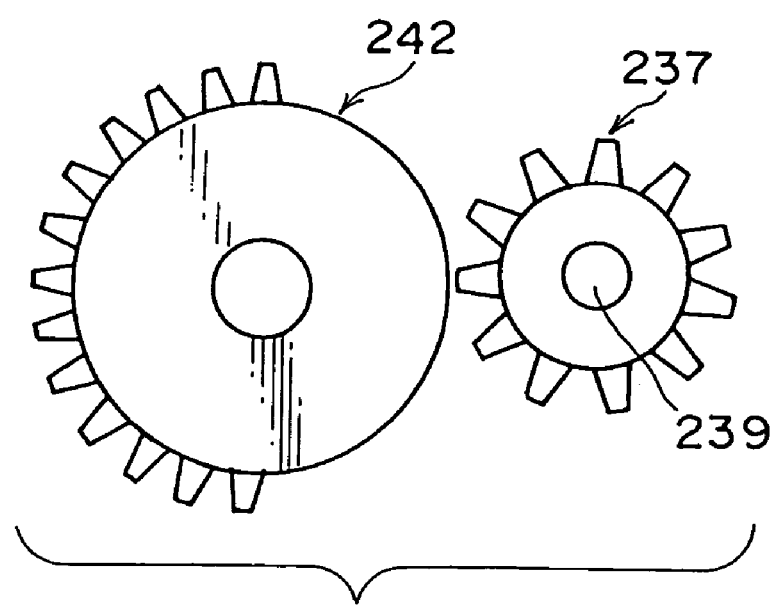
FIG. 55B is a view of a relationship in which gears shown in FIG. 55A mesh with each other.

As shown in FIG. 55, a gear ratio of the intermittent gear 242 that is formed at the cam gear 140 to the gear 237 is 1:1. Therefore, the gear 237 (the cam plate 238) rotates one time while the cam gear 140 rotates one time. Namely, as the tray 126 rotates ⅓ (i.e., 120° rotation), the supporting portions 240 adjacent to each other sequentially move to the front of the disk changer 120. Further, the cam apparatus 236 rotates around the supporting portion 240 as a center.

Subsequently, with reference to FIGS. 56 to 58, an operation of the present embodiment will be explained. FIG. 56 shows a position at which the supporting portion 128 of the tray 126 faces the front portion of the disk changer 120 or the supporting shaft 130 (i.e., an initial position or in the stop or play mode). In this initial position, the disk changer 120 is positioned substantially at a center of the supporting shaft 130, and the bearing 132 does not abut the bearing portion 232.

When the cam gear 140 rotates, the tray 126 rotates, and as shown in FIG. 57, the cam plate 238 (only the cam groove 238A is shown in FIG. 57) rotates 90°, and the disk changer 120 (the frame 122) is guided by the supporting shaft 130 and slid in the left-hand direction (the direction of arrow in FIG. 57). Further, when the cam gear 140 rotates, as shown in FIG. 58, the cam plate 239 (only the cam groove 238A is shown in FIG. 58) rotates by the angle of 180°, the disk changer 120 (the frame 122) is guided by the supporting shaft 130, and thereby slide in a right-hand direction (see the direction of arrow in FIG. 58).

Due to the further rotation of the cam gear 140, when the cam plate 239 rotates 90°, the disk changer 120 is returned to its initial position shown in FIG. 56. Namely, the tray 126 rotates ⅓ (i.e., 120° rotation), when the supporting portions 240 adjacent to each other move to the front of the disk changer 120, the disk changer 120 can be slid in a widthwise direction.

Figure 59:
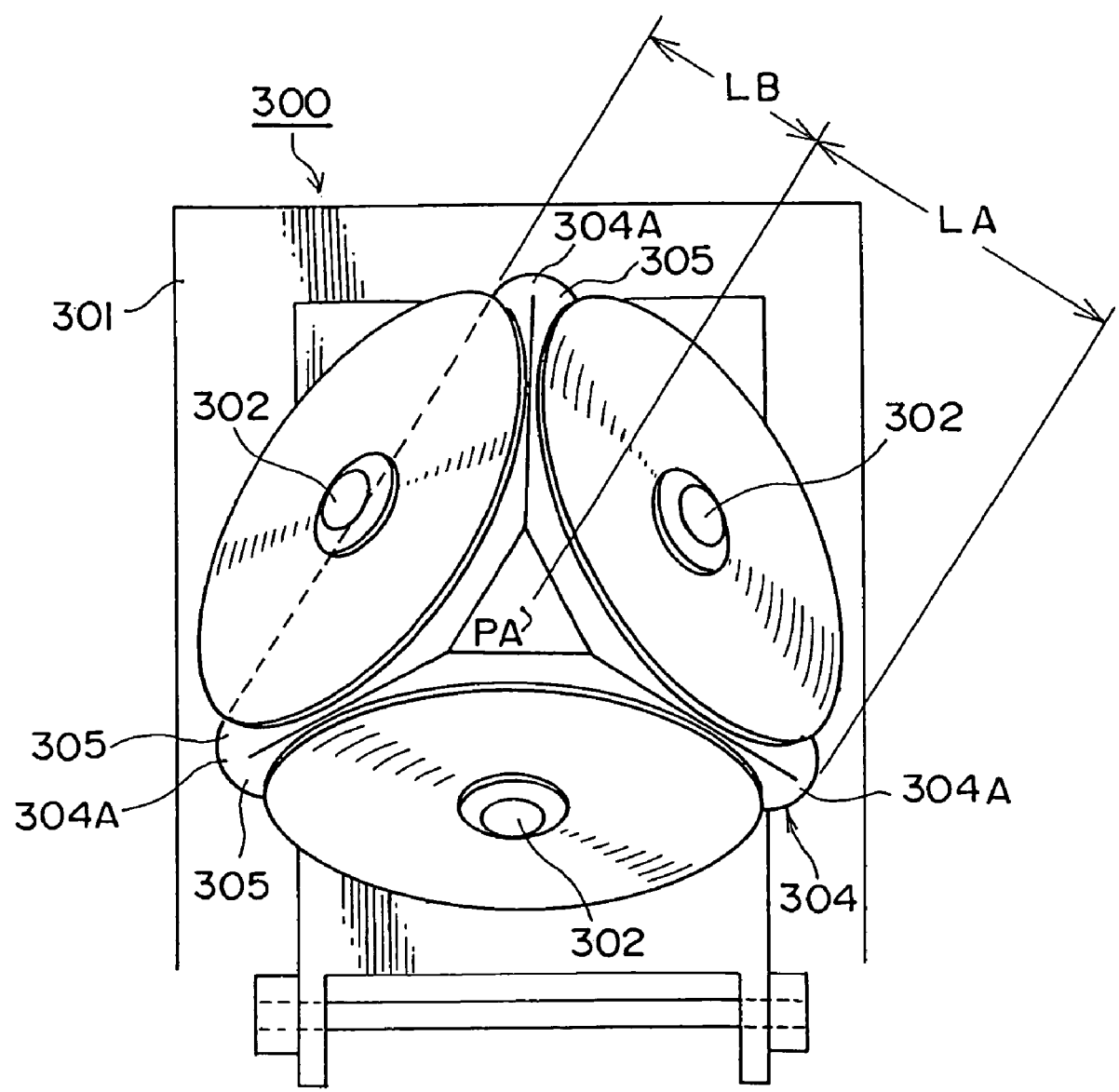
FIG. 59 is a plan view of a disk changer whose tray in a disk changer is formed into a substantially triangular pyramid.
Figure 60:
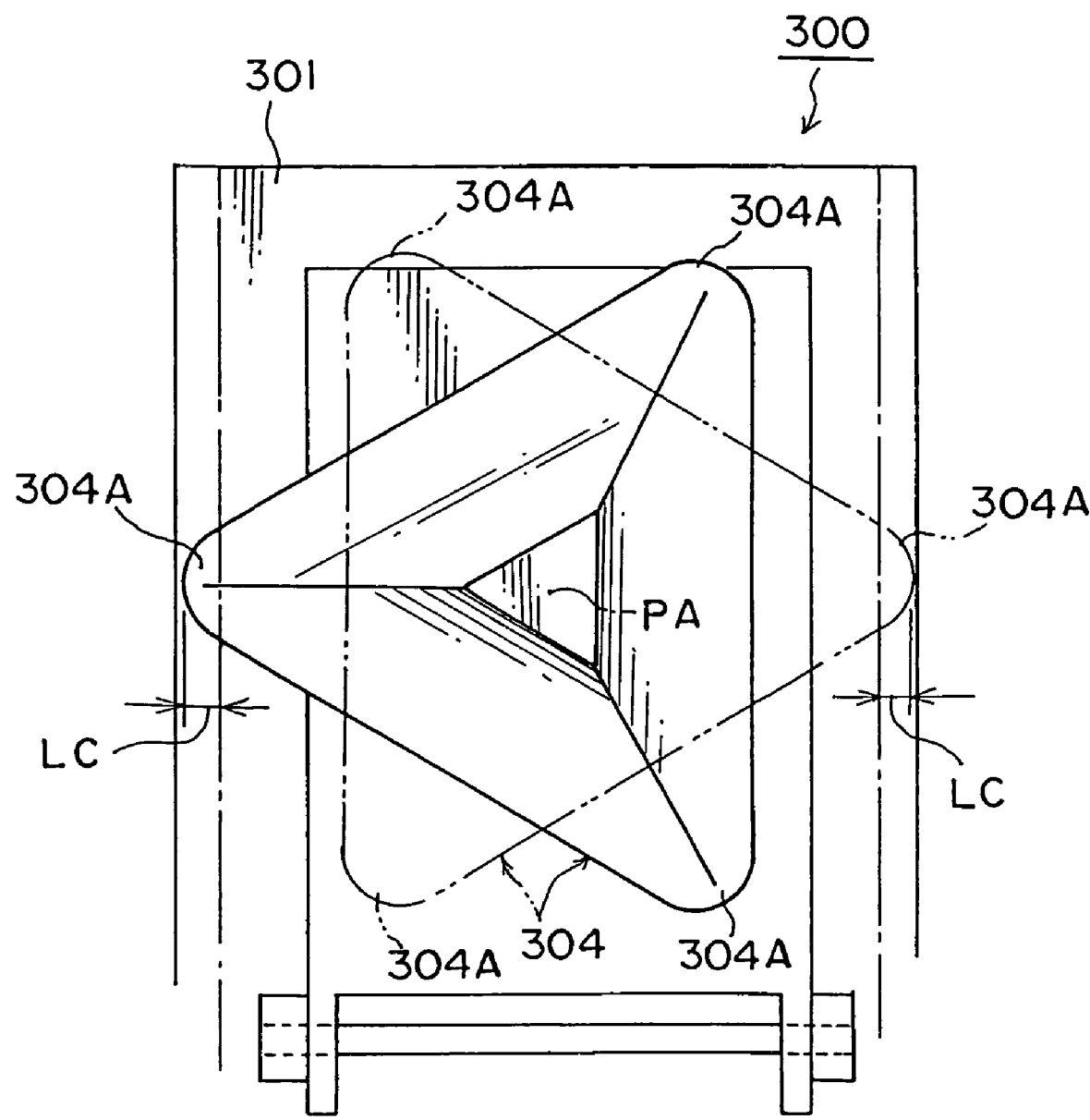
FIG. 60 is an illustrative view that illustrates a state in which the tray is rotated and projected from both sides of a base.

In the present embodiment, during the rotation of the tray 126, the cam gear 140 and the cam apparatus 236 that moves in accordance with the cam gear 140 slide the tray 126 in a direction opposed to a direction in which a solid-angle portion of the supporting portion 128 projects from the initial position at which the supporting portion 128 is positioned at the front surface of the apparatus body (see FIGS. 57 and 58). Namely, in accordance with the present embodiment, since the disk changer 120 is slid in the widthwise direction of the supporting apparatus 230 (i.e., the base 231), the disk changer 120 as the apparatus body can be made more compact than a conventional disk changer (for example, the width of the base plate 231 can be reduced to a total distance of LA+LB shown in FIG. 59).

The present embodiment is structured such that the cam gear 140 and the cam apparatus 236 are connected to each other, and accordingly, they can be synchronized with the timing of the disk change. Namely, in accordance with the present embodiment, when the tray 126 rotates ⅓ (120° rotation), and one adjacent supporting portion 128 comes to the front of the tray 126, the disk changer 120 can be slid in a widthwise direction.

In the present embodiment, the rotation of the tray 126 and the transverse (slide) movement of the disk changer 120 can create a unique combination of movements. Accordingly, for example, if the door leaf is formed by a clear, and visually recognizable material, users can enjoy a unique behavior of the disk changer 120. Since other structures and operational effects are the same as those of the second embodiment of the present invention, a detailed description thereof will be omitted.

Further, in claim 15, the structure in which the entire disk changer moves (slides) with respect to the supporting apparatus may be realized by using another driving means (a motor, an operation lever and the like) via an unillustrated sensor. Further, in the present invention, the above-described second to fourth embodiments of the present invention can be combined arbitrarily and modified.

Fifth Embodiment

Figure 61:
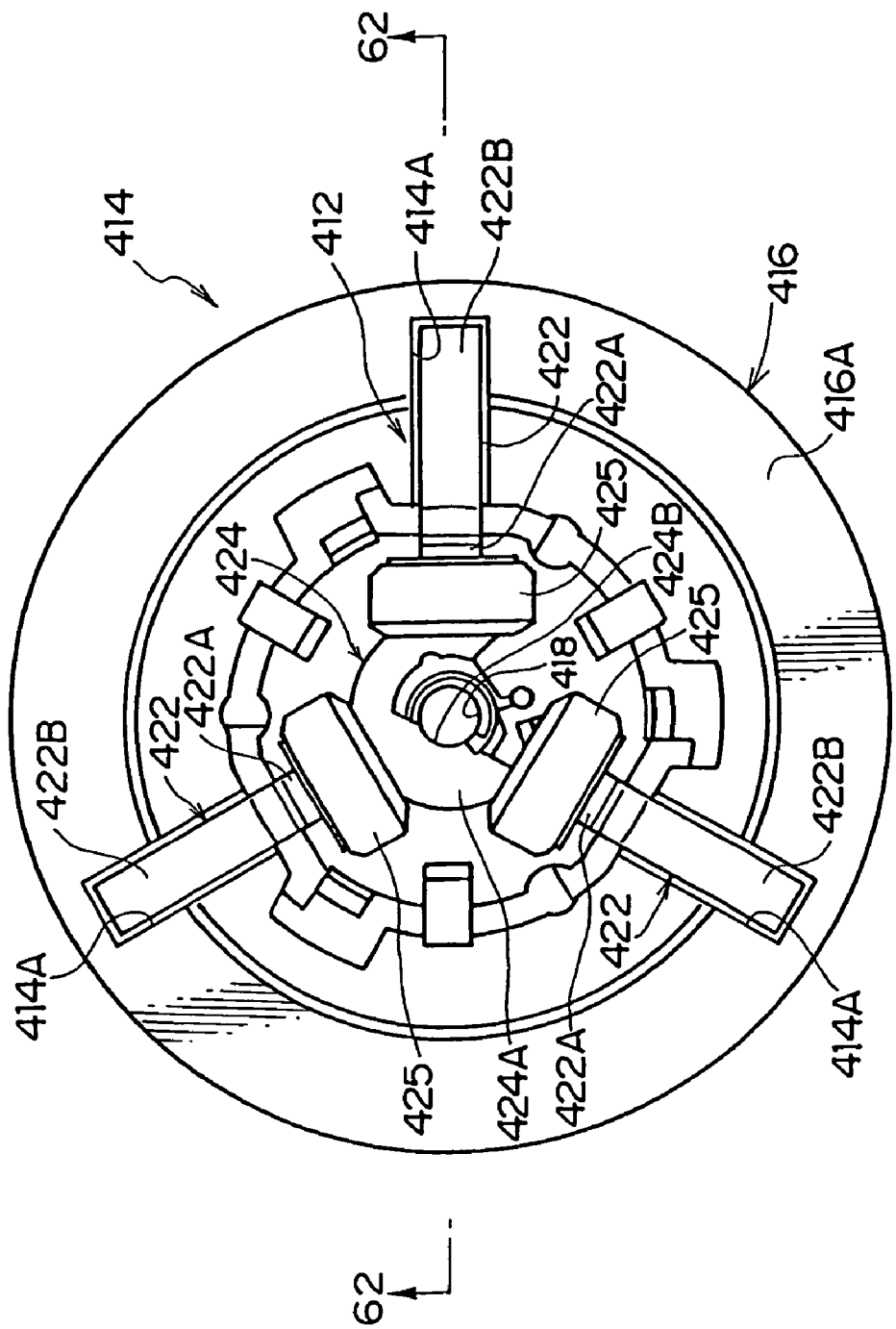
FIG. 61 is a plan view of a disk holding apparatus according to a fifth embodiment of the present invention.
Figure 62:
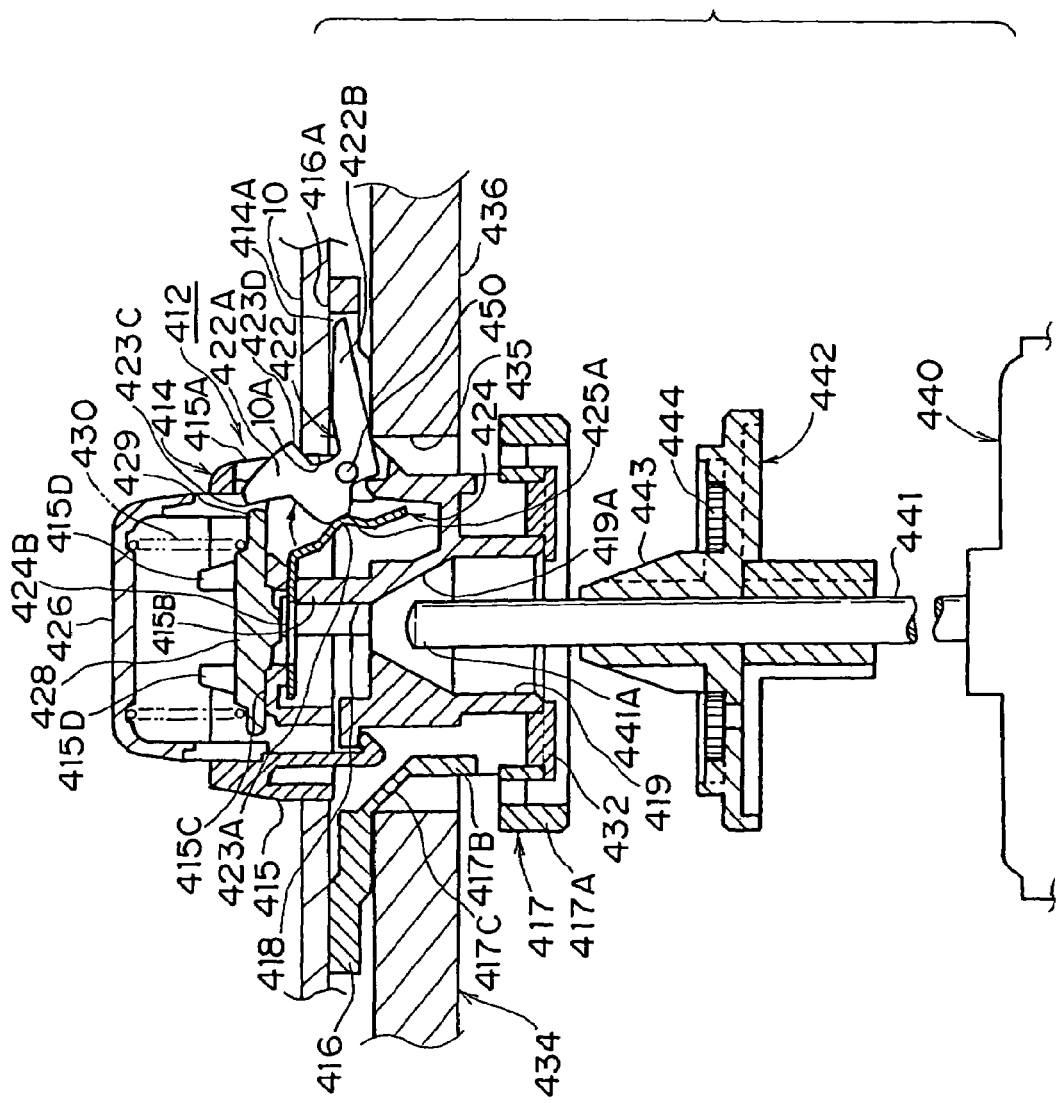
FIG. 62 is a cross sectional view of the disk holding apparatus cut along a line 62—62 in FIG. 61.

With reference to FIGS. 61 to 65, a disk holding apparatus according to the fifth embodiment of the present invention will be explained hereinafter. FIG. 61 shows a plan view of the disk holding apparatus of the present embodiment. FIG. 62 shows a cross sectional view cut along a line 62—62 of FIG. 61. Further, FIG. 61 is a plan view in which an ejection button 426 and a lock member 428 that are shown in FIG. 62 are not disposed.

Rotational Structure for Rotating the Turntable

As shown in FIG. 62, a substantially cylindrical attachment portion 415 into which a central hole 10A of the disk 10 is fitted, a flat shaped mounting portion 416 on which the disk 10 is mounted, and a connecting portion that is connected to a spindle motor 440 as the first drive means are formed integrally with each other at a turntable 414 that is formed by a synthetic resin such as plastic. Further, a taper surface is formed at an outer upper circumferential portion of the attaching portion 415, and the attachment portion 415 has a diameter that is slightly smaller than that of the central hole 10A of the disk 10.

The connecting portion 417 is formed in continuous with the mounting portion 416, and an insertion portion 417B is formed between a lower portion 417A of the connecting portion 417 and the mounting portion 416. The insertion portion 417B has a diameter that is slightly smaller than the lower portion 417A. Further, a taper portion 417C is formed at the insertion portion 417B, tapering from the mounting portion 416 toward the insertion portion 417B. Moreover, a ring-shaped metal plate 432 is mounted to the lower portion 417A of the connecting portion 417.

Figure 64:
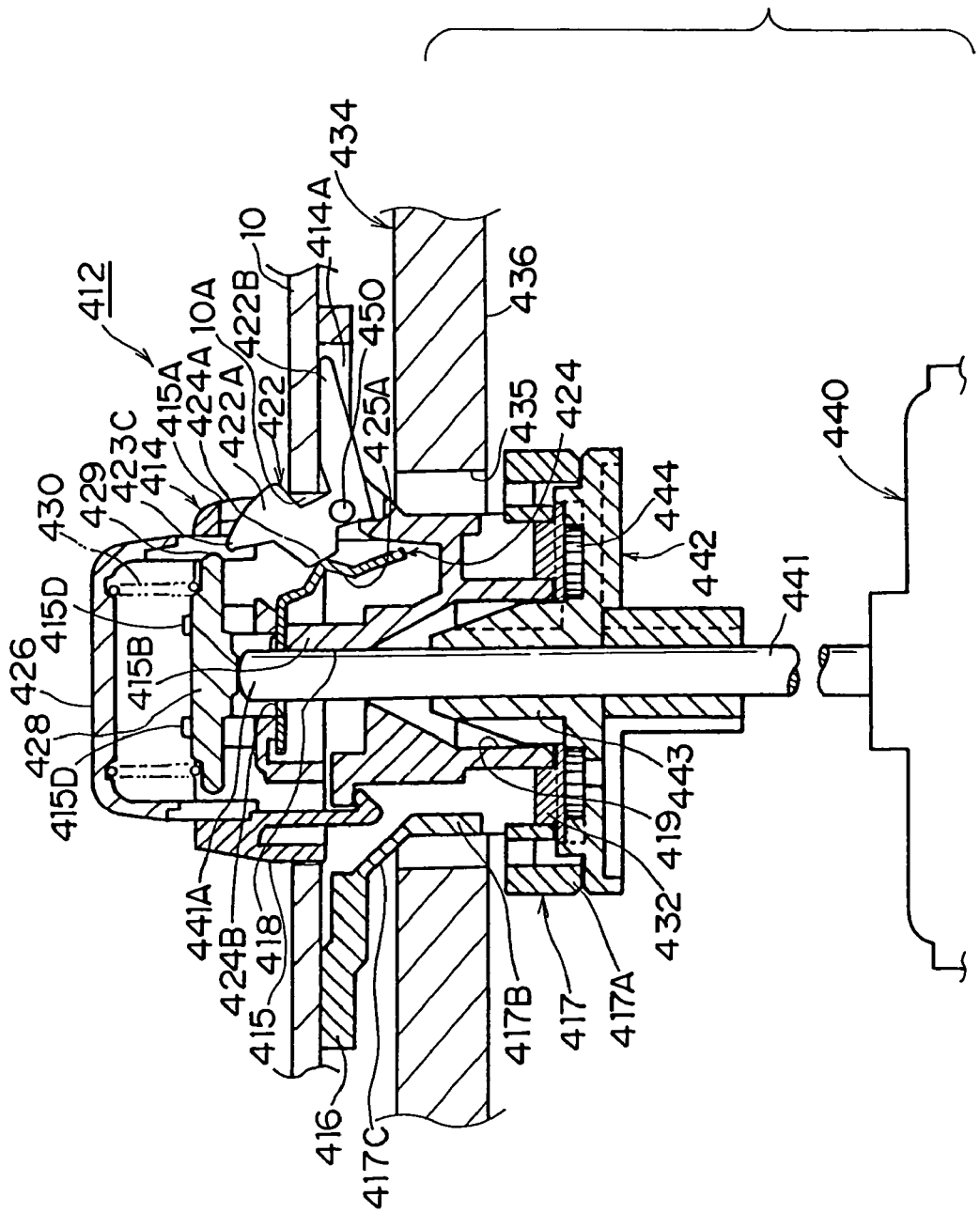
FIG. 64 is a cross sectional view of the disk holding apparatus in a play mode or a stop mode in which connecting members of the turntable and a spindle shown in FIG. 62 are connected to each other to lift the turntable from the supporting portion thereof.

The insertion portion 417B of the turntable 414 is inserted into a hole 435 of a tray 434. The hole 435 has substantial the same diameter as the maximum diameter of the taper portion 417C. In a connection state in which the spindle motor 440 is connected to the turntable 414 (a state shown in FIG. 64 corresponding to the play or stop mode), as shown in FIG. 64, the spindle motor 440 is provided such that the turntable 414 floats on the tray 434.

In this connection state, in order not to prevent damaging the rotation of the turntable 414, the turntable 414 and tray 434 are inhibited from contacting with each other. When the spindle motor 440 rotates, the turntable 414 rotates via the spindle 20.

A plurality of the supporting portions 436 (for example, three in the present embodiment) is disposed at the tray 434 of the present embodiment. The turntables 414 are placed respectively on these supporting portions 436. Further, the tray 434 is formed into a substantially triangle pyramid configuration by inclining each of the supporting portion 436, and is able to rotate. Further, the spindle motor 440 is disposed at only predetermined position.

An insertion hole 418 is formed at the center of the turntable 414, and a spindle 441 of the spindle motor 440 is inserted thereinto. Further, a connection concave portion 419 in continuous with the insertion hole 418 is formed at the connection portion 417. The connection concave portion 419 has a diameter that is larger than that of the insertion hole 418, and a taper portion 419A is formed at the insertion hole 418 side of the connection concave portion 419 and is tapered toward the insertion hole 418.

A connection member 442 is disposed substantially at a center of the spindle 441. A connection portion 443 that is formed at the tip end of the connection member 442 is formed substantially in conformity with a configuration of the connection concave portion 419 of the turntable 414. Namely, the maximum diameter of the connection portion 443 is slightly smaller than that of the maximum hole diameter of the connection concave portion 419. In other words, the connection portion 443 can be inserted into the connection concave portion 419, and the connection portion 443 is prevented from being caught at an inner wall of the connection concave portion 419.

A ring shaped magnet 444 is mounted at a portion of the connection portion 443 corresponding to a metal plate 432 disposed at the connection portion 417. As shown in FIG. 64, in the state in which the spindle motor 440 is connected to the turntable 414, the metal plate 432 magnetically attracting the metal plate 432 integrates the connecting member 442 and the turntable 414 with each other.

As shown in FIG. 64, in the state in which the spindle motor 440 is connected to the turntable 414, a tip end 441A of the spindle 441 abuts a locking member 428 that will be described later, and then lifts the lock member 428. Accordingly, the locking member 428 is separated from the hook lever 422, thus entering a lock release state.

In the present embodiment, the spindle 441 serves as release means for releasing the locking member 428 as well as the connection portion. Further, the release means or the connection portion can be provided not only at the spindle 441 but also at the spindle motor 440.

The spindle motor 440 is mounted on an unillustrated base. When this base moves, the spindle 441 is inserted into the connection concave portion 419 and the insertion hole 418 of the turntable 414 or pulled out therefrom.

Structure of the Disk Holding Apparatus

As shown in FIG. 62, a disk holding apparatus 412 comprises a hook lever 422 as engaging means, an inverting coil 424 as urging means, an eject button 426, a lock member 428 as control means, and a coil spring 430 disposed between the eject button 426 and the lock member 428. The disk holding apparatus 412 is disposed at the turntable 414.

The hook lever 422 is plate-shaped, and comprises a lock portion 422A and the eject portion 422B formed thereon. The hook lever 422 is rotatably mounted to the turntable 414 via a pin 450 that is inserted between the lock portion 422A and the eject portion 422B.

As shown in FIG. 61, a plurality of holes 414A (three in the present embodiment) is formed at the turntable 414 in conformity with the attachment portion 415 and the mounting portion 416 to open the lock portion 422A or the eject portion 422B of the hook lever 422. These holes 414A are separated from one another within a desired angle interval (angle interval of 120° in the present embodiment).

Figure 65:
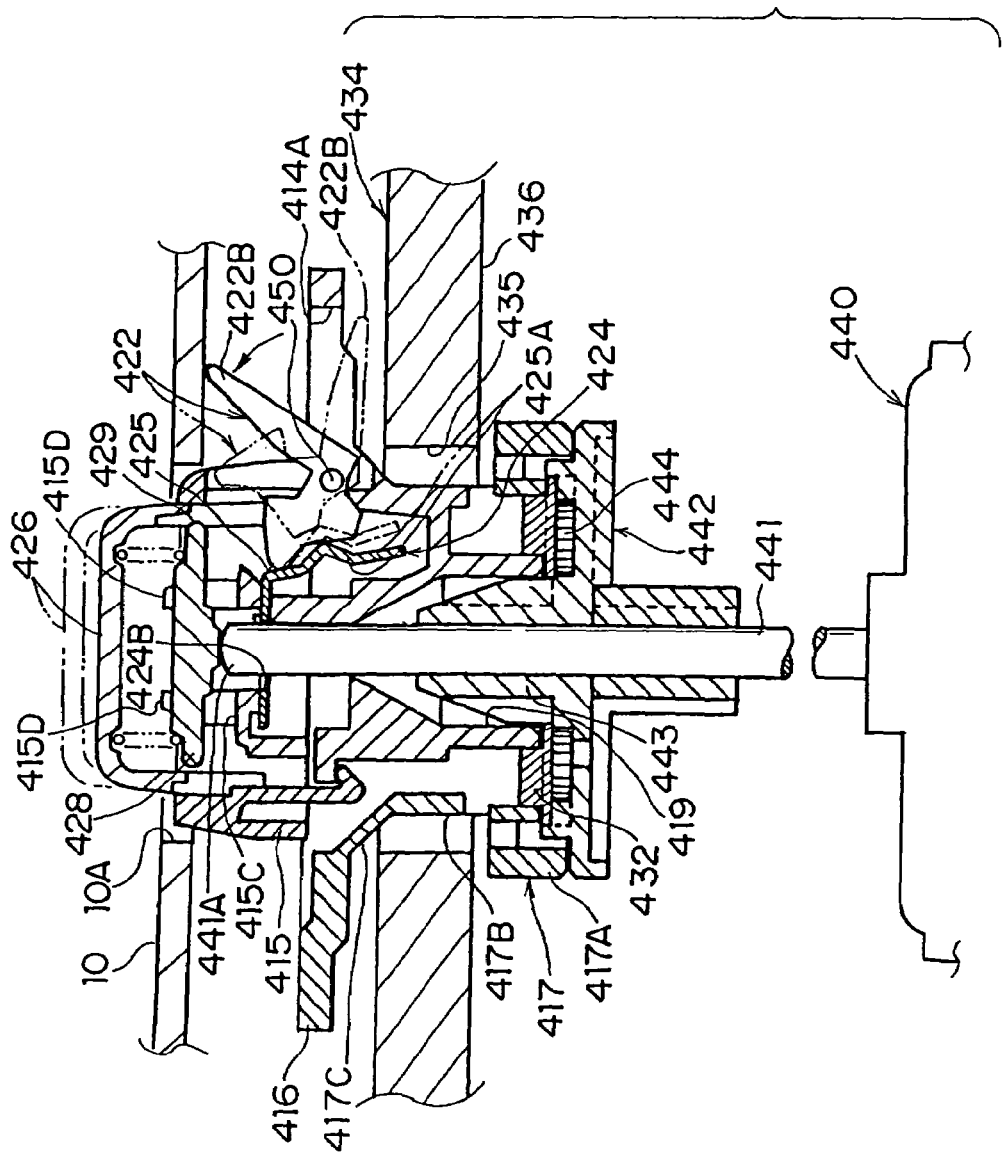
FIG. 65 is a cross sectional view of the disk holding apparatus in the state in which a take-out button shown in FIG. 64 is pressed.

As shown in FIG. 62 or FIG. 65, the lock portion 422A or the eject portion 422B is structured so as to protrude from each of the holes 414A.

In order to position the disk 10 at the turntable 414, a lock surface 423D of the lock portion 422A protruding from the hole 414A presses the disk 10 onto the mounting surface 416A. Further, as shown in FIG. 65, when the disk 10 is ejected (pushed out) from the turntable 414, the eject portion 422B protruding from the hole 414A is structured to press the disk 10 in a direction in which the disk 10 is separated from the mounting surface 416A.

The inverting coil 424 comprises a substantially flat-shaped mounting portion 424A, and spring portions 425 that are formed in conformity with the mounting portion 424A. Further, the inverting coil 424 is formed as a one-piece component. The mounting portion 424A is mounted on the base 415B of the attachment portion 415, and a notch 424B is formed at a portion corresponding to the insertion hole 418 (see FIG. 6). Namely, as shown in FIGS. 64 and 65, the tip end 441A of the spindle 441 is inserted into the insertion hole 418 and the notch 424B, and thereby abuts to the lock member 428.

The spring portions 425 are respectively disposed to correspond to the hook levers 422 (see FIG. 61). As shown in FIG. 62, a tilt portion 425A is formed at a substantially central portion of each of the spring portions 425. Further, the tilt portion 425A is formed into a substantially V-shaped cross sectional configuration. Other than the substantially V-shaped cross sectional configuration, the tilt portion 425A can be formed into an arc shape. However, In the present embodiment, the tilt portion 425A is formed into the substantially V-shaped cross sectional configuration in order to provide a sense of clicking.

The tilt portion 425A is disposed so as to substantially correspond to a pin 450 of the hook lever 422. The spring portions 425 are formed so as to respectively abut the abutting surfaces 423A to 423C of the lock portion 422B. Namely, in a first abutting state in which the tilt portion 425A of the spring portion 425 abuts the abutting surface 423A of the lock portion 422B, a position at which the tilt portion 425A and the abutting surface 423A abut to each other is higher than the central position of the pin 450. Accordingly, the spring portion 425 urges the hook lever 422 in a clockwise direction (in directions of arrows of FIGS. 62 to 64).

In a second abutting state in which the tilt portion 425A of the spring portion 425 abuts the abutting surface 423A of the lock portion 422B (the state shown by solid line in FIG. 65), a position at which the tilt portion 425A and the abutting surface 423B abut to each other is lower than the central position of the pin 450. Accordingly, the spring portion 425 urges the hook lever 422 in a counterclockwise direction (direction of the arrow in FIG. 65).

In the second abutting state, the abutting surface 423C abuts the connecting portion 425. Namely, a direction in which the hook lever 422 is urged can change in accordance with a position at which the hook lever 422 abuts the spring portion 425.

A substantially disk-shaped lock member 428 is slidably disposed along a plurality of guide portions 415D (two in the present embodiment) protruding from the base surface 415C. Namely, the lock member 428 is formed so as to slide along the shaft center of the turntable 414.

As shown in FIG. 62, a lock surface (outer circumferential surface) of the lock member 428 is formed so as to face the abutting surface 423C of the hook lever 422. It is structured that a small amount of clearance (gap or play) is formed between the lock surface 429 and the abutting surface 423C of the hook lever 422.

The lock member 428 is urged to the base surface 415C by the coil spring 430, while the ejection button 426 is urged by the coil spring 430 in a direction the button 425 protrudes from the attachment portion 415.

The ejection button 426 is slidably disposed along the shaft center of the turntable 414. An unillustrated stopper is disposed at the ejection button 426 to suppress the ejection button 426 from falling off from the turntable 414, and as shown by a solid line in FIG. 65, an unillustrated press portion is disposed to forcibly rotate the hook lever 422 in a counterclockwise direction. Namely, the press portion presses a portion in the vicinity of the abutting portion 423C of the hook lever 422, and then rotates the hook lever 422.

An operation of the present embodiment will be explained. First, a case will be explained in which an arbitrary disk 10 is attached to the turntable 414. In this case, in the stop mode (the state shown in FIG. 65), the disk 10 is mounted on the turntable 414 of a desirable supporting portion 436.

As shown in FIG. 65, the stop mode is in a state in which the the connection portion 417 of the turntable 414 and the connecting member 42 of the spindle 441 are connected to each other. Therefore, the tip end 441A of the spindle 441 lifts the lock member 428 from the base surface 415C to separate the lock surface 429 of the lock member 428 from the hook lever 422, thus entering a lock release state.

In the above-described connection state, since the hook lever 422 is in the state shown by a solid line or an imaginary line in FIG. 65, the disk 10 abutting the lock portion 422A or the eject portion 422B of the hook lever 422 rotates the hook lever 422.

As shown in FIG. 64, since the lock surface 423D protrudes from the outer circumferential surface 415A of the mounting portion 415, and the disk 10 is pressed toward the mounting surface 416A (toward a lower portion in FIG. 62), the disk 10 being attached is held by the mounting surface 416A of the turntable 470. Further, FIG. 64 shows a lay mode in which the turntable 414 floats on the supporting portion 436.

When the tray 434 is rotated during the disk change or in the state in which the disk 10is attached to the turntable 470, the connection member 442 is separated from the connection portion 417. Namely, as shown in FIG. 632, since the tip end 441A of the spindle 441 comes out from the insertion hole 418, the lock member 428 is urged to he base surface 415C by the urging force of the coil spring 430, and abuts the base surface 415C.

For this reason in this state (in the stop mode or the play mode in which the connection member 442 of the spindle 441 is connected to the turntable 414), the lock surface 429 of the lock member 428 faces the abutting surface 423C of the hook lever 422, and enters in a lock state for controlling unexpected rotation of the hook lever 422. Further, it is not shown: however, the tray 434 rotates in the state the spindle 441 is completely separated from the turntable 414.

Figure 63:
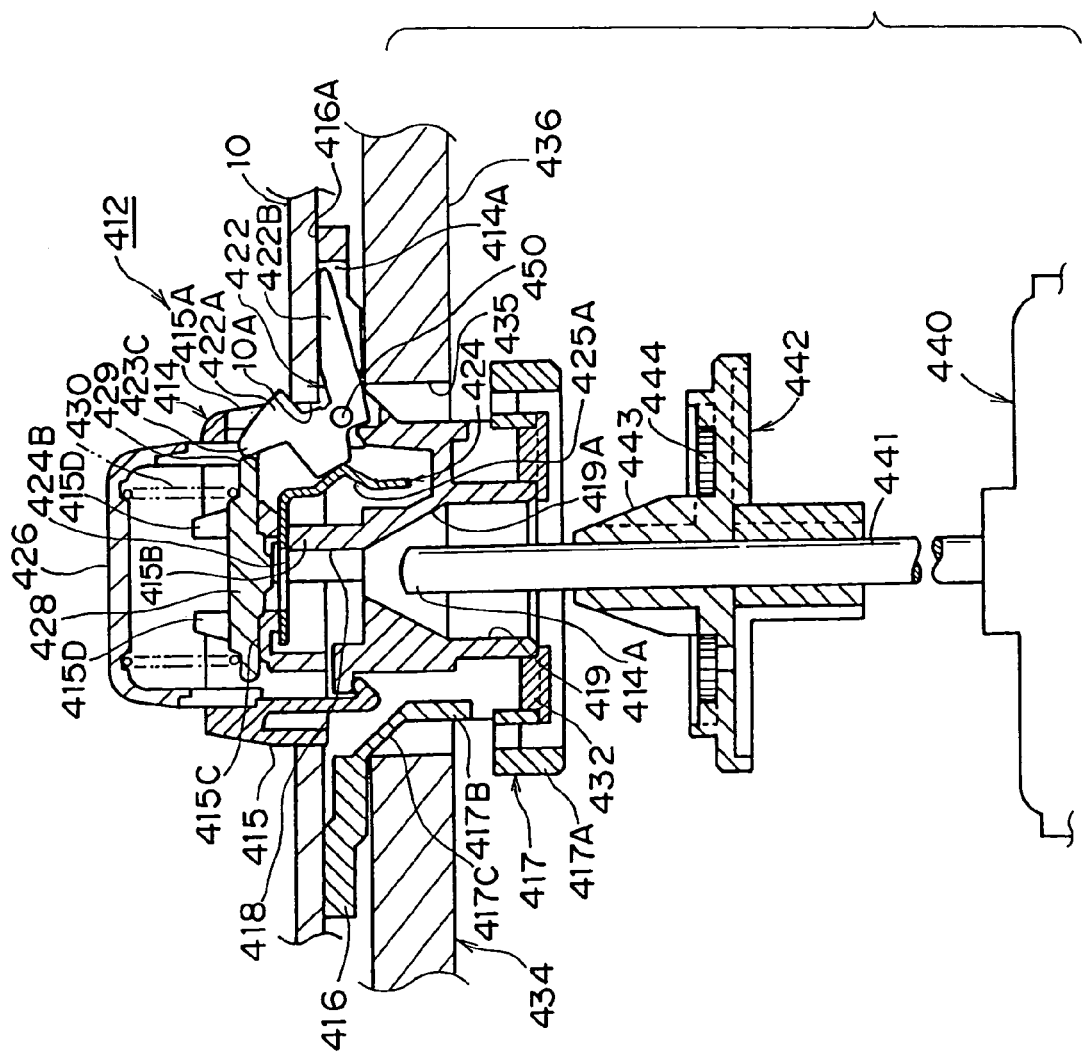
FIG. 63 is a cross sectional view of the disk holding apparatus whose hook lever and lock member shown in FIG. 62 abut with each other.

On the other hand, FIG. 62 shows a state in which when unexpected force (load) is applied inwardly to the disk 10, as shown in FIG. 63, the abutting surface 423C of the hook lever 422 abuts the lock surface 429 of the lock member 428, and hold the lock surface 423D of the hook lever 422 so as to face the disk 10.

In accordance with the present embodiment, a shock is applied to the disk apparatus body, the disk 10 is not easily ejected from the turntable 414, whereby the disk 10 can reliably be held at the turntable. Particularly in such a structure as in the present embodiment in which the tray 434 whose supporting portion 436 is inclined and which is rotated, it is essential to prevent the disk 10 attached to the turntable 414 from falling off from the turntable 414.

In the stop mode (the state shown in FIG. 65), as shown in FIG. 65, when the ejection button 426 is pressed, the hook lever 422 is forcibly rotated in a counterclockwise direction so that the eject portion 422B ejects the disk 10 from the mounting surface 416A. Namely, as a result, the disk 10 can easily be ejected from the turntable 414.

The aforementioned embodiment is an example in which the spindle 441 is used as releasing means according to claim 16. However, in the invention according to claim 16, a button that s located at the upper portion of a turntable can be used as releasing means. Namely, the invention according to claim 17 can be applied to an apparatus of one type in which a turntable and a spindle motor can be connected to each other. However, in the same manner as this type, the invention according to claim 17 can be applied to an apparatus of another type in which a spindle is fixed to a turntable. In this case, in accordance with the operation of the button, the hook lever can be used to eject the disk from the turntable. In the same manner as this, only during attachment/detachment of a disk, the present invention can be structured such that the control means can be withdrawn from the engaging means.

Sixth Embodiment

Figure 66:
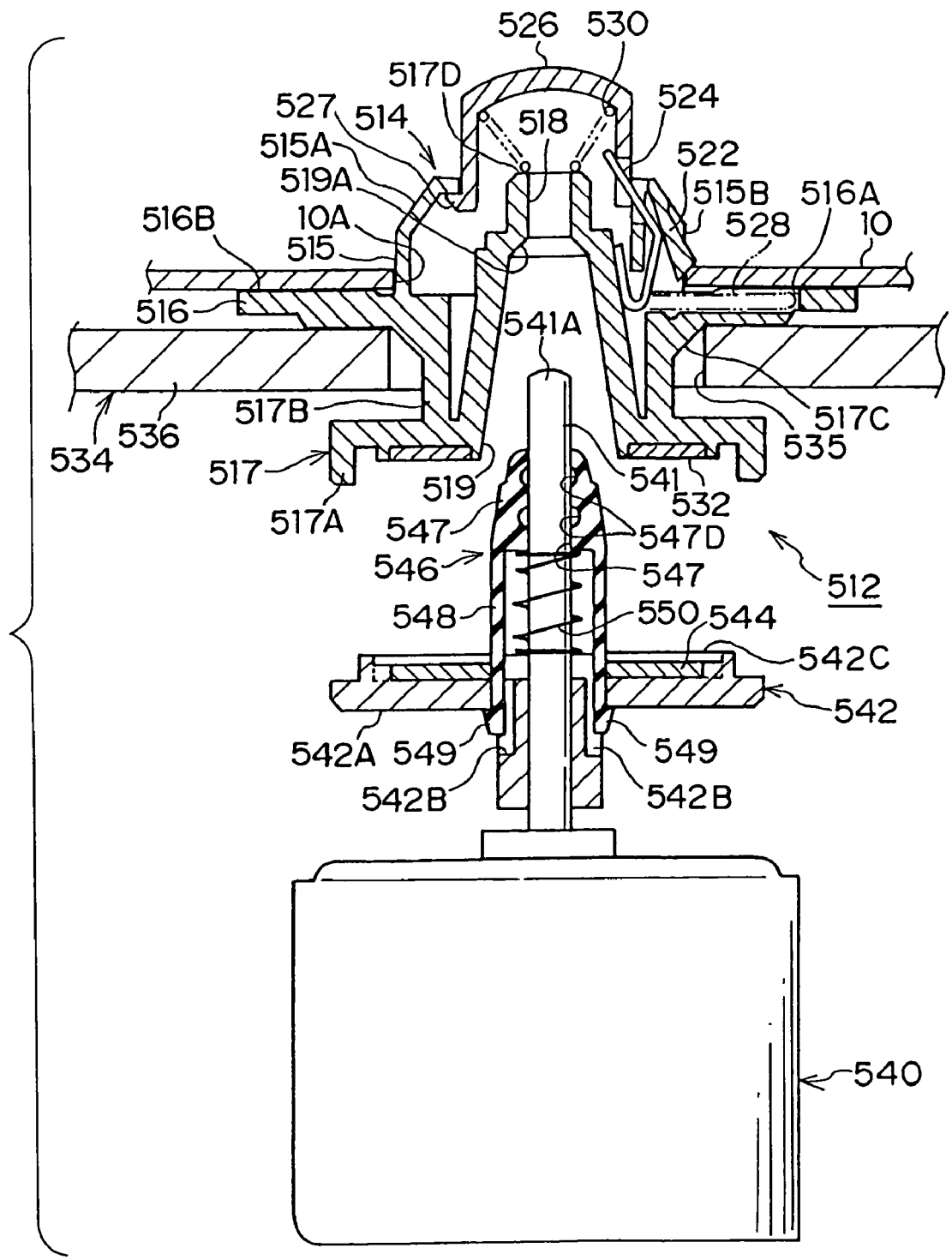
FIG. 66 is a cross sectional view of a main portion of a disk holding apparatus according to a fifth embodiment of the present invention.
Figure 67:
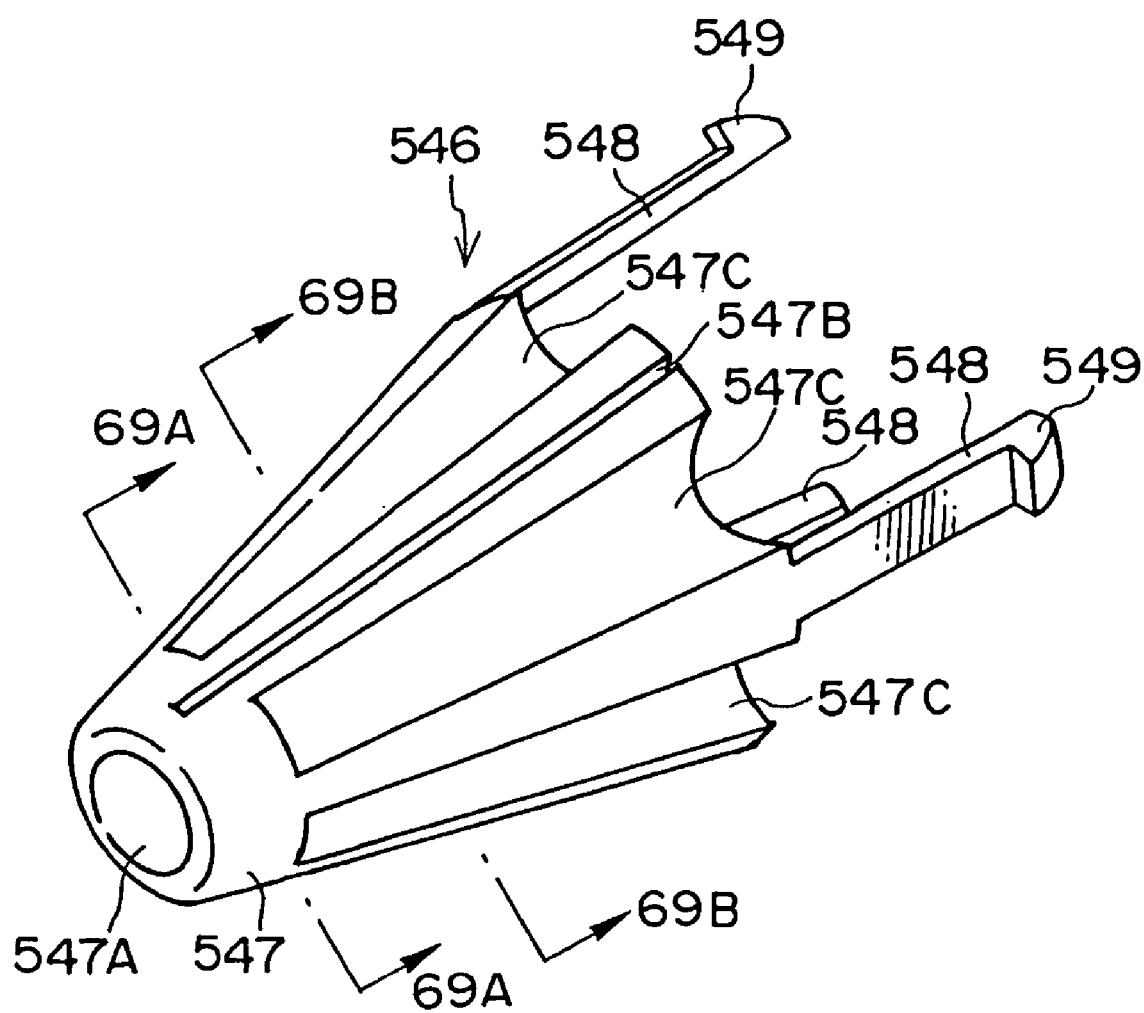
FIG. 67 is a perspective view of a collar of the disk holding apparatus shown in FIG. 66.
Figure 68:
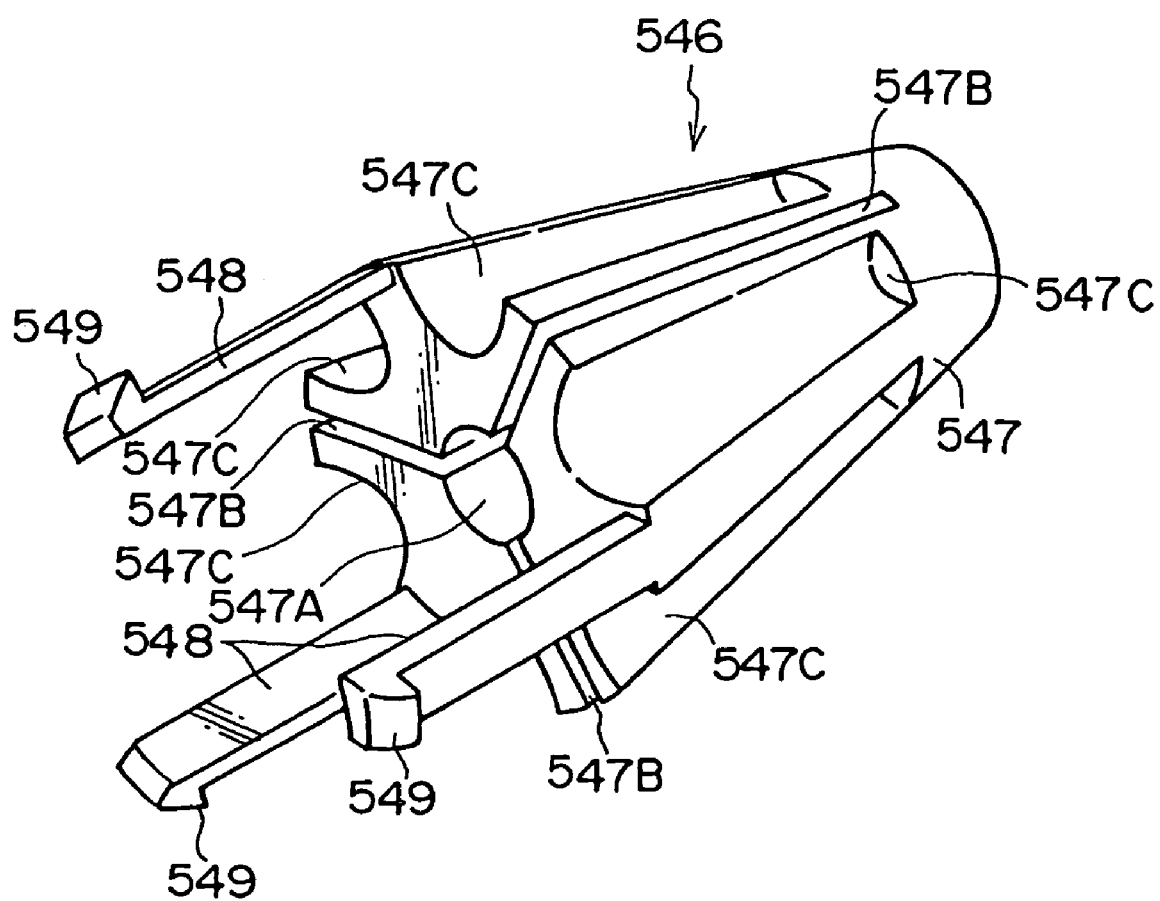
FIG. 68 is a perspective view of the collar of the disk holding apparatus shown in FIG. 66.

With respect to FIGS. 66 to 72, a description of a disk holding apparatus according to a sixth embodiment of the present invention will be made hereinafter. FIG. 66 shows a cross sectional view of a main portion of the disk holding apparatus according to the present embodiment. And FIGS. 67 and 68 show a perspective view of a collar of the main portion of the disk holding apparatus shown in FIG. 66.

Structure of the Disk Holding Apparatus

As shown in FIG. 66, a disk holding apparatus 512 comprises a turntable 514 that is disposed at a supporting portion 536 of a tray 534, and a spindle motor 540 as first driving means. Further, a disk holding apparatus 512 according to the present embodiment is an apparatus of a type to allow the spindle motor 540 to be connected to the turntable 514.

A substantially cylindrical attaching portion 515 into which a central hole 10A of the disk 10 is fitted, a flat-shaped mounting portion 516 for mounting the disk 10 thereon, and a connecting portion 517 as a third connection portion which is connected to the spindle motor 514 are integrally formed with one another at the turntable 514. Further, a taper surface 515A is formed at an upper portion of an outer circumferential surface 515B of the attaching portion 515. The outer circumferential surface 515B of the attaching portion 515 has a diameter that is slightly smaller than that of the central hole 10A of the disk 10.

The connection portion 517 is formed in continuous with the mounting portion 516, and an insertion portion 517B is formed between a lower portion 517A of the connection portion 517 and the mounting portion 516. The insertion portion 517B has a diameter that is smaller than that of the lower portion 517A. Further, a taper portion 517C is formed at the insertion portion 517B so as to taper from the mounting portion 516 to the insertion portion 517B. Moreover, a ring shaped metal plate 532 is mounted to the lower portion 517A of the connection portion 517.

Figure 71:
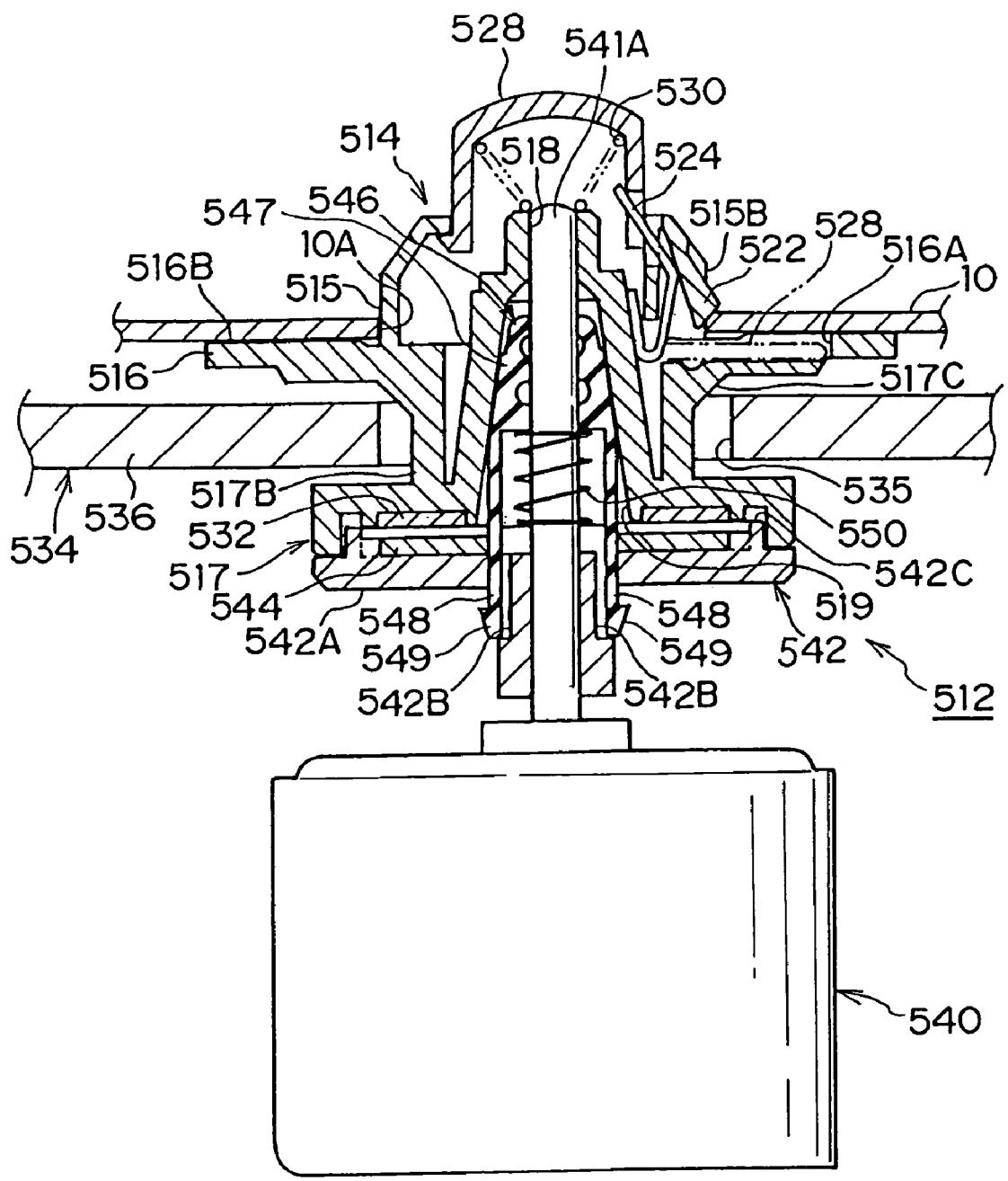
FIG. 71 is a cross sectional view of a state in which connecting members of a turntable and a spindle of the disk holding apparatus shown in FIG. 66 are connected to each other.

The insertion portion 517B of the turntable 514 is inserted into a hole 5353 of the tray 534. The hole 535 has substantially the same diameter as a maximum diameter of the taper portion 517C. Then, in the state in which the spindle motor 540 is connected to the turntable 514 (the state that is shown in FIG. 71 and corresponds to the play or stop mode), as shown in FIG. 71, the spindle motor 540 is structured to allow the turntable 514 to float on the tray 534.

In this connection state, in order to prevent damaging the rotation of the turntable 514, the turntable 514 and the tray 534 do not contact with each other. When the spindle motor 540 rotates, the turntable 514 rotates via the spindle 20.

A plurality (e.g. three) of supporting portions 536 is disposed at the tray 534 of the present embodiment, and the turntables 514 are respectively placed on these supporting portions 536. Further, each of the supporting portions 536 inclines to thereby form the tray 534 into a substantially triangular pyramid configuration, and make the tray 534 rotatable. Moreover, the spindle motor 540 is disposed at only predetermined position.

An insertion hole 518 is formed at the connection portion 517 inside the attaching portion 515 at a position corresponding to the attaching portion 515. A spindle 541 as a fourth connection portion of the spindle motor 540 is inserted into the insertion hole 518. Further, a connection concave portion 519 is formed at the connection portion 517 in continuous with the insertion hole 518. The connection concave portion 519 has a diameter that is larger than that of the insertion hole 518, and a taper portion 519A tapering toward the insertion hole 518 is formed at the insertion hole 518 side of the connection concave portion 519.

A ring-shaped connection member 542 having a substantially T-shaped cross-section is fixed to the spindle 541 at a substantially central portion thereof. A ring-shaped magnet 544 is mounted to the connection member 542 at a portion corresponding to a metal plate 532 that is disposed at the connection portion 517 thereof.

Figure 72:
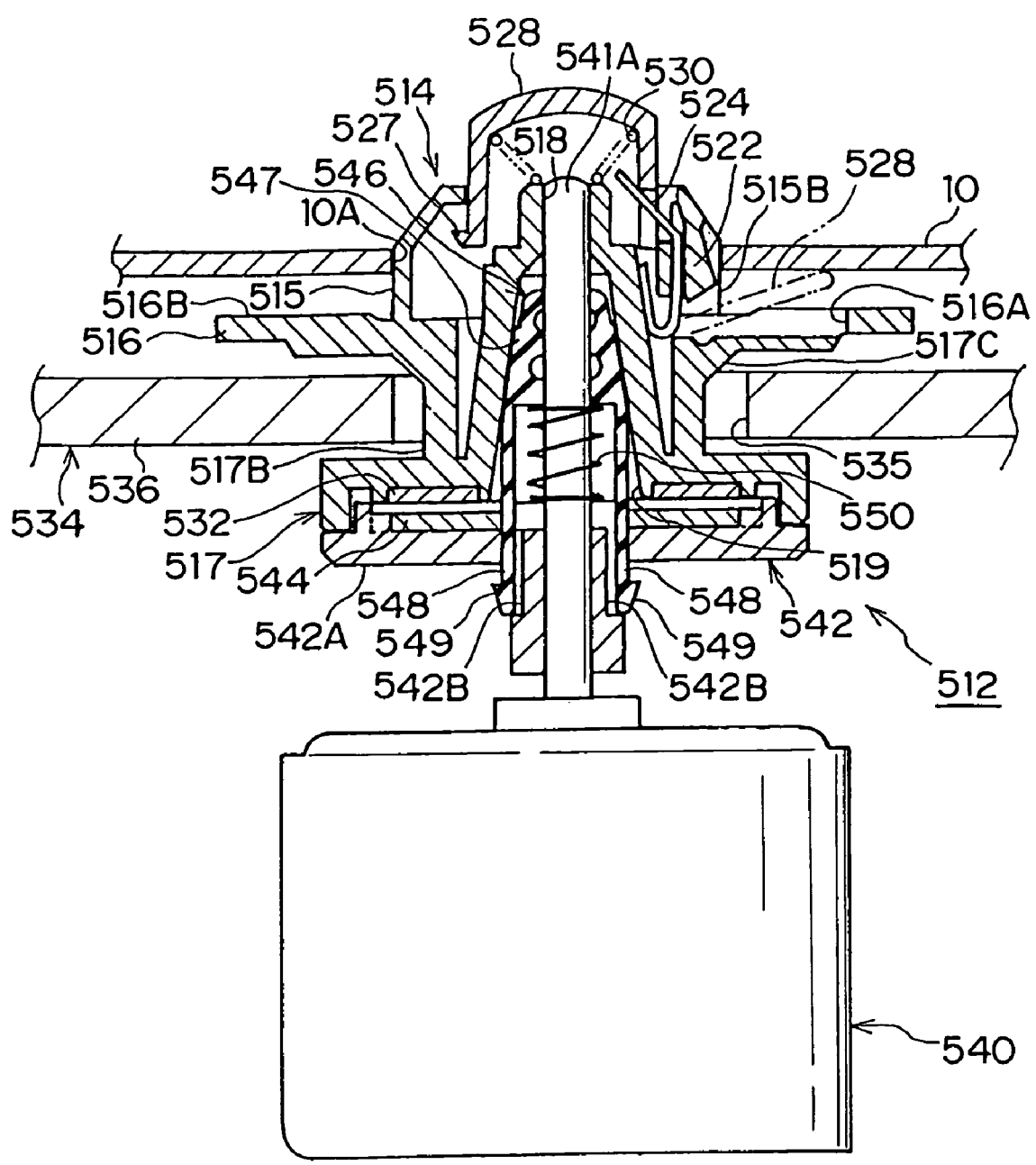
FIG. 72 is a cross sectional view of the disk holding apparatus in the state in which a take-out button is pressed.

As shown in FIGS. 71 and 72, in the state in which the spindle motor 540 is connected to the turntable 514, the magnet 544 magnetically attracting the metal plate 532 integrates the connection member 542 and the turntable 514 with each other.

The turntable 514 comprises a hook lever 522 that is disposed rotatably at the attaching portion 515, a spring 524 that always urges the hook lever 522 in an outer direction of the attaching portion 515, and an ejection button that is disposed slidably at an upper portion of the attaching portion 515, and coil springs 530 that are disposed at the ejection button 526 and on an upper surface 517D of the connecting portion 517, and an ejection lever 528 that is shown by an imaginary line.

The ejection lever 528 is disposed inside an elongated hole 516A that is formed at the attaching portion 515, and protrudes from the elongated hole 516A in accordance with the operation of the ejection button 526. Further, the hook lever 522 and the ejection lever 528 are disposed so as to separate from each other at a predetermined angle (120° in the present embodiment).

Figure 70:
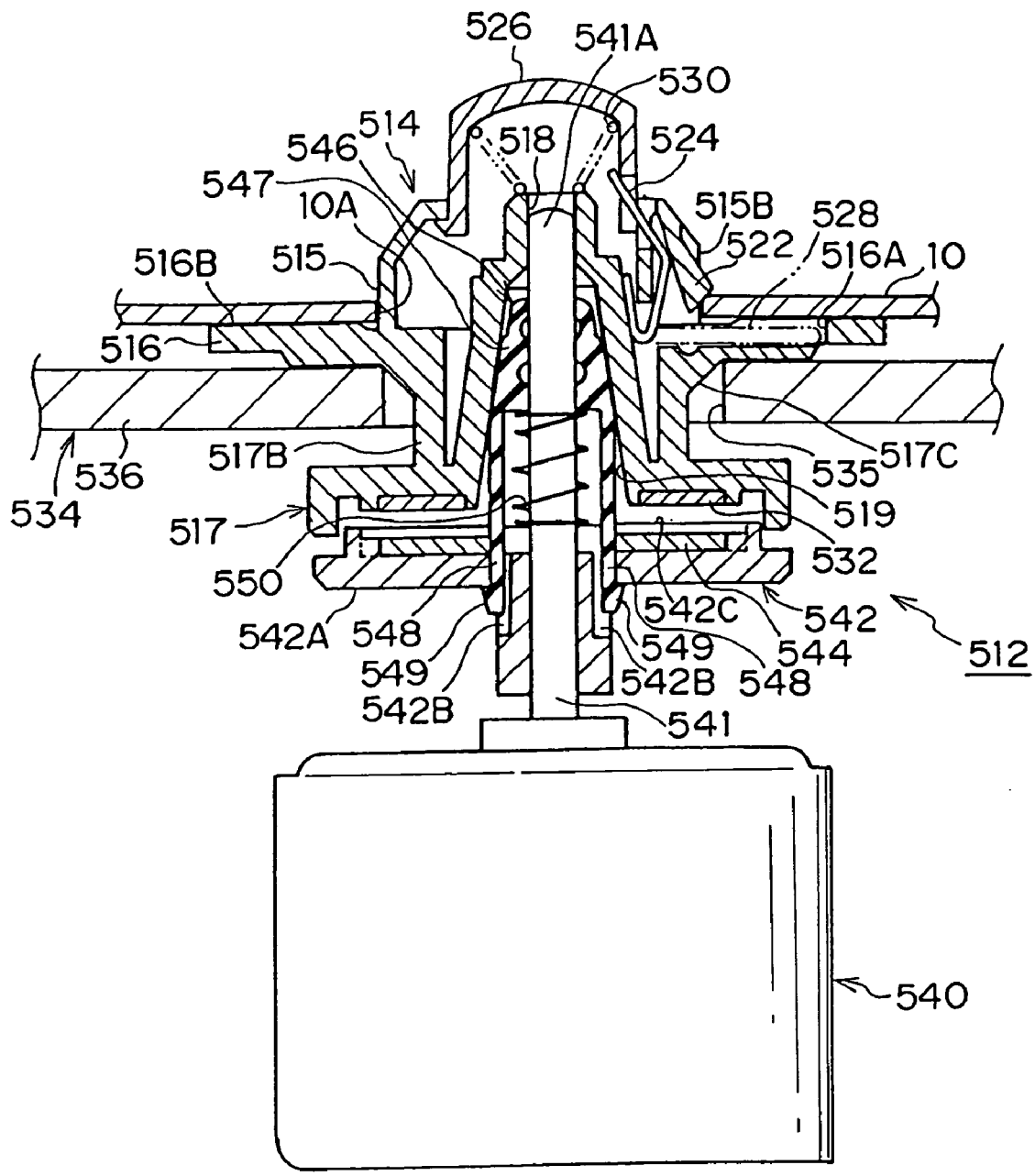
FIG. 70 is a cross sectional view of a state in which the collar of the disk holding apparatus shown in FIG. 66 abuts with a connecting concave portion of a turntable.

As shown in FIGS. 66, 70, and 71, if the disk 10 is positioned at the turntable 514, the hook lever 522 protrudes from the outer circumferential surface 515A of the attaching portion 515, and pressing the disk 10 to the mounting surface 516A side. Further, as shown in FIG. 72, if the disk 10 is ejected from the turntable 514, the ejection lever 528 (shown by an imaginary line) protruding from the elongated hole 516A presses the disk 10 in a direction in which the disk 10 is separated from the mounting surface 516B.

A stopper 527 for suppressing the disk 10 from being removed from the turntable 514 is disposed at the ejection button 526. Further, the ejection button 526 is urged by the coil springs 530 in a direction in which the button 526 protrudes from the attaching portion 515, and during the operation of the ejection button 526, the spring 524 moves inwardly.

Structure of Second Positioning Means

As shown in FIG. 66, the spindle 541 has a collar as the second positioning means that is disposed movably along the shaft center of the spindle 541. The collar is formed by a flexible synthetic resin, and comprises a head portion that is formed into a substantially truncated conical shaped configuration, and a plurality of leg portions (three in the present embodiment) extending from the head portion 547. Further, the leg portions are provided so as to separate from each other at a desired angle (120° in the present embodiment).

A sagittate-shaped hook 549 is formed at the tip end portion of each leg portion 548 so as to protrude outwardly. The hook 549 faces the lower surface 542A of the connection member 542 in the state in which the collar 546 is attached to the spindle 541 and the connection member 542. Namely, the hook 549 is used to suppress the collar 546 from falling off from the connection member 542.

As shown in FIGS. 66 to 69, a hole 547A whose diameter is substantially the same as that of the spindle 541 is formed at the head portion 547 of the collar 546. The collar 546 is symmetric with respect to the axis center of the hole 547A. And when the collar 456 is attached to the spindle 541, the spindle 541 is inserted into the hole 547A of the collar 546.

As shown in FIGS. 67 and 68, a plurality of slits 547B (three in the present embodiment) are formed at the head portion 547 along the axial direction from one end portion to the other end of the head portion 547. The slits 547B are disposed so as to separate from one another at a desired angle (120° in the present embodiment) and interposed between the leg portions 548.

Figure 69A:
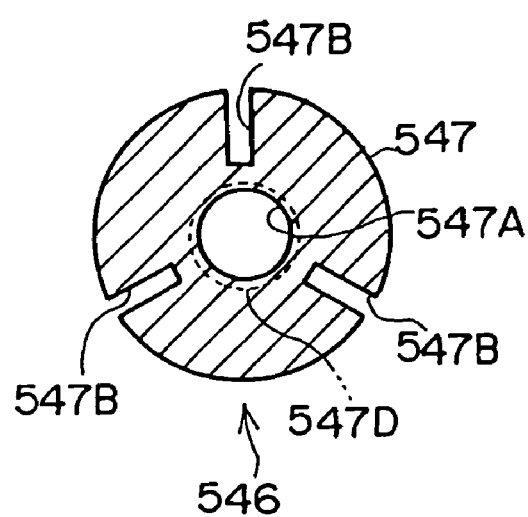
FIG. 69A is a cross sectional view of the collar cut along a line 69A—69A of FIG. 67.
Figure 69B:
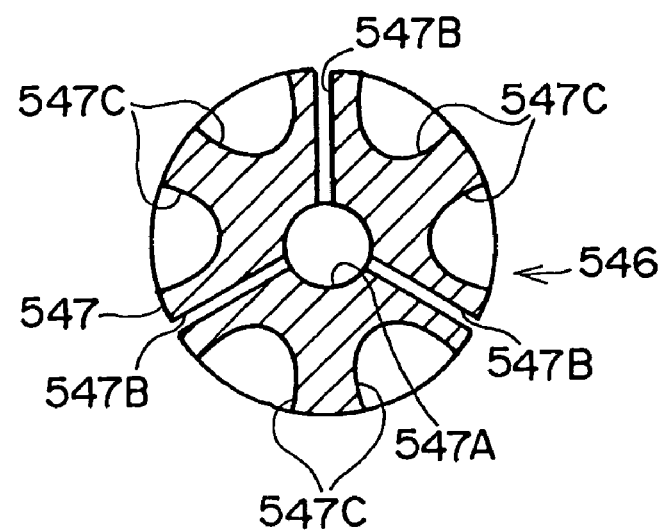
FIG. 69B is a cross sectional view of the collar cut along a line 69B—69B of FIG. 67.

The slits 547B shown in FIG. 69A are formed radially at the head portion 547 from the outer circumferential end portions so as to remain portions closer to the hole 547A. On the other hand, the slits 547B shown in FIG. 69B are formed so as to radially cut through the head portion 547.

Notches 547C are formed at the outer circumferential end portions of the head portion 547, and each of the notches 547C is formed into an arc shaped configuration which becomes larger from a portion close to the center of the head portion 547 to a circumferential portion thereof. Further, the notch 547C is not formed at the tip end of the head portion 547. Further, as shown in FIG. 66, two ring shaped grooves 547D are formed on the inner circumferential surface of the head portion 547 so as to be separated from each other at a predetermined distance.

As shown in FIGS. 70 and 71, when the head portion 547 is inserted into a connection concave portion 519 of the turntable 514, the slits 547A, the notches 547B, and the grooves 547C that are formed at the head portion 547 are used to elastically deform the head portion 547 and keep the outer circumferential surface of the collar 546 and the inner circumferential surface of the connection concave portion 519 in close contact with each other.

The configuration of the head portion 547 of the collar 546 substantially corresponds to that of the connection concave portion 519 of the turntable 514. Namely, the head portion 547 can be inserted into the connection concave portion 519 without being caught at the inner wall of the connection concave portion 519 during the insertion.

As shown in FIG. 66, a coil spring 550 through which the spindle 541 passes is disposed between the head portion 547 of the collar 546 and the connection member 542. Further, grooves 542B are formed in an axial direction of the collar 546 at portions of the connection member 542 corresponding to the leg portions 548 of the collar 546.

The end portions of the leg portions 548 of the collar 546 are fitted into the grooves 542B so that the collar 546 is attached to the spindle 541 and the connection member 542. Further, the collar 546 is always urged toward a tip end 541A of the spindle 541by the urging force of the coil spring 550.

At this point, it is structured that the urging force of the coil spring 550 is smaller than the magnetic force of the magnet 544 at the time when the magnet 544 magnetically attracting the metal plate 532 integrates the connection member 542 and the turntable 514 with each other. Namely, in the state in which the turntable 514 and the connection member 542 (i.e., the spindle motor 540) are connected to each other (the state shown in FIGS. 71 and 72), due to the magnetic integration of the magnet 544 and the metal plate 532 resists the urging force of the coil spring 550, the connection state of the turntable 514 and the connection member 542 can be maintained.

As described above, the hook 549 suppresses the collar 546 from falling off from the connection member 542. Further, the spindle motor 540 is mounted to an unillustrated base, and when this base moves, the spindle 541 is inserted into or withdrawn from the connection concave portion 519 and the insertion hole 518 of the turntable 514.

Subsequently, an operation of the present embodiment will be explained. First, a description of changing the play mode i.e., the separation state shown in FIG. 66 to a connection state shown in FIG. 71 (the stop mode or the play mode) will be made. As shown in FIG. 66, the hook lever 522 is protruded from the outer circumferential surface 515A of the attaching portion 515 to press the disk 10 toward the mounting surface 516A (at the lower portion in FIG. 66), whereby the disk 10 in an attached state to the turntable 514 is held on the mounting surface 516A of the turntable 514.

The spindle motor 540 that is separated from the turntable 514 moves toward the connection concave portion 519 of the turntable 514 that stops at a predetermined position. When the spindle motor 540 moves toward the connection concave portion 519, the spindle 541 and the collar 546 are inserted into the connection concave portion 519, and as shown in FIG. 70, the outer circumferential surface of the collar 546 abuts the inner wall of the connection concave portion 519.

Further, when the spindle motor 540 moves toward the connection concave portion 519, as shown in FIG. 71, the connection member 542 and the collar 546 that are disposed at the spindle 541, and the connection portion 517 of the turntable 514 are connected, thus entering a connection state. Namely, the metal plate 532 is attracted by the magnet 532 due to its magnetic force so that the connection member 452 and the connection portion 517 are connected, and the outer circumferential surface of the collar 546 is urged by the coil spring 550, and pressed toward the inner wall of the connection concave portion 519.

When the outer circumferential surface of the collar 546 is pressed toward the inner wall of the connection concave portion 519, the slits 547A, the notches 547B, and the grooves 547C that are formed at the head portion 547 are used to elastically deform the head portion 547 and keep the outer circumferential surface of the collar 546 and the inner circumferential surface of the connection concave portion 519 in closer contact with each other. Namely, in the present embodiment, the collar 546 and the turntable 514 are kept in close contact with each other, whereby the collar 546 and the turntable 514 are rigidly integrated with each other to remove a rattle occurring between the tip end portion 54 1A of the spindle 541 and the insertion hole 518 of the turntable 514.

In accordance with the present embodiment, the coil spring 550 urges the collar 546 to the connection concave portion 519 to keep the collar 546 and the connection concave portion 519 in close contact with each other, a rattle between the tip end portion 541A of the spindle 541 and the insertion hole 518 of the turntable 514 can be prevented. Namely, in accordance with the present embodiment, even in a structure in which the spindle motor 540 is made connectable to the turntable 514, the collar 456 as the second positioning means is provided between the connection portion 517 of the turntable 514 and the connection member 542 of the spindle motor 540. Accordingly, the collar 546, which also has a damping function, rigidly connects the connection portion 517 and the connection member 542 and fixes them to each other. As a result, the turntable 514 resists vibration.

In accordance with the present embodiment, as shown in FIG. 71, a lower portion 517A of the connection portion 517 and the upper surface 542C of the connection member 542 are tightly connected and fixed to each other. Accordingly, the turntable 514 resists vibration.

In accordance with the present embodiment, since the collar 546 is provided between the connection portion 517 of the turntable 514 and the connection member 542 of the spindle 541, alignment of the turntable 514 and the spindle 541 in a radial direction is carried out. Accordingly, rotational run-out of the turntable during the rotation of the first driving means can be prevented.

In accordance with the present embodiment, since a distance between the pickup (not shown) disposed at the unillustrated disk apparatus and the disk 10 mounted on the turntable 514, and a rotational center of the turntable 514 are maintained constant, a focus servo and a tracking servo can appropriately be controlled.

After the collar 546 has been kept into close contact with the inner wall of the connection concave potion 519, the collar 546 moves toward the spindle motor 540 to resist the urging force of the coil spring 550. Namely, the collar 546 slides along the spindle 541 in the axial direction thereof, and held in a tightly contacted state with the inner wall of the connection concave portion 519 due to the urging force of the coil spring 550. Further, when the collar 546 slides along the spindle 541, the leg portions 548 of the collar 546 slide along the grooves 542B of the connection member 542 and escape.

In the stop mode (the state shown in FIG. 72), as shown in FIG. 72, when the eject button 526 is pressed, the hook lever 522 is rotated in a clockwise direction, and the disk 10 is ejected from the mounting surface 516A by the ejection lever 528 shown by an imaginary line in FIG. 72. Namely, accordingly, the disk 10 is easily detached from the turntable 514. In the state shown in FIG. 72 (the play mode or the stop mode), the turntable 514 floats on the supporting portion 536.

In each of the above-described embodiments of the present invention, the tray 26 is formed into a substantially triangular pyramid configuration. However, the tray 26 can be formed into an arbitrary configuration such as a quadrangular pyramid, a pentagonal pyramid, or a prism for forming a polygon surface. Further, if the disk supporting apparatus is formed into a substantially quadrangular pyramid or a pentagonal pyramid, the number of supporting portions is four or five, whereby a lot of disks (more than four disks) can be disposed on the tray 26. Further, the door leaf 14, the turntable 42, the motor 38 for driving the turntable 42, and the motor 52 for driving the tray 26 can arbitrarily be changed.

Figure 73:
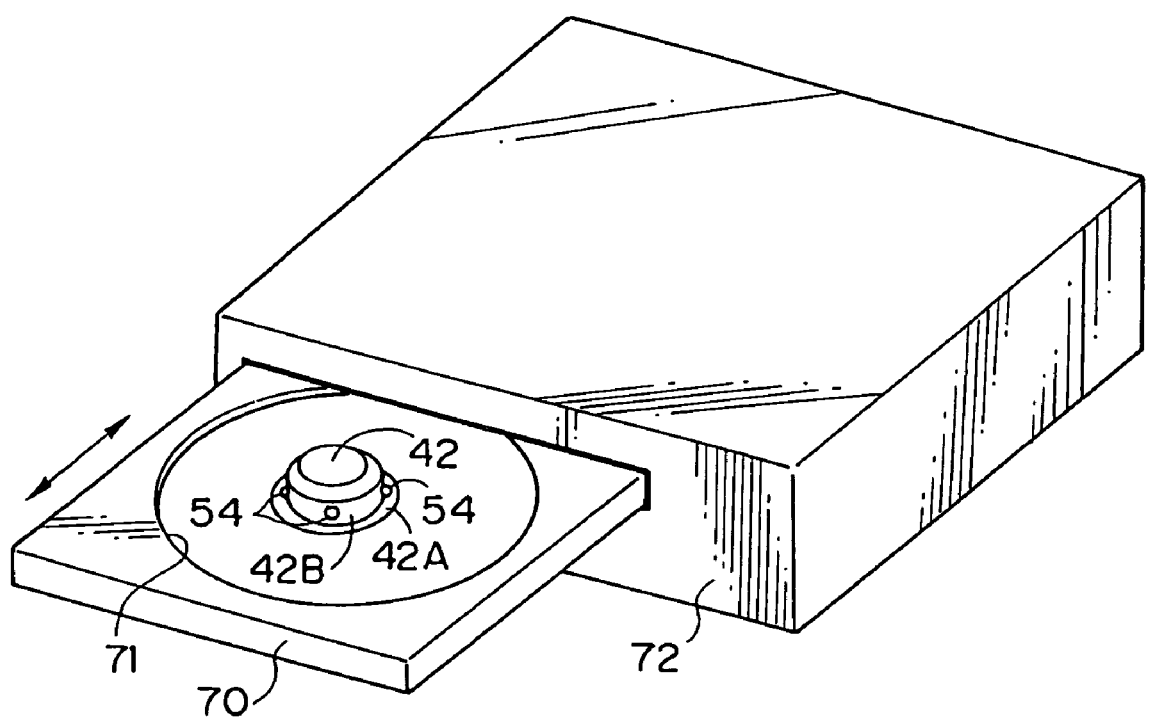
FIG. 73 is a perspective view of a main portion of a disk apparatus according to a variant example of the first embodiment of the present invention.

Regarding claim 1 of the present invention, the tray 26 can be changed into a planar configuration as in a conventional rotation table 492. With reference to FIG. 73, a variant example will be explained in which a tray is formed into a planar configuration. The present embodiment is an example in which the mounting table 70 for constituting a portion of the first moving means is slid along the cabinet 72 of the disk apparatus so that a plate shaped mounting table 70 is ejected from or returned to the cabinet 72. In the present embodiment, portions identical to those in the embodiment shown in FIG. 2 are denoted by the same reference numerals.

A disk shaped concave portion 71 is formed at the mounting table 70. The turntable 42 is disposed rotatably at the center of the concave portion 71. The turntable 42 is structured in the same manner as shown in FIG. 6 and has the ball-chuck mechanism containing the balls 54 therein at the trunk portion 42B thereof. Then, the disk not shown is inserted into the concave portion 71 and attached to the trunk portion 42B through the ball-chuck mechanism.

The motor 38 is movably disposed inside the cabinet 72. As shown in FIG. 6, the motor 38 has the ring member 40 that is mounted to and fixed at a portion corresponding to the turntable 42 when the mounting table 70 is withdrawn into the cabinet 72. As shown in FIG. 6B, when the motor 38 is moved, the ring member 40 is connected to the ring member 43 of the turntable 42, and when the motor 38 is rotated, the turntable 42 is rotated.

The unillustrated slide mechanism for constituting the first moving means is disposed inside the cabinet 72. The slide mechanism slides between a position at which the mounting table 70 is withdrawn into the cabinet 72 to make the turntable 42 and the motor 38 connectable, and a position at which the mounting table 70 is withdrawn from the cabinet 72 so that a disk can be inserted into or ejected from the concave portion 71 of the mounting table 70.

In the present embodiment, the cabinet 72 can be mounted in a horizontal direction as shown in FIG. 73 or can be mounted in a vertical direction. Since other operational effects are the same as those shown in FIG. 2, detailed description thereof will be omitted.

In the above-described embodiments, examples of the connecting means include the ring member 40 and the magnet member 41 which are connected to the motor 38, and the ring member 43 which is connected to the turntable 42. However, as long as the turntable and the motor are held by them and connected to each other, other connecting means can be used.

The connecting portion of the present invention can be structured inversely to the structures of the above-described embodiments (i.e., the ring member 40, the hole 56 of the turntable 42 and the like). For example, the connecting portion may be structured such that a hole is formed on the ring member 40 and a protruding portion corresponding to this hole is provided at a turntable, and the protruding portion is positioned by a plate spring provided at the hole and a reference surface.

The disk according to the present invention may include a so-called mini-disk, a compact disk, a digital video disk (DVD) and the like. Further, the disk apparatus of the present invention can be applied to a personal computer comprising an electronic apparatus such as a disk apparatus, other than a component stereo apparatus. Further, the disk apparatus to which the disk holding apparatus according to the present invention is applied can be used for a disk changer, a portable disk player, and the like.

EFFECTS OF THE INVENTION

As described above, in accordance with the disk supporting apparatus of claim 1 of the present invention, since disks are supported and held rotatably by the plurality of first holding means that are supported concentrically with the supporting means, a disk can be inclined or placed upright at each of the first holding means. In this case, a planar dimension (space) of the disk supporting apparatus can be lessened.

In accordance with the disk supporting apparatus of claim 3 of the present invention, since, in a reproducible state of the disk held by the first holding means, the first holding means is supported by the supporting means so as to form a disk surface into a polygonal pyramid configuration including a predetermined point on the axis as a vertex, a planar dimension (space) of the disk supporting apparatus can be lessened. Namely, in accordance with the disk supporting apparatus of claim 3 of the present invention, since a planar dimension of the disk supporting apparatus of the present invention becomes narrower than that of a conventional turntable, a plurality of disks can be disposed at the disk supporting apparatus.

In accordance with the disk holding apparatus or the disk apparatus of claim 6 or 7 of the present invention, since the turntable and the first driving means are self-held by the connecting means, the turntable and the first driving means can be connected to each other smoothly and reliably.

In accordance with the disk supporting apparatus or the disk apparatus of claim 6 or 7 of the present invention, if a disk apparatus is structured so as to move the turntable between one position at which the turntable and the first driving means are connected to each other and the other, a disk is rotatably held at the turntable in advance, and the disk is not displaced from the turntable, whereby a conventional mis-chucking of a disk can be prevented.

Further, In accordance with the disk holding apparatus or the disk apparatus of claims 6 and 7 of the present invention, since a disk is rotatably held at the turntable in advance, even when a deformed disk is used, the disk can be positioned smoothly and reliably at the turntable.

In accordance with the disk holding apparatus or the disk apparatus of claim 8 or 9 of the present invention, the connecting means connects the first drive means and the turntable, and in the state in which the first connection portion and the second connection portion are connected to each other, the first positioning means positions the first or second connection portion. Accordingly, the turntable can be positioned smoothly ad reliably.

In accordance with the disk holding apparatus or the disk apparatus of claim 8 or 9 of the present invention, a distance between a pickup disposed at the disk apparatus and the disk attached to the turntable and a rotational center of the turntable is always maintained constant. Accordingly, the focus servo and the tracking servo can appropriately be controlled.

In accordance with the disk apparatus of claim 10 of the present invention, since the tray is rotated and the holder is moved, respectively, by the same second driving means and a common driving path, the number of parts used for the apparatus of the present invention can be reduced as compared to those in a conventional disk changer, whereby the disk apparatus is structured more simply and manufactured inexpensively.

In accordance with the disk apparatus of claim 11 of the present invention, the lock means locks the turntable at a predetermined position in an unconnected mode in which the connecting means is not connected to the turntable. Accordingly, even when the turntable and a spindle are not connected to each other, for example, during a disk change time at which the tray is rotating, or at the time when the disk apparatus is carried, occurrence of a rattle or a rattle noise due to a play between the turntable and the tray can be prevented.

In accordance with the disk apparatus of claim 12 of the present invention, the third positioning means positions the information processing means in the state in which connection between the connecting means and the turntable has been completed. Therefore, when a disk is detached or attached with respected to a turntable, if an unexpected load is applied to the tray, the tray is reliably supported. Accordingly, in accordance with the disk apparatus of claim 12 of the present invention, since the tray for which the connection between the connecting means and the turntable has been completed is reliably supported by the third positioning means, the disk can be detached or attached with respect to the turntable with more excellent workability.

In accordance with the disk apparatus of claim 13 of the present invention, after the disk has been changed, the second moving means moves the apparatus body in order to place the tray in the vicinity of the panel. Accordingly, a gap between the turntable and the opening portion of the panel becomes smaller than that of a conventional disk apparatus. As a result, a disk can be attached to/removed from the turntable through the opening portion with more excellent workability.

In accordance with the disk apparatus of claim 14 of the present invention, since the detecting means detects that a disk is not appropriately attached to the turntable, in the disk changer, for example, a disk is prevented from flowing away from the turntable due to a centrifugal force.

In accordance with the disk apparatus of claim 15 of the present invention, during the rotation of the tray, since the sliding means slides the tray such that the solid-angle portion of the tray does not protrude from the apparatus body, the apparatus body can be made more compact than a conventional one.

In accordance with the disk holding apparatus of claim 16 of the present invention, for example, even if a shock is applied to the apparatus body, since the engaging means and the control means abut with each other, a disk is not easily ejected from the turntable so that the disk can reliably be held at the turntable.

In accordance with the disk holding device of claim 18 of the present invention, since the second positioning means is provided between the third connecting portion of the turntable and the fourth connecting portion of the first driving means, the first driving means and the turntable are radially aligned to each other, whereby a rotational run-out of the turntable during the rotation of the first driving means can be prevented.

Further, in accordance with the disk holding device of claim 18 of the present invention, since a distance between a pickup provided at the disk apparatus and a disk attached to the turntable, and a rotational center of the turntable are maintained constant, a focus servo and a tracking servo are normally controlled.

What is claimed is:

1. A disk supporting apparatus comprising:
first holding means for rotatably holding disks; and
supporting means having a plurality of supporting portions for supporting the first holding means to be concentric therewith,
wherein the supporting means can rotate around an axis to be concentric with the first holding means, and the supporting portions have surfaces which are respectively inclined with respect to a predetermined point on the axis as a vertex,
wherein the first holding means is connected to or released from a disk driving means provided at reproducing means for reproducing a disk, and the supporting means supports the first holding means such that surfaces of respective disks form faces of a polygonal pyramid configuration including the predetermined point on the axis as a vertex, in a state in which disks are held by all of the first holding means.

2. A disk supporting apparatus comprising:
first holding means for rotatably holding disks; and
supporting means having a plurality of supporting portions for supporting the first holding means to be concentric therewith,
wherein the supporting means can rotate around an axis to be concentric with the first holding means, and the supporting portions have surfaces which are respectively inclined with respect to a predetermined point on the axis as a vertex,
wherein the supporting means is provided with engaging portions which are disposed at plate-shaped supporting portions and rotatably engage the first holding means, and respective surfaces of the plate-shaped supporting portions form faces of a polygonal pyramid configuration including the predetermined point on the axis as a vertex, in a state in which disks are held by all of the first holding means.

3. A disk supporting apparatus comprising:
first holding means for rotatably holding disks; and
supporting means having a plurality of supporting portions for supporting the first holding means to be concentric therewith,
wherein the supporting means can rotate around an axis to be concentric with the first holding means, and the supporting portions have surfaces which are respectively inclined with respect to a predetermined point on the axis as a vertex,
wherein the first holding means is connected to or released from disk driving means provided at a reproducing means for reproducing a disk, and the supporting means supports the first holding means such that surfaces of respective disks form faces of a polygonal pyramid configuration including the predetermined point on the axis as a vertex, in a state in which disks are held by all of the first holding means,
wherein the supporting means has an engaging portion which is disposed at each of plate-shaped supporting portions and rotatably engages the first holding means, and respective surfaces of the supporting portions form faces of a polygonal pyramid configuration including the predetermined point on the axis, as a vertex.

4. A disk supporting apparatus comprising:
a plurality of first holding units each configured to rotatably hold a disk; and
a supporting unit having a plurality of supporting portions configured to support the plurality of first holding units to be concentric therewith,
wherein the supporting unit is configured to rotate around an axis to be concentric with the first holding units, and the supporting portions have surfaces which are respectively inclined with respect to a predetermined point on the axis as a vertex,
wherein the plurality of first holding units are connected to or released from a disk driving unit provided at a reproducing unit configured to reproduce a disk, and the supporting unit supports the first holding unit such that surfaces of respective disks form faces of a polygonal pyramid configuration including the predetermined point on the axis as a vertex, in a state in which disks are held by the plurality of first holding units.

5. A disk supporting apparatus comprising:
a plurality of first holding units each configured to rotatably a hold disk; and
a supporting unit having a plurality of supporting portions configured to support the plurality of first holding units to be concentric therewith,
wherein the supporting unit is configured to rotate around an axis to be concentric with the first holding units, and the supporting portions have surfaces which are respectively inclined with respect to a predetermined point on the axis as a vertex,
wherein the supporting unit is provided with engaging portions which are disposed at plate-shaped supporting portions and rotatably engage the first holding units, and respective surfaces of the plate-shaped supporting portions form faces of a polygonal pyramid configuration including the predetermined point on the axis as a vertex, in a state in which disks are held by a plurality of the first holding units.

6. A disk supporting apparatus comprising:

a plurality of first holding units each configured to rotatably a hold disk; and a supporting unit having a plurality of supporting portions configured to support the first holding units to be concentric therewith, wherein the supporting unit is configured to rotate around an axis to be concentric with the first holding units, and the supporting portions have surfaces which are respectively inclined with respect to a predetermined point on the axis as a vertex, wherein the first holding units are connected to or released from a disk driving unit provided at a reproducing unit configured to reproduce a disk, and the supporting unit supports the first holding units such that surfaces of respective disks form faces of a polygonal pyramid configuration including the predetermined point on the axis as a vertex, in a state in which disks are held by a plurality of the first holding units, wherein the supporting unit has an engaging portion which is disposed at each of plate-shaped supporting portions and rotatably engages the first holding units, and respective surfaces of the supporting portions form faces of a polygonal pyramid configuration including the predetermined point on the axis, as a vertex.

* * * * *

UNITED STATES PATENT AND TRADEMARK OFFICE
CERTIFICATE OF CORRECTION

PATENT NO. : 7,231,648 B2
APPLICATION NO. : 10/433481
DATED : June 12, 2007
INVENTOR(S) : Chikara Ute et al.

It is certified that error appears in the above-identified patent and that said Letters Patent is hereby corrected as shown below:

Column 1, line 14, change "disposed" to --disposed.--;

Column 1, line 47, change "damper" to --clamper-- at both occurrences;

Column 1, line 66, change "damper" to --clamper--;

Column 2, line 5, change "damper" to --clamper--;

Column 2, line 31, change "damper" to --clamper--;

Column 2, line 33, change "damper" to --clamper--;

Column 2, line 38, change "damper" to --clamper--;

Column 3, line 13, change "serve" to --servo--;

Column 5, line 16, change "ad" to --and--;

Column 7, line 20, change "In" to --in--;

Column 7, line 41, change "One" to --one--;

Column 9, line 9, change "respected" to --respect--;

Column 16, line 43, change "other" to --other.--;

Column 18, line 61, change "damper" to --clamper--;

Column 23, line 28, change "damper" to --clamper--;

Column 23, line 45, change "damper" to --clamper--;

Column 23, line 59, change "damper" to --clamper--;

Column 25, line 61, change "14 1A" to --141A--;

Column 25, line 64, "change"14 1A" to --141A--;

Column 32, line 63, change "f" to --of--;

UNITED STATES PATENT AND TRADEMARK OFFICE
CERTIFICATE OF CORRECTION

PATENT NO. : 7,231,648 B2
APPLICATION NO. : 10/433481
DATED : June 12, 2007
INVENTOR(S) : Chikara Ute et al.

It is certified that error appears in the above-identified patent and that said Letters Patent is hereby corrected as shown below:

Column 34, line 26, change "dick" to --disk--;

Column 34, line 53, change "these" to --this--;

Column 35, line 56, change "whish" to --which--;

Column 36, line 36, change "128 by." to --128.--;

Column 36, lines 43-44, change "38 carries out." to --38.--;

Column 36, line 54, change "plat" to --plate--;

Column 40, line 13, change "140 by." to --140.--;

Column 44, line 20, change "substantial" to --substantially--;

Column 44, line 39, change "only predetermined" to --only one predetermined--;

Column 45, line 67, change "In" to --in--;

Column 47, line 14, change "10is" to --10 is--;

Column 47, line 18, change "he" to --the--;

Column 47, line 55, change "s" to --is--;

Column 48, line 59, change "only predetermined" to --only one predetermined--;

Column 51, line 45, change "54 1A" to --541A--;

Column 52, line 15, change "potion" to --portion--;

Column 54, line 17, change "In" to --in--;

Column 54, line 29, change "ad" to --and--;

Column 54, line 60, change "respected" to --respect--;

UNITED STATES PATENT AND TRADEMARK OFFICE
CERTIFICATE OF CORRECTION

PATENT NO.        : 7,231,648 B2
APPLICATION NO.   : 10/433481
DATED             : June 12, 2007
INVENTOR(S)       : Chikara Ute et al.

It is certified that error appears in the above-identified patent and that said Letters Patent is hereby corrected as shown below:

Column 56, line 57, change "a hold" to --hold a--;

Column 57, line 9, change "a hold" to --hold a--;

Signed and Sealed this

Fifteenth Day of April, 2008

JON W. DUDAS
*Director of the United States Patent and Trademark Office*